(12) United States Patent
Boduch et al.

(10) Patent No.: US 8,565,603 B2
(45) Date of Patent: Oct. 22, 2013

(54) RECONFIGURABLE OPTICAL ADD DROP MULTIPLEXER CORE DEVICE, PROCEDURE AND SYSTEM USING SUCH DEVICE, OPTICAL LIGHT DISTRIBUTOR, AND COUPLING-RATIO ASSIGNING PROCEDURE

(75) Inventors: Mark E. Boduch, Geneva, IL (US); Kimon Papakos, Chicago, IL (US); Gilbert A. Buescher, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 13/348,158

(22) Filed: Jan. 11, 2012

(65) Prior Publication Data
US 2012/0106970 A1 May 3, 2012

Related U.S. Application Data

(62) Division of application No. 12/099,587, filed on Apr. 8, 2008, now Pat. No. 8,116,629.

(60) Provisional application No. 60/907,565, filed on Apr. 9, 2007.

(51) Int. Cl.
*H04J 14/02* (2006.01)

(52) U.S. Cl.
USPC ............................................. 398/82; 398/83

(58) Field of Classification Search
IPC ..................... H04J 14/0221,14/0278
See application file for complete search history.

(56) References Cited

U.S. PATENT DOCUMENTS

| 7,133,616 | B2 | 11/2006 | Caroli |
| 7,184,666 | B1 | 2/2007 | Li et al. |
| 7,231,107 | B1 | 6/2007 | Zhong et al. |
| 7,272,321 | B1 | 9/2007 | Kuo et al. |

(Continued)

FOREIGN PATENT DOCUMENTS

| EP | 1 628 424 A | 2/2006 |
| WO | 03/061330 A | 7/2003 |
| WO | 2008/008277 A | 1/2008 |

OTHER PUBLICATIONS

PCT International Search Report and Written Opinion of International Search Authority in PCT/JP2008/059672 issued Nov. 14, 2008.

(Continued)

*Primary Examiner* — Danny Leung
(74) *Attorney, Agent, or Firm* — Fitzpatrick, Cella, Harper & Scinto

(57) ABSTRACT

A reconfigurable optical add drop multiplexer core device includes a light distributor, a light combiner, and first and second sets of add and drop ports. The light distributor is configured to receive an optical signal along a primary input of the reconfigurable optical add drop multiplexer core device and to distribute the received optical signal along a plurality of subtending outputs. The light combiner is configured to receive optical signals along a plurality of subtending inputs, to combine the received optical signals into a combined signal, and to output the combined signal. The add and drop ports in the first set function as add and drop ports, respectively, and the add and drop ports in the second set function as both add and drop ports, respectively, and as express ports connectable to another reconfigurable optical add drop multiplexer core device.

20 Claims, 78 Drawing Sheets

(56) References Cited

U.S. PATENT DOCUMENTS

| | | |
|---|---|---|
| 7,343,066 B2 | 3/2008 | Doerr et al. |
| 7,653,311 B2 | 1/2010 | Kikuchi et al. |
| 2002/0186432 A1 | 12/2002 | Roorda et al. |
| 2004/0042712 A1 | 3/2004 | Cho et al. |
| 2005/0281558 A1 | 12/2005 | Wang et al. |
| 2006/0034610 A1 | 2/2006 | Akiyama et al. |
| 2006/0133807 A1* | 6/2006 | Jenkins et al. ............ 398/59 |
| 2007/0237524 A1 | 10/2007 | Gerstel et al. |
| 2008/0008474 A1 | 1/2008 | Boduch et al. |
| 2008/0013953 A1 | 1/2008 | Boduch et al. |
| 2008/0013954 A1 | 1/2008 | Boduch et al. |
| 2008/0260386 A1 | 10/2008 | Boduch et al. |
| 2008/0267631 A1 | 10/2008 | Collings et al. |

OTHER PUBLICATIONS

Lei Zong et al.; "A Novel Tunable DeMUX/MUX Solution for WSS-Based ROADM and WXC Nodes," Optical Fiber Communication Conference and Exposition National Fiber Optic Engineers Conference, OFCNFOEC 2007 Mar. 25-29, 2007, pp. 1-7.

A Jajszczyk et al.; "An Architecture for a Photonic Fast Packed Switching Fabric," Proceedings of the Global Telecommunications Conference (Blobecom), New York, Dec. 2, 1991, pp. 1219-1223.

PCT International Search Report and Written Opinion of International Search Authority in PCT/US2009/001387 issued Sep. 9, 2009.

European Search Report dated Nov. 29, 2010, in European Application No. 07 796 705.7-2415.

\* cited by examiner

RECONFIGURABLE OPTICAL ADD DROP MULTIPLEXER CORE DEVICE, PROCEDURE AND SYSTEM USING SUCH DEVICE, OPTICAL LIGHT DISTRIBUTOR, AND COUPLING-RATIO ASSIGNING PROCEDURE

CROSS-REFERENCE TO RELATED APPLICATIONS

This application is a divisional of U.S. patent application Ser. No. 12/099,587, filed Apr. 8, 2008, issued as U.S. Pat. No. 8,116,629 on Feb. 14, 2012, which claims the benefit under 35 U.S.C. §119(e) of U.S. Provisional Application No. 60/907,565 filed Apr. 9, 2007.

INCORPORATION BY REFERENCE

The present application incorporates by reference the contents of the U.S. Provisional Application No. 60/907,565 and appendices 1, 2, and 3 thereof in their entirety as if fully set forth herein.

BACKGROUND

1. Field

Example embodiments disclosed herein relate in general to the field of wavelength division multiplexing and more particularly to a multifunctional reconfigurable network element, and a DWDM optical node, optical network, and procedure.

2. Related Art

Wavelength Division Multiplexing (WDM) and Dense Wavelength Division Multiplexing (DWDM) are technologies that enable a multitude of optical wavelengths of differing frequencies to be transported over a single optical fiber. A DWDM network is constructed by interconnecting multiple DWDM network elements. Each network element typically contains elements such as optical multiplexing equipment, optical de-multiplexing equipment, optical amplifiers, optical power monitors, optical supervisory channel processors, network element control processors, and optical converters.

First generation DWDM network equipment provided the ability to transport a multitude of optical wavelengths between two points over a single pair of optical fibers. These systems are referred to as DWDM point-to-point systems.

Second generation DWDM network equipment provided the ability to interconnect DWDM network elements in a "ring" configuration. These elements contained two DWDM network interfaces and multiple single wavelength ports used to add and drop wavelengths to and from the DWDM network interfaces. Second generation DWDM network elements provided the ability to "pass" wavelengths directly between their two DWDM network interfaces. However, in order to do this, fiber cables had to be manually interconnected within a system each time a "pass-through" connection is required.

Third generation DWDM network elements included Reconfigurable Optical Add Drop Multiplexers, commonly referred to as ROADMs. ROADMs provided the ability to remotely reconfigure the DWDM network element. For these systems, wavelengths could be remotely configured to pass-through the network element without manual intervention. Since these third generation DWDM network elements also contained only two DWDM network interfaces, they were commonly referred to as 2-degree network elements. But these third generation DWDM network elements connect only a single add-on device to the ROADMs. As a result, while they are reconfigurable, they are not multifunctional, which limits their usefulness.

SUMMARY

One or more of the example embodiments disclosed herein provide a reconfigurable optical add drop multiplexer core device that includes a light distributor, a light combiner, and first and second sets of add and drop ports. The light distributor is configured to receive an optical signal along a primary input of the reconfigurable optical add drop multiplexer core device and to distribute the received optical signal along a plurality of subtending outputs. The light combiner is configured to receive optical signals along a plurality of subtending inputs, to combine the received optical signals into a combined signal, and to output the combined signal. The add and drop ports in the first set function as add and drop ports, respectively. The add and drop ports in the second set function as both add and drop ports, respectively, and as express ports connectable to another reconfigurable optical add drop multiplexer core device.

One or more of the example embodiments disclosed herein also provide a procedure for processing optical signals with a first reconfigurable optical add drop multiplexer core device having a first set of add and drop ports, each connectable to a second reconfigurable optical add drop multiplexer core device, and a second set of add and drop ports. The procedure includes at least one of a receiving operation and an outputting operation. The receiving operation receives an optical signal through one of the add ports of the first set of add ports from the second reconfigurable optical add drop multiplexer core device and provides the optical signal with a path through the first reconfigurable optical add drop multiplexer core device with less insertion loss than that provided to an optical signal received through an add port of the second set of add ports. The outputting operation outputs an optical signal through one of the drop ports of the first set of drop ports to the second reconfigurable optical add drop multiplexer core device and provides the dropped optical signal a path through the first reconfigurable optical add drop multiplexer core device with less insertion loss than that provided to the optical signal output through one of the drop ports of the second set of drop ports.

One or more of the example embodiments disclosed herein further provide an optical system including first and second reconfigurable optical add drop multiplexer core devices. The first reconfigurable optical add drop multiplexer core device has a plurality of add and drop ports. The second reconfigurable optical add drop multiplexer core device is connected to the first reconfigurable optical add drop multiplexer core device through an add port and a drop port of the first reconfigurable optical add drop multiplexer core device.

One or more of the example embodiments disclosed herein also provide an optical light distributor including a primary input, an express output, a plurality of subtending outputs, and a light-directing device. The light directing device is configured to perform the following operations on a wavelength arriving on the primary input: direct the entire optical power of the wavelength only to the express output; direct the entire optical power of the wavelength only to one of the subtending outputs; and direct a portion of the optical power of the wavelength to only one of the subtending outputs and a portion of the optical power of the wavelength to the express output.

Further, one or more example embodiments disclosed herein provide a dense wavelength division multiplexing optical add/drop optical node. The node includes first, second, and third sets of optical couplers. The output of the first set of optical couplers and part of the output of the second set of optical couplers is input into the third set of optical couplers. The coupling ratios for the first set of optical couplers is equal among all the inputs of each optical coupler in the first set. The coupling ratios for the second set of optical couplers is such that the power level of an optical wavelength output therefrom along a path directed to a drop port of a first reconfigurable optical add drop multiplexer core device in the node is the minimum required power for optical wavelengths dropped from the first reconfigurable optical add drop multiplexer core device. The coupling ratios for the third set of optical couplers maximizes the power level of the optical wavelength exiting the third set of optical couplers with the lowest optical power.

In addition, one or more of the example embodiments provide a procedure for assigning coupling ratios for first, second, and third sets of optical couplers within a dense wavelength division multiplexing optical add/drop node. The output of the first set of optical couplers and part of the output of the second set of optical couplers is input into the third set of optical couplers. The procedure includes choosing the coupling ratios for the first set of optical couplers to be equal among all the inputs of each optical coupler in the first set. The procedure also includes choosing the coupling ratios for the second set of optical couplers such that the power level of an optical wavelength output therefrom along a path directed to a drop port of a first reconfigurable optical add drop multiplexer core device in the node is the minimum required power for optical wavelengths dropped from the first reconfigurable optical add drop multiplexer core device. The procedure further includes choosing the coupling ratios for the third set of optical couplers to maximize the power level of the optical wavelength exiting the third set of optical couplers with the lowest optical power.

BRIEF DESCRIPTION OF THE DRAWINGS

The features and advantages of the example embodiments presented herein will become more apparent from the detailed description set forth below when taken in conjunction with the drawings in which like reference numbers indicate identical or functionally similar elements.

FIG. 20A is an example embodiment of the general case using e expansion ports, where e is an integer greater than 0, FIG. 20B is an example embodiment where e equals 1, and where a 4:1 coupler is used, FIG. 20C is an example embodiment where e equals 1, and where three 2:1 couplers are used, and FIG. 20D is an example embodiment where e equals 1, where three 2:1 couplers are used, and where the number of total add ports is eight, the number of total drop ports is eight, the number of add ports functioning also as express ports is two, and the number of drop ports functioning also as express ports is two.

FIGS. 47A and 47B are block diagrams of example embodiments of type-1 ROADMs, in which FIG. 47A shows a ROADM with the VOAs removed from the add ports and with a single VOA placed at the output of a k-to-1, equal-split coupler, while FIG. 47B shows a ROADM with the VOAs removed from the add ports.

Figure 1:
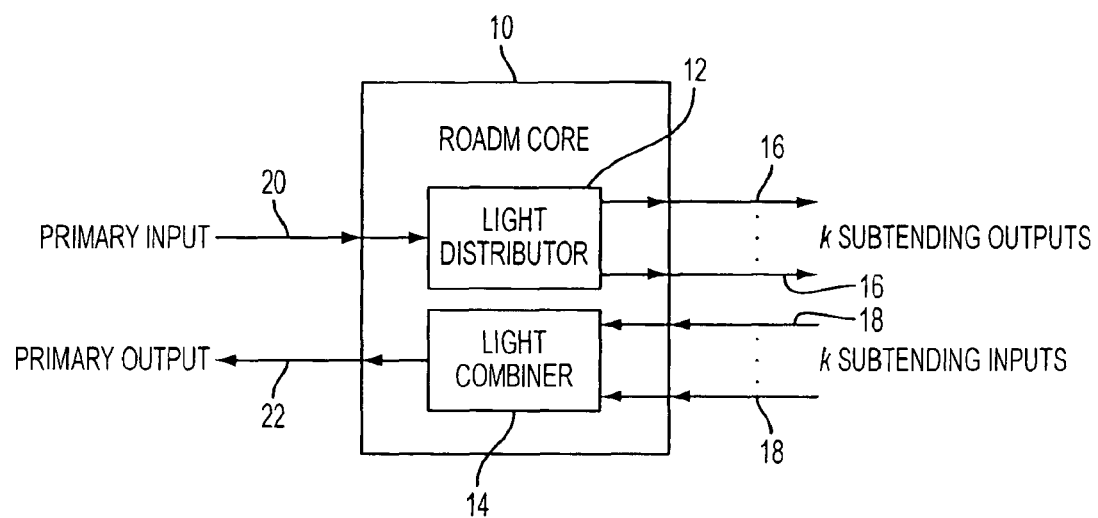
FIG. 1 is a block diagram of an example embodiment of a ROADM device.

To provide a more complete understanding of the various example embodiments and features and advantages thereof, reference is made to the following description of examples embodiments, taken in conjunction with the accompanying figures

DETAILED DESCRIPTION

The example embodiments presented herein are directed to devices, procedures, systems and computer program products for reconfigurable optical add drop multiplexer devices and reconfigurable optical add drop multiplexer core devices, which are described herein in terms of a DWDM environment. This description is not intended to limit the application of the example embodiments presented herein. In fact, after reading the following description, it will be apparent to one skilled in the relevant art(s) how to implement the following example embodiments in alternative embodiments. In addition, it should be understood to one ordinarily skilled in the art that the inventive techniques illustrated by the disclosed example embodiments could be used in other WDM environments, such as a Coarse Wavelength Division Multiplexing environment, without limitation.

As used in this application, the term "ROADM" is defined as a reconfigurable optical add drop multiplexer that is configurable to transmit and receive optical signals of single and multiple wavelengths to and from other optical devices. In some example embodiments, as will be discussed below, a ROADM is configurable to receive an optical signal or signals from an add port thereof and to drop an optical signal or signals at a drop port thereof, although it is not limited thereto. In other example embodiments, as will be discussed below, a ROADM is configurable to receive an optical signal or signals from an add port of a device coupled to the ROADM within the same optical node and to drop an optical signal or signals at a drop port of the coupled device, although it is not limited thereto. In still other example embodiments, as will be discussed below, a ROADM is configurable to transmit a multiple wavelength signal on a subtending output thereof and to receive a multiple wavelength signal on a subtending input thereof, although it is not limited thereto. The subtending inputs and outputs can be coupleable to another optical device in the same optical node. But it should be understood that ROADMs are not limited to transmitting multiple wavelength signals to optical devices within the same optical node and to receiving multiple wavelength signals from optical devices within the same optical node. Accordingly, in other example embodiments that will be discussed below, a ROADM receives a multiple wavelength signal from and transmits a multiple wavelength signal to a network node interface that connects to another node.

In addition, as used in this application, the term "ROADM core device" or "ROADM core" is a type of ROADM that can be used in an optical network and/or an optical node and that can connect to at least two add-on devices. Such a ROADM core device enables the formation of a multifunctional and reconfigurable optical node if the add-on devices are of different types, thereby providing a plurality of different functions to the ROADM core device. As also used in this application, an add-on device or module, also called a ROADM add-on, is an optical device connectable to a ROADM, via at least one subtending input and one subtending output of the ROADM, and that is configured to transmit optical signals of multiple wavelengths to the ROADM and to receive optical signals of multiple wavelengths from the ROADM, such as, but not limited to, another ROADM, port expansion packs, and spur access packs. In addition, as used in this application, the terms "network node interface", "network interface", "input line interface", "line in", "line out", "line input port", "line in port", "line output port", "line out", and "DWDM line interface" are used interchangeably and are used to denote the interface between a ROADM in one node and another node to permit optical communication between the two nodes. Various example embodiments described below provide a ROADM and a ROADM core with additional functionality. For example, according the various embodiments, a ROADM may also be configurable and reconfigurable to 1) receive optical signals of single and multiple wavelengths, divide the received optical signals into a plurality of optical signals and output the plurality of optical signals, 2) combine received optical signals into a single optical signal, and output the single optical signal, 3) receive and process signals of a single wavelength or multiple wavelengths at an add port thereof and/or drop signals of a single wavelength or multiple wavelengths from a drop port thereof, and/or 4) change the subtending output or drop port from which a single-wavelength optical signal is output or dropped and/or change the selection of single-wavelength optical signals originating on different subtending inputs or add ports thereof that are output from subtending outputs or drop ports thereof. But it should be understood that ROADMs are not limited to these functions or the additional functions discussed below, and that it is within the scope of the example embodiments for the ROADMs described herein to include additional and/or alternative functions. It should also be understood that ROADMs are not limited to performing all of the functions noted above and discussed below, but are configurable to perform any subset of the above and below discussed functions.

The ROADMs described herein can include add and drop ports. These ports can be of two types: colored add and drop ports and colorless add and drop ports. A colored port is pre-assigned only one particular frequency or wavelength. No other wavelengths or frequencies can be used with such a "colored" port. As a result, only the pre-assigned wavelength for a particular add port can be added at that add port, and only the pre-assigned wavelength for a particular drop port can be dropped from that drop port. A colorless add/drop port is not assigned a particular frequency or wavelength so that any frequency or wavelength can be used with the port (e.g., any wavelength can be added to any of the colorless add ports and any wavelength can be dropped from any of the colorless drop ports).

According to at least one example embodiment, a 4th generation DWDM networking element and procedure are provided that can be used by themselves or with additional elements and procedures to form a multifunctional, reconfigurable DWDM optical node, a DWDM optical network, and a DWDM system, and to practice a DWDM procedure. One or more colorless optical ports and one or more colored optical ports that can extend the functionality of a DWDM optical node also can be provided, as will be discussed below.

FIG. 1 illustrates an example embodiment of a ROADM 10. The ROADM 10 includes a light distributor 12, a light combiner 14, a plurality of subtending outputs 16, and a plurality of subtending inputs 18. However, it is within the scope of the example embodiment for the ROADM 10 to include a plurality of light distributors 12 and a plurality of light combiners 14. The light distributor 12 can include a primary input interface 20, also called a primary input 20, while the light combiner 14 can include a primary output interface 22, also called a primary output 22. The ROADM 10 can constitute part of or an entire optical node. In these cases, the primary input interface 20 of the light distributors 12 can receive optical signals from a primary output of the ROADM of another optical node and the primary output interface 22 of the light combiners 14 can transmit optical signals to a primary input of the ROADM of another optical node. The light distributors 12 can be used to distribute (in some manner as known to those skilled in the art) the light arriving on the primary input 20 to the subtending outputs 16. The light combiners 14 can be used to combine (in some manner as known to those skilled in the art) the light arriving on the subtending inputs 18 to the primary output 22. Any of multiple types of light combiners, and any of multiple types of light distributors can be used in accordance with example embodiments, as will be described below. ROADM 10 can be provided with a network node interface (not shown) through which it transmits multiple-wavelength optical signals to and receives multiple-wavelength signals from another optical node.

Types of Light Combiners and Light Distributors

Figure 2A:
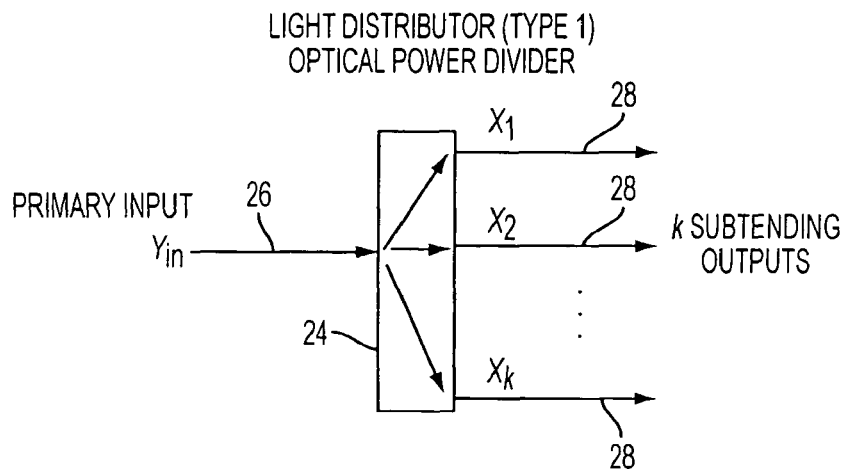
FIG. 2A is a block diagram of an example embodiment of a type-1 light distributor and FIG. 2B is a block diagram of an example embodiment of a type-1 light combiner.

FIG. 2A shows an example of a type-1 light distributor 24 in accordance with an example embodiment. The type-1 light distributor 24 can route a portion of the total amount of light entering at a primary input $y_{in}$ 26 to each of subtending outputs 28, which are individually denoted as $x_1, x_2 \ldots x_k$, where k is a positive integer representing the total number of subtending outputs. Expressed in another way, $x_i$ represents the ith subtending output, where "i" ranges from 1 to k. For the case of an "even" distributor, an equal amount of light is diverted from the primary input $y_{in}$ 26 to each of the subtending outputs $(x_1, x_2 \ldots x_k)$ 28. For instance, for the case of an "even" 1-to-2 light distributor having two subtending outputs $x_1$ and $x_2$, half of the light at the primary input $y_{in}$ 26 is diverted to subtending output $x_1$, and half of the light is diverted to subtending output $x_2$. In general, the amount of optical power $P_x$, at any given output $x_i$ of k total outputs can be determined by the formula $P_{x_i} = b_i P_{y_{in}}$ (where $P_{y_{in}}$ is the amount of optical power applied to primary input $y_{in}$, $b_i$ represents the scaling coefficient of the light distributor for output $x_i$, and $$\sum_{i=1}^{k} b_i = 1 \bigg).$$

Therefore, for the case of an 50/50 light distributor, 50 percent of the light is sent to output $x_1$ ($b_1$=0.5) and 50 percent of the light is sent to output $x_2$ ($b_2$=0.5). In reality, an actual light distributor is not ideal and the light from the primary input $y_{in}$ 26 may not always be perfectly coupled into the subtending outputs 28, so that a small error term ($e_i$) may be associated with each output $x_i$ of the type-1 light distributor. Therefore, for the non-ideal light distributor, $P_{x_i} = b_i P_{y_{in}} - e_i$. It is within the scope of the example embodiment for the type-1 light distributor 24 to be constructed such that an uneven proportion of light from the primary input $y_{in}$ 26 is directed to each of the subtending outputs 28 so that the amount of light output on each subtending output 28 is not identical. Therefore, for the case of an ideal 80/20 light distributor, 80 percent of the light is sent to output $x_1$ ($b_1$=0.8) and 20 percent of the light is sent to output $x_2$ ($b_2$=0.2). It is also within the scope of the example embodiment, for the type-1 light distributor 24 to operate without being programmed with the knowledge of the frequencies (wavelengths) associated with the light upon which it operates. The type-1 light distributor 24 is also called an optical power divider or an optical splitter.

Figure 2B:
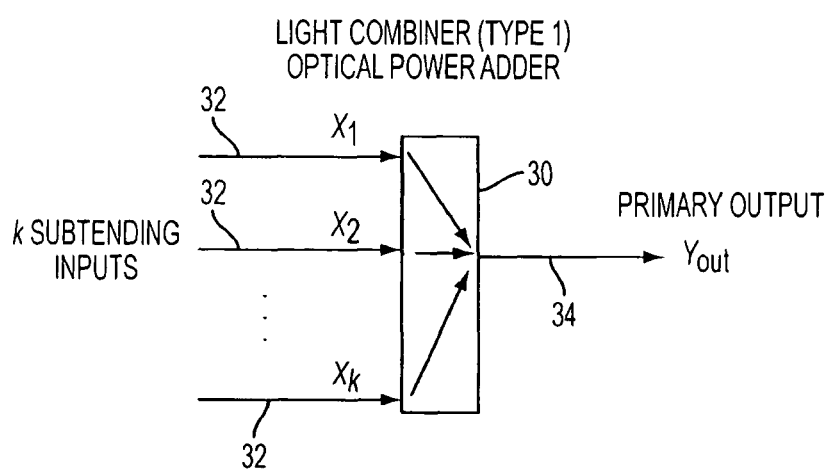

FIG. 2B shows an example embodiment of a type-1 light combiner 30. The type-1 light combiner 30 shown in FIG. 2B can be configured to combine the light from subtending inputs 32 and direct the optical power associated with those subtending inputs 32 to a primary output, $y_{out}$ 34. The subtending inputs 32 are individually identified as $x_1, x_2 \ldots x_k$, k in this case being the total number of subtending inputs 32. Expressed in another way, $x_i$ in this example represents the ith subtending input, where "i" ranges from 1 to k. In an example of a ROADM core device including a type-1 light combiner 30, the total number of subtending inputs can be the same as the total number of subtending outputs. But it is within the scope of the example embodiment for the total number of subtending inputs to be different than the total number of subtending outputs. In addition, in one example embodiment, the light combiner 30 can be an "even" combiner, in which the percentage of light sent to the primary output $y_{out}$ 34 from each of the subtending inputs 32 is equal. For the case of an "even" 2-to-1 light combiner 30, half of the light output from the primary output $y_{out}$ 34 comes from the subtending input $x_1$, and half of the light output from the primary output $y_{out}$ 34 comes from the subtending input $x_2$. In general, for the case of a k input light combiner, the amount of optical power $P_{y_{out}}$ at output $y_{out}$ can be determined by the formula $$P_{y_{out}} = \sum_{i=1}^{k} b_i P_{x_i}$$

(where $b_i$ represents the scaling coefficient of the light combiner for input $$x_i, \sum_{i=1}^{k} b_i = 1,$$

and $P_{x_i}$ is the power applied to input $x_i$). In reality, though, for a non-ideal light combiner, the light from the subtending inputs 32 may not always be perfectly coupled into the primary output 34, so that a small error term (e) may be associated with the type-1 light combiner 30. Therefore, for the non-ideal light combiner $$P_{y_{out}} = \sum_{i=1}^{k} b_i P_{x_i} - e.$$

It is within the scope of the example embodiment for the type-1 light combiner 30 to be also constructed such that an uneven proportion of light is directed from each of the subtending inputs 32 to the light combiner output 34. As a result, the primary output may receive a different percentage of light from each subtending input. Therefore, for the case of an ideal 70/30 light combiner, 70 percent of the light from input $x_1$ is coupled to $y_{out}$ ($b_1$=0.7) and 30 percent of the light from input $x_2$ is coupled to $y_{out}$ ($b_2$=0.3). It is also within the scope of the example embodiment for the type-1 light combiner 30 to operate without being programmed with the knowledge of the frequencies (wavelengths) associated with the light upon which it operates. The type-1 light combiner 30 is also called an optical power adder or an optical coupler.

Figure 3A:
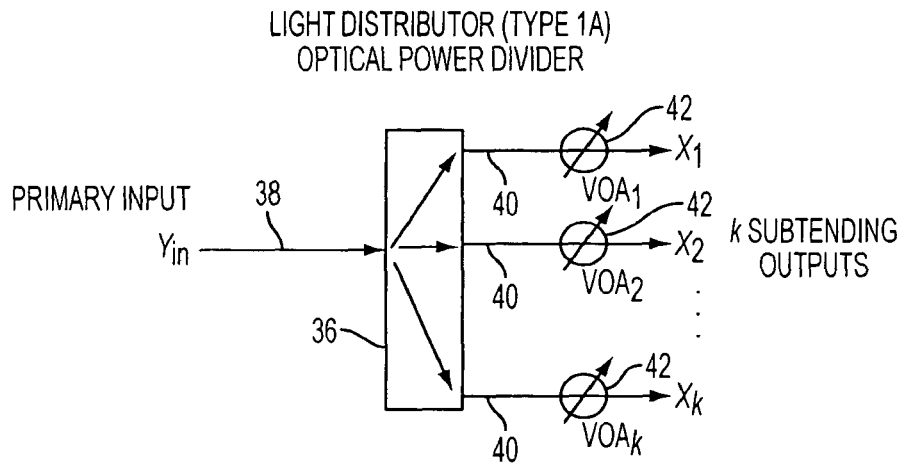
FIG. 3A is a block diagram of an example embodiment of a type-1A light distributor and FIG. 3B is a block diagram of an example embodiment of a type-1A light combiner.

FIG. 3A shows an example of a type-1A light distributor 36. The type-1A light distributor 36 can route a portion of the total amount of light entering at a primary input $y_{in}$ 38 to each of subtending outputs 40, which are individually denoted as $x_1, x_2 \ldots x_k$, k being the total number of subtending outputs. Expressed in another way, $x_i$ in this case represents the ith subtending output, where "i" ranges from 1 to k. Each subtending output 40 includes a variable optical attenuator (VOA) 42. Each VOA 42 can enable the light exiting a given subtending output to be further attenuated by some adjustable amount denoted by $a_i$, where "a" represents a coefficient of attenuation and "i" represents a particular subtending output 40 and ranges from 1 to k, where k is the total number of subtending outputs. Thus, for example, $a_1$ is the coefficient of attenuation applied to the 1$^{st}$ subtending output 40, which is denoted by $x_1$. Each VOA 42 can also allow the light exiting a given subtending output to be completely extinguished. In this case, the coefficient of attenuation takes the value of 0. Each VOA 42 can be adjusted independently from all other VOAs 42, although it is within the scope of the example embodiment to not provide interdependent control of the VOAs 42. A control signal associated with each subtending output 40 of the type-1A light distributor 36 can be used to set the attenuation value of each VOA 42, as is known to those skilled in the art. It is within the scope of the example embodiment for each subtending output 40 to include a VOA 42, and for less than all of the subtending output 40 to include a VOA 42 and for any number of subtending outputs 40 to include a VOA 42. For the case of an "even" light distributor, an equal amount of light is diverted from the primary input $y_{in}$ 38 to each of the subtending outputs $x_1, x_2 \ldots x_k$. For instance, for the case of an "even" 1-to-2 light distributor having two subtending outputs $x_1$ and $x_2$, half of the light at the primary input $y_{in}$ 38 is diverted to subtending output $x_1$, and half of the light is diverted to subtending output $x_2$. In general the amount of optical power $P_{x_i}$ at any given output $x_i$ of k total outputs can be determined by the formula $P_{x_i} = a_i b_i P_{y_{in}}$ (where $P_{y_{in}}$ is the amount of optical power applied to primary input $y_{in}$, $b_i$ represents the scaling coefficient of the light distributor for output $x_i$, $a_i$ represents the coefficient of attenuation for output $x_i$, $0 \le a_i \le 1$, and $$\sum_{i=1}^{k} b_i = 1 \bigg).$$

Therefore, for the case of an 50/50 light distributor (k=2) with the VOA of output $x_1$ set to attenuate its input signal by 60% and with the VOA of output $x_2$ set to attenuate its input signal by 70%, 20 percent of the light from $P_{y_{in}}$ is sent to output $x_1$ ($b_1$=0.5, $a_1$=0.4) and 15 percent of the light from $P_{y_{in}}$ is sent to output $x_2$ ($b_2$=0.5, $a_2$=0.3). In reality, an actual light distributor is not ideal and the light from the primary input $y_{in}$ 38 may not always be perfectly coupled into the subtending outputs 40, so that a small error term (e) may be associated with each output of the type-1A light distributor 36. Therefore, for the non-ideal light distributor, $P_{x_i} = a_i b_i P_{y_{in}} - e_i$. It is within the scope of the example embodiment for the type-1A light distributor 36 to be constructed such that an uneven proportion of light from the primary input $y_{in}$ 38 is directed to each of the subtending outputs 40 so that the amount of light output on each subtending output 40 is not identical (assuming the attenuation coefficients $a_i$ are the same). It is also within the scope of the example embodiment, for the type-1A light distributor 36 to operate without being programmed with the knowledge of the frequencies (wavelengths) associated with the light upon which it operates. It is further within the scope of the example embodiment for the type-1A distributor 36 to be identical to its type-1 equivalent, except that the VOA 42 is inserted in each subtending output. And it also within the scope of the example embodiment for the type-1A distributor 36 to be different from its type-1 equivalent in ways in addition to the use of the VOA. The type-1A light distributor 36 is also called an optical power divider with VOAs or an optical splitter with VOAs.

Figure 3B:
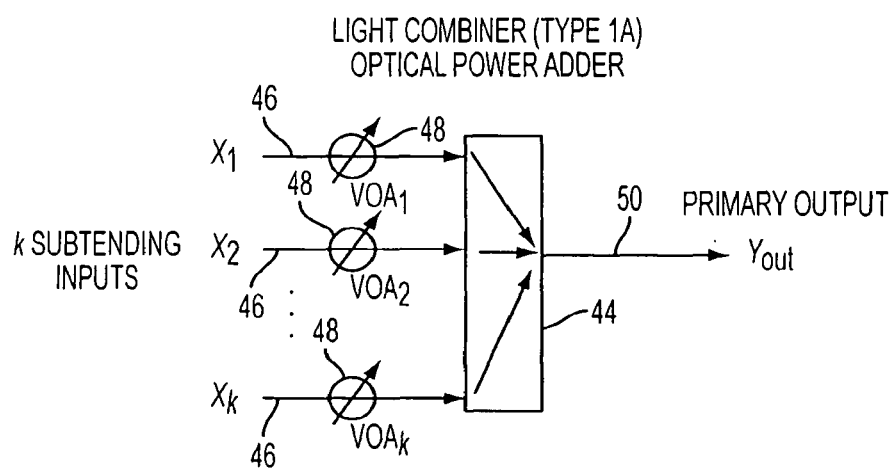

FIG. 3B shows an example embodiment of a type-1A light combiner 44. The type-1A light combiner shown in FIG. 3B can be configured to attenuate light from subtending inputs 46 using variable optical attenuators (VOAs) 48, combine the attenuated light from the subtending inputs 46, and direct the optical power associated with those subtending inputs 46 to a primary output, $y_{out}$ 50. Each VOA 48 can enable the light entering the light combiner 44 on a given subtending input to be attenuated by some adjustable amount denoted by $a_i$, where "a" represents a coefficient of attenuation and "i" represents a particular subtending input 46 and ranges from 1 to k, where k is the total number of subtending inputs; thus, for example, $a_1$ is the coefficient of attenuation applied to the $1^{st}$ subtending input 46, which is denoted by $x_1$, and $a_2$ is the coefficient of attenuation applied to the $2^{nd}$ subtending input 46, which is denoted by $x_2$. Expressed in another way, $x_i$ in this case represents the ith subtending input, where "i" ranges from 1 to k. Each VOA 48 can also enable the light entering the light combiner 44 on a given subtending input to be completely extinguished. In this case, the coefficient of attenuation takes the value of 0. Each VOA 48 can be adjusted independently from all other VOAs 48, although it is within the scope of the example embodiment, to not provide interdependent control of the VOAs 48. A control signal associated with each subtending input 46 of the type-1A light combiner 44 can be used to set the attenuation value of each VOA 48. It is within the scope of the example embodiment for each subtending input 46 to include a VOA 48, and it is within the scope of the example embodiment for less than all of the subtending inputs 46 to include a VOA 48 and for any number of subtending inputs 46 to include a VOA 48. In addition, in a ROADM core device including a type-1A light combiner 44, the total number of subtending inputs can be the same as the total number of subtending outputs. But it is within the scope of the example embodiment for the total number of subtending inputs in a ROADM core device to be different than the total number of subtending outputs. In addition, the light combiner 44 can be an "even" combiner, in which the percentage of light sent to the primary output $y_{out}$ 50 from each of the subtending inputs 46 is equal. For the case of an "even" 2-to-1 light combiner 44, half of the light output from the primary output $y_{out}$ 50 comes from the subtending input $x_1$, and half of the light output from the primary output $y_{out}$ 50 comes from the subtending input $x_2$. In general, for the case of a k input type-1A light combiner, the amount of optical power $P_{y_{out}}$ at output $y_{out}$ can be determined by the formula $$P_{y_{out}} = \sum_{i=1}^{k} b_i a_i P_{x_i}$$

(where $b_i$ represents the scaling coefficient of the light combiner for input $x_i$, $a_i$ represents the coefficient of attenuation for input $x_1$, $0 \le a_i \le 1$, $$\sum_{i=1}^{k} b_i = 1,$$

and $P_{x_i}$ is the power applied to input $x_i$). In reality though, for a non-ideal light combiner, the light from the subtending inputs 46 may not always be perfectly coupled into the primary output 50, so that a small error term (e) may be associated with the type-1A light combiner 44. Therefore, for the non-ideal type-1A light combiner $$P_{y_{out}} = \sum_{i=1}^{k} b_i a_i P_{x_i} - e.$$

It is within the scope of the example embodiment for the type-1A light combiner 44 to be also constructed such that an uneven proportion of light is directed from each of the subtending inputs 46 to the light combiner output 50. As a result, in this example embodiment, the primary output may receive a different percentage of light from each subtending input. It is also within the scope of the example embodiment for the type-1A light combiner 44 to operate without being programmed with the knowledge of the frequencies (wavelengths) associated with the light upon which it operates. It is further within the scope of the example embodiment for the type-1A light combiner 44 to be identical to its type-1 equivalent shown in FIG. 2B, except that the VOA 48 is inserted in each subtending input 46 in the type-1A light combiner 44. In addition, it is within the scope of the example embodiment for the type-1A light combiner 44 to be different from its type-1 equivalent shown in FIG. 2B in ways in addition to the use of the VOA. The type-1A light combiner 44 is also called an optical power adder with VOAs or an optical coupler with VOAs.

Figure 4A:
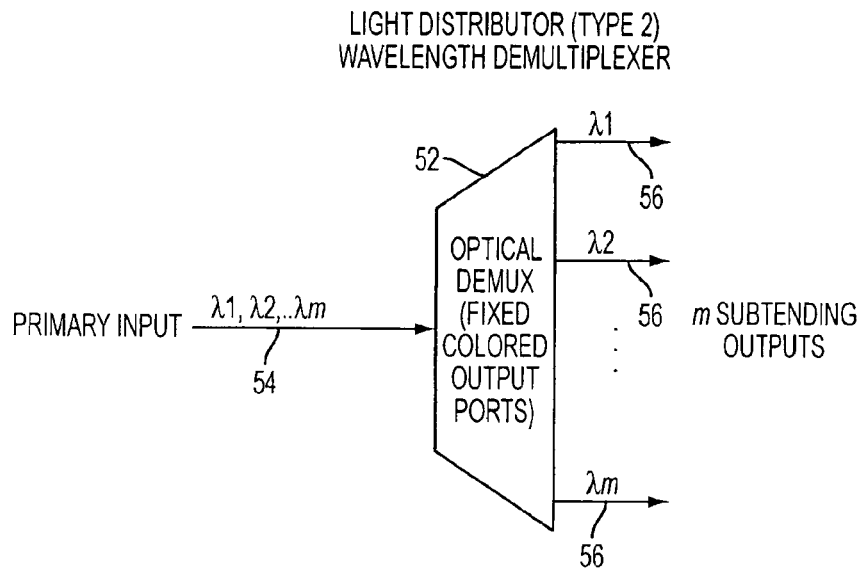
FIG. 4A is a block diagram of an example embodiment of a type-2 light distributor and FIG. 4B is a block diagram of an example embodiment of a type-2 light combiner.

FIG. 4A shows an example of a type-2 light distributor 52. The type-2 light distributor 52 can be configured to demultiplex individual wavelengths from a composite wavelength division multiplexed light stream including m multiple wavelengths denoted as $\lambda_1, \lambda_2, \ldots \lambda_m$, where m represents the total number of wavelengths in the stream. A wavelength division multiplexed (WDM) light stream or a dense wavelength division multiplexed (DWDM) light stream can be applied to the primary input 54 of the type-2 light distributor 52. The type-2 light distributor 52 is then able to divert particular wavelengths to particular subtending outputs 56, depending upon its design. In the FIG. 4A example, a DWDM signal including wavelengths $\lambda_1$ to $\lambda_m$ is applied to the type-2 light distributor 52, and the light distributor 52 directs wavelength $\lambda_1$ to subtending output 1, wavelength $\lambda_2$ to subtending output 2, and more generally, directs wavelength $\lambda_i$ to subtending output i (where i=1 to m). For the type-2 light distributor 52, a given wavelength is directed to a pre-defined and predetermined subtending output 56. There may be an inherent insertion power loss associated with the path each wavelength takes from the primary input 54 to its corresponding subtending output 56. While one example embodiment employs the same number of wavelengths as the number of subtending outputs 56, it is within the scope of the example embodiment for the number of wavelengths to differ from the number of subtending outputs 56.

Figure 4B:
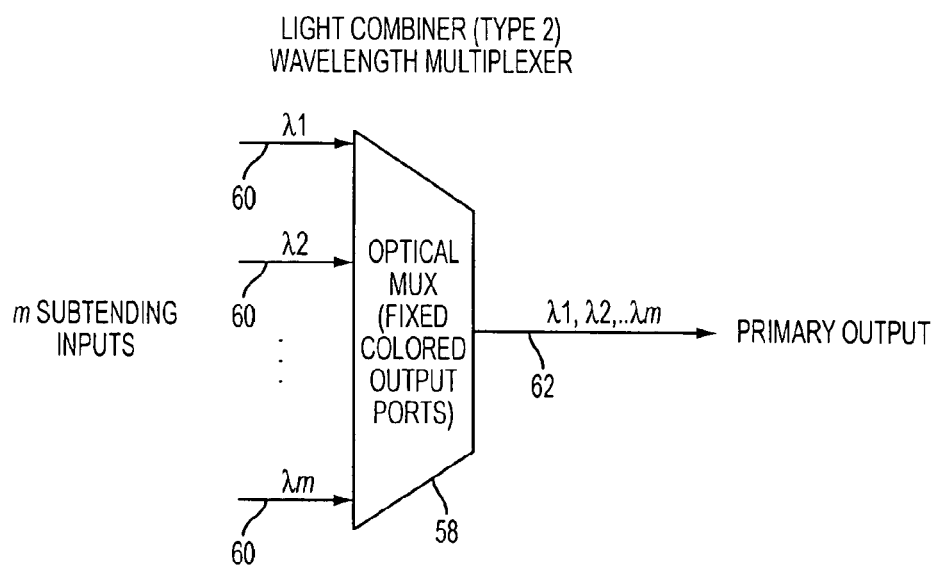

FIG. 4B shows an example of a type-2 light combiner 58, which can be used to multiplex individual wavelengths, such as $\lambda_1, \lambda_2, \ldots, \lambda_m$, arriving on individual subtending inputs 60 in order to form a composite wavelength division multiplexed light stream on primary output 62 including light of the multiple wavelengths $\lambda_1, \lambda_2, \ldots, \lambda_m$ (m in this case being an integer representing the total number of wavelengths input into the light combiner 58). A single predefined wavelength is applied to each subtending input 60 of the type-2 light combiner 58. In the FIG. 4B example, wavelength $\lambda_1$ is applied to subtending input 1, wavelength $\lambda_2$ is applied to subtending input 2, and wavelength $\lambda_m$ is applied to subtending input m. The resulting light stream exiting from the primary output 62 then includes a DWDM signal including wavelengths $\lambda_1$ through $\lambda_m$. There may be an inherent insertion power loss associated with the path each wavelength takes from its subtending input 60 to the primary output 62. An example of a physical component that performs wavelength multiplexing or wavelength demultiplexing is an Arrayed Waveguide Grating (AWG). While one example embodiment employs the same number of wavelengths as the number of subtending inputs 60, it is within the scope of the example embodiment for the number of wavelengths to differ from the number of subtending inputs 60. In another example embodiment, in a ROADM core device including a type-2 light combiner 58, the total number of subtending inputs can be the same as the total number of subtending outputs. But it is within the scope of the example embodiment for the total number of subtending inputs of such a ROADM core device to be different than the total number of subtending outputs.

Figure 5A:
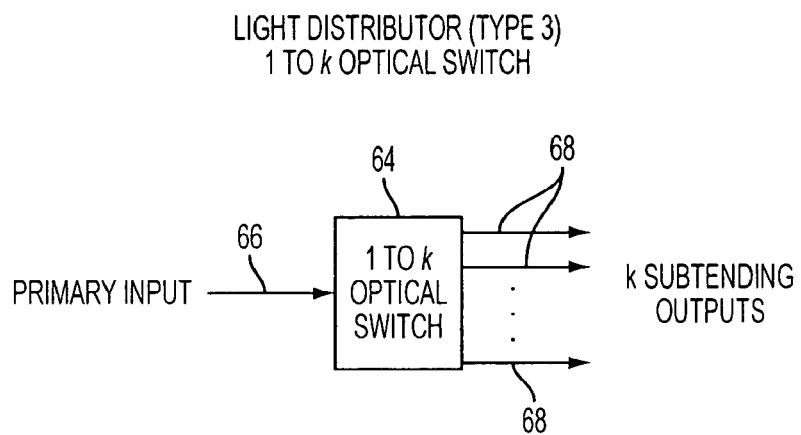
FIG. 5A is a block diagram of an example embodiment of a type-3 light distributor and FIG. 5B is a block diagram of an example embodiment of a type-3 light combiner.

FIG. 5A shows an example of a type-3 light distributor 64. The type-3 light distributor 64 can be configured to direct the light arriving on the primary input 66 to only one of the k subtending outputs 68 (in this instance, k is an integer denoting the total number of subtending outputs 68). The type-3 light distributor 64 can be programmed in a manner known to those skilled in the art to direct the light arriving at the primary input 66 to any of the k subtending outputs 68. For instance, all the light arriving at the primary input 66 could first be directed to subtending output 1, and then at some time later, the distributor 64 could be programmed or reconfigured such that all the light arriving at the primary input 66 could then be directed to subtending output 2. To accomplish this task, a control signal can be associated with the type-3 light distributor 64 to program the type-3 light distributor 64 to direct the light arriving on the primary input 66 to a selected one of the subtending outputs 68. This type-3 light distributor 64 is also called a 1-to-k optical switch.

Figure 5B:
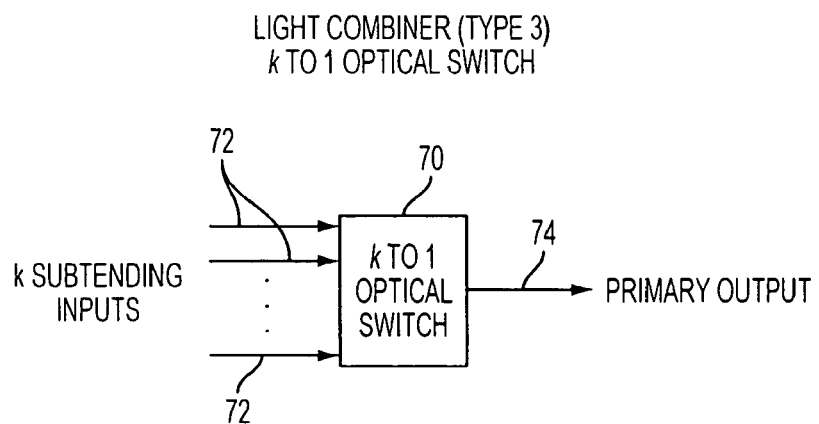

FIG. 5B shows an example of a type-3 light combiner 70 that can be configured to direct the light from only one of its subtending inputs 72 to its primary output 74. The type-3 light combiner 70 can be programmed in ways known to those skilled in the art to direct the light arriving on any of its k subtending inputs 72 to its primary output 74 (in this example embodiment, k is an integer denoting the total number of subtending inputs 72). For instance, all the light arriving on subtending input 1 could first be directed to the primary output 74, and then at some time later, the light arriving on subtending input 1 can be prevented from being directed to the primary output 74, and instead, all the light arriving on subtending input 2 can be directed to the primary output 74. To accomplish this task, a control signal can be associated with a type-3 light combiner, as is known to those skilled in the art. The control signal is used to program or reconfigure the combiner 70 to direct the light arriving on one of the subtending inputs 72 to the primary output 74. This type-3 light combiner is also called a k-to-1 optical switch. Both the type-3 light distributor 64 and the type-3 light combiner 70 may have an inherent optical insertion loss (IL) associated with the paths through them. In one example embodiment, in a ROADM core device including a type-3 light combiner 70, the total number of subtending inputs is the same as the total number of subtending outputs. But it is within the scope of the example embodiment for the total number of subtending inputs to be different than the total number of subtending outputs.

Figure 6:
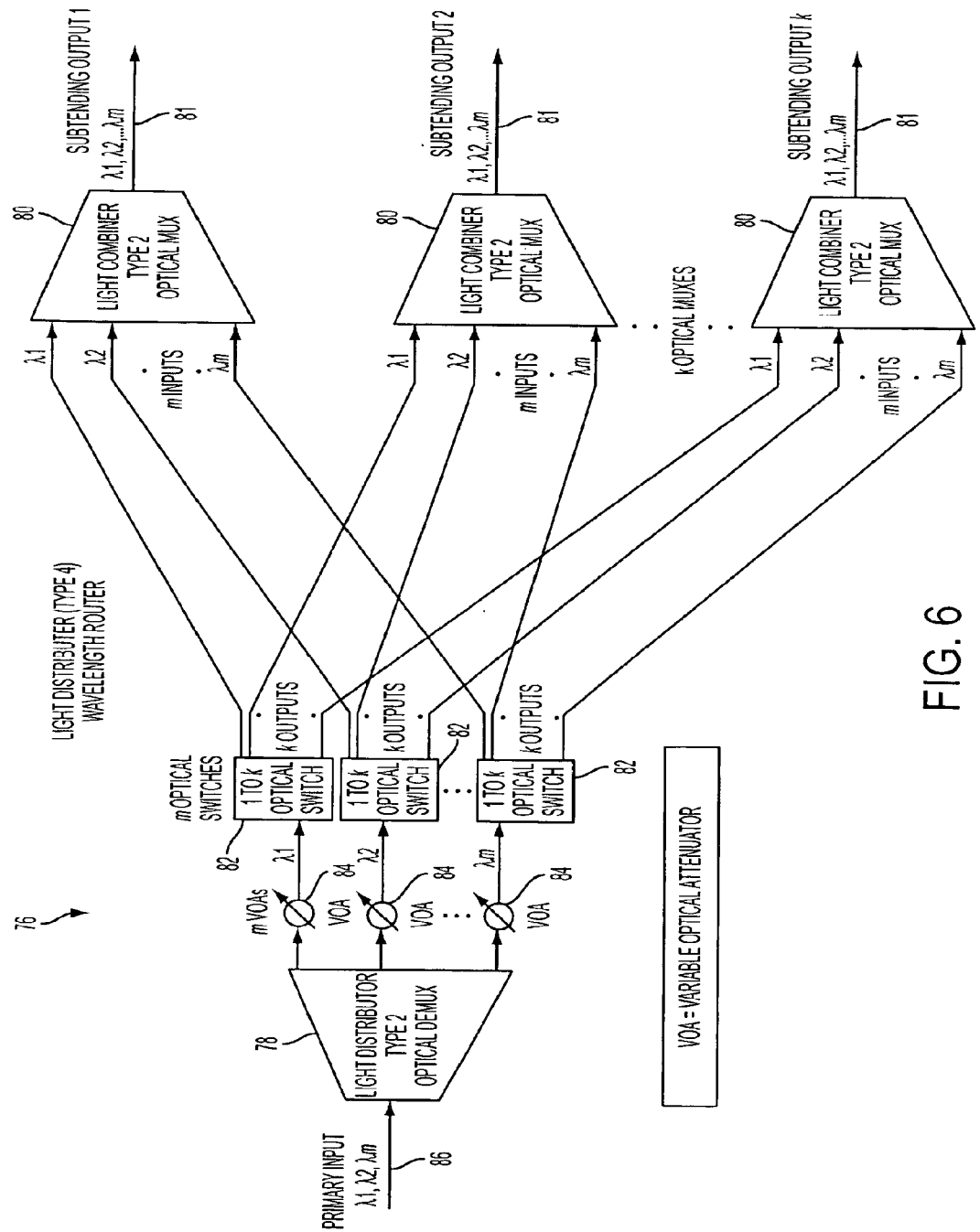
FIG. 6 is a block diagram of an example embodiment of a type-4 light distributor.
Figure 35:
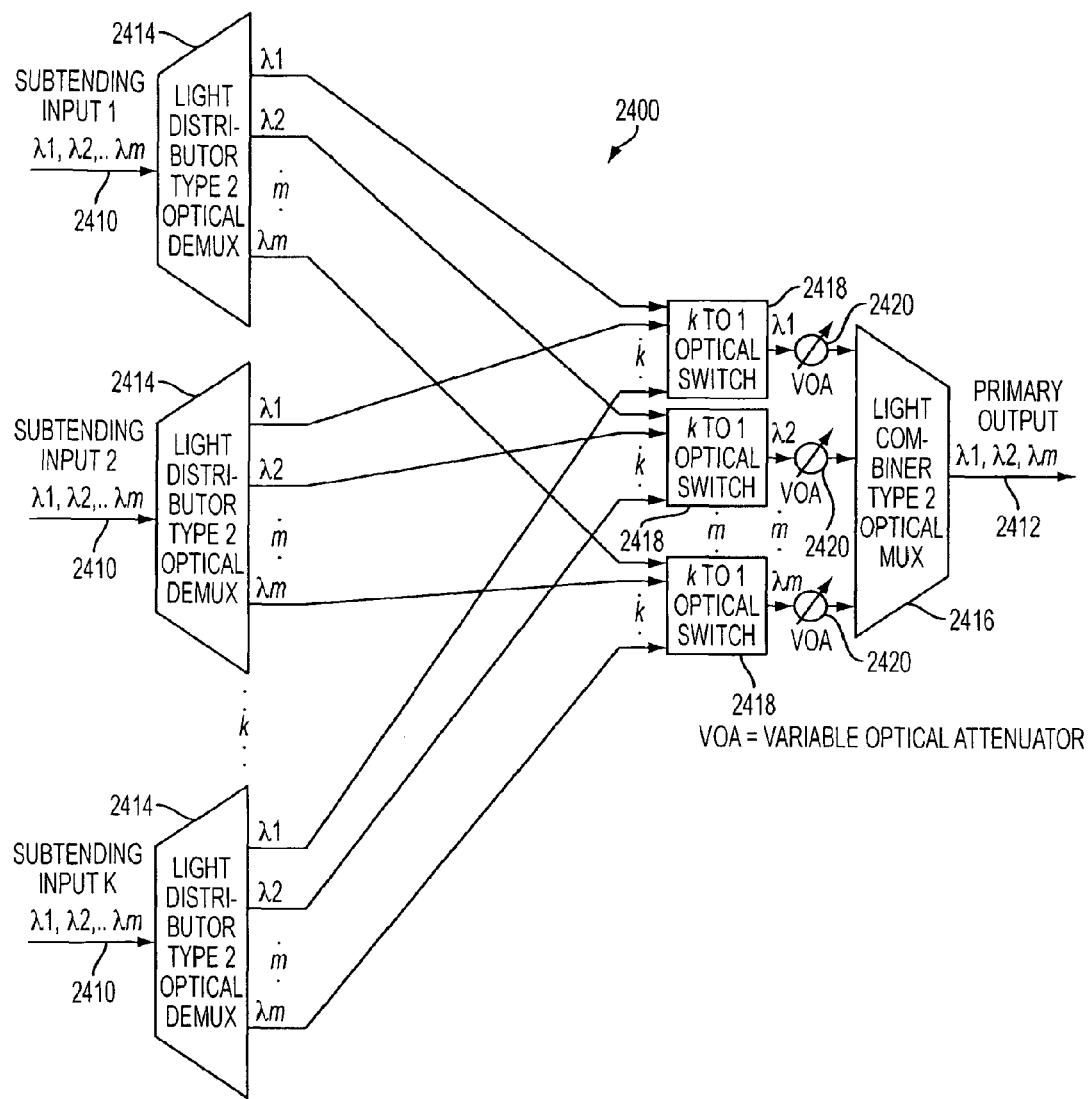
FIG. 35 is a block diagram of an example embodiment of a type-4 light combiner.
Figure 42:
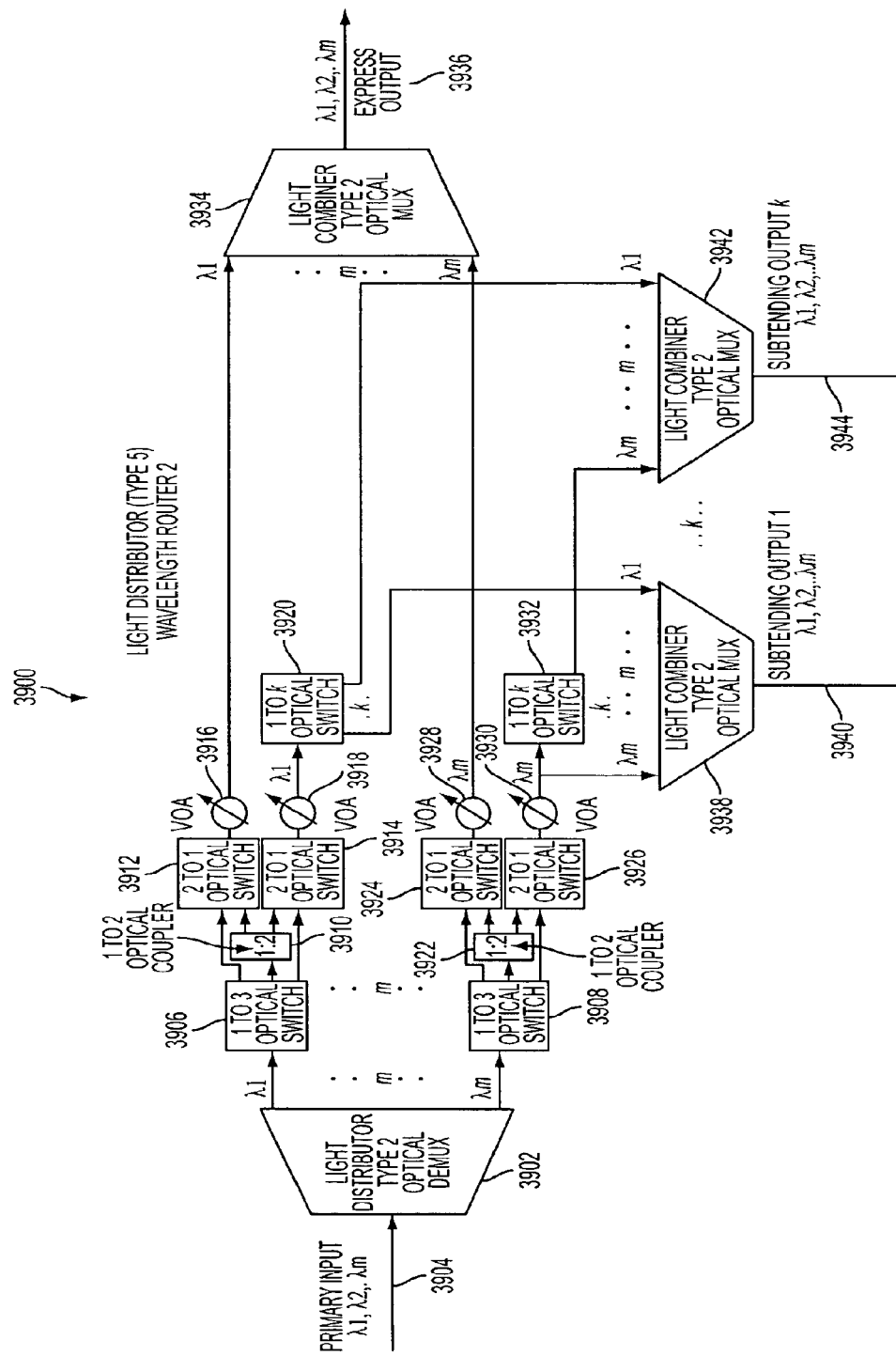
FIG. 42 is a block diagram of a type-5 light distributor.

The functions provided by the type 1, 2, and 3 light distributors and by the type 1, 2, and 3 light combiners can be further combined to form more complex light distributors and light combiners. FIGS. 6, 35, and 42 illustrate examples of such elements.

FIG. 6 shows an example of a type-4 light distributor 76. The type-4 light distributor 76 can include a type-2 light distributor 78, type-2 light combiners 80, type-3 light distributors 82, and VOAs 84 positioned between the type-2 light distributor 78 and the type-3 light distributors 82. The type-2 light distributor 78, the type-2 light combiners 80, the type-3 light distributors 82, and the VOAs 84 can be the same as, for example, the type-2 light distributor 52, the type-2 light combiner 58, the type-3 light distributor 64, and the VOAs 42, respectively, shown in FIGS. 4A, 4B, 5A, and 3A, although they are not limited thereto. In addition, a control signal associated with each VOA 84 can be used to set the attenuation value of each VOA 84. The type-4 light distributor 76 can be configured and programmed to direct each wavelength arriving in the light stream entering the primary input 86 to only one of the type-2 light combiners 80 and its associated subtending output 81, which are individually denoted by 1 through k (k being an integer representing the total number of subtending outputs in this case). This is accomplished by 1) receiving a multiple-wavelength signal, composed of multiple wavelengths up to m wavelengths ($\lambda_1, \lambda_2, \ldots \lambda_m$), with the type-2 light distributor 78 on the primary input 86 (m representing the total number of wavelengths within the light stream entering the primary input 86), 2) separating the multiple-wavelength signal into a plurality of single-wavelength optical signals with the type-2 light distributor 78, 3) individually attenuating each single-wavelength optical signal output from the type-2 light distributor 78 with a corresponding VOA 84, 4) directing each attenuated single-wavelength optical signal to a different and corresponding type-3 light distributor 82, 5) assigning each attenuated single-wavelength optical signal to only one of the type-2 light combiners 80 using its corresponding type-3 light distributor 82, so that different sets of attenuated single-wavelength optical signals can be directed to different type-2 light combiners 80, 6) combining optical signals in each set of assigned, attenuated, single-wavelength optical signals output from the type-3 light distributors 82 into a single output signal with one of the type-2 light combiners 80, and 7) outputting each single output signal from the type-2 light combiner 80 on its associated subtending output 81. The 1-to-k optical switches 82 can be programmable to direct an optical signal input thereinto to any one of the type-2 light combiners 80 and their associated subtending outputs 81. As illustrated in FIG. 6, up to m wavelengths can be included within the light stream entering the primary input 86, and up to m wavelengths can exit any given subtending output 81. The subtending outputs 81 are individually denoted by the phrase "subtending output 1", "subtending output 2", . . . "subtending output k", where k denotes the total number of subtending outputs. As noted above, the 1-to-k optical switches 82 can direct a given wavelength applied thereto to only one type-2 light combiner 80 and only one subtending output 81. Therefore, for example, if wavelength $\lambda_2$ is directed to subtending output 1, then it cannot simultaneously be directed to subtending output 2, for instance, or any other subtending output. In addition, the light distributor 76 can be programmed to attenuate the optical power of each wavelength using the VOA 84 associated with that wavelength before it is directed to a given subtending output 81 by one of the 1-to-k optical switches 82. It is also within the scope of the example embodiment for the VOA 84 associated with a given wavelength to be programmed such that the wavelength is blocked from exiting any of the subtending outputs. Further, it is within the scope of the example embodiment, for the type-4 light distributor 76 not to include the VOAs 84. And it is within the scope of the example embodiment for the light distributor 76 to include more or less than the number of type-2 light distributors 78, VOAs 84, type-3 light distributors 82, and type-2 light combiners 80 shown in FIG. 6. It is also within the scope of the example embodiment for the type-4 light distributor to include additional elements not shown in FIG. 6. It is further within the scope of the example embodiment, for any of the type-2 light distributor 78, the VOAs 84, the type-3 light distributors 82, and the type-2 light combiners 80 of the type-4 light distributor 76 shown in FIG. 6 to be replaced by any other suitable component that performs the functions of these elements discussed above. As an example, a single VOA function and a single 1 to k optical switch function may be implemented with a single mirror device (MEMs) which can both switch light and attenuate light simultaneously. Alternatively, both the VOA function and the 1 to k optical switch function may be implemented using liquid crystal technology in another example embodiment.

In summary, the path through the type-4 light distributor 76 is as follows. A WDM or DWDM light stream is applied to the primary input 86 of the distributor 78. The type-2 light distributor 78 then demultiplexes the WDM/DWDM light stream into its individual wavelengths. Each of the individual wavelengths is attenuated by some programmable amount via a corresponding VOA 84. Each wavelength is then directed to its corresponding type-2 light combiner 80 and its corresponding k subtending output 81 via its corresponding type-3 light distributor 82 (1-to-k optical switch). At each type-2 light combiner 80, the combiner 80 multiplexes up to m wavelengths into a WDM/DWDM signal on a corresponding subtending output 81.

The light distributor 76 is a 1-to-k, type-4 light distributor configured to operate upon m wavelengths and using m VOA control signals, and m 1-to-k optical switch control signals. The type-4 light distributor 76 is also called a wavelength router or a wavelength selective switch (WSS).

Figure 7:
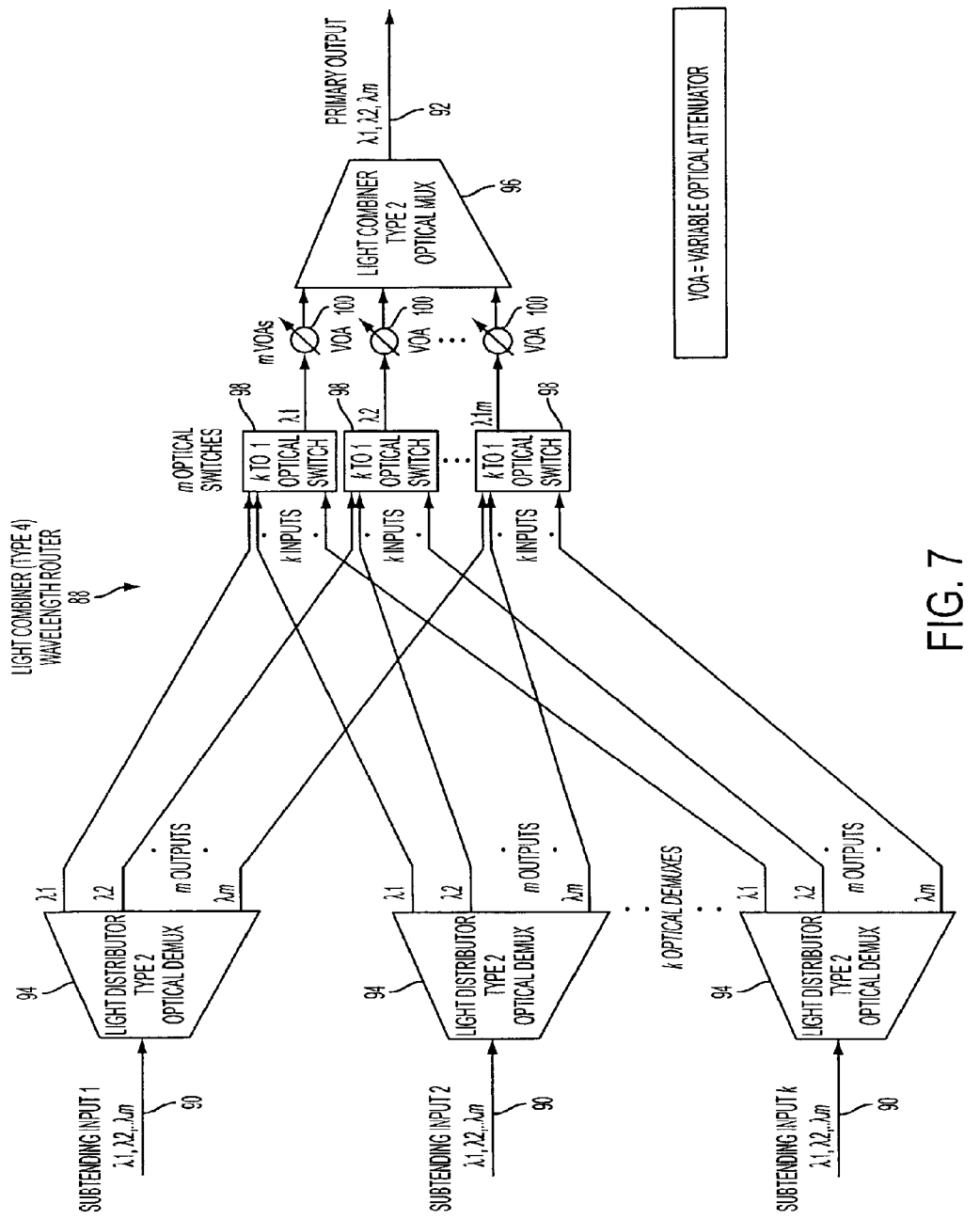
FIG. 7 is a block diagram of an example embodiment of a type-1 ROADM core device.

FIG. 7 shows an example embodiment of a type-1 ROADM core device 102. It includes a type-1 light combiner 102a or a type-1A light combiner 102b and a type-4 light distributor 102c. The type-1 light combiner 102a, the type-1A light combiner 102b, and the type-4 light distributor 102c can be the same as, for example, the type-1 light combiner 30, the type-1A light combiner 44, and the type-4 light distributor 76, respectively, as shown in FIGS. 2B, 3B, and 6, although they are not limited thereto. It is within the scope of the example embodiment for the type-1 ROADM core device 102 to include more than the number of components (i.e., one type-1 light combiner 102a, one type-1A light combiner 102b, and one type-4 light distributor 102c) shown in FIG. 7. It is further within the scope of the example embodiment for any of the type-1 light combiner 102a or the type-1A light combiner 102b, and the type-4 light distributor 102c shown in FIG. 7 to be replaced by any other suitable component (or components) that performs (or perform) the functions thereof, as discussed above.

Figure 8:
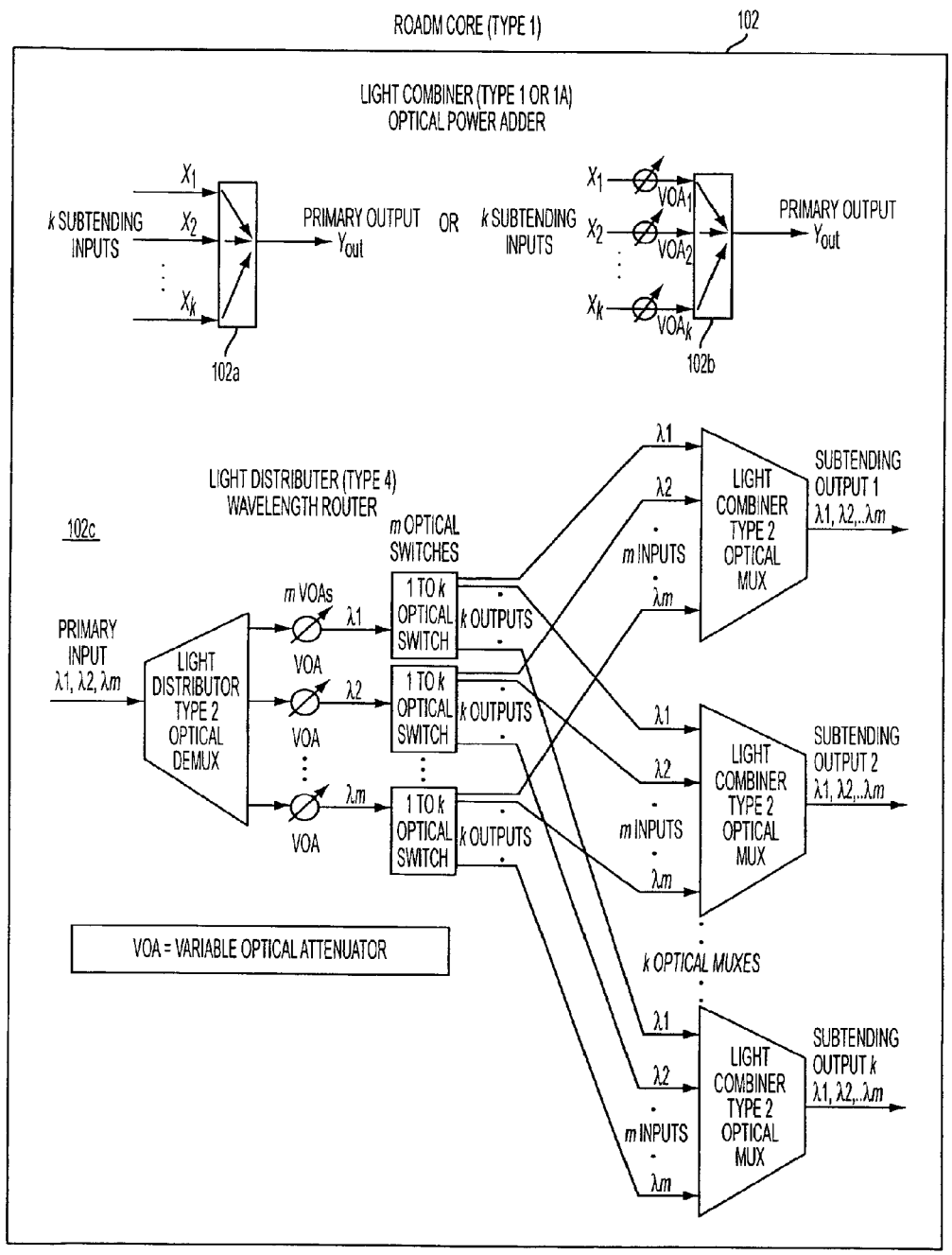
FIG. 8 is a block diagram of an example embodiment of two paired type-1 ROADM core devices making up a 2-degree optical node.

FIG. 8 shows example embodiments of how two type-1 ROADM core devices can be configured to build the multiplexing and demultiplexing functions associated with a 2-degree ROADM based optical node including two DWDM line interfaces.

FIG. 8 is a block diagram of an example of a DWDM network element 104 including an optical node that is used to add and drop wavelengths to and from a DWDM network ring or other type of network. The network element 104 includes two type-1 ROADM core devices, including an east ROADM core device 108 and a west ROADM core device 110, each including a bidirectional DWDM line interface 108a, 110a, respectively. The bidirectional DWDM line interface is also called a line interface, a network node interface, or a network interface. The type-1 ROADM core devices 108, 110 can be the same as, for example, the type-1 ROADM core device 102 shown in FIG. 7, although they are not limited thereto. It is within the scope of the example embodiment for the network element 104 to include more than the number of type-1 ROADM core devices shown in FIG. 8. It is further within the scope of the example embodiment for any of the type-1 ROADM core devices 108, 110 to be replaced by any other suitable component (or components) that performs (or perform) the functions thereof discussed below. It is also within the scope of the example embodiment to connect to each primary input 108b, 110b of each ROADM core device 108, 110 an input optical amplifier (not shown). The input optical amplifier can be used to compensate for any loss associated with the length of fiber connected to the primary input 108b, 110b of the ROADM core device 108, 110. Similarly, it is within the scope of the example embodiment to connect to the primary output 108c, 110c of the each ROADM core device 108, 110 an output optical amplifier (not shown). The output optical amplifier could be used to compensate for any insertion loss of the two ROADMs 108, 110 located between a primary input (for example, the primary input 110b on the west ROADM core device 110) and a primary output (for example, the primary output 108c on the east ROADM core device 108 for instance). The input optical amplifier (not shown) could have the ability to adjust its optical gain, based upon the length of fiber connected to it. The output optical amplifier, however, may be of the fixed-gain type, since insertion loss of the two ROADMs 108 and 110 is normally a fixed non-changing value. Alternatively, however, the output optical amplifier can be of the varying gain type, in order to accommodate different types of ROADMs of differing insertion losses. It is within the scope of the any of the other example embodiments disclosed herein to include such optical amplifiers. It is also within the scope of the example embodiment for network element 104 to include more than the number of type-1 ROADM core devices shown in FIG. 8. It is further within the scope of the example embodiment, for any of the type-1 ROADM core devices 108, 110 shown in FIG. 8 to be replaced by any other suitable component (or components) that performs (or perform) the functions thereof.

The processing of a signal entering the network element 104 will now be described. A DWDM signal can enter a DWDM line interface 108a, 110a of the network element 104 at the primary input 110b on the west side of the network element, for example, at the west ROADM 110, as shown in FIG. 8. At the DWDM line interface 110a, the optical supervisory channel of the DWDM signal is filtered out from the other optical wavelengths and forwarded to an associated optical supervisory channel processor (not shown) for further processing. It is within the scope of the any of the other example embodiments discussed herein to include such filtering and supervisory channel processing. In the example embodiment in which the network element includes an optical input amplifier (not shown), the remaining optical wavelengths can be forwarded to the associated optical input amplifier (not shown), which simultaneously amplifies all the wavelengths as they pass through it. Following amplification, the amplified wavelengths can be sent to the type-4 light distributor unit 112 within the west ROADM 110 (or, in example embodiments in which there is no amplification, after the optical supervisory channel is filtered out, the DWDM signal is forwarded directly to the type-4 light distributor unit 112 within the west ROADM 110). The light distributor unit 112 can be used to isolate individual wavelengths in order to allow them to be "dropped" to individual optical converters (not shown) at drop outputs 110d, also called drop output ports, of the west ROADM 110 (the east ROADM 108 has corresponding drop outputs 108d, to which individual wavelengths can be dropped when a signal is input on the primary input 108b). A wavelength dropped to an optical converter is converted by the converter to either a non-colored optical signal (e.g., a 1310 or 850 nm signal) or an electrical signal. The converted signal is then passed out a client interface of the converter. In FIG. 8, the receivers of the optical converters would be connected to the drop outputs 110d of the ROADM core device 110. Any optical wavelengths from the input amplifier (not shown) that are not dropped to an optical converter (in west ROADM 110, for example) can be passed though to the light combiner unit 114 (in the east ROADM 108, for example). In FIG. 8, these wavelengths that are "passed through" in the west to east direction follow the path from the light distributor 112 of the west ROADM 110 to the light combiner 114 in the east ROADM 108. The light combiner unit 114 in the east ROADM can be used to multiplex signals from the west ROADM 110 with the input signals from the optical line converters (not shown) connected to the east ROADM 108 at add inputs thereof 108e (the west ROADM 110 includes corresponding add inputs or ports 110e which can add wavelengths to light combiner 118 that can be combined with a signal from light distributor 116 in the east ROADM 108 when a signal is input on primary input 108b of the east ROADM 108). In one example embodiment, once these signals are combined into a single DWDM signal by the light combiner unit 114, a single DWDM signal is output from the primary output 108c to the network node interface 108a of the east ROADM 108. In another example embodiment, after leaving the light combiner unit 114 and before being output on the primary output, the single DWDM signal is forwarded to an associated output optical amplifier (not shown) in order to be amplified by some predetermined amount, and prior to exiting the network element 104, an OSC filter (not shown) is used to combine an output optical supervisory channel signal with the wavelengths of the DWDM signal from the output amplifier. It is within the scope of the other embodiments disclosed herein to include such an output amplifier and OSC filter.

The transmitters of the optical converters (not shown) connected to the add inputs 108e, 110e of the ROADM core devices 108, 110 convert client signals (either electrical or optical) to "colored" optical signals of some predetermined frequency and wavelength. For instance, a client signal could be converted to the wavelength associated with wavelength 1 of the m wavelengths supported by the ROADMs 108, 110, or alternatively a client signal could be converted to any of the wavelengths associated with any of the m wavelengths supported by the ROADMs 108, 110.

DWDM signals arriving at the primary input 108b of the east ROADM 108 can be forwarded to the light distributor unit 116 of the east ROADM 108, which separates the DWDM signals into single-wavelength signals and transmits certain single-wavelength signals to the drop outputs 108d of the east ROADM 108 and transmits other single-wavelength signals to the light combiner unit 118 in the west ROADM 110, in the same manner that is described for those signals arriving at the primary input 110b of the west ROADM 110.

The FIG. 8 network element 104 can be considered to be a "two degree" network element or node, since it is capable of connecting to two DWDM line interfaces, which can connect to two other optical nodes. Since the light distributors 112 and 116 can direct any received wavelength to any subtending output thereof, and since the add inputs 108e, 110e, which are connected to the subtending inputs of the light combiners 114, 118, can receive any wavelength directed thereto, the ROADMs 108 and 110 in FIG. 8 are said to have "colorless" add/drop ports. A colorless add/drop port is not assigned a particular frequency or wavelength so that any frequency or wavelength can be used with the port (e.g., any wavelength can be added to any of the colorless add ports and any wavelength can be dropped from any of the colorless drop ports). Thus, drop outputs 108d, 110d, and add inputs 108e and 110e are colorless ports. In the FIG. 8 network element 104, each of the outputs of the optical converters (not shown) connected to the add inputs 108e, 110e, could have VOAs (not shown). These VOAs could be used to adjust the power levels of each added wavelength to match the power levels of the "pass-through" wavelengths, before all the combined wavelengths exit the ROADMs via the primary outputs 108c, 110c. The optical power of the pass-through wavelengths can be adjusted via the VOAs within the type-4 light distributors 112, 116, although it is not required to do so.

Figure 9:
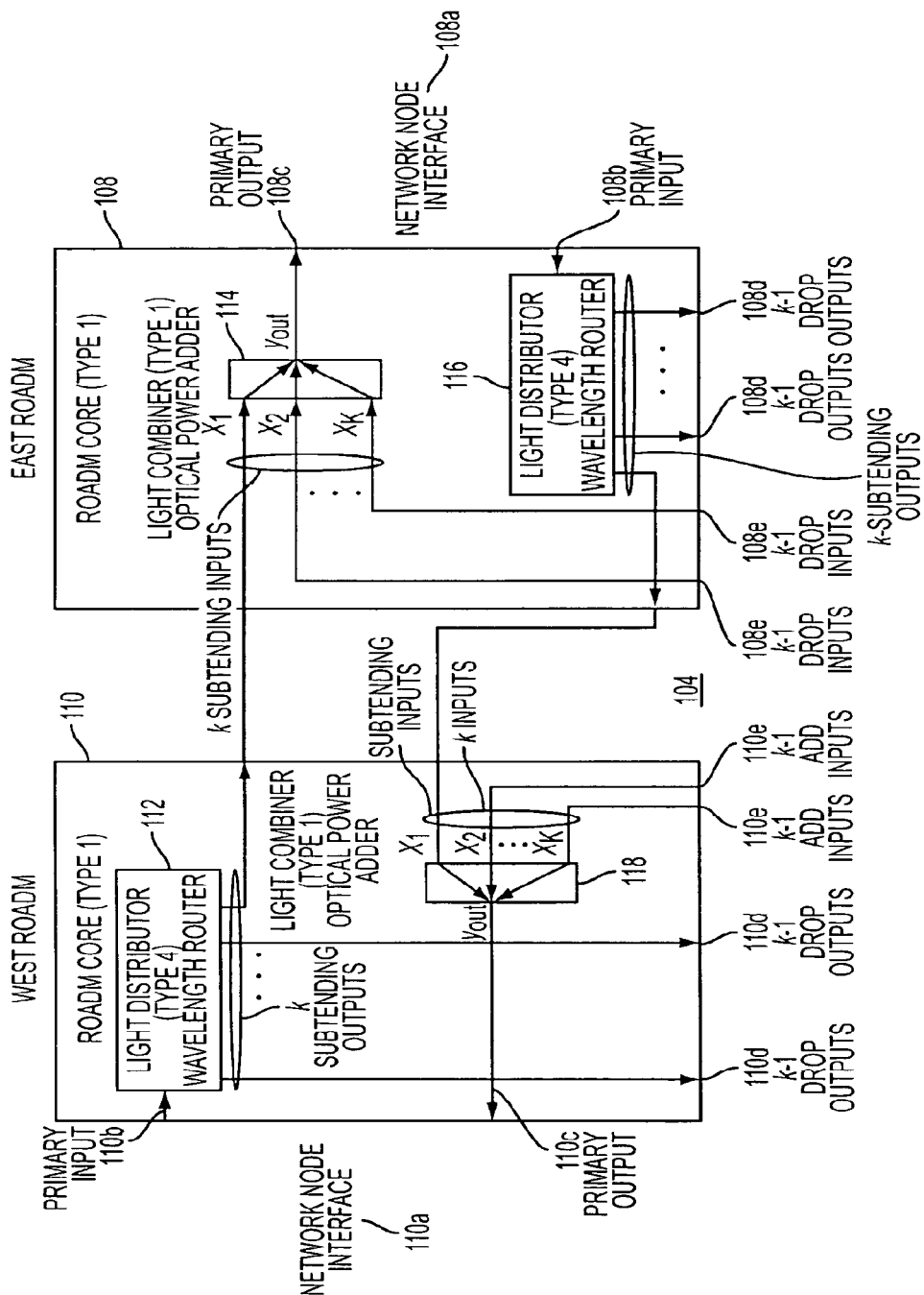
FIG. 9 is a block diagram of an example embodiment of two paired type-1 ROADM core devices including type-1A light combiners making up a 2-degree optical node.

FIG. 9 shows an example embodiment of a ROADM based network element 120 including two type-1 ROADM core devices 122 and 124 having two DWDM line interfaces 122a, 124a, respectively, and using type-1A light combiners 122b, 124b. The type-1A light combiners 122b, 124b can be the same as, for example, the type-1A light combiner 44 shown in FIG. 3B, although they are not limited thereto. Except for the replacement of type-1 light combiners 114 and 118 with type-1A light combiners 122b, 124b, the ROADM core devices 122 and 124 can be the same as, for example, the ROADM core devices 108, 110 shown in FIG. 8, although they are not limited thereto. It is within the scope of the example embodiment for network element 120 to include more than the number of type-1 ROADM core devices shown in FIG. 9. It is further within the scope of the example embodiment for any of the type-1 ROADM core devices 122, 124 to be replaced by any other suitable component (or components) that performs (or perform) the functions of thereof. The type-1A light combiners 122b, 124b allow wavelengths applied to the add inputs 122c, 124c of the ROADM core devices 122, 124 to have their optical power levels adjusted by the VOAs 122d, 124d included within the type-1A light combiners 122b, 124b, thus eliminating the need to have VOAs on the outputs of the optical converters (not shown) connected to the add inputs 122c, 124c of the ROADM core devices 122, 124. With the type-1 ROADM core devices 122, 124, the type-4 light distributors 122e, 124e provide the ability to "block" wavelengths from propagating from the primary inputs 122f, 124f of the ROADMs 122, 124 to subtending outputs 122g, 124g connected to the paired ROADM core device, since the type-4 light distributors 122e, 124e contain VOAs (not shown) whose attenuation coefficient can be set to 0 for those wavelengths. Therefore, when a given wavelength entering a type-1 ROADM core device 122, 124 (in a node having paired type-1 ROADM core devices) is diverted to a drop port 122h, 124h thereof, that wavelength can be prevented from being passed to its companion ROADM core device, and therefore an optical signal of the same wavelength can be added to the primary output 122i, 124i of the companion ROADM core device without any interference from an optical signal of the same wavelength arriving at the light combiner 122b, 124b of the companion ROADM core device.

Figure 10A:
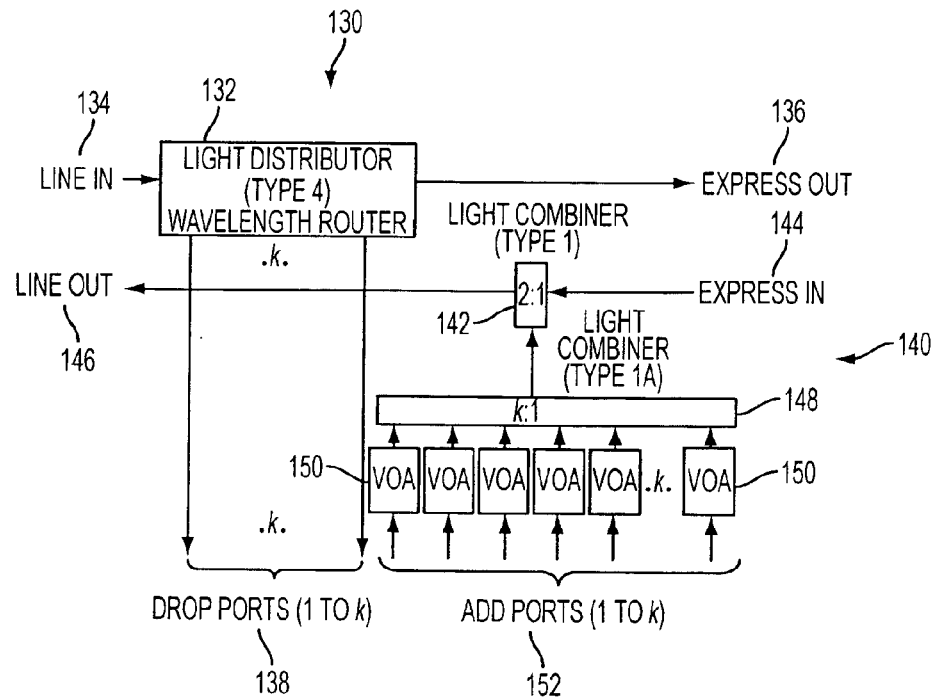
FIG. 10A is a block diagram of one example embodiment of a type-1 ROADM core device in which the add and drop ports are all of one type.

FIG. 10A shows an example embodiment of a type-1 ROADM 130 core device, which can be a variation on, but is not limited to being a variation on, one of the ROADM core devices of FIG. 9. As such, the ROADM core device 130 shown in FIG. 10(a) can be the same as, but is not limited to, for example, either of the type-1 ROADM core devices 122 and 124 shown in FIG. 9 (with the exception of the differences noted below). The ROADM core device 130 can comprise a type-4 light distributor 132 receiving optical signals input from line interface 134 (also called a line in or line input port), outputting optical signals on express output port 136, and locally dropping optical signals via k drop ports 138, where k is a positive integer representing the total number of add ports and the total number of drop ports, which are the same (although the example embodiment may have an unequal number of add and drop ports). The ROADM core device 130 can further comprise a type-1A light combiner 140 comprising a 2:1, type-1 light combiner 142 receiving optical signals from an express input port 144 and outputting optical signals from a line output interface 146 (also called a line out or line output port). The type-1 light combiner 142 can also receive optical signals from a type-1A light combiner 148. Thus, the type-1A light combiner 140 can comprise the light combiners 142 and 148. The light combiner 148 receives optical signals from k VOAs 150, each of which is connected to one of the k add ports 152. The type-1 light combiner 142, the type-1A light combiner 148, the type-4 light distributor 132, and the VOAs 150 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. The type-1 ROADM core device 130 can include more than the number of components shown in FIG. 10(a), and it is within the scope of this example embodiment for any of the type-1 light combiner 142, the type-1A light combiner 148, the type-4 light distributor 132, and the VOAs 150 shown in FIG. 10(a) to be replaced by any other suitable component (or components) that performs (or perform) the functions thereof, as discussed above.

In the ROADM core device 130, the light combiner function is performed in two stages. First the type-1A light combiner 148 can be used to combine the light associated with k add ports 152. The output of the type-1A light combiner 148 is then directed to the first input of the 2:1 type-1 light combiner 142. Thus, the first input of the type-1 light combiner 142 can receive the light output from the type-1A light combiner 148. The second input of the type-1 light combiner 142 can receive optical signals inputted into the ROADM core device 130 on the express in port 144. The combined light from the express in port 144 and from the k add ports 152 can then be directed to the line out port 146 of the ROADM core device 130.

The wavelength router 132 in FIG. 10(a) can have one primary input connected to the line in port or interface 134 of the ROADM core device 130 and k+1 subtending outputs, one of which can be connected to the express out port 136, and the remaining k outputs can be connected to the k drop ports 138.

ROADM Example Embodiment #1

Figure 10B:
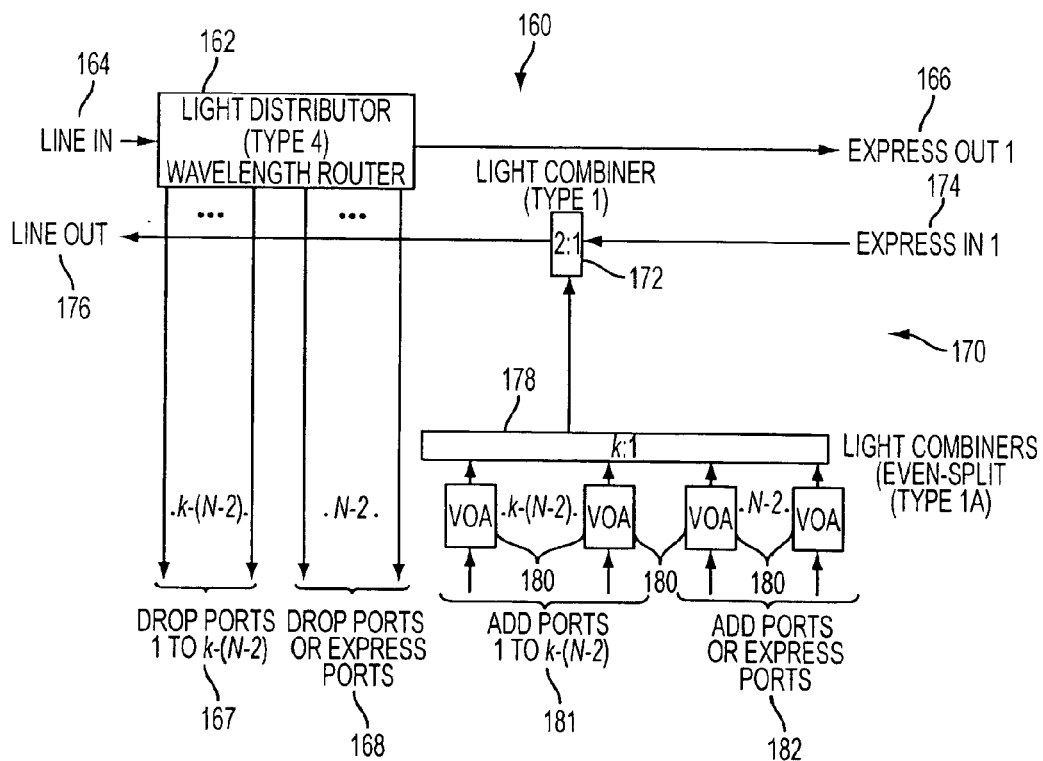
FIG. 10B is a block diagram of another example embodiment of a type-1 ROADM core device comprising ROADM example embodiment #1 having two different sets of add ports and two different sets of drop ports, the add ports in one set functioning as both add ports and express ports, and the drop ports in one set functioning as both drop ports and express ports.

FIG. 10(b) shows a first example embodiment of a type-1 ROADM core device. The optical structure of the FIG. 10(b) ROADM can be, but is not limited to being, identical to the structure of the FIG. 10(a) ROADM, except that the subtending outputs of the wavelength router and the inputs to the VOAs are reconfigured in order to support novel node level functionality, as will be discussed in detail below. However, it should be understood that it is within the scope of the example embodiment for the ROADM core shown in FIG. 10b to be the same as the ROADM shown in FIG. 10(a), except for the reconfigured subtending inputs and outputs, as noted below.

More specifically, the ROADM core device 160 can comprise a type-4 light distributor 162 receiving optical signals input from line interface or line in port 164, outputting optical signals on express output port 166, and locally dropping optical signals via two sets of drop ports. The first set of k−(N−2) drop ports 167 (where k is the total number of drop ports and the total number of add ports, which are the same although the example embodiment is not limited to having equal number of add and drop ports, and N is the number of optical degrees supported by the ROADM 160) can function only as drop ports to locally drop optical signals from the distributor 162. The second set of N−2 drop ports 168 can function as both drop ports and express ports that are connectable to another ROADM or similar optical device in the node containing the ROADM 160. The k−(N−2) drop ports 167 can emit a signal containing a single wavelength. The N−2 "drop ports or express ports" 168 can emit a signal containing a single wavelength when operating as drop ports, and can emit a signal containing more than one wavelength when operating as express ports.

The ROADM core device 160 can further comprise a type-1A light combiner 170 comprising a 2:1, type-1 light combiner 172 receiving optical signals from an express input port 174 and outputting optical signals from a line output interface 176. The type-1 light combiner 172 can also receive optical signals from a type-1A light combiner 178. Thus, the type-1A light combiner 170 can comprise the light combiners 172 and 178. The light combiner 178 can receive optical signals from VOAs 180, each connected to one of two sets of add ports. The first set of k−(N−2) add ports 181 can function only as add ports to locally add optical signals to the ROADM 160. The second set of N−2 add ports 182 can function as both add ports and express ports that are connectable to another ROADM or similar optical device in the node containing the ROADM 160 to receive optical signals therefrom. The k−(N−2) add ports 181 can receive a signal containing a single wavelength. The N−2 "add ports or express ports" 182 can receive a signal containing a single wavelength when operating as add ports, and can receive a signal containing more than one wavelength when operating as express ports.

The type-1 light combiner 172, the type-1A light combiner 178, the type-4 light distributor 162, and VOAs 180 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiner 172, the type-1A light combiner 178, and the type-4 light distributor 162 can be the same as, or different from, the type-1 light combiner 142, the type-1A light combiner 148, and the type-4 light distributor 132 shown in FIG. 10(a). Also, the type-1 ROADM core device 160 can include more than the number of components shown in FIG. 10(b), and it is within the scope of this example embodiment for any of the type-1 light combiner 172, the type-1A light combiner 178, the type-4 light distributor 162, and the VOAs 180 shown in FIG. 10(b) to be replaced by any other suitable component (or components) that performs (or perform) the same or similar functions thereof, as discussed above.

Optical Node Example Embodiment #1

FIGS. 11 through 14 represent example embodiments of a first optical node. These diagrams illustrate how the FIG. 10(a) ROADM core device can be used in one of three different example modes of operation. The first mode is a two-degree ROADM mode in which each ROADM has k add/drop ports. The second mode is a three-degree ROADM mode. In this mode the add and drop ports comprise a first set of add ports and a first set of drop ports in which the add and drop ports function only as add and drop ports, and a second set of add ports and a second set of drop ports in which the add and drop ports function as both add and drop ports, respectively, and as express ports that are connectable to another ROADM core device. In the second mode, each ROADM has k−1 add ports in the first set and k−1 drop ports in the first set, where k represents the total number of add ports when the add ports in both sets of add ports are combined and k also represents the total number of drop ports when the drop ports in both sets of drop ports are combined. The third mode is a four-degree ROADM mode. In this mode the add and drop ports also comprise a first set of add ports and a first set of drop ports in which the add and drop ports function only as add and drop ports, and a second set of add ports and a second set of drop ports in which the add and drop ports function as both add and drop ports, respectively, and as express ports that are connectable to another ROADM core device. In the third mode, each ROADM has k−2 add ports in the first set and k−2 drop ports in the first set, where k represents the total number of add ports when the add ports in both sets of add ports are combined and k also represents the total number of drop ports when the drop ports in both sets of drop ports are combined. In general, the FIG. 10(b) ROADM core device can be used to construct an N-degree node using N−2 add ports and N−2 drop ports as express ports to connect to another ROADM, with each ROADM having a total of k+2−N add/drop ports, where N is the number of ROADMs in the node. (An N degree node is a node having N ROADMs, each with one network node interface, also called a DWDW line interface).

Figure 11:
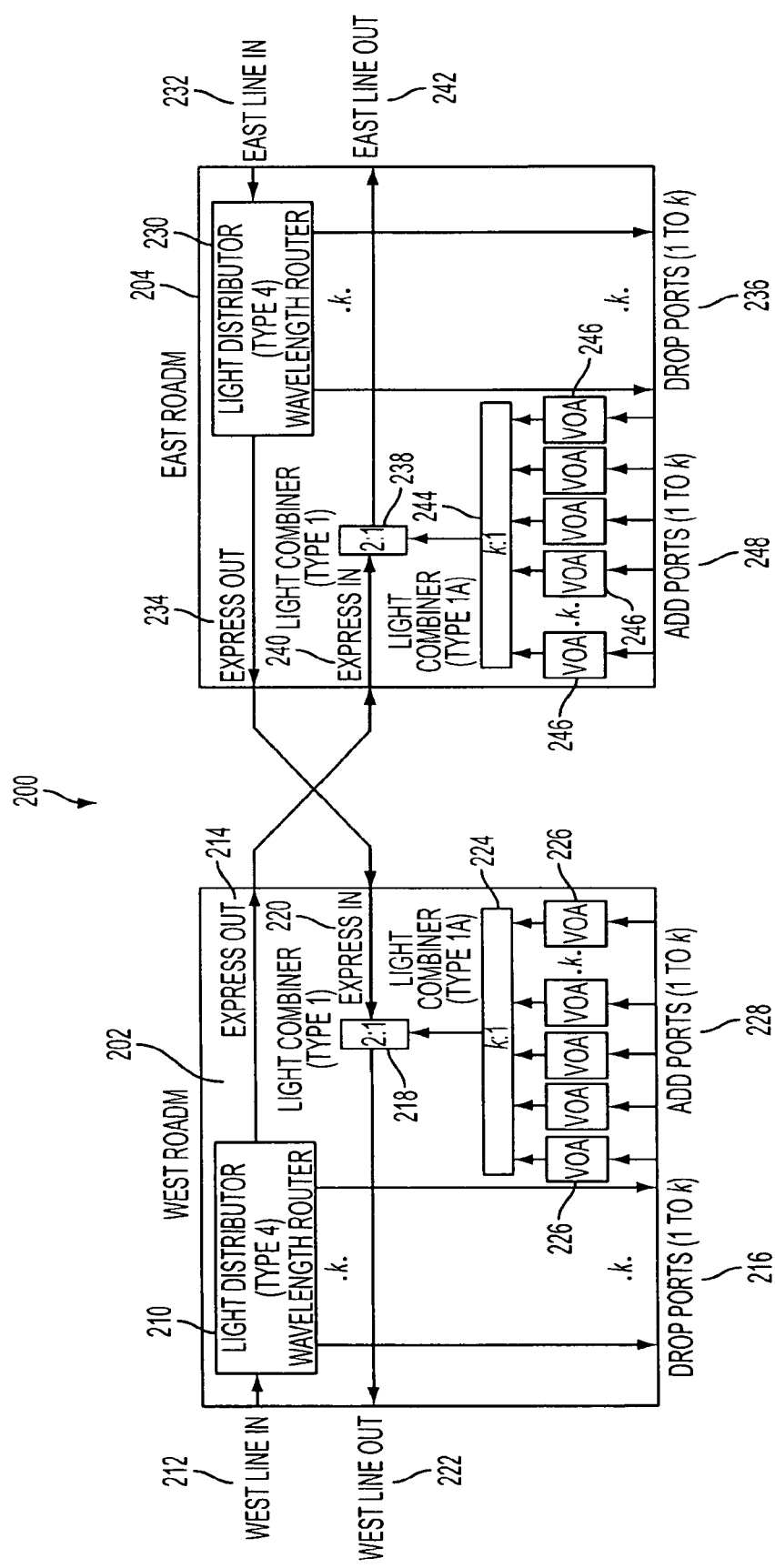
FIG. 11 is a block diagram of one example embodiment of optical node example embodiment #1 having two paired type-1 ROADM core devices making up a 2-degree optical node with k protected colorless add and drop ports, where k is an integer representing the total number of add ports and the total number of drop ports supported by the ROADM core device.

FIG. 11 shows an example embodiment of an optical node 200 including two ROADM core devices 202 and 204 interconnected in order to form a two-degree optical node in which each ROADM core device 202, 204 has k colorless add/drop ports. Each ROADM core shown in FIG. 11 can be the same as, for example, one of the ROADM cores shown in FIG. 10(a), although it is not limited thereto. It is within the scope of the example embodiment for the optical node shown in FIG. 11 to include additional elements. It is also within the scope of this example embodiment to replace each of the ROADM core devices shown in FIG. 11 and each of the components of each ROADM core with any other suitable component (or components) that performs (or perform) the functions thereof. In the two-degree configuration shown in FIG. 11, since all of the k add ports are considered equal, the type-1A light combiner used on each ROADM can be designed such that an equal amount of light from each add port appears at the output of the light combiner, although it is not required to do so. Such a light combiner is referred to as an "equal-split" optical coupler.

More specifically, the ROADM 202 can comprise a type-4 light distributor 210 receiving optical signals input from line interface 212, outputting optical signals on express output port 214 (which is connected to the express input port 240 of the ROADM 204), and locally dropping optical signals via k drop ports 216, where k is a positive integer representing the total number of add ports and the total number of drop ports, which are the same (although the example embodiment may have an unequal number of add and drop ports). The ROADM core device 202 can further comprise a 2:1, type-1 light combiner 218 receiving optical signals from an express input port 220 (which, in turn, receives optical signals from an express output port 234 of the ROADM 204) and outputting optical signals from a line output interface 222. The type-1 light combiner 218 can also receive optical signals from a k:1, type-1A light combiner 224. The light combiner 224 receives optical signals from k VOAs 226, each of which is connected to one of the k add ports 228. The type-1 light combiner 218, the type-1A light combiner 224, the type-4 light distributor 210, and the VOAs 226 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 202 can include more than the number of components shown in FIG. 11, and it is within the scope of this example embodiment for any of the type-1 light combiner 218, the type-1A light combiner 224, the type-4 light distributor 210, and the VOAs 228 shown in FIG. 11 to be replaced by any other suitable component (or components) that performs (or perform) the functions thereof, as discussed above.

The ROADM 204 can comprise a type-4 light distributor 230 receiving optical signals input from line interface 232, outputting optical signals on the express output port 234 (which is connected to the express input port 220 of the ROADM 202), and locally dropping optical signals via k drop ports 236, where k is a positive integer representing the total number of add ports and the total number of drop ports, which are the same (although the example embodiment may have an unequal number of add and drop ports). The ROADM core device 204 can further comprise a 2:1, type-1 light combiner 238 receiving optical signals from an express input port 240 (which, in turn, receives optical signals from an express output port 214 of the ROADM 202) and outputting optical signals from a line output interface 242. The type-1 light combiner 238 can also receive optical signals from a k:1, type-1A light combiner 244. The light combiner 244 receives optical signals from k VOAs 246, each of which is connected to one of the k add ports 248. The type-1 light combiner 238, the type-1A light combiner 244, the type-4 light distributor 230, and VOAs 246 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 204 can include more than the number of components shown in FIG. 11, and it is within the scope of this example embodiment for any of the type-1 light combiner 238, the type-1A light combiner 244, the type-4 light distributor 230, and the VOAs 246 shown in FIG. 11 to be replaced by any other suitable component (or components) that performs (or perform) the functions thereof, as discussed above.

There is typically an optical insertion loss associated with every path through a type-1 (or 1A) light combiner (or optical coupler). For an ideal k input equal-split optical coupler, the insertion loss associated with all k paths through the optical coupler are exactly the same. In general the insertion loss (in dB) associated with each input of a k-input equal-split optical coupler is equal to $10 \log(1/k)+e$, where "e" is the excess loss associated with the coupler. The excess loss associated with a coupler is any additional loss that may occur over and above the insertion loss due to the light splitting function. The table below illustrates some typical specifications for different example embodiments of equal-split optical couplers.

TABLE 1

| Configuration | Coupling Ratio | Insertion Loss | Excess Loss |
|---|---|---|---|
| 1x2 | 50.00% | 3.4 dB | 0.39 dB |
| 1x3 | 33.33% | 5.7 dB | 0.93 dB |
| 1x4 | 25.00% | 7.0 dB | 0.98 dB |
| 1x5 | 20.00% | 8.0 dB | 1.01 dB |

TABLE 1-continued

| Configuration | Coupling Ratio | Insertion Loss | Excess Loss |
| --- | --- | --- | --- |
| 1x6 | 16.67% | 9.0 dB | 1.22 dB |
| 1x7 | 14.29% | 9.8 dB | 1.35 dB |
| 1x8 | 12.50% | 10.6 dB | 1.57 dB |
| 1x9 | 11.11% | 11.2 dB | 1.66 dB |
| 1x10 | 10.00% | 11.7 dB | 1.70 dB |
| 1x16 | 6.25% | 14.0 dB | 1.96 dB |

It should be noted that the same type of physical device can be used as both a type-1 light combiner and a type-1 light distributor, although in other example embodiments they may be different types of devices.

In the above table, the coupling ratio is the ratio of one output to the sum of all outputs. The above table illustrates example specifications for single window broadband couplers (SWBBC). SWBBC couplers have only a small amount of insertion loss variation over a single wavelength window (such as the C-band window).

The table below shows examples of insertion loss specifications for the components within the ROADM core device 130 shown in FIG. 10(*a*).

TABLE 2

| Component | Insertion Loss |
| --- | --- |
| 1x2 coupler 142 (equal-split) | 3.4 dB |
| 1x8 coupler 148 (equal-split) | 10.6 dB |
| 1x16 coupler 148 (equal-split) | 14.0 dB |
| Type-4 Light Distributor 132 (k = 8) | 6.0 dB |
| Type 4 Light Distributor 132 (k = 16) | 10.0 dB |
| VOA 150 (with no attenuation) | 1.0 dB |

Based upon the insertion losses contained within the above table, the below table shows the total insertion losses associated with the three distinct paths through the two degree ROADM of FIG. 11.

TABLE 3

| Configuration (1x2 coupling ratio = 50/50%) | West Line In 212 to East Line Out 242 IL | West Line In 212 to Drop Port 216 IL | Add Port In 248 to East Line Out 242 IL |
| --- | --- | --- | --- |
| Configuration 1 (k = 8) | 9.4 dB | 6.0 dB | 15.0 dB |
| Configuration 2 (k = 16) | 13.4 dB | 10.0 dB | 18.4 dB |

Figure 12:
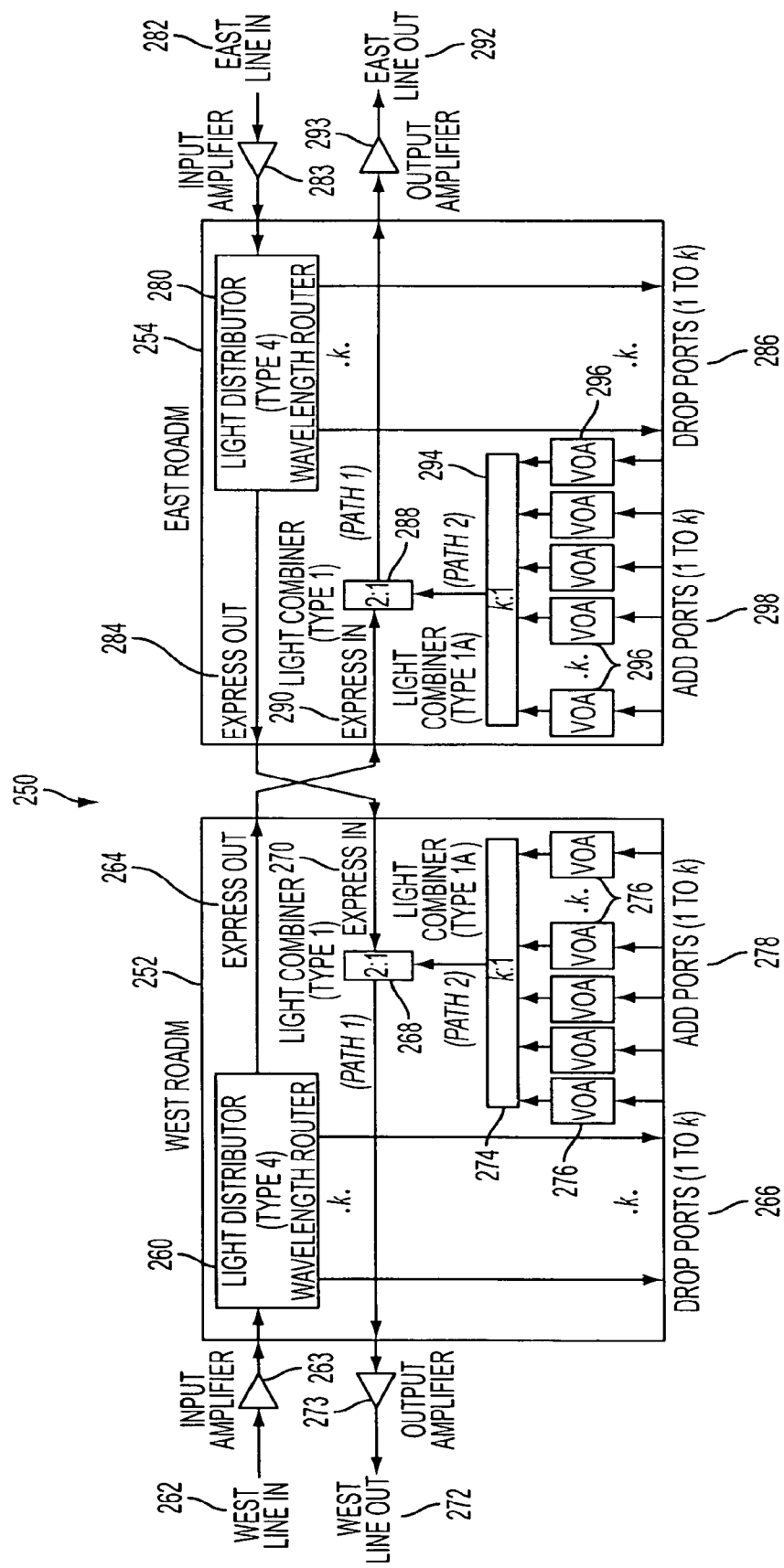
FIG. 12 is a block diagram of another example embodiment of optical node example embodiment #1 having two paired type-1 ROADM core devices making up a 2-degree optical node with k protected colorless add and drop ports and input and output amplifiers, where k is an integer representing the total number of add ports and the total number of drop ports.

FIG. 12 shows an example embodiment of a DWDM node 250 containing two ROADM core devices 252 and 254 and input and output amplifiers, as will be described in more detail below. The two ROADM core devices 252 and 254 shown in FIG. 12 can be the same as the ROADM core devices shown in FIGS. 10(*a*), 10(*b*), and 11, and can be interconnected in the same manner as the ROADM core devices shown in FIG. 11, although they are not limited thereto. It is within the scope of the example embodiment for the optical node shown in FIG. 12 to include additional elements not shown therein. It is also within the scope of this example embodiment to replace each of the ROADM core devices shown in FIG. 12 and each of the components of each ROADM core with any other suitable component (or components) that performs (or perform) the same or similar functions thereof. The input amplifiers may be used to compensate for the insertion loss associated with their corresponding input fiber spans, while the output amplifiers may be used to compensate for the insertion losses associated with the ROADM cores.

The ROADM 252 can comprise a type-4 light distributor 260 receiving optical signals input from line interface 262 and passing through an input amplifier 263, outputting optical signals on express output port 264 (which is connected to the express input port 290 of the ROADM 254), and locally dropping optical signals via k drop ports 266, where k is a positive integer representing the total number of add ports and the total number of drop ports, which are the same (although the example embodiment may have an unequal number of add and drop ports). The ROADM core device 252 can further comprise a 2:1, type-1 light combiner 268 receiving optical signals from an express input port 270 (which, in turn, receives optical signals from an express output port 284 of the ROADM 254) and outputting optical signals from a line output interface 272 after being amplified by output amplifier 273. The type-1 light combiner 268 can also receive optical signals from a k:1, type-1A light combiner 274. The light combiner 274 receives optical signals from k VOAs 276, each of which is connected to one of the k add ports 278. The type-1 light combiner 268, the type-1A light combiner 274, the type-4 light distributor 260, and VOAs 276 can be the same as, for example, the type-1 light combiner 30, the type-1A light combiner 44, the type-4 light distributor 76, and VOAs 48, respectively, as shown in FIGS. 2B, 3B, 6, and 3B although they are not limited thereto. The type-1 ROADM core device 252 can include more than the number of components shown in FIG. 12, and it is within the scope of this example embodiment for any of the type-1 light combiner 268, the type-1A light combiner 274, the type-4 light distributor 260, and the VOAs 278 shown in FIG. 12 to be replaced by any other suitable component (or components) that performs (or perform) the functions thereof, as discussed above.

The ROADM 254 can comprise a type-4 light distributor 280 receiving optical signals input from line interface 282 and amplified by input amplifier 283, outputting optical signals on the express output port 284 (which is connected to the express input port 270 of the ROADM 252), and locally dropping optical signals via k drop ports 286, where k is a positive integer representing the total number of add ports and the total number of drop ports, which are the same (although the example embodiment may have an unequal number of add and drop ports). The ROADM core device 254 can further comprise a 2:1, type-1 light combiner 288 receiving optical signals from an express input port 290 (which, in turn, receives optical signals from an express output port 264 of the ROADM 252) and outputting optical signals from a line output interface 292 after being amplified by output amplifier 293. The type-1 light combiner 288 can also receive optical signals from a k:1, type-1A light combiner 294. The light combiner 294 receives optical signals from k VOAs 296, each of which is connected to one of the k add ports 298. The type-1 light combiner 288, the type-1A light combiner 294, the type-4 light distributor 280, and VOAs 296 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 254 can include more than the number of components shown in FIG. 12, and it is within the scope of this example embodiment for any of the type-1 light combiner 288, the type-1A light combiner 294, the type-4 light distributor 280, and the VOAs 296 shown in FIG. 12 to be replaced by any other suitable component (or components) that performs (or perform) the functions thereof, as discussed above.

In one example embodiment, the input amplifiers 263 and 283 can amplify each incoming wavelength to an optical power level equal to 0 dBm, and the output amplifiers 273 and 293 can amplify each outgoing wavelength to an optical power level equal to 0 dBm, although in other example embodiments, the amplifiers can be used to amplify incoming and outgoing wavelengths to different power levels. Also, in an example embodiment, the optical power level of each signal applied to the system at the add ports (via transponders) can be equal to 0 dBm, although in other example embodiments the optical power level of the signals applied at the add ports can be different from 0 dBm. In an example indicated in Table 3 above, it can be useful that the path from one of the add ports 278, 298 to the line out port 272, 292 includes an output amplifier 273, 293 with a gain of 15 dB (assuming k=8, where k is the number of add ports, the number of drop ports, and the number of subtending outputs of the type-4 light distributor), and for the VOAs within the wavelength router 260, 280 to attenuate each wavelength passing through it by 5.6 dB (15.0−9.4=5.6) in order to launch all wavelengths leaving the system via the line interfaces of the ROADMs 252, 254 at a power level of 0 dBm.

It is within the scope of the example embodiment to modify the coupling ratio of the 2-to-1 optical coupler 268, 288 in FIG. 12 to utilize an output amplifier with a lower optical gain. An amplifier operating with a lower optical gain can provide an improved optical signal to noise ratio (OSNR), thus providing improved network performance. Table 4 shows examples of insertion losses associated with the two paths through various 2-to-1 optical couplers 268, 288 having various coupling ratios.

TABLE 4

| Configuration | Coupling Ratio of couplers 268, 288 | Insertion Loss (path 1) | Insertion Loss (path 2) |
| --- | --- | --- | --- |
| 1x2 | 50/50% | 3.4 dB | 3.4 dB |
| 1x2 | 45/55% | 3.9 dB | 2.9 dB |
| 1x2 | 40/60% | 4.4 dB | 2.5 dB |
| 1x2 | 35/65% | 5.1 dB | 2.2 dB |
| 1x2 | 30/70% | 5.8 dB | 1.8 dB |
| 1x2 | 25/75% | 6.7 dB | 1.6 dB |
| 1x2 | 20/80% | 7.6 dB | 1.1 dB |
| 1x2 | 15/85% | 9.0 dB | 1.0 dB |
| 1x2 | 10/90% | 11.0 dB | 0.6 dB |
| 1x2 | 5/95% | 14.6 dB | 0.4 dB |

From Table 4 it can be determined that the optimum 2-to-1 coupler 268, 288 for the FIG. 12 system can be, for example, the 25/75% coupler, as this coupler allows the output amplifier 273, 293 to operate at the lowest possible gain. The 2-to-1 coupler can be oriented such that 75% of the light emitted from the output of the 2-to-1 coupler originates from the k:1 light combiner in FIG. 11, and 25% of the light emitted from the output of the 2-to-1 coupler originates from the "Express In" Port. Therefore, on a given ROADM, the light path from the "Express" In port to the "Line Out" port experiences 6.7 dB of attenuation. When the 25/75% coupler is used, the resulting example insertion losses for the FIG. 11 system are shown in the table below.

TABLE 5

| Configuration (1x2 coupling ratio = 25/75%) | West Line In to East Line Out IL | West Line In to Drop Port IL | Add Port In to East Line Out IL |
| --- | --- | --- | --- |
| Configuration 1 (k = 8) | 12.7 dB | 6.0 dB | 13.2 dB |
| Configuration 2 (k = 16) | 16.7 dB | 10.0 dB | 17.0 dB |

From the above table it can be seen that an output amplifier with a gain of only 13.2 dB (instead of a gain of 15 dB) can be useful for the case where k=8.

This procedure for determining the optimal coupling ratio and the corresponding required gain of the output amplifier will now be discussed in more detail.

The goal is to select the optimized standard 2:1 optical coupler for the ROADM, i.e., to select the 2:1 optical coupler such that an output amplifier with the lowest possible optical gain can be used.

There are two paths through a given output amplifier (shown in FIG. 12). One path (path 1) starts at the line in port 262 of ROADM 252, enters the express in port 290 of ROADM 254, passes through one input of the 2:1 coupler 288, and exits out of the line out port 292 of ROADM 254. The second path (path 2) starts at the add ports 298 of ROADM 254, passes through the second input of the 2:1 coupler 288, and exits out of the line out port 292 of ROADM 254. Inevitably, one path will have a higher insertion loss (IL) than the other path (or they will have equal insertion losses). The goal is to choose the 2:1 coupler such that the path with the higher IL is as low as possible.

Operation 1

Set k=8 in FIG. 12. Based upon the Table 2 values, we see that the IL (insertion loss) of the 8:1 coupler is 10.6 dB and the IL of the VOA is 1 dB. Therefore, the IL of path 2 is equal to 10.6 dB+1 dB+the IL through path 2 of the 2:1 coupler. Also from Table 2, the IL through path 1 is equal to the IL of the type 4 light distributor (6 dB)+the IL through path 1 of the 2:1 coupler.

Operation 2:

Not including the IL of the 2:1 coupler, the IL of the two paths are: 11.6 dB (path 2) and 6 dB (path 1). Determine the difference between the insertion losses between the two paths by subtracting the IL of one path from the insertion loss of the other path, or 11.6−6.0=5.6 dB.

Operation 3:

Add an additional column to the Table 4 table of standard 2:1 coupler values. This new column calculates the IL of path x−path y, as shown below in Table 4A.

TABLE 4A

| Configuration | Coupling Ratio | Insertion Loss (path x) | Insertion Loss (path y) | path x − path y |
| --- | --- | --- | --- | --- |
| 1x2 | 50/50% | 3.4 dB | 3.4 dB | 0 dB |
| 1x2 | 45/55% | 3.9 dB | 2.9 dB | 1 dB |
| 1x2 | 40/60% | 4.4 dB | 2.5 dB | 1.9 dB |
| 1x2 | 35/65% | 5.1 dB | 2.2 dB | 2.9 dB |
| 1x2 | 30/70% | 5.8 dB | 1.8 dB | 4.0 dB |
| 1x2 | 25/75% | 6.7 dB | 1.6 dB | 5.1 dB |
| 1x2 | 20/80% | 7.6 dB | 1.1 dB | 6.5 dB |
| 1x2 | 15/85% | 9.0 dB | 1.0 dB | 8.0 dB |
| 1x2 | 10/90% | 11.0 dB | 0.6 dB | 10.4 dB |
| 1x2 | 5/95% | 14.6 dB | 0.4 dB | 14.2 dB |

Operation 4:

From Table 4A, choose the coupler with the path x−path y value closest to the value computed in operation 2 (5.6 dB). The closest value is the 25/75% coupler with a path x−path y value of 5.1 dB.

Operation 5:

Calculate the insertion losses of the two paths based upon the chosen 2:1 coupler. The higher IL value of the coupler corresponds to the lower % value of the coupling ratio because the % value corresponds to the percentage of light that gets through the coupler for a given path. Therefore, the 25% path of a 25/75% coupler can allow 25% of the light through path x (the higher IL path or the 6.7 dB path), and the 75% path of a 25/75% coupler can allow 75% light through path y (the lower IL path or the 1.6 dB path). Therefore for path 2 the IL is 10.6 dB+1 dB+(the lower IL path through the coupler)=10.6+1+1.6=13.2 dB, as shown in Table 5. And path 1 is 6+6.7=12.7 dB. This result can be confirmed by using values for all the couplers in Table 4A in the two equations:

Path 2=11.6+*IL* of path *y*

Path 1=6.0+*IL* of path *x*

From such an operation, it is clear that no other coupler gives a lower IL value for the higher IL path than 13.2 dB.

Figure 13A:
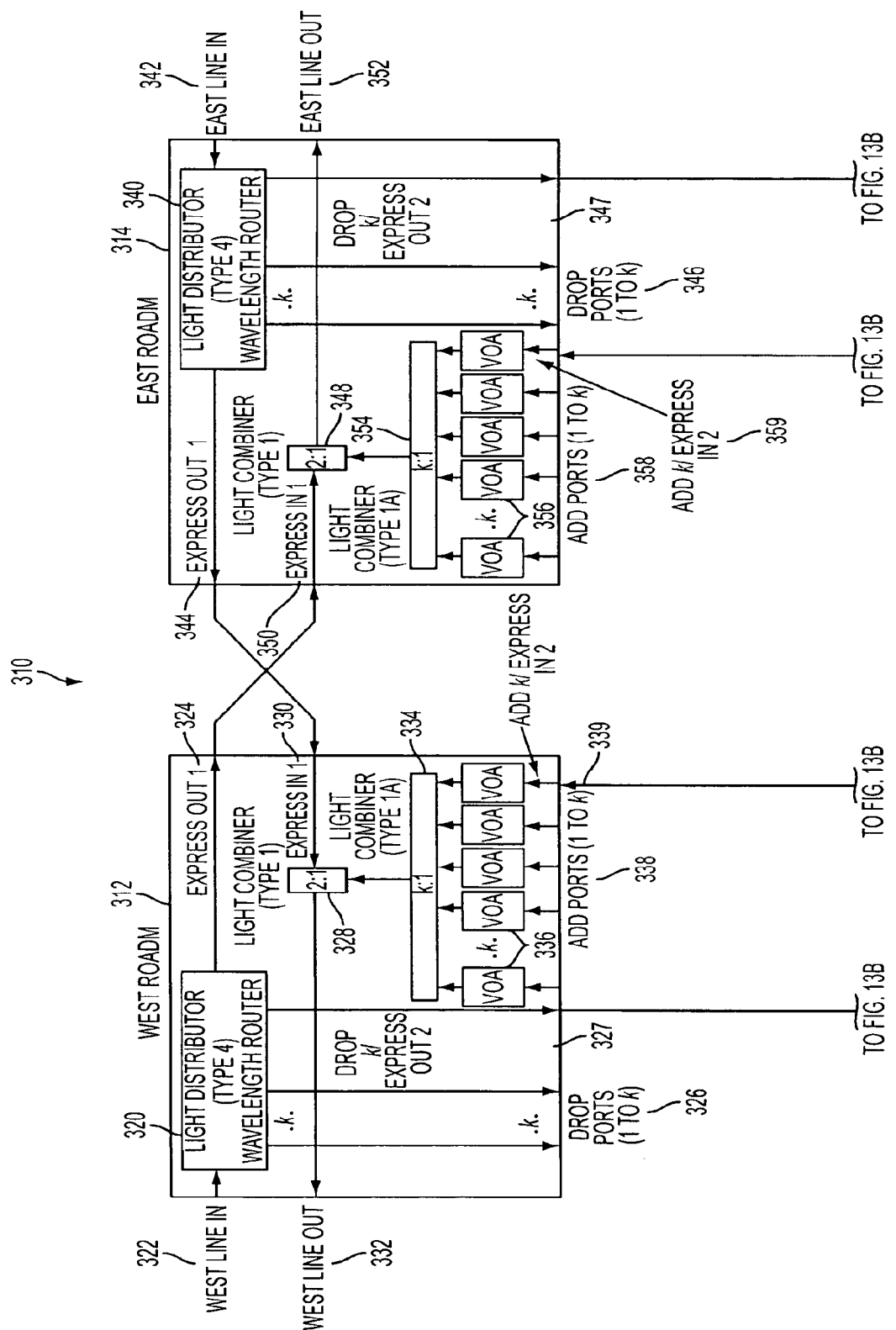
FIG. 13 is a block diagram of another example embodiment of optical node example embodiment #1, which is a 3-degree optical node having three type-1 ROADM core devices, each with an add port and a drop port functioning also as express ports and k−1 protected colorless add and drop ports functioning only as add and drop ports, respectively, where k is an integer representing the total number of add ports and the total number of drop ports.
Figure 13B:
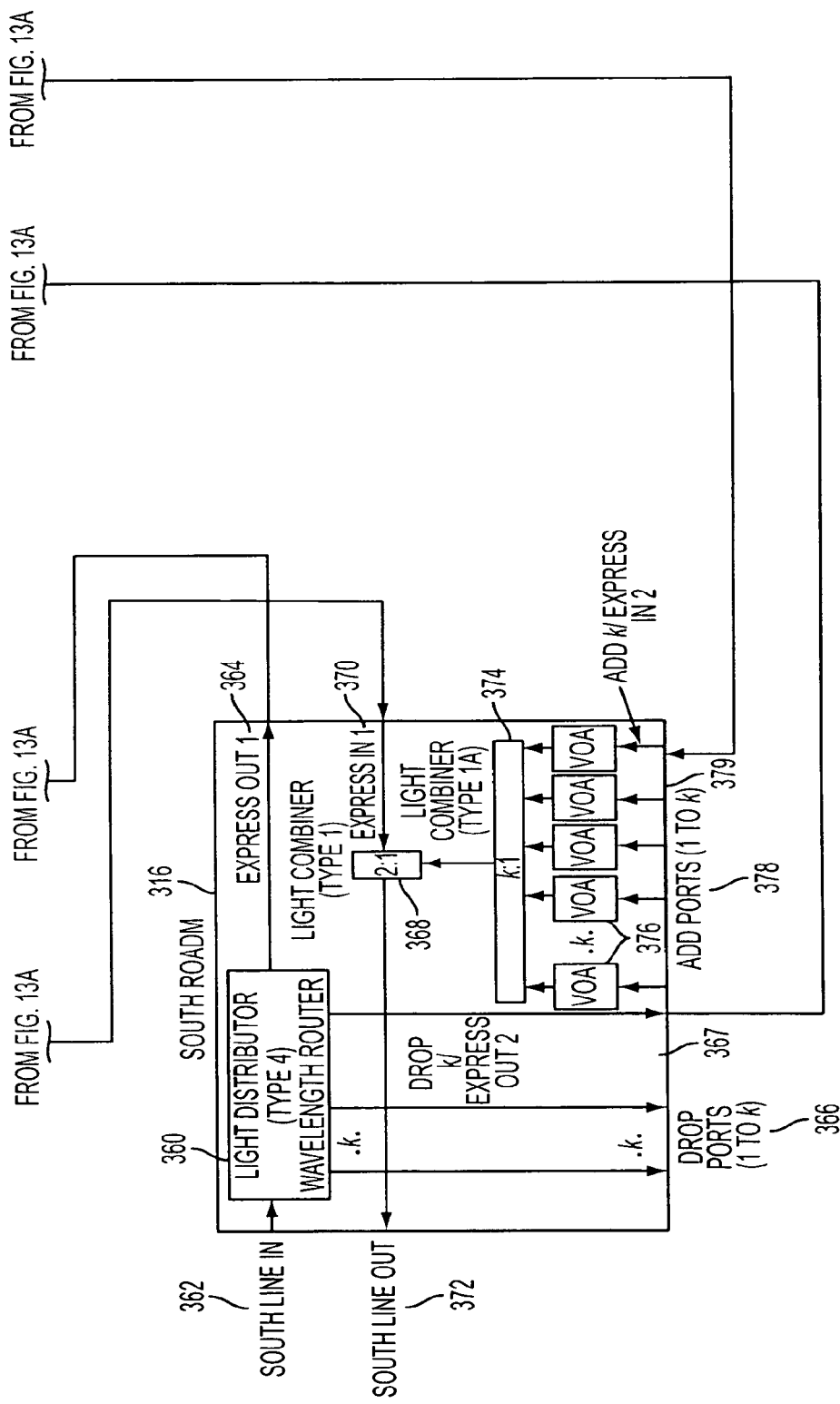

The FIG. 10A ROADM core device can also be used to implement a DWDM node of greater than two degrees. This can be done by designating a subset of the add and drop ports as additional express ports. FIG. 13 illustrates an example embodiment of a three degree node 310 using three ROADM cores devices 312, 314, and 316. Each ROADM core shown in FIG. 13 can be the same as, for example, one of the ROADM core devices shown in FIG. 10A, although it is not limited thereto. It is within the scope of the example embodiment for the optical node shown in FIG. 13 to include additional elements, and to replace each of the ROADM cores shown in FIG. 13 and each of the components of each ROADM core with any other suitable component (or components) that performs (or perform) the functions thereof.

More specifically, the ROADM 312 can comprise a type-4 light distributor 320 receiving optical signals input from line interface 322, outputting optical signals on express output port 324 (which is connected to the express input port 350 of the ROADM 314), and locally dropping optical signals via k drop ports 326 and 327, where k is a positive integer representing the total number of add ports and the total number of drop ports, which are the same (although the example embodiment may have an unequal number of add and drop ports). The drop ports 326 can function exclusively as drop ports, while the drop port 327 can function as both a drop port and an express port. The ROADM core device 312 can further comprise a 2:1, type-1 light combiner 328 receiving optical signals from an express input port 330 (which, in turn, receives optical signals from an express output port 344 of the ROADM 314) and outputting optical signals from a line output interface 332. The type-1 light combiner 328 can also receive optical signals from a k:1, type-1A light combiner 334. The light combiner 334 receives optical signals from k VOAs 336, each of which is connected to one of the k add ports in a first set of add ports 338 that can function exclusively as add ports and a second add port set comprising a single add port 339 that can function as both an add port and an express port. The type-1 light combiner 328, the type-1A light combiner 334, the type-4 light distributor 320, and the VOAs 336 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 312 can include more than the number of components shown in FIG. 13, and it is within the scope of this example embodiment for any of the type-1 light combiner 328, the type-1A light combiner 334, the type-4 light distributor 320, and the VOAs 338 shown in FIG. 13 to be replaced by any other suitable component (or components) that performs (or perform) the functions thereof, as discussed above.

The ROADM 314 can comprise a type-4 light distributor 340 receiving optical signals input from line interface 342, outputting optical signals on the express output port 344 (which is connected to the express input port 330 of the ROADM 312), and locally dropping optical signals via k drop ports 346 and 347, where k is a positive integer representing the total number of add ports and the total number of drop ports, which are the same (although the example embodiment may have an unequal number of add and drop ports). The drop ports 346 can function exclusively as drop ports. The drop port 347 can function as both a drop port and an express port. The ROADM core device 314 can further comprise a 2:1, type-1 light combiner 348 receiving optical signals from an express input port 350 (which, in turn, receives optical signals from an express output port 324 of the ROADM 312) and outputting optical signals from a line output interface 352. The type-1 light combiner 348 can also receive optical signals from a k:1, type-1A light combiner 354. The light combiner 354 receives optical signals from k VOAs 356, each of which is connected to one of the k add ports in a first set of add ports 358 (that can function exclusively as add ports) or in a second add port set comprising a single add port 359 (that can function as an add port and an express port). The type-1 light combiner 348, the type-1A light combiner 354, the type-4 light distributor 340, and VOAs 356 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 314 can include more than the number of components shown in FIG. 13, and it is within the scope of this example embodiment for any of the type-1 light combiner 348, the type-1A light combiner 354, the type-4 light distributor 340, and VOAs 356 shown in FIG. 13 to be replaced by any other suitable component (or components) that performs (or perform) the functions thereof, as discussed above.

The ROADM 316 can comprise a type-4 light distributor 360 receiving optical signals input from line interface 362, outputting optical signals on the express output port 364 (which is connected to the add port 339 of the ROADM 312), and locally dropping optical signals via k drop ports 366 and 367, where k is a positive integer representing the total number of add ports and the total number of drop ports, which are the same (although the example embodiment may have an unequal number of add and drop ports). The drop ports 366 can function exclusively as drop ports, while the drop port 367 can function as both a drop port and an express port. The ROADM core device 316 can further comprise a 2:1, type-1 light combiner 368 receiving optical signals from an express input port 370 (which, in turn, receives optical signals from the drop port 327 of the ROADM 312) and outputting optical signals from a line output interface 372. The type-1 light combiner 368 can also receive optical signals from a k:1, type-1A light combiner 374. The light combiner 374 receives optical signals from k VOAs 376, each of which is connected to one of the k add ports in a first set of add ports 378 or in a second add port set comprising a single add port 379. The add ports 378 can function exclusively as add ports, while the add port 379 can function as both a drop port and an express port. In addition, the add port 379 can be connected to the drop port 347 of the ROADM 314 to receive optical signals dropped from drop port 347. The type-1 light combiner 368, the type-1A light combiner 374, the type-4 light distributor 360, and VOAs 376 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 316 can include more than the number of components shown in FIG. 13, and it is within the scope of this example embodiment for any of the type-1 light combiner 368, the type-1A light combiner 374, the type-4 light distributor 360, and VOAs 376 shown in FIG. 13 to be replaced by any other suitable component (or components) that performs (or perform) the functions thereof, as discussed above.

Thus, in the node 310, on each ROADM core device 312, 314, and 316, there can be two ports used as express ports: the original express port receiving the output of one of the type-4 light distributors 320, 340, and 360 (now referred to as express port 1, e.g., express out 1 and express in 1) and a secondary express port (express port 2) made up of the add port and drop port that double as express ports, i.e., (327,339), (359, 347), (367, 379), although each ROADM core is not limited thereto. As shown in FIG. 13, the West ROADM core device 312 is interconnected to the South ROADM core device 316 by connecting Express out Port 2 (327) on the West ROADM core device to Express port 1 (370) on the South ROADM core device and connecting the express out port 1 (364), on the South ROADM core device 316 to the express in port 2, denoted by reference numeral 339 in the West ROADM core device 312, although these ROADM core devices are not limited to being connected in this way. The East ROADM core device 314 is interconnected to the South ROADM core device 316 by connecting express out port 2 (347) on the East ROADM core device 314 to Express in port 2 (379) on the South ROADM core device 316 and by connecting the Express out port 2 (367) of the South ROADM core device 316 to the Express in port 2 (359) of the East ROADM core device 314, although these ROADM cores are not limited to being connected in this way. Wavelengths arriving on the West line in port 322 of the West ROADM core device 312 can be routed to the South line out port 372 of the South ROADM core device 316 by using the wavelength router 320 on the West ROADM core device 312 to direct wavelengths to its Drop k/Express Out 2 port 327, although routing of wavelengths from the West line in port of the West ROADM core device 312 is not limited to this specific routing regimen. Similarly, wavelengths arriving on the West line in port 322 of the West ROADM core device 312 can be routed to the East line out port 352 of the East ROADM core device 314 by using the wavelength router 320 on the West ROADM core device 312 to direct wavelengths to its Express Out 1 port 324, although routing of wavelengths from the West line in port 322 of the West ROADM core device 312 is not limited to this specific routing regimen.

It should be noted that when the FIG. 10B ROADM core device is used in a three degree configuration (as shown in FIG. 13), each ROADM core device can lose an add/drop port, and therefore when this occurs, each ROADM only has k−1 add/drop ports (instead of k add/drop ports) that function only as add/drop ports.

It should also be noted that in one example embodiment the insertion loss through the express in 2 port is higher than the insertion loss through the express in 1 port. For instance, in an example embodiment using a 25/75% 2-to-1 coupler on each ROADM (where the lower insertion loss path through the 2-to-1 coupler is the path from add ports to the line out port), where k=8, the insertion loss through the express in 2 port is 6.5 dB higher than through the express in 1 port. This is illustrated in Table 6.

TABLE 6

| FIG. 13 Configuration (1x2 coupling ratio of 2:1 light combiner 328 and 348 = 25/75%) | West Line In 322 to East Line Out IL 352 | South Line In 362 to West Line Out IL 332 |
| --- | --- | --- |
| Configuration 1 (k = 8) | 12.7 dB | 19.2 dB |
| Configuration 2 (k = 16) | 16.7 dB | 26.6 dB |

Examination of the couplers shown in Table 4 shows that a 2-to-1 coupler with a 10/90% ratio can result in a lowest possible overall insertion losses for the FIG. 13 system with k=8 (where the lower insertion loss path through the 2-to-1 coupler is the path from add ports to the line out port). This is illustrated in the table below.

TABLE 7

| FIG. 13 Configuration (1x2 coupling ratio of 2:1 light combiner 328 and 348 = 10/90%) | West Line In 322 to East Line Out IL 352 | South Line In 362 to West Line Out IL 332 |
| --- | --- | --- |
| Configuration 1 (k = 8) | 17.0 dB | 18.2 dB |

Figure 14A:
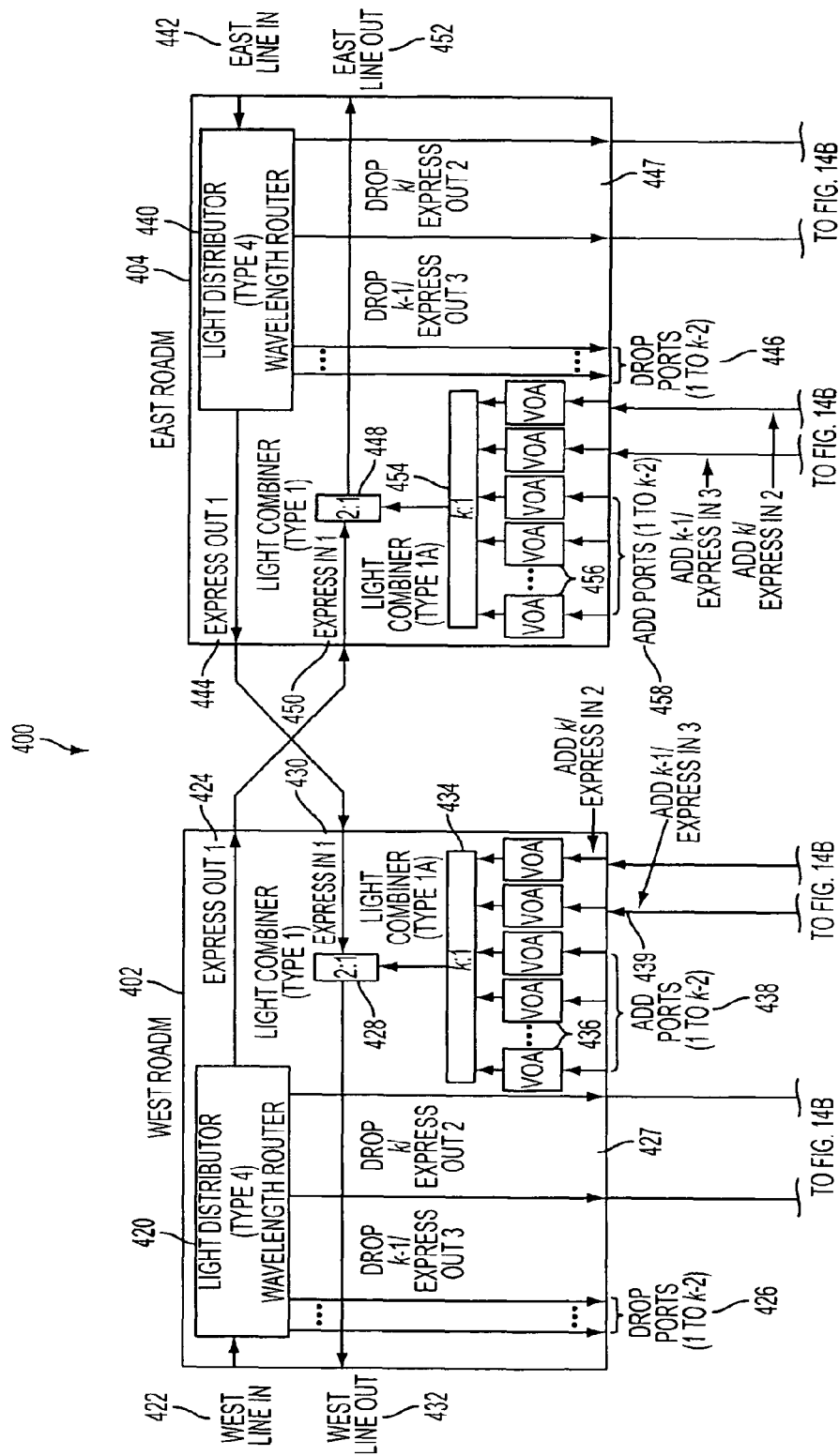
FIG. 14 is a block diagram of another example embodiment of optical node example embodiment #1, which is a 4-degree optical node having four type-1 ROADM core devices each with two add ports and two drop ports functioning also as express ports, and k−2 protected colorless add and drop ports functioning only as add and drop ports, respectively, where k is an integer representing the total number of add ports and the total number of drop ports.
Figure 14B:
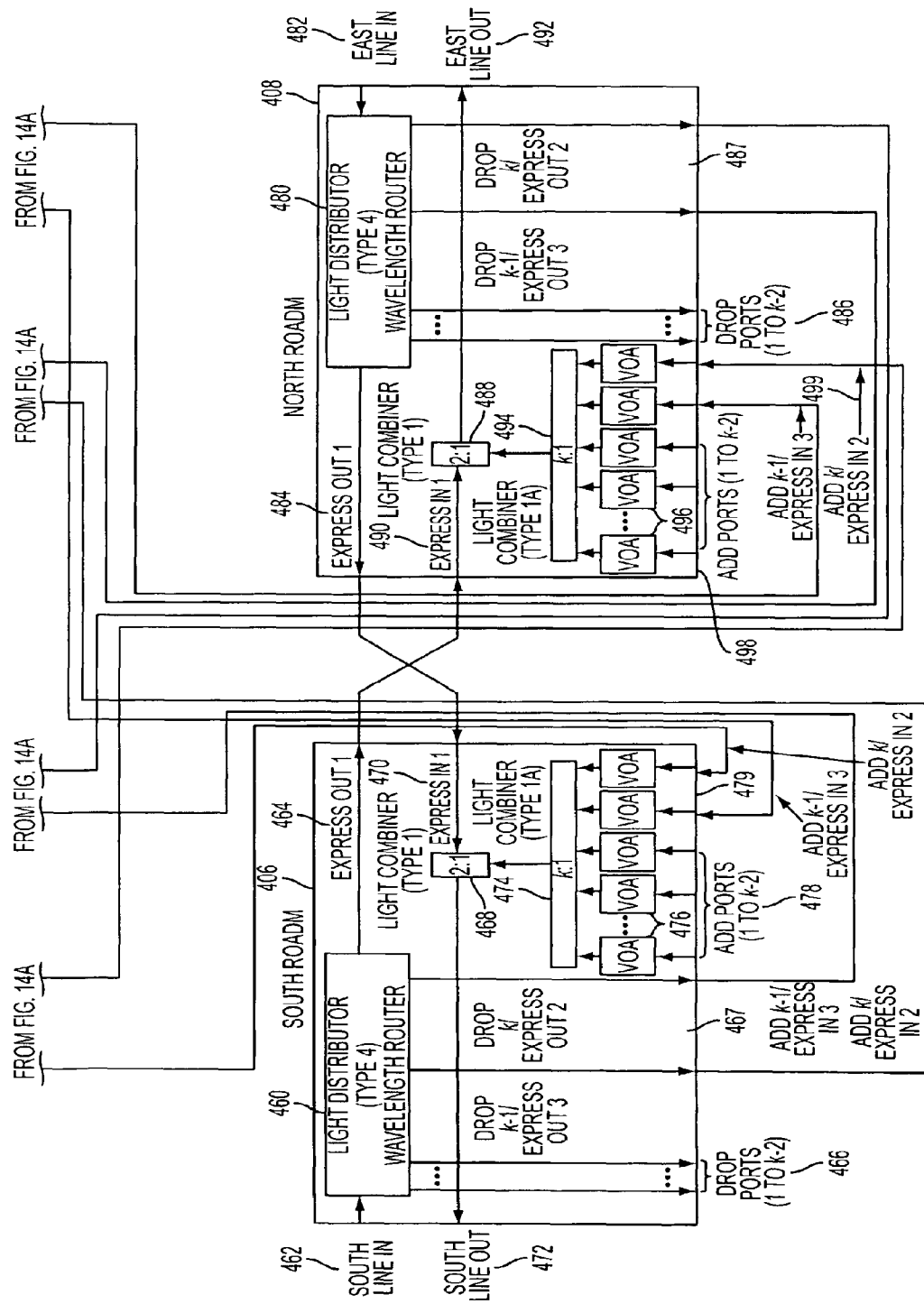

FIG. 14 illustrates an example of a four degree node 400 using four ROADM cores devices 402, 404, 406, and 408. Each ROADM core device shown in FIG. 14 can be the same as, for example, one of the ROADM cores shown in FIG. 10B, although it is not limited thereto. It is within the scope of the example embodiment for the optical node 400 shown in FIG. 14 to include additional elements and to replace each of the ROADM cores devices shown in FIG. 14 and each of the components of each ROADM core device with any other suitable component (or components) that performs (or perform) the functions thereof. In the node 400, on each module there are three ports used as express ports, and each ROADM core only has k−2 add/drop ports that function only as add and drop ports.

More specifically, the ROADM 402 can comprise a type-4 light distributor 420 receiving optical signals input from line interface 422, outputting optical signals on express output port 424 (which is connected to the express input port 450 of the ROADM 404), and dropping optical signals via k drop ports comprising two sets of drop ports, where k is a positive integer representing the total number of add ports and the total number of drop ports, which are the same (although the example embodiment may have an unequal number of add and drop ports). One set of drop ports includes (k−2) drop ports 426 that function only as drop ports and the other set includes two drop ports 427 that also function as express ports. The two drop/express ports 427 are denoted as drop/express out port 2 and drop/express out port 3. One of the drop/express ports 427 is connected to one of the add/express ports 479 of the ROADM core device 406 and the other drop/express port 427 is connected to one of the add/express ports 499 of the ROADM core device 408. The ROADM core device 402 can further comprise a 2:1, type-1 light combiner 428 receiving optical signals from an express input port 430 (which, in turn, receives optical signals from an express output port 444 of the ROADM 404) and outputting optical signals from a line output interface 432. The type-1 light combiner 428 can also receive optical signals from a k:1, type-1A light combiner 434. The light combiner 434 receives optical signals from k VOAs 436, each of which is connected to one of the k add ports comprising a first set of (k−2) add ports 438 that function only as add ports, and a second add port set comprising two add ports 439 that function as both add ports and express ports, denoted as add/express in port 2 and add/express in port 3 (one of the add/express ports 439 is connected to one of the drop/express ports 467 of the ROADM core device 406 and the other add/express port 439 is connected to one of the drop/express ports 487 of the ROADM core device 408). The type-1 light combiner 428, the type-1A light combiner 434, the type-4 light distributor 420, and the VOAs 436 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 312 can include more than the number of components shown in FIG. 14, and it is within the scope of this example embodiment for any of the type-1 light combiner 428, the type-1A light combiner 434, the type-4 light distributor 420, and the VOAs 436 shown in FIG. 14 to be replaced by any other suitable component (or components) that performs (or perform) the functions thereof, as discussed above.

The ROADM core device 404 can comprise a type-4 light distributor 440 receiving optical signals input from line interface 442, outputting optical signals on the express output port 444 (which is connected to the express input port 430 of the ROADM 402), and dropping optical signals via k drop ports comprising a first set of (k−2) drop ports and two drop ports 447 in a second set of drop ports, where k is a positive integer representing the total number of add ports and the total number of drop ports, which are the same (although the example embodiment may have an unequal number of add and drop ports). The first set of (k−2) drop ports 446 function only as drop ports and the second set of two drop ports 447 also function as express ports. The two drop/express ports 447 are denoted as drop/express out port 2 and drop/express out port 3. One of the drop/express out ports 447 is connected to one of the add/express ports 479 of the ROADM core device 406 and the other drop/express out port 447 is connected to one of the add/express ports 499 of the ROADM core device 408.

The ROADM core device 404 can further comprise a 2:1, type-1 light combiner 448 receiving optical signals from an express input port 450 (which, in turn, receives optical signals from an express output port 424 of the ROADM 402) and outputting optical signals from a line output interface 452. The type-1 light combiner 448 can also receive optical signals from a k:1, type-1A light combiner 454. The light combiner 454 receives optical signals from k VOAs 456, each of which is connected to one of the k add ports comprising a first set of (k−2) add ports 458 that function only as add ports, and a second add port set comprising two add ports 459 that function as both add ports and express ports, denoted as add/express in port 2 and add/express in port 3 (one of the add/express ports 459 is connected to one of the drop/express ports 467 of the ROADM core device 406 and the other add/express port 459 is connected to one of the drop/express ports 487 of the ROADM core device 408). The type-1 light combiner 448, the type-1A light combiner 454, the type-4 light distributor 440, and VOAs 456 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 404 can include more than the number of components shown in FIG. 14, and it is within the scope of this example embodiment for any of the type-1 light combiner 448, the type-1A light combiner 454, the type-4 light distributor 440, and VOAs 456 shown in FIG. 14 to be replaced by any other suitable component (or components) that performs (or perform) the functions thereof, as discussed above.

The ROADM core device 406 can comprise a type-4 light distributor 460 receiving optical signals input from line interface 462, outputting optical signals on the express output port 464 (which is connected to the express in port 490 of the ROADM 408), and dropping optical signals via k drop ports that comprise (k−2) drop ports 466 in a first set of drop ports and two drop ports 467 in a second set of drop ports, respectively, where k is a positive integer representing the total number of add ports and the total number of drop ports, which are the same (although the example embodiment may have an unequal number of add and drop ports). The first set of drop ports includes (k−2) drop ports 466 that function only as drop ports and the second set of drop ports includes two drop ports 467 that also function as express ports. The two drop/express ports 467 are denoted as drop/express out port 2 and drop/express out port 3. One of the drop/express out ports 467 is connected to one of the add/express ports 459 of the ROADM core device 404 and the other drop/express out port 467 is connected to one of the add/express ports 439 of the ROADM core device 402.

The ROADM core device 406 can further comprise a 2:1, type-1 light combiner 468 receiving optical signals from an express input port 470 (which, in turn, receives optical signals from the express out port 484 of the ROADM 408) and outputting optical signals from a line output interface 472. The type-1 light combiner 468 can also receive optical signals from a k:1, type-1A light combiner 474. The light combiner 474 receives optical signals from k VOAs 476, each of which is connected to one of the k add ports comprising a first set of (k−2) add ports 478 that function only as add ports and a second add port set comprising two add ports 479 that function as both as both add ports and express ports. One of the add/express ports 479 can be connected to the drop port 427 of the ROADM 402 to receive optical signals dropped from drop port 427. The other of the add/express ports 479 is connected to one of the drop/express ports 447 of the ROADM core device 404. The type-1 light combiner 468, the type-1A light combiner 474, the type-4 light distributor 460, and VOAs 476 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 406 can include more than the number of components shown in FIG. 14, and it is within the scope of this example embodiment for any of the type-1 light combiner 468, the type-1A light combiner 474, the type-4 light distributor 460, and VOAs 476 shown in FIG. 14 to be replaced by any other suitable component (or components) that performs (or perform) the functions thereof, as discussed above.

The ROADM core device 408 can comprise a type-4 light distributor 480 receiving optical signals input from line interface 482, outputting optical signals on the express output port 484 (which is connected to the express in port 470 of the ROADM 406), and dropping optical signals via k drop ports comprising a first set of (k−2) drop ports 486 and a second set of two drop ports 487, where k is a positive integer representing the total number of add ports and the total number of drop ports, which are the same (although the example embodiment may have an unequal number of add and drop ports). The first set of drop ports includes (k−2) drop ports 486 that function only as drop ports and the second set of drop ports includes two drop ports 487 that also function as express ports. The two drop/express ports 487 are denoted as drop/express out port 2 and drop/express out port 3. One of the drop/express out ports 487 is connected to one of the add/express ports 459 of the ROADM core device 404 and the other drop/express out port 487 is connected to one of the add/express ports 439 of the ROADM core device 402.

The ROADM core device 408 can further comprise a 2:1, type-1 light combiner 488 receiving optical signals from an express input port 490 (which, in turn, receives optical signals from the express out port 464 of the ROADM 406) and outputting optical signals from a line output interface 492. The type-1 light combiner 488 can also receive optical signals from a k:1, type-1A light combiner 494. The light combiner 494 receives optical signals from k VOAs 496, each of which is connected to one of the k add ports comprising a first set of (k−2) add ports 498 that function only as add ports and a second add port set comprising two add ports 499 that function as both as both add ports and express ports. One of the add/express ports 499 can be connected to one of the drop ports 427 of the ROADM 402 to receive optical signals dropped from drop port 427. The other of the add/express ports 499 can be connected to one of the drop/express ports 447 of the ROADM core device 404. The type-1 light combiner 488, the type-1A light combiner 494, the type-4 light distributor 480, and VOAs 496 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 408 can include more than the number of components shown in FIG. 14, and it is within the scope of this example embodiment for any of the type-1 light combiner 488, the type-1A light combiner 494, the type-4 light distributor 480, and VOAs 496 shown in FIG. 14 to be replaced by any other suitable component (or components) that performs (or perform) the functions thereof, as discussed above.

In order to lower the gain of the output amplifier (not shown) needed to overcome the higher express insertion losses that can be encountered in three and four degree nodes, the insertion losses associated with the express in 2 and express in 3 ports can be lowered, while increasing the insertion losses of add ports 1 to k−2 and while increasing the insertion loss associated with the express in 1 port.

ROADM Example Embodiment #2

Figure 15A:
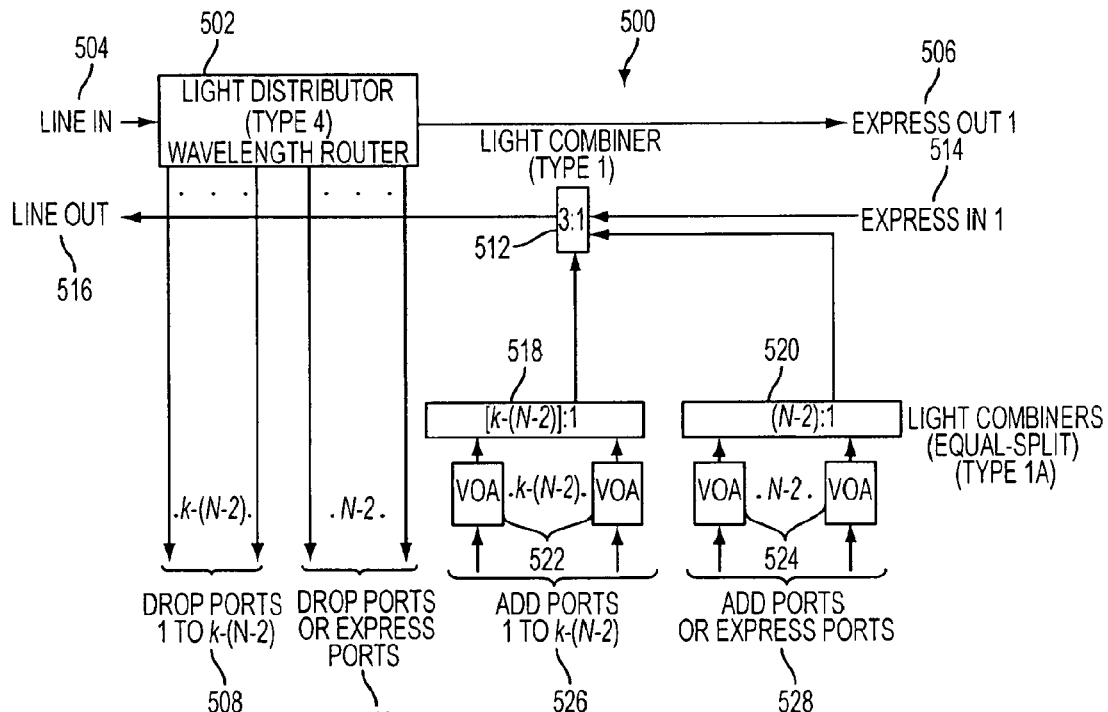
FIG. 15A is a block diagram of one example embodiment of a type-1 ROADM core device comprising ROADM example embodiment #2 in which the coupling ratio of a 3:1 optical coupler is selected to produce different insertion losses for the set of add ports that function only as add ports and the set of add ports that function as both add ports and express ports.

FIG. 15A shows example embodiment #2 of a ROADM core device 500. In this example embodiment of the ROADM core device 500, there are two types of add ports: those that are used as add and drop ports only, and those that can be used as add and drop ports and as express ports, although the embodiment is not limited to only these two types of add and drop ports.

This example embodiment can differ from the FIG. 10B example embodiment in that the two sets of add ports can be each connected to separate equal-split couplers (instead of a single equal-split coupler as shown in FIG. 10B). The outputs of the two equal-split couplers (518 and 520) and the express in 1 signal (from express in port 514) can be then fed into a three-to-one unequal-split coupler (512).

Figure 15B:
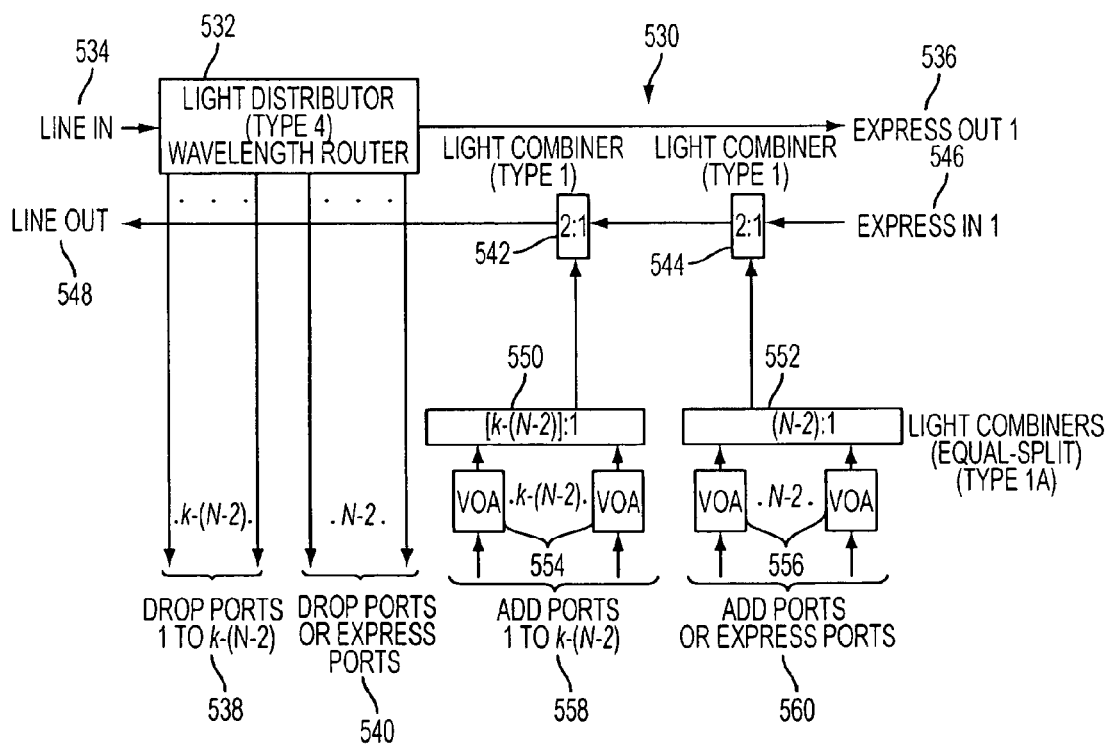
FIG. 15B is a block diagram of another example embodiment of the ROADM example embodiment #2 that uses two 2:1 couplers instead of the 3:1 coupler used in the example embodiment shown in FIG. 15($a$).

By using this configuration, the insertion loss of the add only ports, the insertion loss of the combination add/express ports, and the insertion loss of the express in 1 port can be adjusted with respect to one another by adjusting the coupling ratios of the 3-to-1 coupler. FIG. 15A shows an example embodiment of a ROADM 500 used to construct an N-degree node with k−(N−2) colorless add/drop ports that function only as add and drop ports, respectively. The ROADM core device shown in FIG. 15A can be the same as, for example, the ROADM core device shown in FIG. 10A, except for the use of two different kinds of add ports and the couplers associated therewith, although it is not limited thereto. It is within the scope of the example embodiment for the ROADM core device shown in FIG. 15A to include additional elements and to replace each of the components of the ROADM core device shown in FIG. 15A with any other suitable component (or components) that performs (or perform) the functions thereof. FIG. 15B also shows an example embodiment of a ROADM used to construct an N-degree node (having N ROADMs each with one network node interface, so that the N-degree node has N network node interfaces) with k−(N−2) colorless add/drop ports that function only as add and drop ports, respectively, but FIG. 15B uses two 2-to-1 couplers 542 and 544 to create the 3-to-1 coupler function shown in FIG. 15A. The ROADM core device 530 shown in FIG. 15B can be the same as, for example, the ROADM core device shown in FIG. 15A, except for the use of two 2-to-1 couplers to create the 3-to-1 coupler function shown in FIG. 15A, although it is not limited thereto.

More specifically, in FIG. 15A, the ROADM core device 500 can comprise a type-4 light distributor 502 receiving optical signals input from line interface or line in port 504, outputting optical signals on express output port 506, and dropping optical signals via two sets of drop ports. The first set of k−(N−2) drop ports 508 can function only as drop ports to locally drop optical signals from the distributor 502. In this example embodiment, k is the total number of drop ports in the two sets and the total number of add ports in the two sets, which are the same (although the example embodiment is not limited to having equal number of add and drop ports), and N is the number of optical degrees supported by the ROADM 500. The second set of N−2 drop ports 510 can function as both drop ports and express ports and are connectable to another ROADM or similar optical device in the node containing the ROADM 500.

The ROADM core device 500 can further comprise a 3:1, type-1 light combiner 512 receiving optical signals from an express input port 514 and outputting optical signals from a line output interface 516. The type-1 light combiner 512 can also receive optical signals from two type-1A light combiners 518 and 520. The light combiner 518 is a k−(N−2):1 light combiner that receives optical signals from k−(N−2) VOAs 522, which each receive optical signals from one of k−(N−2) add ports 526. Add ports 526 constitute a first set of add ports that function only as add ports. The light combiner 520 is a (N−2):1 light combiner that receives optical signals from (N−2) VOAs 524, which each receive optical signals from one of (N−2) add ports 528. Add ports 528 constitute a second set of add ports that function as both add ports and as express ports that are connectable to another ROADM or similar optical device in the node containing the ROADM 500 to receive optical signals therefrom.

The type-1 light combiner 512, the type-1A light combiners 518 and 520, the type-4 light distributor 502, and VOAs 522 and 524 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiner 512, the type-1A light combiners 518 and 520, the type-4 light distributor 502, and VOAs 522 and 524 can be the same as, or different from, the type-1 light combiner 142, the type-1A light combiner 148, and the type-4 light distributor 132 shown in FIG. 10A. Also, the type-1 ROADM core device 500 can include more than the number of components shown in FIG. 15A, and it is within the scope of this example embodiment for any of the type-1 light combiner 512, the type-1A light combiners 518 and 520, the type-4 light distributor 502, and VOAs 522 and 524 shown in FIG. 15A to be replaced by any other suitable component (or components) that performs (or perform) the same or similar functions thereof, as discussed above.

FIG. 15B shows an example embodiment of a ROADM core device 530 comprising a type-4 light distributor 532 receiving optical signals input from line interface or line in port 534, outputting optical signals on express output port 536, and dropping optical signals via two sets of drop ports. The first set of k–(N–2) drop ports 538 can function only as drop ports to locally drop optical signals from the distributor 532. In this example embodiment, k is the total number of drop ports in the two sets and the total number of add ports in the two sets, which are the same (although the example embodiment is not limited to having equal number of add and drop ports), and N is the number of optical degrees supported by the ROADM 530. The second set of N–2 drop ports 540 can function as both drop ports and express ports and are connectable to another ROADM or similar optical device in the node containing the ROADM 530.

The ROADM core device 530 can further comprise two 2:1, type-1 light combiners 542 and 544. The light combiner 542 receives optical signals from the light combiner 544 and outputs optical signals to a line output interface 548. The light combiner 544 receives optical signals from an express input port 546. The light combiner 542 can also receive optical signals from a k–(N–2):1 light combiner 550, which in turn receives optical signals from k–(N–2) VOAs 554, each connected to a different one of k–(N–2) add ports 558 in a first set of add ports that function only as add ports. The light combiner 544 can also receive optical signals from a (N–2):1 light combiner 552, which in turn receives optical signals from (N–2) VOAs 556, each connected to a different one of (N–2) add ports 560 in a second set of add ports that function as both add ports and express ports.

The type-1 light combiners 542 and 544, the type-1A light combiners 550 and 552, the type-4 light distributor 532, and VOAs 554 and 556 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiners 542 and 544, the type-1A light combiners 550 and 552, the type-4 light distributor 532, and VOAs 554 and 556 can be the same as, or different from, the type-1 light combiner 142, the type-1A light combiner 148, the type-4 light distributor 132, and the VOAs 150 shown in FIG. 10A. Also, the type-1 ROADM core device 530 can include more than the number of components shown in FIG. 15B, and it is within the scope of this example embodiment for any of the type-1 light combiners 542 and 544, the type-1A light combiners 550 and 552, the type-4 light distributor 532, and VOAs 554 and 556 shown in FIG. 15B to be replaced by any other suitable component (or components) that performs (or perform) the same or similar functions thereof, as discussed above.

Figure 16A:
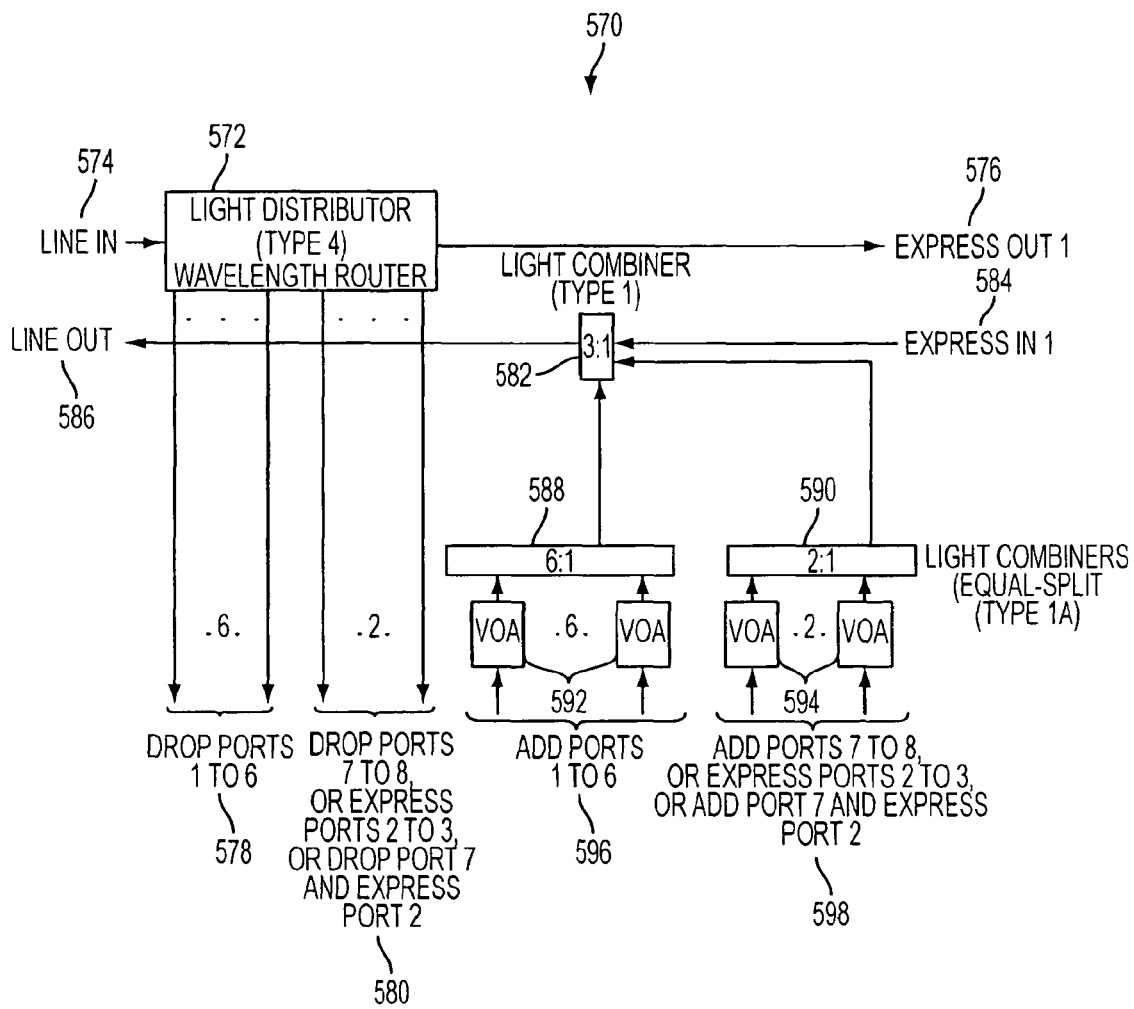
FIGS. 16A through 16D are block diagrams of other example embodiments of the ROADM example embodiment #2 that have eight total add ports and eight total drop ports, (a first set of six add ports and a first set of six drop ports and a second set of two add ports and a second set of two drop ports), in which the add and drop ports in the second sets of add and drop ports function as both add ports and drop ports, respectively, and as express ports, and can be used to construct a 4-degree optical node (N=4, where N is maximum number of optical degrees supported by ROADM, and therefore N is the maximum number of ROADMs in the node). The example embodiment shown in FIG. 16A uses a 3:1 coupler connected to the add ports, the example embodiment shown in FIG. 16B uses two 2:1 couplers both receiving the output of all of the add ports, the example embodiment of FIG. 16C uses two 2:1 couplers, each connected to a different set of add ports, and the example embodiment of FIG. 16D uses two 2:1 couplers, each connected to a different set of add ports, where the 2:1 coupler receiving the output from the second set of add ports is upstream from the 2:1 coupler receiving the output from the first set of add ports.
Figure 16B:
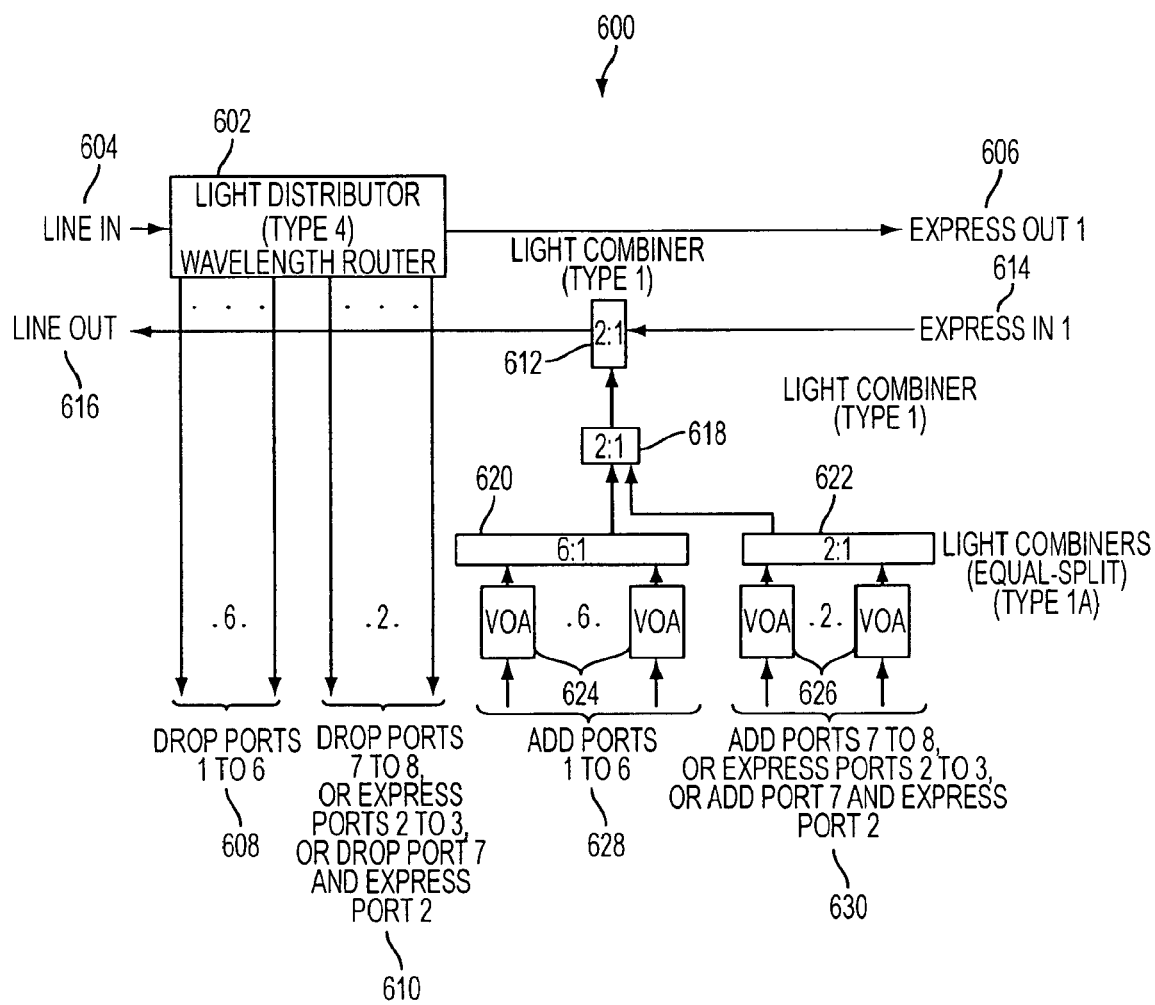
Figure 16C:
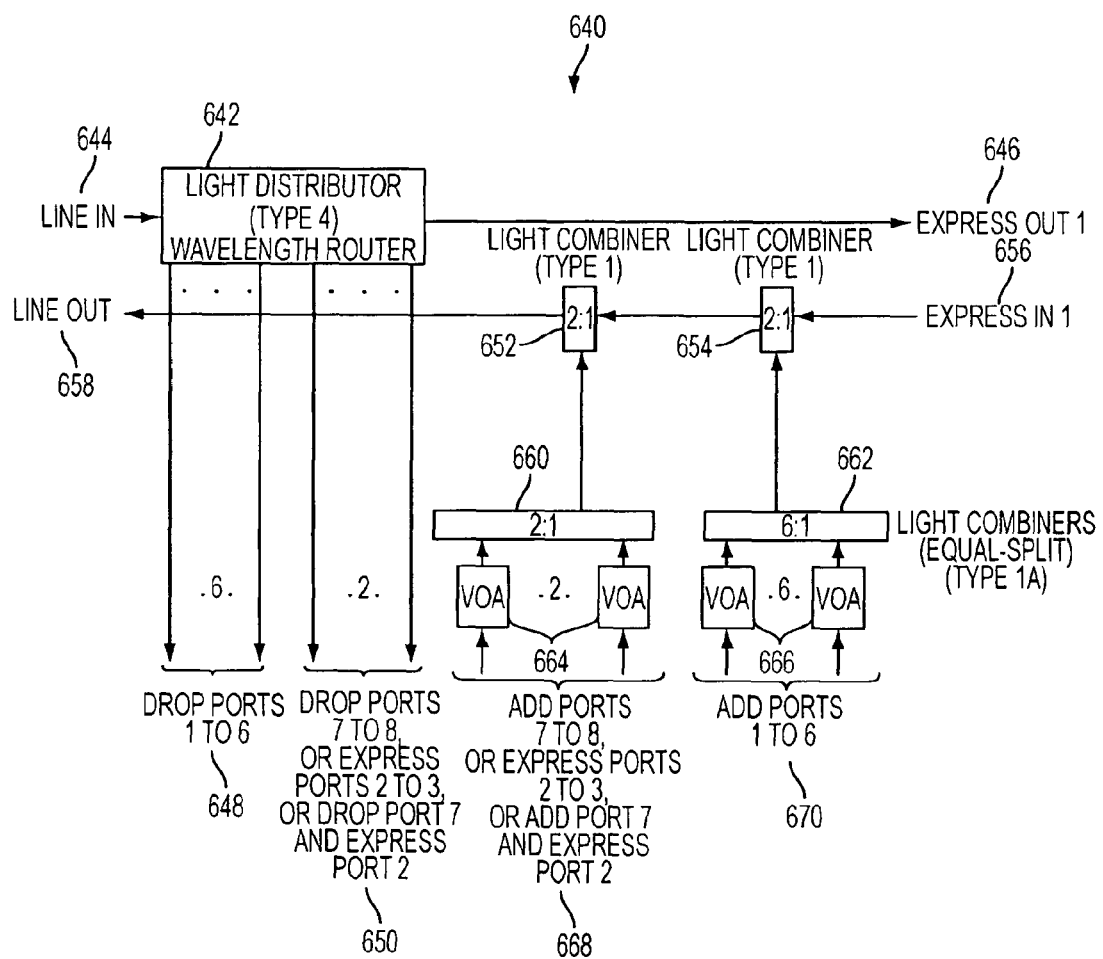
Figure 16D:
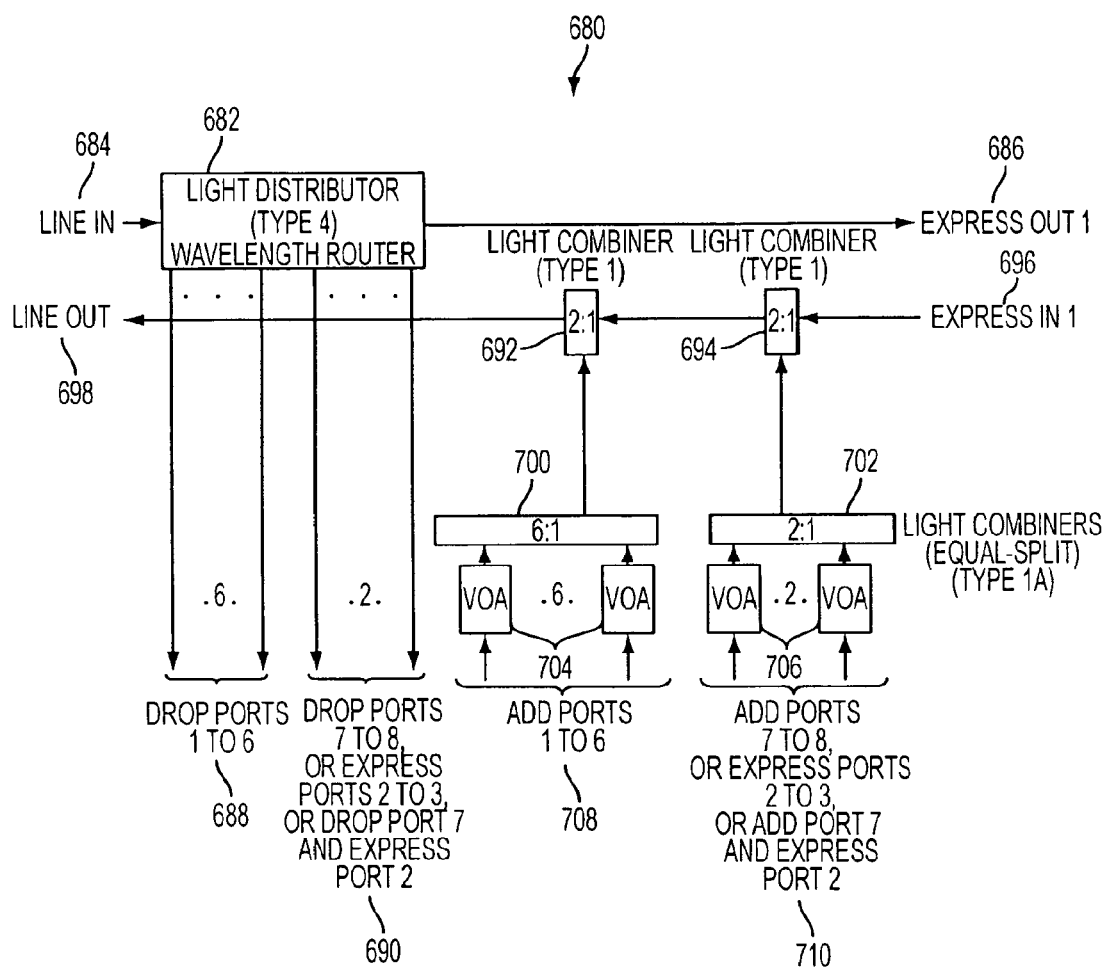

FIGS. 16A-16D show other example embodiments of the ROADM example embodiment #2 for the case where N=4 and k=8, although the example embodiments shown in these figures are not limited to implementing ROADM example embodiment #2 and they can implement other suitable ROADM example embodiments. FIG. 16A shows an example embodiment using a single unequal-split 3-to-1 coupler, as will also be described in more detail below. FIG. 16B shows an example embodiment using two unequal-split 2-to-1 couplers, where the outputs of one of the two equal-split couplers can be fed into the input of the other 2-to-1 unequal-split coupler, as will also be described in more detail below. FIGS. 16C and 16D show example embodiments using two unequal-split 2-to-1 couplers, a 6:1 equal-split coupler, and a 2-to-1 equal-split coupler, which differ in which 2:1 coupler receives the output of the 6:1 coupler.

Based upon the standard coupling ratios available for 2-to-1 couplers (shown in Table 4), one of the configurations shown in FIGS. 16B, 16C, and 16D can provide a solution in a case where the overall lowest output amplifier gain is desired. The ROADM core devices shown in FIGS. 16A-16D can be the same as, for example, the ROADM core devices shown in FIGS. 15A and 15BB, except for the use of the specific combination of couplers associated with the add ports functioning as both add ports and express ports, although they are not limited thereto. It is within the scope of the example embodiment for the ROADM core devices shown in FIG. 16A-16D to include additional elements and to replace each of the components of the ROADM core devices shown in FIG. 16A-16D with any other suitable component (or components) that performs (or perform) the functions thereof.

More specifically, in FIG. 16A, the ROADM core device 570 can comprise a type-4 light distributor 572 receiving optical signals input from line interface or line in port 574, outputting optical signals to express output port 576, and dropping optical signals via two sets of drop ports. The first set of six drop ports 578 can function only as drop ports to locally drop optical signals from the distributor 572. The second set of two drop ports 580 can function as both drop ports and express ports and are connectable to another ROADM or similar optical device in the node containing the ROADM 570.

The ROADM core device 570 can further comprise a 3:1, type-1 light combiner 582 receiving optical signals from an express input port 584 and outputting optical signals from a line output interface 586. The type-1 light combiner 582 can also receive optical signals from two type-1A light combiners 588 and 590. The light combiner 588 is a 6:1 light combiner that receives optical signals from six VOAs 592, which each receive optical signals from one of two add ports 596. Add ports 596 constitute a first set of add ports that function only as add ports. The light combiner 590 is a 2:1 light combiner that receives optical signals from two VOAs 594, which each receive optical signals from one of two add ports 598. Add ports 598 constitute a second set of add ports that function as both add ports and as express ports that are connectable to another ROADM or similar optical device in the node containing the ROADM 570 to receive optical signals therefrom.

In FIG. 16A, the type-1 light combiner 582, the type-1A light combiners 588 and 590, the type-4 light distributor 572, and VOAs 592 and 594 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiner 582, the type-1A light combiners 588 and 590, the type-4 light distributor 572, and VOAs 592 and 594 can be the same as, or different from, the type-1 light combiner 142, the type-1A light combiner 148, the type-4 light distributor 132, and the VOAs 150 shown in FIG. 10A. Also, the type-1 ROADM core device 570 can include more than the number of components shown in FIG. 16A, and it is within the scope of this example embodiment for any of the type-1 light combiner 582, the type-1A light combiners 588 and 590, the type-4 light distributor 572, and VOAs 592 and 594 shown in FIG. 16A to be replaced by any other suitable component (or components) that performs (or perform) the same or similar functions thereof, as discussed above.

In FIG. 16B, the ROADM core device 600 can comprise a type-4 light distributor 602 receiving optical signals input from line interface or line in port 604, outputting optical signals to express output port 606, and dropping optical signals via two sets of drop ports 608 and 610. The first set of six drop ports 608 can function only as drop ports to locally drop optical signals from the distributor 602. The second set of two drop ports 610 can function as both drop ports and express ports and are connectable to another ROADM or similar optical device in the node containing the ROADM 600.

The ROADM core device 600 can further comprise two 2:1, type-1 light combiners 612 and 618. The light combiner 612 receives optical signals from an express in 1 port 614 and from the light combiner 618, and outputs optical signals to a line output interface 616. The light combiner 618 receives optical signals from a 6:1 light combiner 620 and a 2:1 light combiner 622. The light combiner 620 receives optical signals from six VOAs 624, each connected to a different one of six add ports 628 in a first set of add ports that function only as add ports. The light combiner 622 can receive optical signals from two VOAs 626, each connected to a different one of two add ports 630 in a second set of add ports that function as both add ports and express ports.

The type-1 light combiners 612 and 618, the type-1A light combiners 620 and 622, the type-4 light distributor 602, and VOAs 624 and 626 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiners 612 and 618, the type-1A light combiners 620 and 622, the type-4 light distributor 602, and VOAs 624 and 626 can be the same as, or different from, the type-1 light combiner 142, the type-1A light combiner 148, the type-4 light distributor 132, and the VOAs 150 shown in FIG. 10A. Also, the type-1 ROADM core device 602 can include more than the number of components shown in FIG. 16B, and it is within the scope of this example embodiment for any of the type-1 light combiners 612 and 618, the type-1A light combiners 620 and 622, the type-4 light distributor 602, and VOAs 624 and 626 shown in FIG. 16B to be replaced by any other suitable component (or components) that performs (or perform) the same or similar functions thereof, as discussed above.

FIG. 16C shown an example embodiment of a ROADM core device 640 that can comprise a type-4 light distributor 642 receiving optical signals input from line interface or line in port 644, outputting optical signals to express output port 646, and dropping optical signals via two sets of drop ports 648 and 650. The first set of six drop ports 648 can function only as drop ports to locally drop optical signals from the distributor 642. The second set of two drop ports 650 can function as both drop ports and express ports and are connectable to another ROADM or similar optical device in the node containing the ROADM 640.

The ROADM core device 640 can further comprise two 2:1, type-1 light combiners 652 and 654. The light combiner 652 receives optical signals from the light combiner 654 and outputs optical signals to a line output interface 658. The light combiner 654 receives optical signals from an express input port 656. The light combiner 654 also receives optical signals from a 6:1 light combiner 662, which receives optical signals from six VOAs 666, each of which receive optical signals from a different one of six add ports 670 in a first set of add ports that function only as add ports. The light combiner 652 can also receive optical signals from a 2:1 light combiner 660, which in turn receives optical signals from two VOAs 664, each connected to a different one of two add ports 668 in a second set of add ports that function as add ports and as express ports.

The type-1 light combiners 652 and 654, the type-1A light combiners 660 and 662, the type-4 light distributor 642, and VOAs 664 and 666 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiners 652 and 654, the type-1A light combiners 660 and 662, the type-4 light distributor 642, and VOAs 664 and 666 can be the same as, or different from, the type-1 light combiner 142, the type-1A light combiner 148, the type-4 light distributor 132, and the VOAs 150 shown in FIG. 10A. Also, the type-1 ROADM core device 640 can include more than the number of components shown in FIG. 16C, and it is within the scope of this example embodiment for any of the type-1 light combiners 652 and 654, the type-1A light combiners 660 and 662, the type-4 light distributor 642, and VOAs 664 and 666 shown in FIG. 16C to be replaced by any other suitable component (or components) that performs (or perform) the same or similar functions thereof, as discussed above.

FIG. 16D shown an example embodiment of a ROADM core device 680 that can comprise a type-4 light distributor 682 receiving optical signals input from line interface or line in port 684, outputting optical signals on express output port 686, and dropping optical signals via two sets of drop ports 688 and 690. The first set of six drop ports 688 can function only as drop ports to locally drop optical signals from the distributor 682. The second set of two drop ports 690 can function as both drop ports and express ports and are connectable to another ROADM or similar optical device in the node containing the ROADM 680.

The ROADM core device 680 can further comprise two 2:1, type-1 light combiners 692 and 694. The light combiner 692 receives optical signals from the light combiner 694 and outputs optical signals to a line output interface 698. The light combiner 694 receives optical signals from an express input port 696. The light combiner 692 can also receive optical signals from a 6:1 light combiner 700, which in turn receives optical signals from six VOAs 704, each connected to a different one of six add ports 708 in a first set of add ports that function only as add ports. The light combiner 694 can also receive optical signals from a 2:1 light combiner 702, which receives optical signals from two VOAs 706, each of which receive optical signals from a different one of two add ports 710 in a second set of add ports that function as add ports and express ports.

The type-1 light combiners 692 and 694, the type-1A light combiners 700 and 702, the type-4 light distributor 692, and VOAs 704 and 706 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiners 692 and 694, the type-1A light combiners 700 and 702, the type-4 light distributor 692, and VOAs 704 and 706 can be the same as, or different from, the type-1 light combiner 142, the type-1A light combiner 148, the type-4 light distributor 132, and the VOAs 150 shown in FIG. 10A. Also, the type-1 ROADM core device 680 can include more than the number of components shown in FIG. 16D, and it is within the scope of this example embodiment for any of the type-1 light combiners 692 and 694, the type-1A light combiners 700 and 702, the type-4 light distributor 692, and VOAs 704 and 706 shown in FIG. 16D to be replaced by any other suitable component (or components) that performs (or perform) the same or similar functions thereof, as discussed above.

Figure 17:
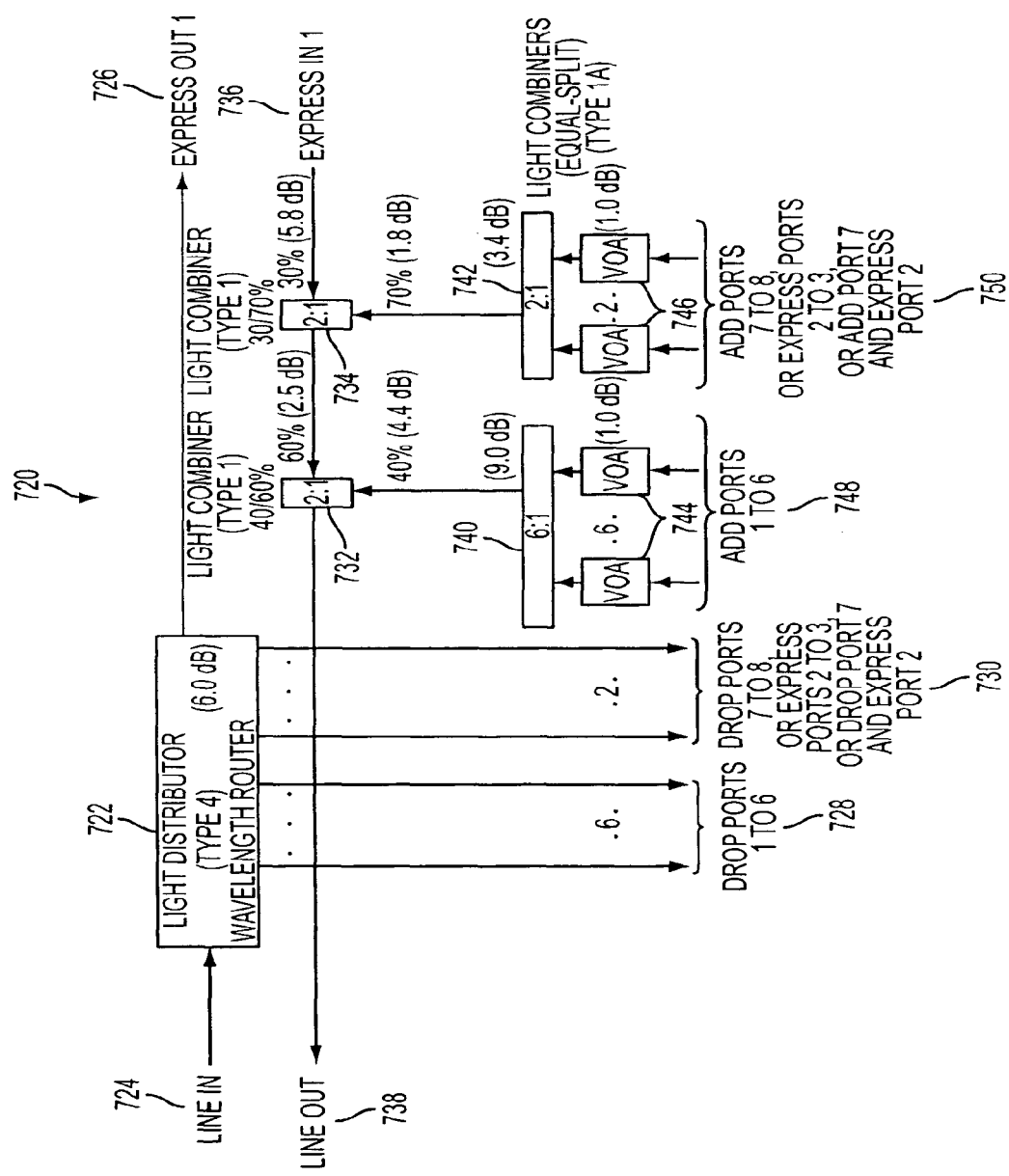
FIG. 17 is a block diagram of another example embodiment of the ROADM example embodiment #2 having eight total add ports and eight total drop ports, (a first set of six add ports and a first set of six drop ports and a second set of two add ports and a second set of two drop ports), in which the add and drop ports in the second sets of add and drop ports function as both add ports and drop ports, respectively, and as express ports, and can be used to construct a 4-degree optical node. This example embodiment includes two 2:1 unequal-power optical couplers, each connected to a different set of add ports.

FIG. 17 shows another example embodiment of ROADM example embodiment #2 with N=4 and k=8, using 2-to-1 optical couplers chosen from Table 4, although the example embodiment shown in these figures is not limited to implementing the ROADM example embodiment #2, and can employ other suitable types of ROADM example embodiments.

FIG. 17 shows an example embodiment of a ROADM core device 720 that can comprise a type-4 light distributor 722 receiving optical signals input from line interface or line in port 724, outputting optical signals to express output port 726, and dropping optical signals via two sets of drop ports 728 and 730. The first set of six drop ports 728 can function only as drop ports to locally drop optical signals from the distributor 722. The second set of two drop ports 730 can function as both drop ports and express ports and are connectable to another ROADM or similar optical device in the node containing the ROADM 720.

The ROADM core device 720 can further comprise two 2:1, type-1 light combiners 732 and 734. The light combiner 732 receives optical signals from the light combiner 734 and outputs optical signals to a line output interface 738. The light combiner 734 receives optical signals from an express input port 736. The light combiner 732 can also receive optical signals from a 6:1 light combiner 740, which in turn receives optical signals from six VOAs 744, each connected to a different one of six add ports 748 in a first set of add ports that function only as add ports. The light combiner 734 can also receive optical signals from a 2:1 light combiner 742, which receives optical signals from two VOAs 746, each of which receive optical signals from a different one of two add ports 750 in a second set of add ports that function as add ports and express ports.

The light combiners 732 and 734 are unequal-split optical couplers, whose coupling ratios and insertion loss values are selected based on Tables 1 and 4. As can be seen in FIG. 17, the light combiner 734 is a 30%/70% 2-to-1 optical coupler and the light combiner 732 is a 40%/60% 2-to-1 optical coupler, although the FIG. 17 example embodiment is not limited to these specific couplers, coupling ratios, and insertion losses.

The type-1 light combiners 732 and 734, the type-1A light combiners 740 and 742, the type-4 light distributor 722, and VOAs 744 and 746 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiners 732 and 734, the type-1A light combiners 740 and 742, the type-4 light distributor 722, and VOAs 744 and 746 can be the same as, or different from, the type-1 light combiner 142, the type-1A light combiner 148, the type-4 light distributor 132, and the VOAs 150 shown in FIG. 10A. Also, the type-1 ROADM core device 720 can include more than the number of components shown in FIG. 17, and it is within the scope of this example embodiment for any of the type-1 light combiners 732 and 734, the type-1A light combiners 740 and 742, the type-4 light distributor 722, and VOAs 744 and 746 shown in FIG. 17 to be replaced by any other suitable component (or components) that performs (or perform) the same or similar functions thereof, as discussed above.

Optical Node Example Embodiment #2

Figure 18A:
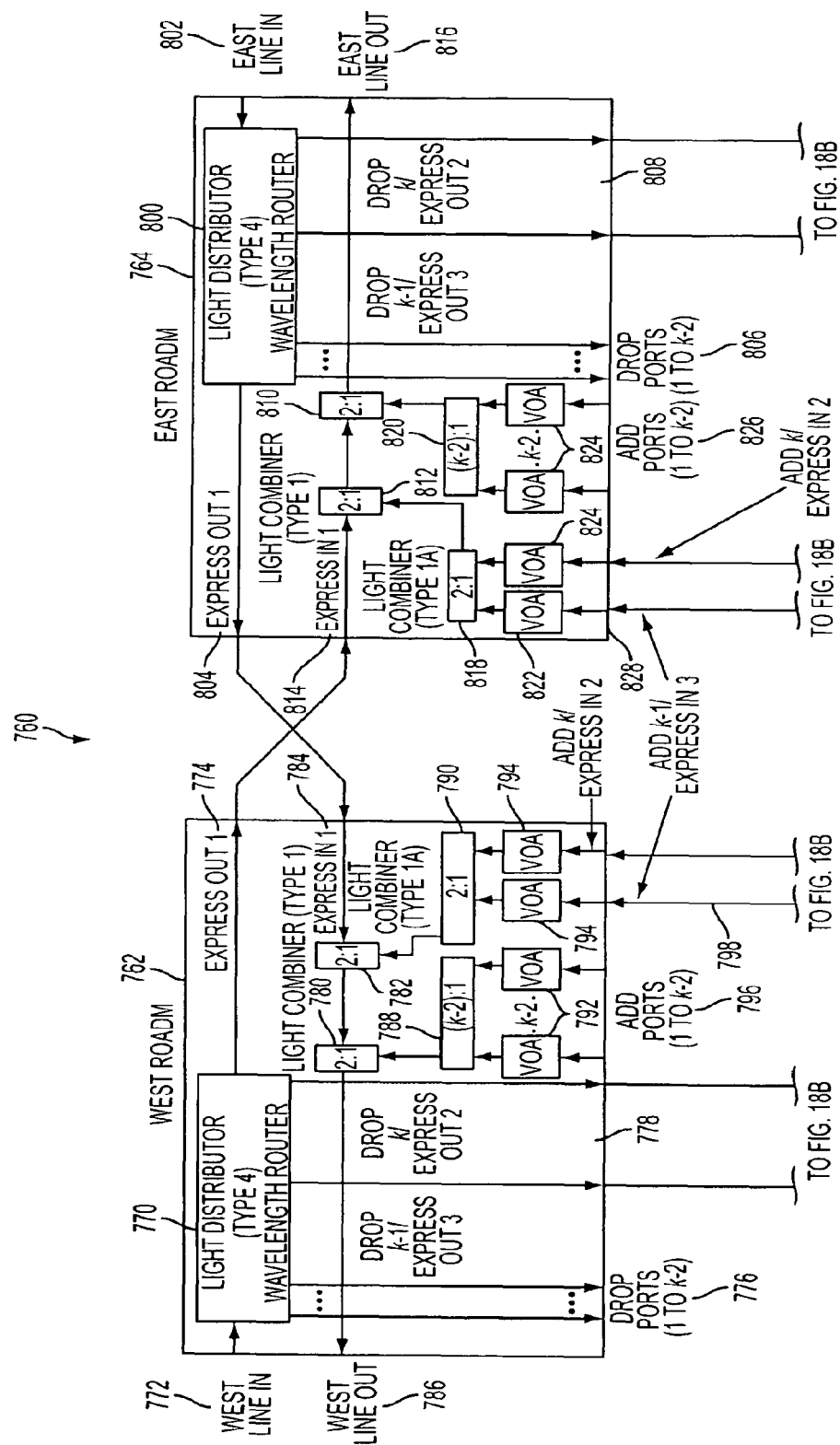
FIG. 18 is a block diagram of optical node example embodiment #2, which is a 4-degree optical node having four type-1 ROADM core devices with k−2 protected colorless add and drop ports that function only as add and drop ports, respectively, where k is an integer representing the total number of add ports and the total number of drop ports, the ROADMs each including a first set of add ports and a first set of drop ports and a second set of add ports and a second set of drop ports, in which the add and drop ports in the second sets of add and drop ports function as both add ports and drop ports, respectively, and as express ports, and two 2:1 unequal-power optical couplers, each connected to a different set of add ports.
Figure 18B:
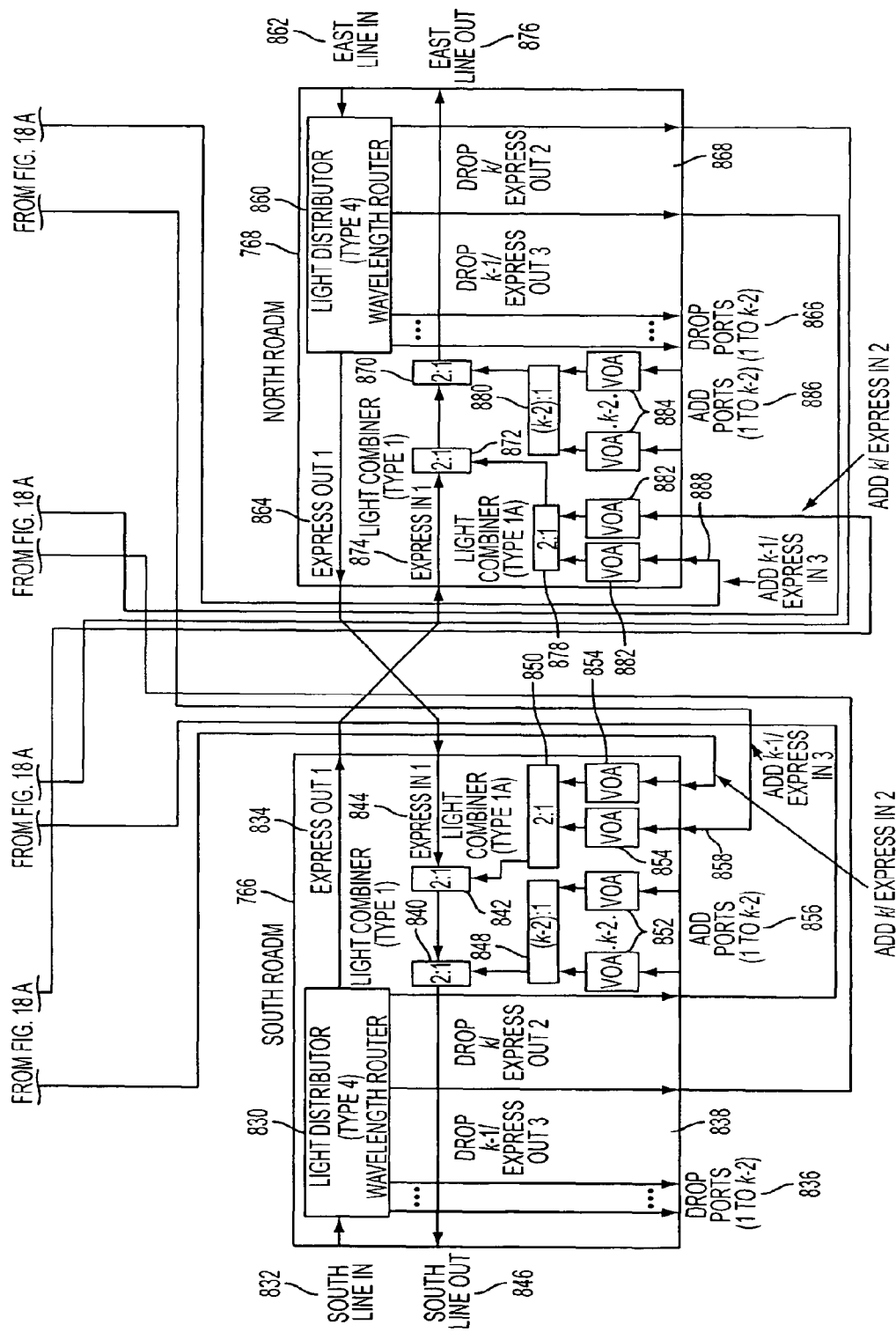

FIG. 18 shows an example embodiment of optical node embodiment #2. More specifically, FIG. 18 shows a four degree node (N=4) 760 including four ROADM core devices 762, 764, 766, and 768. Each of the ROADM core devices shown in FIG. 18 can be the same as, for example, the FIG. 15B ROADM core device, although they are not limited thereto. It is within the scope of the example embodiment for the optical node 760 shown in FIG. 18 to include additional elements and to replace each of the ROADM cores devices shown in FIG. 18 and each of the components of each ROADM core device with any other suitable component (or components) that performs (or perform) the functions thereof. In the node 760, on each ROADM 762, 764, 766, and 768, there are three ports used as express ports, and each ROADM has k−2 add/drop ports that function only as add and drop ports.

More specifically, the ROADM 762 can comprise a type-4 light distributor 770 receiving optical signals input from line interface 772, outputting optical signals to express output port 774 (which is connected to the express input port 814 of the ROADM 764), and dropping optical signals via k drop ports comprising two sets of drop ports, where k is a positive integer representing the total number of add ports and the total number of drop ports, which are the same (although the example embodiment may have an unequal number of add and drop ports). One set of drop ports includes drop ports 776 that function only as drop ports and the other set includes two drop ports 778 that function as express ports. The two drop/express ports 778 are denoted as drop/express out port 2 and drop/express in port 3. One of the drop/express ports 778 is connected to one of the add/express ports 858 of the ROADM core device 766 and the other drop/express port 778 is connected to one of the add/express ports 888 of the ROADM core device 768.

The ROADM core device 762 can further comprise two 2:1, type-1 light combiners 780 and 782. Light combiner 780 receives optical signals from light combiner 782 and outputs optical signals to the west line out port 786. The light combiner 780 also receives optical signals from a (k−2):1 light combiner 788 that, in turn receives optical signals from (k−2) VOAs 792, which each receive an optical signal from a different one of (k−2) add ports 796 in a first set of add ports that function only as add ports. In this example embodiment, k is the total number of drop ports in the two sets of drop ports and the total number of add ports in the two sets of add ports, which are the same (although the example embodiment is not limited to having equal number of add and drop ports). The light combiner 782 receives optical signals from an express in 1 port 784 (which, in turn, receives optical signals from an express output port 804 of the ROADM 764). The light combiner 782 also receives optical signals from a 2:1 light combiner 790. The light combiner 790 receives optical signals from two VOAs 794, each of which receive optical signals from one of the two add ports 798 in the second set of add ports that function as express ports, denoted as add/express in port 2 and add/express in port 3 (one of the add/express ports 798 is connected to one of the drop/express ports 838 of the ROADM core device 766 and the other add/express port 798 is connected to one of the drop/express ports 868 of the ROADM core device 768). The type-1 light combiners 780 and 782, the type-1A light combiners 788 and 790, the type-4 light distributor 770, and the VOAs 792 and 794 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 762 can include more than the number of components shown in FIG. 18, and it is within the scope of this example embodiment for any of the type-1 light combiners 780 and 782, the type-1A light combiners 788 and 790, the type-4 light distributor 770, and the VOAs 792 and 794 shown in FIG. 18 to be replaced by any other suitable component (or components) that performs (or perform) the functions thereof, as discussed above.

The ROADM core device 764 can comprise a type-4 light distributor 800 receiving optical signals input from line interface 802, outputting optical signals on the express output port 804 (which is connected to the express input port 784 of the ROADM 762), and dropping optical signals via k drop ports comprising (k−2) drop ports 806 in a first set of drop ports and two drop ports 808 in a second set of drop ports, where k is a positive integer representing the total number of add ports and the total number of drop ports, which are the same (although the example embodiment may have an unequal number of add and drop ports). The first set of drop ports 806 function only as drop ports and the second set of drop ports 808 function as express ports. The two drop/express ports 808 are denoted as drop/express out port 2 and drop/express out port 3. One of the drop/express ports 808 is connected to one of the add/express ports 858 of the ROADM core device 766 and the other drop/express port 808 is connected to one of the add/express ports 888 of the ROADM core device 768.

The ROADM core device 764 can further comprise two 2:1, type-1 light combiners 810 and 812. Light combiner 810 receives optical signals from light combiner 812 and outputs optical signals to the east line out port 816. The light combiner 810 also receives optical signals from a (k−2):1 light combiner 820 that, in turn receives optical signals from (k−2) VOAs 824, which each receive an optical signal from a different one of (k−2) add ports 826 in a first set of add ports that function only as add ports. In this example embodiment, k is the total number of drop ports in the two sets of drop ports and the total number of add ports in the two sets of add ports, which are the same (although the example embodiment is not limited to having equal number of add and drop ports). The light combiner 812 receives optical signals from an express in 1 port 814 (which, in turn, receives optical signals from an express output port 774 of the ROADM 762). The light combiner 812 also receives optical signals from a 2:1 light combiner 818. The light combiner 818 receives optical signals from two VOAs 822, each of which receive optical signals from one of the two add ports 828 in the second set of add ports that function as express ports, denoted as add/express in port 2 and add/express in port 3 (one of the add/express ports 828 is connected to one of the drop/express ports 888 of the ROADM core device 768 and the other add/express port 828 is connected to one of the drop/express ports 838 of the ROADM core device 766).

The type-1 light combiners 810 and 812, the type-1A light combiners 818 an 820, the type-4 light distributor 800, and VOAs 822 and 824 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 764 can include more than the number of components shown in FIG. 18, and it is within the scope of this example embodiment for any of the type-1 light combiner type-1 light combiners 810 and 812, the type-1A light combiners 818 an 820, the type-4 light distributor 800, and VOAs 822 and 824 shown in FIG. 18 to be replaced by any other suitable component (or components) that performs (or perform) the functions thereof, as discussed above.

The ROADM core device 766 can comprise a type-4 light distributor 830 receiving optical signals input from line interface 832, outputting optical signals on the express output port 834 (which is connected to the express in port 874 of the ROADM 768), and dropping optical signals via k total drop ports comprising (k−2) drop ports 836 in a first set of drop ports and two drop ports 838 in a second set of drop ports, where k is a positive integer representing the total number of add ports and the total number of drop ports, which are the same (although the example embodiment may have an unequal number of add and drop ports). The first set of (k−2) drop ports 836 function only as drop ports and the second set of drop ports 838 function as express ports. The two drop/express ports 838 are denoted as drop/express out port 2 and drop/express out port 3. One of the drop/express ports 838 is connected to one of the add/express ports 828 of the ROADM core device 764 and the other drop/express port 838 is connected to one of the add/express ports 798 of the ROADM core device 762.

The ROADM core device 766 can further comprise two 2:1, type-1 light combiners 840 and 842. Light combiner 840 receives optical signals from light combiner 842 and outputs optical signals to the south line out port 846. The light combiner 840 also receives optical signals from a (k−2):1 light combiner 848 that, in turn receives optical signals from (k−2) VOAs 852, which each receive an optical signal from a different one of (k−2) add ports 856 in a first set of add ports that function only as add ports. In this example embodiment, k is the total number of drop ports in the two sets of drop ports and the total number of add ports in the two sets of add ports, which are the same (although the example embodiment is not limited to having equal number of add and drop ports). The light combiner 842 receives optical signals from an express in 1 port 844 (which, in turn, receives optical signals from an express output port 864 of the ROADM 768). The light combiner 842 also receives optical signals from a 2:1 light combiner 850. The light combiner 850 receives optical signals from two VOAs 854, each of which receive optical signals from one of the two add ports 858 in the second set of add ports that function as express ports, denoted as add/express in port 2 and add/express in port 3 (one of the add/express ports 858 is connected to one of the drop/express ports 808 of the ROADM core device 764 and the other add/express port 858 is connected to one of the drop/express ports 778 of the ROADM core device 762).

The type-1 light combiners 840 and 842, the type-1A light combiners 848 and 850, the type-4 light distributor 830, and VOAs 852 and 854 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 766 can include more than the number of components shown in FIG. 18, and it is within the scope of this example embodiment for any of the type-1 light combiners 840 and 842, the type-1A light combiners 848 and 850, the type-4 light distributor 830, and VOAs 852 and 854 shown in FIG. 18 to be replaced by any other suitable component (or components) that performs (or perform) the functions thereof, as discussed above.

The ROADM core device 768 can comprise a type-4 light distributor 860 receiving optical signals input from line interface 862, outputting optical signals to the express output port 864 (which is connected to the express in port 844 of the ROADM 766), and dropping optical signals via (k−2) drop ports 866 in a first set of drop ports and two drop ports 868 in a second set of drop ports, where k is a positive integer representing the total number of add ports and the total number of drop ports, which are the same (although the example embodiment may have an unequal number of add and drop ports). The first set of drop ports 866 function only as drop ports and the second set of drop ports 868 function also as express ports. The two drop/express ports 868 are denoted as drop/express out port 2 and drop/express out port 3. One of the drop/express ports 868 is connected to one of the add/ express ports 828 of the ROADM core device 764 and the other drop/express port 868 is connected to one of the add/ express ports 798 of the ROADM core device 762.

The ROADM core device 768 can further comprise two 2:1, type-1 light combiners 870 and 872. Light combiner 870 receives optical signals from light combiner 872 and outputs optical signals to the east line out port 876. The light combiner 870 also receives optical signals from a (k−2):1 light combiner 880 that, in turn receives optical signals from (k−2) VOAs 884, which each receive an optical signal from a different one of (k−2) add ports 886 in a first set of add ports that function only as add ports. In this example embodiment, k is the total number of drop ports in the two sets of drop ports and the total number of add ports in the two sets of add ports, which are the same (although the example embodiment is not limited to having equal number of add and drop ports). The light combiner 872 receives optical signals from an express in 1 port 874 (which, in turn, receives optical signals from an express output port 834 of the ROADM 766). The light combiner 872 also receives optical signals from a 2:1 light combiner 878. The light combiner 878 receives optical signals from two VOAs 882, each of which receive optical signals from one of the two add ports 888 in the second set of add ports that function as express ports, denoted as add/express in port 2 and add/express in port 3 (one of the add/express ports 888 is connected to one of the drop/express ports 778 of the ROADM core device 762 and the other add/express port 888 is connected to one of the drop/express ports 828 of the ROADM core device 764).

The type-1 light combiners 870 and 872, the type-1A light combiner 878 and 880, the type-4 light distributor 860, and VOAs 882 and 884 can be the same as, for example, the type-1 light combiner 30, the type-1A light combiner 44, the type-4 light distributor 76, and VOAs 48, respectively, as shown in FIGS. 2B, 3B, 6, and 3B, although they are not limited thereto. The type-1 ROADM core device 768 can include more than the number of components shown in FIG. 18, and it is within the scope of this example embodiment for any of the type-1 light combiners 870 and 872, the type-1A light combiner 878 and 880, the type-4 light distributor 860, and VOAs 882 and 884 shown in FIG. 18 to be replaced by any other suitable component (or components) that performs (or perform) the functions thereof, as discussed above.

When k=8, and the coupler values of couplers 870 and 872 take the values shown in FIG. 17, the insertion losses associated with the various paths through the FIG. 18 system can be as shown in Table 8, although the FIG. 18 example embodiment is not limited to the coupler values shown in FIG. 17, the insertion losses shown in Table 8, or k=8. The coupling ratio values shown in FIG. 17 are chosen such that the insertion losses of the optical paths through the line out ports are approximately equal, and they are as low as possible, as shown in Table 8, although it is within the scope of the example embodiment to choose other coupling ratios and to make the insertion losses of the optical paths through the line out ports unequal. From the insertion loss values shown in Table 8 below, it can be seen that it is useful for a four degree system constructed from the ROADM shown in FIG. 17 to use output amplifiers with a gain of 14.7 dB, although the example embodiment is not limited to this value for the gain of the output amplifiers.

TABLE 8

| FIG. 18 Path | Insertion Loss |
| --- | --- |
| West Line In to East Line Out | 14.3 dB |
| West Line In to South Line Out | 14.7 dB |
| West Line In to North Line Out | 14.7 dB |
| East Line In to West Line Out | 14.3 dB |
| East Line In to South Line Out | 14.7 dB |
| East Line In to North Line Out | 14.7 dB |
| South Line In to East Line Out | 14.7 dB |
| South Line In to West Line Out | 14.7 dB |
| South Line In to North Line Out | 14.3 dB |
| North Line In to East Line Out | 14.7 dB |
| North Line In to West Line Out | 14.7 dB |
| North Line In to South Line Out | 14.3 dB |
| Add to West Line Out | 14.4 dB |
| Add to East Line Out | 14.4 dB |
| Add to South Line Out | 14.4 dB |
| Add to North Line Out | 14.4 dB |

It can be seen from the above table (in comparison to Table 7, where the highest insertion loss for a path through the FIG. 13 system is 18.2 dB) that a worst case insertion loss for an example of optical node embodiment #2 can be much less than a worst case insertion loss for an example of optical node embodiment #1, although it is not required for this to be the case. In one example embodiment, such as that shown in FIG. 14, a worst case insertion loss for the FIG. 14 system (with k=8, for example) can be 18.2 dB (where a 2-to-1 coupler with a coupling ratio of 10/90%, for example, is used), while a worst case insertion loss for the FIG. 18 system can be only 14.7 dB, for example.

The gain of the output amplifier that can support, for example, the FIG. 18 four-degree optical node can be, for example, 1.5 dB greater than the gain of the output amplifier that can support, for example, the FIG. 12 two-degree optical node (with k=8 and with, for example, a 25/75% 2-to-1 optical coupler). This is because the gain of the output amplifier for the FIG. 12 optical node can be, for example, 13.2 dB, and the gain of the output amplifier for the FIG. 18 optical node can be, for example, 14.7 dB. Therefore, there can be, for example, a 1.5 dB insertion loss penalty when comparing a ROADM optimized for two degrees to a ROADM optimized for four degrees, although it is within the scope of the example embodiment for the insertion loss penalty to be different from this value when comparing a ROADM optimized for two degrees to a ROADM optimized for four degrees.

Figure 19A:
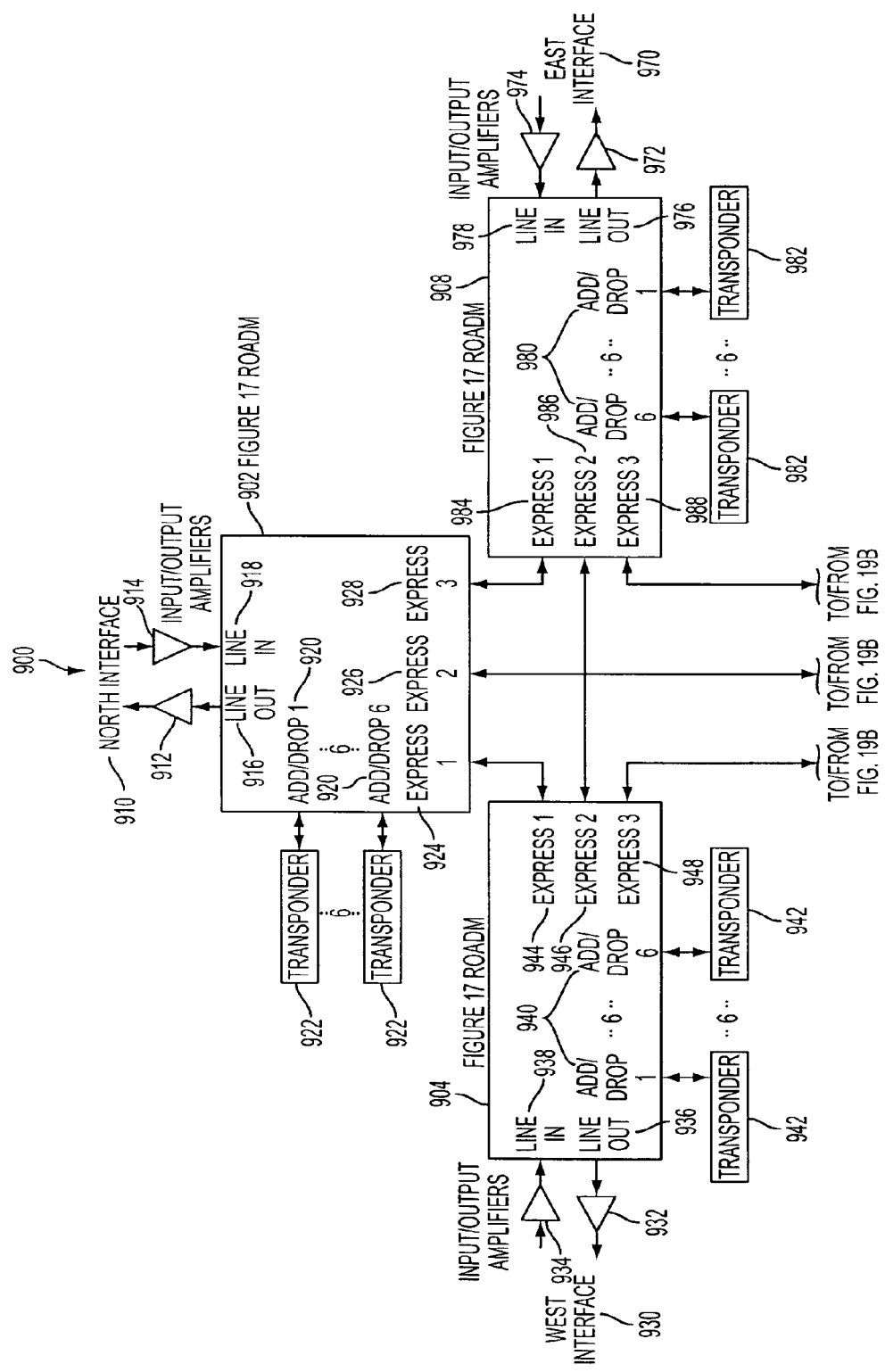
FIG. 19 is a simplified block diagram of an example embodiment of optical node example embodiment #2, which is 4-degree optical node having four type-1 ROADM core devices, each with eight total add ports and eight total drop ports including a first set of add ports and a first set of drop ports and a second set of add ports and a second set of drop ports, in which the add and drop ports in the second sets of add and drop ports function as both add ports and drop ports, respectively, and as express ports.
Figure 19B:
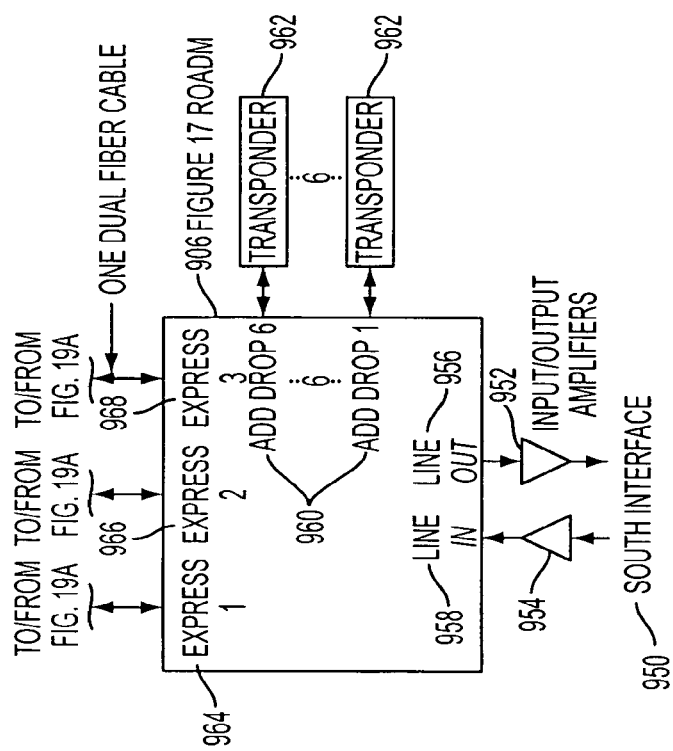

FIG. 19 is another example embodiment of optical node embodiment #2, and can be, but is not limited to being, a simplified view of the FIG. 18 node with k=8. FIG. 19 shows an input and an output amplifier associated with each ROADM, although this example embodiment is not limited to including such amplifiers, and may include more or fewer than the number of amplifiers shown. It is within the scope of the example embodiment for each FIG. 19 ROADM to be implemented on a single circuit pack, and for the amplifiers to be implemented on separate circuit packs, but it is not limited thereto. Alternatively, a single circuit pack could contain a FIG. 19 ROADM and both an input and output amplifier.

FIG. 19 shows an example embodiment of an optical node 900 comprising ROADMs 902, 904, 906, and 908, each of which can be the same as, for example, the FIG. 17 ROADM core device, although they are not limited thereto. It is within the scope of the example embodiment for the optical node 900 shown in FIG. 19 to include additional elements and to replace each of the ROADM cores devices shown in FIG. 19 and each of the components of each ROADM core device with any other suitable component (or components) that performs (or perform) the functions thereof. In the node 900, on each ROADM 902, 904, 906, and 908, there can be three ports used as express ports, and each ROADM can have k−2 add/drop ports that function only as add and drop ports.

More specifically, the ROADM 902 can comprise a north interface 910, an output amplifier 912, an input amplifier 914, a line out port 916, a line in port 918, six add/drop ports 920, six transponders 922 each attached to a different add/drop port 920, and express ports 924, 926, and 928. The ROADM 904 can comprise a west interface 930, an output amplifier 932, an input amplifier 934, a line out port 936, a line in port 938, six add/drop ports 940, six transponders 942 each attached to a different add/drop port 940, and express ports 944, 946, and 948. The ROADM 906 can comprise a south interface 950, an output amplifier 952, an input amplifier 954, a line out port 956, a line in port 958, six add/drop ports 960, six transponders 962 each attached to a different add/drop port 960, and express ports 964, 966, and 968. The ROADM 908 can comprise an east interface 970, an output amplifier 972, an input amplifier 974, a line out port 976, a line in port 978, six add/drop ports 980, six transponders 982 each attached to a different add/drop port 980, and express ports 984, 986, and 988. Express ports 924, 926, and 928 of ROADM 902 can be connected, respectively, to express port 944 of ROADM 904, express port 966 of ROADM 906, and express port 984 of ROADM 908. In addition, express ports 946 and 948 of ROADM 904 can be connected, respectively, to express port 986 of ROADM 908 and express port 964 of ROADM 906. Also, express port 968 of ROADM 906 can be connected to express port 988 of ROADM 908.

As noted above, FIG. 19 also shows transponders attached to the add/drop ports of the ROADM core devices, although it is within the scope of this example embodiment for transponders not to be attached to the add/drop ports of the ROADM cores and for a larger or smaller number of transponders than shown in FIG. 19 to be included. In the drop direction, each transponder can be used to convert a wavelength of a given DWDM frequency to an electrical signal. The electrical signal may then be converted by the transponder, for example, to a "white light" optical signal. (A white light optical signal is a non-colored optical signal of a non-precise wavelength such as 850 nm, 1310 nm, or 1550 nm.) In the add direction, each transponder can convert a "white light" optical signal to one of the m colored wavelengths supported by the ROADM (902, 904, 906, and 908), the node 900, and the system of which the node 900 is a part.

It is within the scope of this example embodiment for the ROADM core devices shown in FIG. 19 to include additional elements not shown therein and to replace each of the ROADM core devices, and to replace each component of the ROADM cores with any other suitable component (or components) that performs (or perform) the functions thereof.

ROADM Example Embodiment #3

FIGS. 20A-20D show example embodiments of a ROADM example embodiment #3. This ROADM can be the same as, for example, the ROADM example embodiment #2, except for the addition of e number of expansion ports, although it is not limited thereto. It is within the scope of the example embodiment for the ROADM core devices shown in FIGS. 20A-20D to be the same as, for example, any of the ROADMs previously disclosed herein, although they are not limited thereto.

The expansion ports can provide the ability to increase the number of add/drop ports beyond the initial k number of add/drop ports. This can be accomplished, for example, by connecting to the expansion port or ports an optical element having additional add/drop ports. Thus, in one example embodiment, where a first ROADM circuit pack is constructed such that it contains k=8 add/drop ports and one expansion port, and is initially deployed in a DWDM network, at some later date, another circuit pack with eight additional add/drop ports can be added to the first circuit pack via the expansion port such that eight additional add/drop ports can be connected to the first circuit pack. The second circuit pack can be explicitly designed for the purpose of adding colorless add/drop ports to a previously deployed ROADM circuit pack, although in other example embodiments, the second circuit pack can be designed to add colored add/drop ports or other types of add/drop ports. When this second circuit pack has colorless add/drop ports, it will be referred to as a colorless port expansion circuit pack or a colorless port expansion module. When this second circuit pack has colored add/drop ports, it will be referred to as a colored port expansion circuit pack or a colored port expansion module.

Figure 20A:
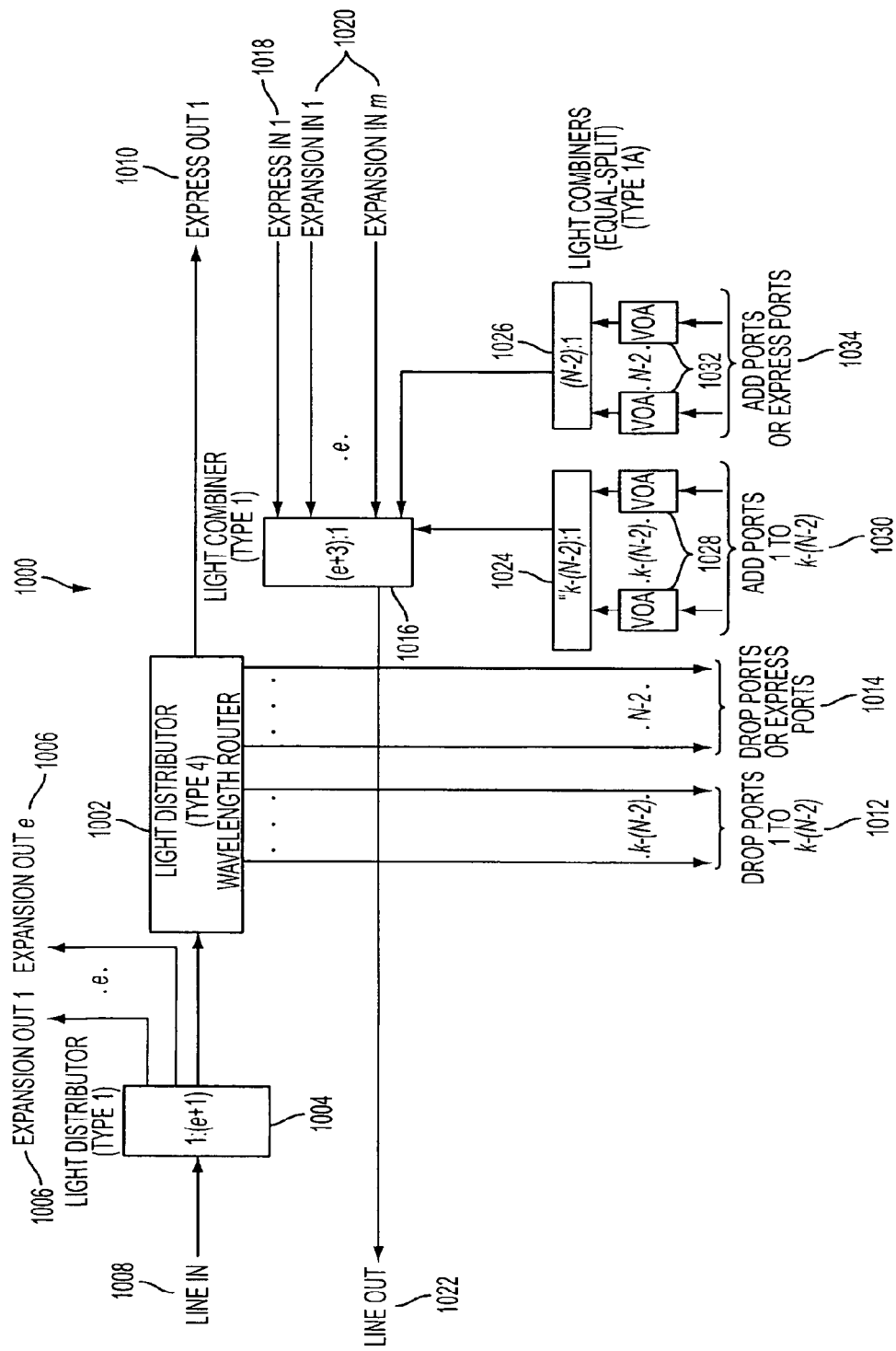
FIGS. 20A through 20D are block diagrams of example embodiments of ROADM example embodiment #3, which is a type-1 ROADM having at least one expansion port and first and second sets of add and drop ports, the second sets functioning as both add ports and drop ports, respectively, and as express ports.

FIG. 20A shows an example embodiment of the general case where e can be any number of expansion ports. More specifically, in FIG. 20A, the ROADM core device 1000 can comprise a type-4 light distributor 1002 receiving optical signals input from a type-1, (e+1):1 light distributor 1004, which also outputs optical signals to e expansion out ports 1006 and receives optical signals from a line interface or line in port 1008. The light distributor 1002 also outputs optical signals on an express output port 1010, and drops optical signals via two sets of drop ports 1012 and 1014. The first set of k−(N−2) drop ports 1012 can function only as drop ports to locally drop optical signals from the distributor 1002. In this example embodiment, k is the total number of drop ports in the two sets and the total number of add ports in the two sets, which are the same (although the example embodiment is not limited to having equal number of add and drop ports), and N is the number of optical degrees supported by the ROADM 1000. The second set of N−2 drop ports 1014 can function as both drop ports and express ports and are connectable to another ROADM or similar optical device in the node containing the ROADM 1000.

The ROADM core device 1000 can further comprise a (e+3):1, type-1 light combiner 1016 receiving optical signals from an express input port 1018 and from e expansion ports 1020, and outputting optical signals from a line output interface 1022. The type-1 light combiner 1016 can also receive optical signals from two type-1A light combiners 1024 and 1026. The light combiner 1024 is a k−(N−2):1 light combiner that receives optical signals from k−(N−2) VOAs 1028, which each receives optical signals from one of k−(N−2) add ports 1030. Add ports 1030 constitute a first set of add ports that function only as add ports. The light combiner 1026 is a (N−2):1 light combiner that receives optical signals from (N−2) VOAs 1032, which each receives optical signals from one of (N−2) add ports 1034. Add ports 1034 constitute a second set of add ports that function as both add ports and as express ports that are connectable to another ROADM or similar optical device in the node containing the ROADM 1000 to receive optical signals therefrom.

The type-1 light distributor 1004, the type-1 light combiner 1016, the type-1A light combiners 1024 and 1026, the type-4 light distributor 1002, and VOAs 1028 and 1032 can be the same as, for example, the type-1 light distributor 24, the type-1 light combiner 30, the type-1A light combiner 44, the type-4 light distributor 76, and the VOAs 48, respectively, as shown in FIGS. 2A, 2B, 3B, 6, and 3B, although they are not limited thereto. In addition, the type-1 light combiner 1016, the type-1A light combiners 1024 and 1026, the type-4 light distributor 1002, and VOAs 1028 and 1032 can be the same as, or different from, the type-1 light combiner 142, the type-1A light combiner 148, and the type-4 light distributor 132, and VOAs 150 shown in FIG. 10A. Also, the type-1 ROADM core device 1000 can include more than the number of components shown in FIG. 20A, and it is within the scope of this example embodiment for any of the type-1 light distributor 1004, the type-1 light combiner 1016, the type-1A light combiners 1024 and 1026, the type-4 light distributor 1002, and VOAs 1028 and 1032 to be replaced by any other suitable component (or components) that performs (or perform) the same or similar functions thereof, as discussed above.

Figure 20B:
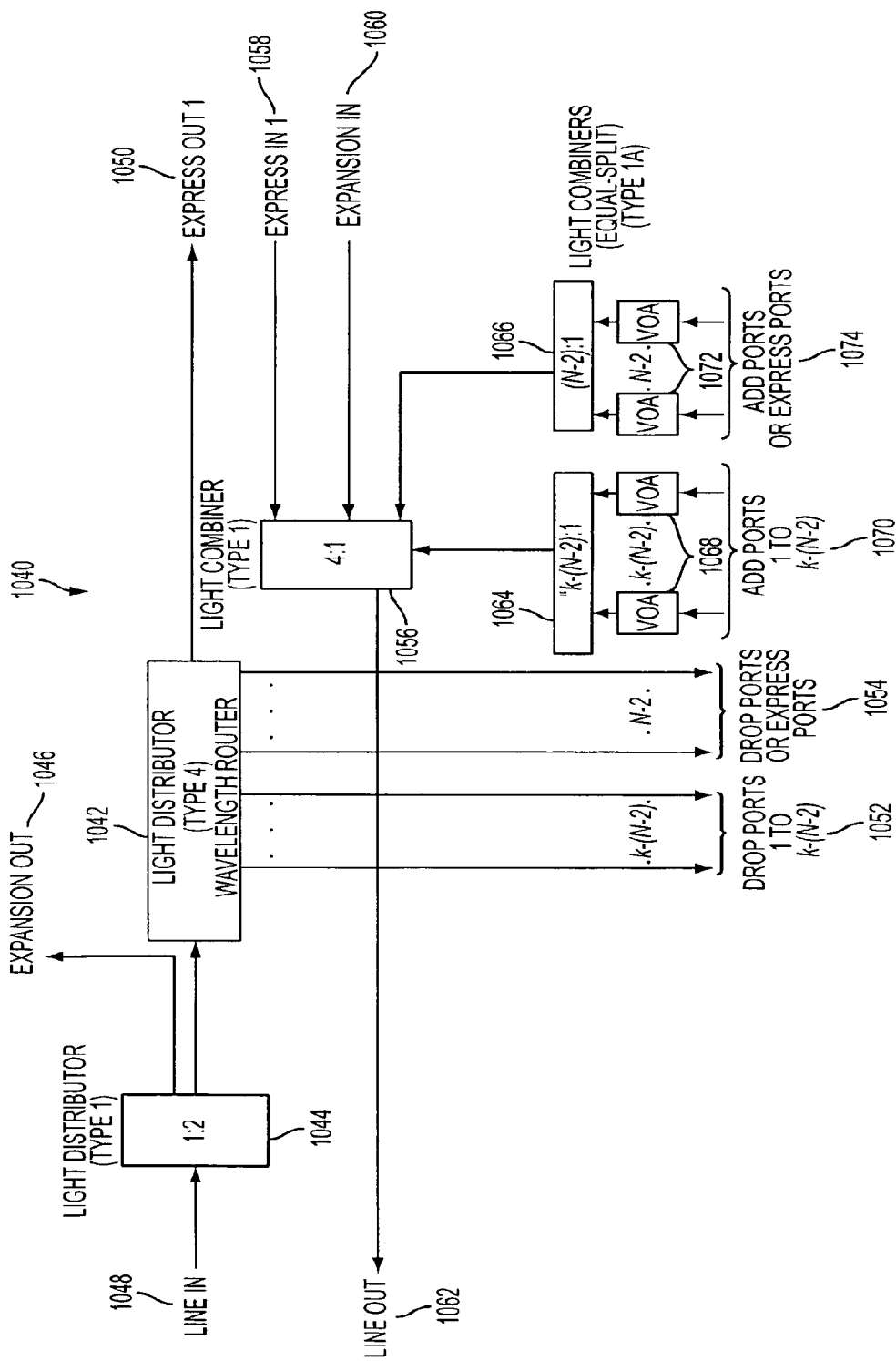

FIG. 20B shows an example embodiment of the specific case where e is equal to 1 (e=1), although it is not limited thereto, and it is within the scope of the FIG. 10B example embodiment to add e expansion ports thereto (where e is a positive integer).

More specifically, in FIG. 20B, the ROADM core device 1040 can comprise a type-4 light distributor 1042 receiving optical signals input from a type-1, 1:2 light distributor 1044, which also outputs optical signals to an expansion out port 1046 and receives optical signals from a line interface or line in port 1048. The light distributor 1042 also outputs optical signals on an express output port 1050, and drops optical signals via two sets of drop ports 1052 and 1054. The first set of k−(N−2) drop ports 1052 can function only as drop ports to locally drop optical signals from the distributor 1042. In this example embodiment, k is the total number of drop ports in the two sets and the total number of add ports in the two sets, which are the same (although the example embodiment is not limited to having equal number of add and drop ports), and N is the number of optical degrees supported by the ROADM 1040. The second set of N−2 drop ports 1054 can function as both drop ports and express ports and are connectable to another ROADM or similar optical device in the node containing the ROADM 1040.

The ROADM core device 1040 can further comprise a 4:1, type-1 light combiner 1056 receiving optical signals from an express input port 1058 and from an expansion port 1060, and outputting optical signals from a line output interface 1062. The type-1 light combiner 1056 can also receive optical signals from two type-1A light combiners 1064 and 1066. The light combiner 1064 is a k−(N−2):1 light combiner that receives optical signals from k−(N−2) VOAs 1068, which each receives optical signals from one of k−(N−2) add ports 1070. Add ports 1070 constitute a first set of add ports that function only as add ports. The light combiner 1066 is a (N−2):1 light combiner that receives optical signals from (N−2) VOAs 1072, which each receive optical signals from one of (N−2) add ports 1074. Add ports 1074 constitute a second set of add ports that function as both add ports and as express ports that are connectable to another ROADM or similar optical device in the node containing the ROADM 1040 to receive optical signals therefrom.

The type-1 light distributor 1044, the type-1 light combiner 1056, the type-1A light combiners 1064 and 1066, the type-4 light distributor 1042, and VOAs 1068 and 1072 can be the same as, for example, the type-1 light distributor 24, the type-1 light combiner 30, the type-1A light combiner 44, the type-4 light distributor 76, and the VOAs 48, respectively, as shown in FIGS. 2A, 2B, 3B, 6, and 3B, although they are not limited thereto. In addition, the type-1 light combiner 1056, the type-1A light combiners 1064 and 1066, the type-4 light distributor 1042, and VOAs 1068 and 1072 can be the same as, or different from, the type-1 light combiner 142, the type-1A light combiner 148, and the type-4 light distributor 132, and VOAs 150 shown in FIG. 10A. Also, the type-1 ROADM core device 1040 can include more than the number of components shown in FIG. 20B, and it is within the scope of this example embodiment for any of the type-1 light distributor 1044, the type-1 light combiner 1056, the type-1A light combiners 1064 and 1066, the type-4 light distributor 1042, and VOAs 1068 and 1072 to be replaced by any other suitable component (or components) that performs (or perform) the same or similar functions thereof, as discussed above.

Figure 20C:
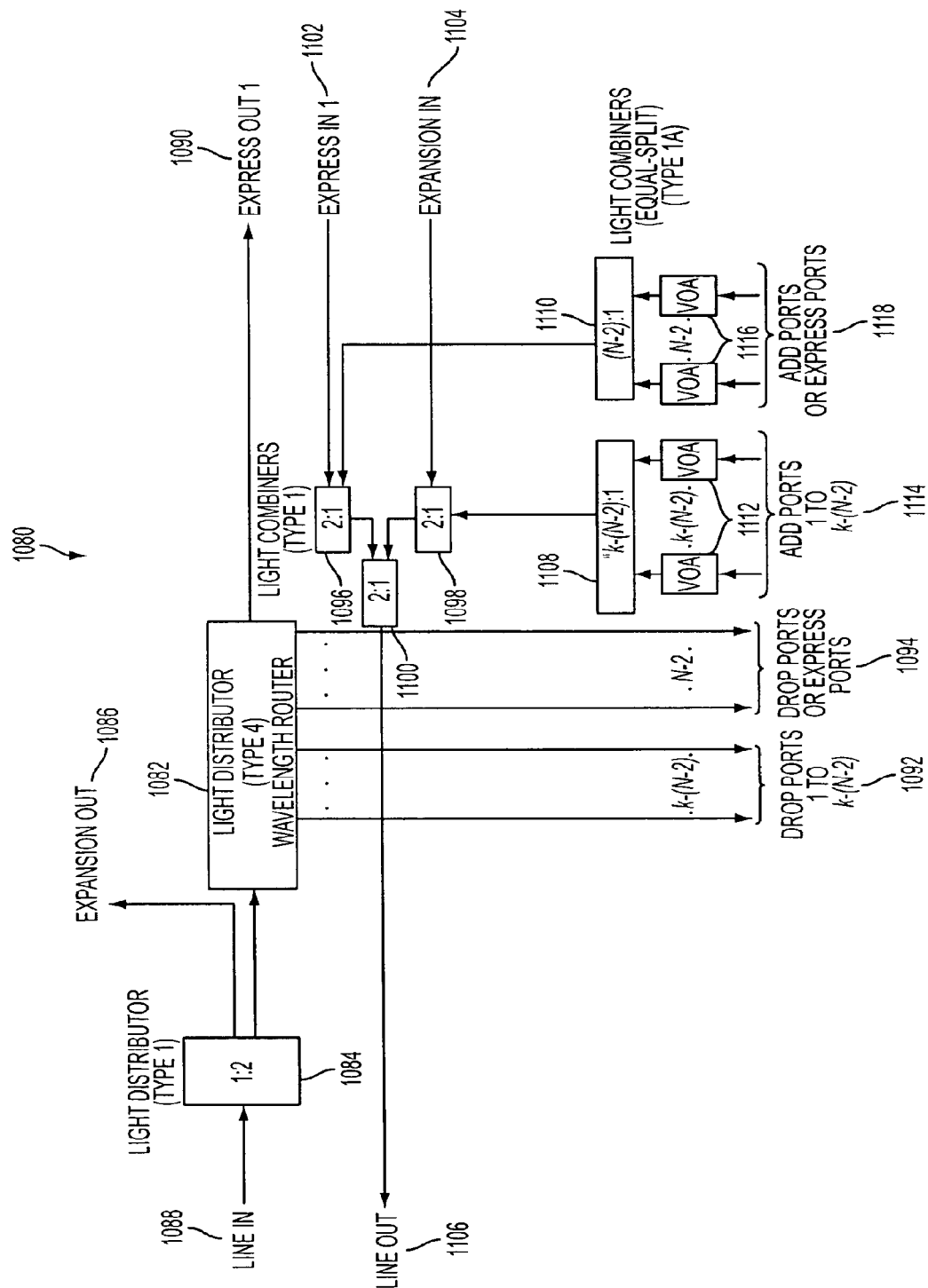

FIG. 20C shows another example embodiment of ROADM example embodiment #3 where the 4-to-1 light combiner function of FIG. 20B can be implemented using three 2-to-1 optical couplers, although the ROADM shown in FIG. 20C is not limited to this configuration of optical couplers. The three 2-to-1 optical couplers can have coupling ratios of any values including the set of standard coupling ratio values shown in Table 4. Also, the four optical signals that are fed into the two rightmost (or upstream) 2-to-1 optical couplers shown in FIG. 20C can be fed into the two optical couplers in combinations different than that shown in FIG. 20C.

More specifically, in FIG. 20C, the ROADM core device 1080 can comprise a type-4 light distributor 1082 receiving optical signals input from a type-1, 1:2 light distributor 1084, which also outputs optical signals to an expansion out port 1086 and receives optical signals from a line interface or line in port 1088. The light distributor 1082 also outputs optical signals on an express output port 1090, and drops optical signals via two sets of drop ports 1092 and 1094. The first set of k−(N−2) drop ports 1092 can function only as drop ports to locally drop optical signals from the distributor 1082. In this example embodiment, k is the total number of drop ports in the two sets and the total number of add ports in the two sets, which are the same (although the example embodiment is not limited to having equal number of add and drop ports), and N is the number of optical degrees supported by the ROADM 1040. The second set of N−2 drop ports 1094 can function as both drop ports and express ports and are connectable to another ROADM or similar optical device in the node containing the ROADM 1080.

The ROADM core device 1080 can further comprise three 2:1, type-1 light combiners 1096, 1098, and 1100. The light combiner 1096 can receive optical signals from an express input port 1102 and from a type-1A, (N−2):1 light combiner 1110. The light combiner 1098 can receive optical signals from an expansion in port 1104 and from a type-1A, k−(N−2):1 light combiner 1108. The light combiners 1096 and 1098 output optical signals to the 2:1 light combiner 1100, which outputs an optical signals to a line output port or interface 1106. The light combiner 1108 can receive optical signals from k−(N−2) VOAs 1112, which each can receive optical signals from one of k−(N−2) add ports 1114. Add ports 1114 constitute a first set of add ports that function only as add ports. The light combiner 1110 can receive optical signals from (N−2) VOAs 1116, which each can receive optical signals from one of (N−2) add ports 1118. Add ports 1118 constitute a second set of add ports that function as both add ports and as express ports that are connectable to another ROADM or similar optical device in the node containing the ROADM 1080 to receive optical signals therefrom.

The type-1 light distributor 1084, the type-1 light combiners 1096, 1098, and 1100, the type-1A light combiners 1108 and 1110, the type-4 light distributor 1082, and VOAs 1112 and 1116 can be the same as, for example, the type-1 light distributor 24, the type-1 light combiner 30, the type-1A light combiner 44, the type-4 light distributor 76, and the VOAs 48, respectively, as shown in FIGS. 2A, 2B, 3B, 6, and 3B, although they are not limited thereto. In addition, the type-1 light combiners 1096, 1098, and 1100, the type-1A light combiners 1108 and 1110, the type-4 light distributor 1082, and VOAs 1112 and 1116 can be the same as, or different from, the type-1 light combiner 142, the type-1A light combiner 148, and the type-4 light distributor 132, and VOAs 150 shown in FIG. 10A. Also, the type-1 ROADM core device 1080 can include more than the number of components shown in FIG. 20C, and it is within the scope of this example embodiment for any of the type-1 light distributor 1084, the type-1 light combiners 1096, 1098, and 1100, the type-1A light combiners 1108 and 1110, the type-4 light distributor 1082, and VOAs 1112 and 1116 to be replaced by any other suitable component (or components) that performs (or perform) the same or similar functions thereof, as discussed above.

Figure 20D:
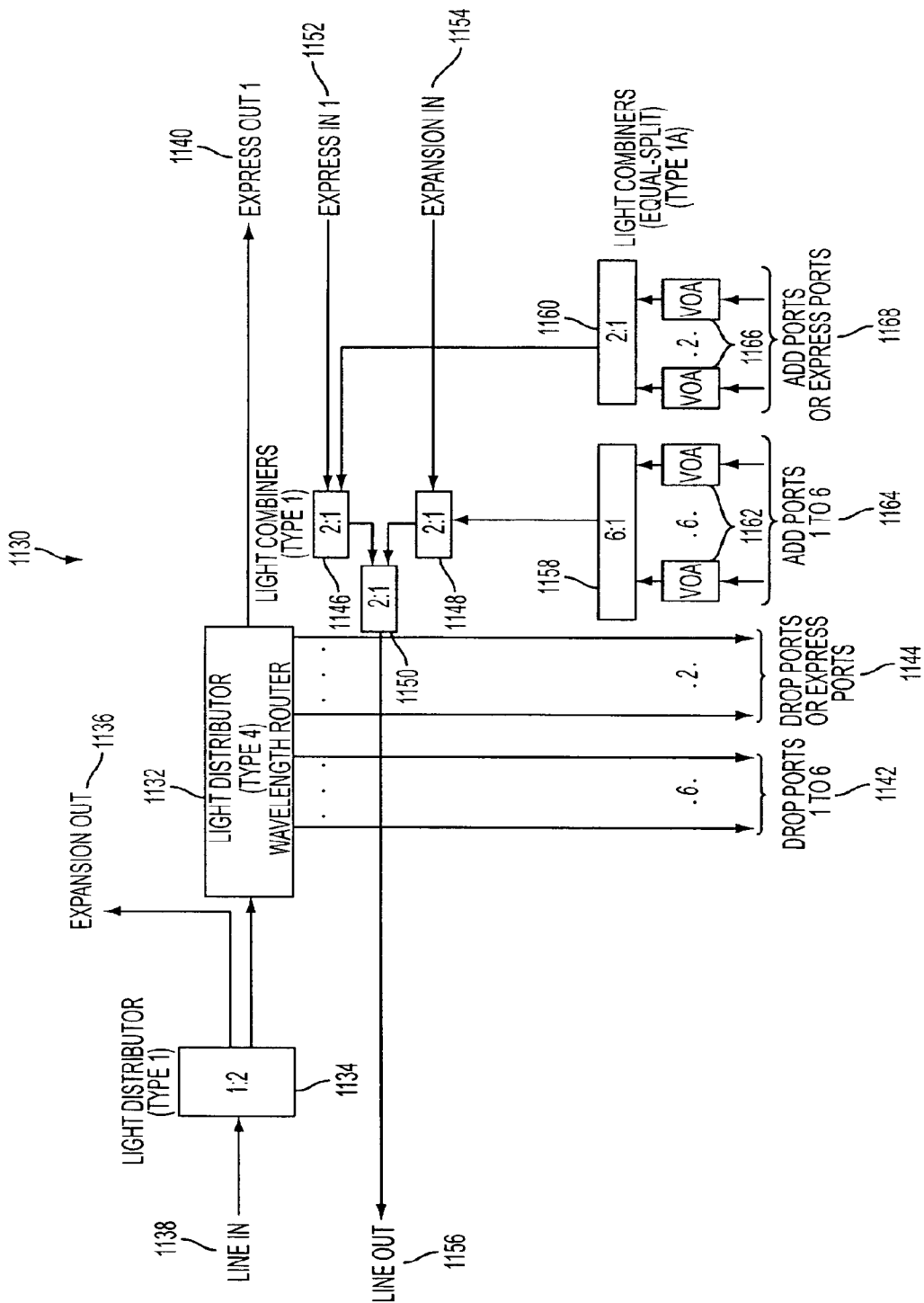

FIG. 20D is an example embodiment that is a variation of the example embodiment of FIG. 20C where N=4 and k=8, where N is the maximum number of optical degrees supported by the ROADM, and k is the maximum number of add ports and the maximum number of drop ports supported by the ROADM, although it is not limited to these specific numbers for N and k. Therefore, N also equals the number of network node interfaces and the number of ROADMs in the optical node.

More specifically, in FIG. 20D, the ROADM core device 1130 can comprise a type-4 light distributor 1132 receiving optical signals input from a type-1, 1:2 light distributor 1134, which also outputs optical signals to an expansion out port 1136 and receives optical signals from a line interface or line in port 1138. The light distributor 1132 also outputs optical signals on an express output port 1140, and drops optical signals via two sets of drop ports 1142 and 1144. The first set of six drop ports 1142 can function only as drop ports to locally drop optical signals from the distributor 1132. The second set of two drop ports 1144 can function as both drop ports and express ports and are connectable to another ROADM or similar optical device in the node containing the ROADM 1130.

The ROADM core device 1130 can further comprise three 2:1, type-1 light combiners 1146, 1148, and 1150. The light combiner 1146 can receive optical signals from an express input port 1152 and from a type-1A, 2:1 light combiner 1160. The light combiner 1148 can receive optical signals from an expansion in port 1154 and from a type-1A, 6:1 light combiner 1158. The light combiners 1146 and 1148 output optical signals to the 2:1 light combiner 1150, which outputs an optical signals to a line output port or interface 1156. The light combiner 1158 can receive optical signals from six VOAs 1162, which each can receive optical signals from one of six add ports 1164. Add ports 1164 constitute a first set of add ports that function only as add ports. The light combiner 1160 can receive optical signals from two VOAs 1166, which each can receive optical signals from one of two add ports 1168. Add ports 1168 constitute a second set of add ports that function as both add ports and as express ports that are connectable to another ROADM or similar optical device in the node containing the ROADM 1130 to receive optical signals therefrom.

The type-1 light distributor 1134, the type-1 light combiners 1146, 1148, and 1150, the type-1A light combiners 1158 and 1160, the type-4 light distributor 1132, and VOAs 1162 and 1166 can be the same as, for example, the type-1 light distributor 24, the type-1 light combiner 30, the type-1A light combiner 44, the type-4 light distributor 76, and the VOAs 48, respectively, as shown in FIGS. 2A, 2B, 3B, 6, and 3B, although they are not limited thereto. In addition, the type-1 light combiners 1146, 1148, and 1150, the type-1A light combiners 1158 and 1160, the type-4 light distributor 1132, and VOAs 1162 and 1166 can be the same as, or different from, the type-1 light combiner 142, the type-1A light combiner 148, and the type-4 light distributor 132, and VOAs 150 shown in FIG. 10A. Also, the type-1 ROADM core device 1130 can include more than the number of components shown in FIG. 20D, and it is within the scope of this example embodiment for any of the type-1 light distributor 1134, the type-1 light combiners 1146, 1148, and 1150, the type-1A light combiners 1158 and 1160, the type-4 light distributor 1132, and VOAs 1162 and 1166 to be replaced by any other suitable component (or components) that performs (or perform) the same or similar functions thereof, as discussed above.

It is within the scope of the example embodiment 1) for the ROADM cores shown in FIGS. 20A-20D to be replaced with any other of the ROADM cores described herein, 2) for the expansion ports shown in FIGS. 20A-20D to be used with any of the other ROADM cores described herein, and 3) for the specific components of the ROADM cores shown in FIGS. 20A-20D to be replaced by any other suitable component (or components) that performs (or perform) the same functions thereof.

Figure 21A:
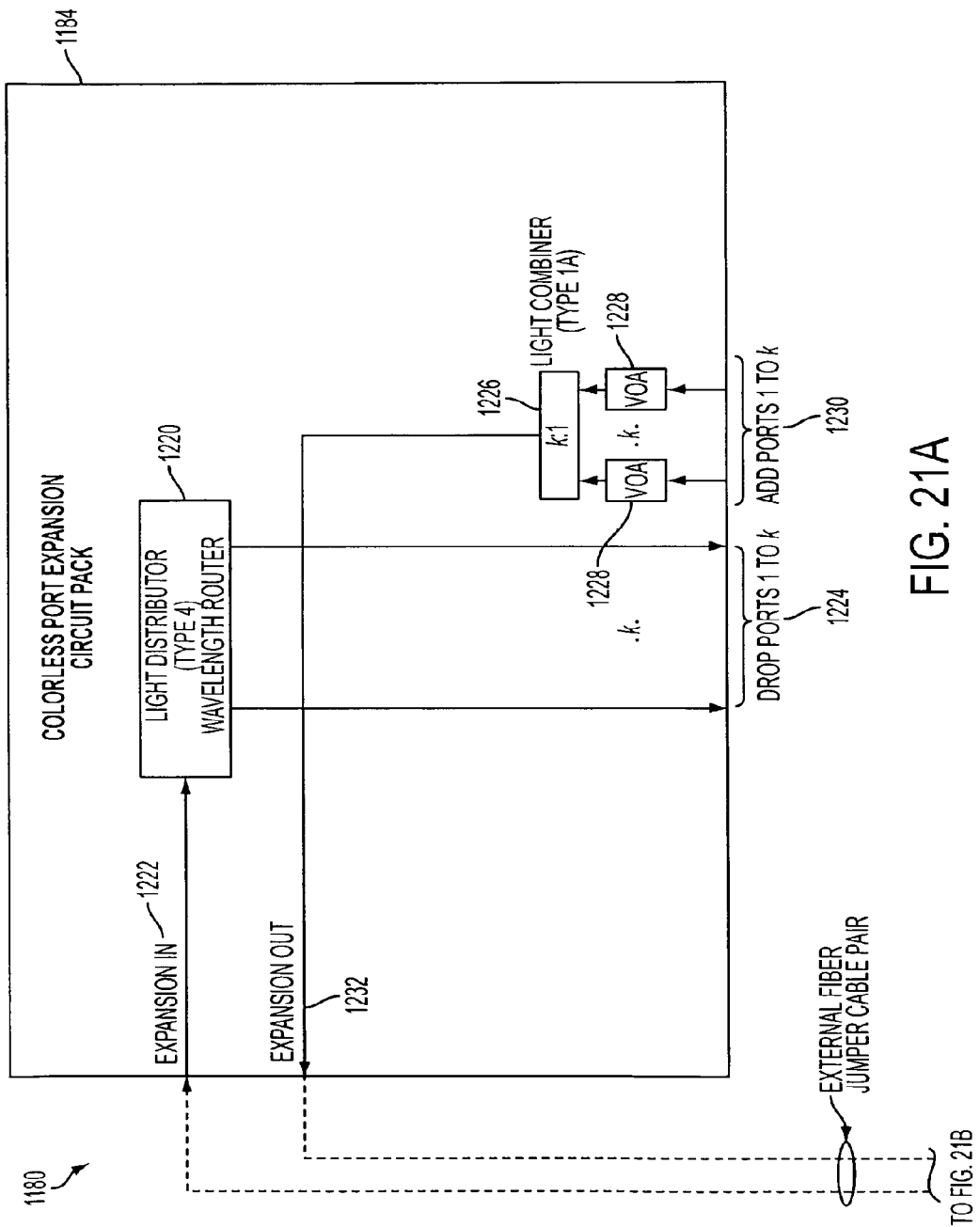
FIG. 21 is a block diagram of another example embodiment of ROADM example embodiment #3, which includes a ROADM circuit pack, comprising a type-1 ROADM having an expansion port attached to one colorless port expansion circuit pack (also called an add/drop expansion module).
Figure 21B:
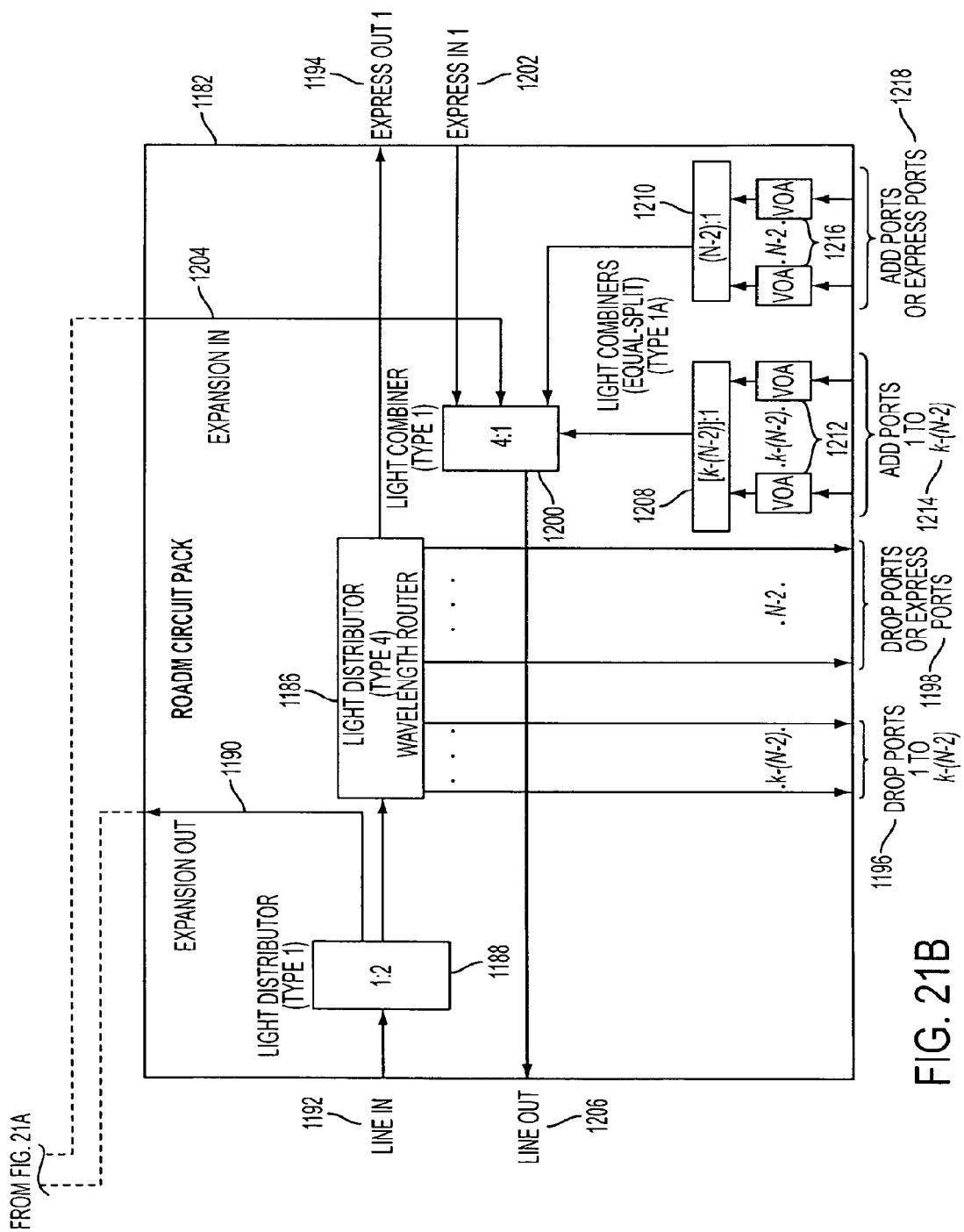

FIG. 21 shows an example embodiment of an optical device 1180 comprising a single ROADM circuit pack 1182, which can support up to k colorless add/drop ports, connected to a single colorless port expansion circuit pack 1184 that supports up to k colorless add/drop ports. The combination of the two circuit packs 1182 and 1184 can provide the ability to support up to 2k colorless add/drop ports when used in a 2-degree ROADM configuration. It is within the scope of the example embodiment for the ROADM core devices used in the circuit packs shown in FIG. 21 to be the same as, for example, any of the ROADM core devices disclosed herein, although it is not limited thereto. It is also within the scope of the example embodiment for the ROADM circuit pack 1182 shown in FIG. 21 to be used with other kinds of devices besides the colorless port expansion circuit pack 1184 shown in FIG. 21, and it is within the scope of the example embodiment for the colorless port expansion circuit pack 1184 shown in FIG. 21 to be used with devices other than the ROADM circuit pack 1182 shown in FIG. 21.

The ROADM circuit pack 1182 can comprise a type-4 light distributor 1186 that can receive optical signals from a 1:2, type-1 light distributor 1188. The light distributor 1188 can also output signals to an expansion out port 1190 and can receive optical signals from a line in port 1192. The light distributor 1186 can output signals to the express out 1 port 1194 and can drop optical signals to a first set of k−(N−2) drop ports 1196, and a second set of N−2 drop ports 1198, where N is the maximum number of optical degrees supported by the ROADM 1182, and k is the maximum number of add ports and the maximum number of drop ports supported by the ROADM. The first set of k−(N−2) drop ports 1196 can function exclusively as drop ports to locally drop optical signals from the distributor 1186. The second set of N−2 drop ports 1198 can function as both drop ports and express ports and are connectable to another ROADM or similar optical device in the node containing the ROADM circuit pack 1182.

The ROADM circuit pack 1182 can further comprise a 4:1, type-1 light combiner 1200 receiving optical signals from an express input port 1202 and from an expansion in port 1204, and outputting optical signals from a line output port or interface 1206. The type-1 light combiner 1200 can also receive optical signals from two type-1A light combiners 1208 and 1210. The light combiner 1208 is a k−(N−2):1 light combiner that receives optical signals from k−(N−2) VOAs 1212, which each receives optical signals from one of k−(N−2) add ports

1214. Add ports 1214 constitute a first set of add ports that function only as add ports. The light combiner 1210 is a (N−2):1 light combiner that receives optical signals from (N−2) VOAs 1216, which each receives optical signals from one of (N−2) add ports 1218. Add ports 1218 constitute a second set of add ports that function as both add ports and as express ports that are connectable to another ROADM or similar optical device in the node containing the ROADM circuit pack 1182 to receive optical signals therefrom.

The type-1 light distributor 1188, the type-1 light combiner 1200, the type-1A light combiners 1208 and 1210, the type-4 light distributor 1186, and VOAs 1212 and 1216 can be the same as, for example, the type-1 light distributor 24, the type-1 light combiner 30, the type-1A light combiner 44, the type-4 light distributor 76, and the VOAs 48, respectively, as shown in FIGS. 2A, 2B, 3B, 6, and 3B, although they are not limited thereto. In addition, the type-1 light combiner 1200, the type-1A light combiners 1208 and 1210, the type-4 light distributor 1186, and VOAs 1212 and 1216 can be the same as, or different from, the type-1 light combiner 142, the type-1A light combiner 148, and the type-4 light distributor 132, and VOAs 150 shown in FIG. 10A. Also, the type-1 ROADM circuit pack 1182 can include more than the number of components shown in FIG. 21, and it is within the scope of this example embodiment for any of the type-1 light distributor 1188, the type-1 light combiner 1200, the type-1A light combiners 1208 and 1210, the type-4 light distributor 1186, and VOAs 1212 and 1216 to be replaced by any other suitable component (or components) that performs (or perform) the same or similar functions thereof, as discussed above.

The colorless port expansion circuit pack 1184 can comprise a type-4 light distributor 1220 that receives optical signals from an expansion in port 1222, which receives optical signals from the expansion out port 1190 of the ROADM circuit pack 1182. The light distributor 1220 can also drop optical signals from k drop ports 1224. The colorless port expansion circuit pack 1184 can also comprise a k:1, type-1A light combiner 1226 that receives optical signals from k VOAs 1228, which each receives optical signals from a different one of the k add ports 1230. The light combiner 1226 outputs optical signals to an expansion out port 1232, which, in turn, outputs optical signals to the expansion in port 1204 of the ROADM circuit pack 1182.

The type-1A light combiner 1226, the type-4 light distributor 1220, and the VOAs 1228 can be the same as, for example, the type-1A light combiner 44, the type-4 light distributor 76, and the VOAs 48, respectively, as shown in FIGS. 3B, 6, and 3B, although they are not limited thereto. In addition, the type-1A light combiner 1226, the type-4 light distributor 1220, and the VOAs 1228 can be the same as, or different from, the type-1A light combiner 148, the type-4 light distributor 132, and VOAs 150 shown in FIG. 10A. Also, the circuit pack 1184 can include more than the number of components shown in FIG. 21, and it is within the scope of this example embodiment for any of the type-1A light combiner 1226, the type-4 light distributor 1220, and the VOAs 1228 to be replaced by any other suitable component (or components) that performs (or perform) the same or similar functions thereof, as discussed above.

According to the example embodiment shown in FIG. 21, the colorless port expansion circuit pack 1184 can be a stripped-down version of the ROADM circuit pack 1182, since the colorless-port-expansion-circuit pack function can be a subset of the ROADM-circuit-pack functions. In other example embodiments, the colorless port expansion circuit pack 1184 is not a stripped-down version of the ROADM circuit pack 1182. Also, a ROADM circuit pack 1182 can first be deployed by itself; and then when all k add/drop ports have been utilized, the colorless port expansion circuit pack 1184 can later be added via an external fiber jumper cable pair, although the example embodiment is not limited to this particular order of deploying these circuit packs or this particular manner of connecting the packs. The traffic passing through the ROADM circuit pack 1182 need not be affected by adding the colorless port expansion circuit pack 1184 to it.

All wavelengths arriving on the line in signal port 1192 can be available to both the wavelength router 1186 in the ROADM circuit pack 1182 and the wavelength router 1220 in the colorless port expansion circuit pack 1184, since the 1-to-2 type-1 light distributor 1188 in the ROADM circuit pack 1182 can be used to broadcast all wavelengths to both circuit packs, although it need not do so.

In this example embodiment, the gain of an output amplifier (not shown) associated with the ROADM circuit pack 1182 can be increased in order to accommodate the additional insertion losses associated with 1-to-2 type-1 light distributor 1188 and the 4-to-1 light combiner 1200. In other example embodiments, the gain of the output amplifier need not be so increased to accommodate for these additional insertion losses. In addition, it is within the scope of the example embodiment for the 1-to-2 type-1 light distributor 1188 to be implemented with an unequal-split optical coupler, and it is within the scope of the example embodiment for the 4-to-1 light combiner 1200 to be implemented with an unequal-split optical coupler. In general, the coupling ratio of light distributor 1188 can normally be set such that the total insertion loss from Line In port 1192 to drop ports 1196 and 1198 is equal to the insertion loss from Line In port 1192 to drop ports 1224, although it need not be so set. This insures the light power levels are equal to all transponders attached to all drop ports on both 1184 and 1182.

It is also within the scope of the example embodiment for the specific components of the ROADM core of the circuit pack 1182, the circuit pack 1182, and port expansion circuit pack 1184 shown in FIG. 21 to be replaced by any other suitable component (or components) that performs (or perform) the same functions thereof.

Figure 22A:
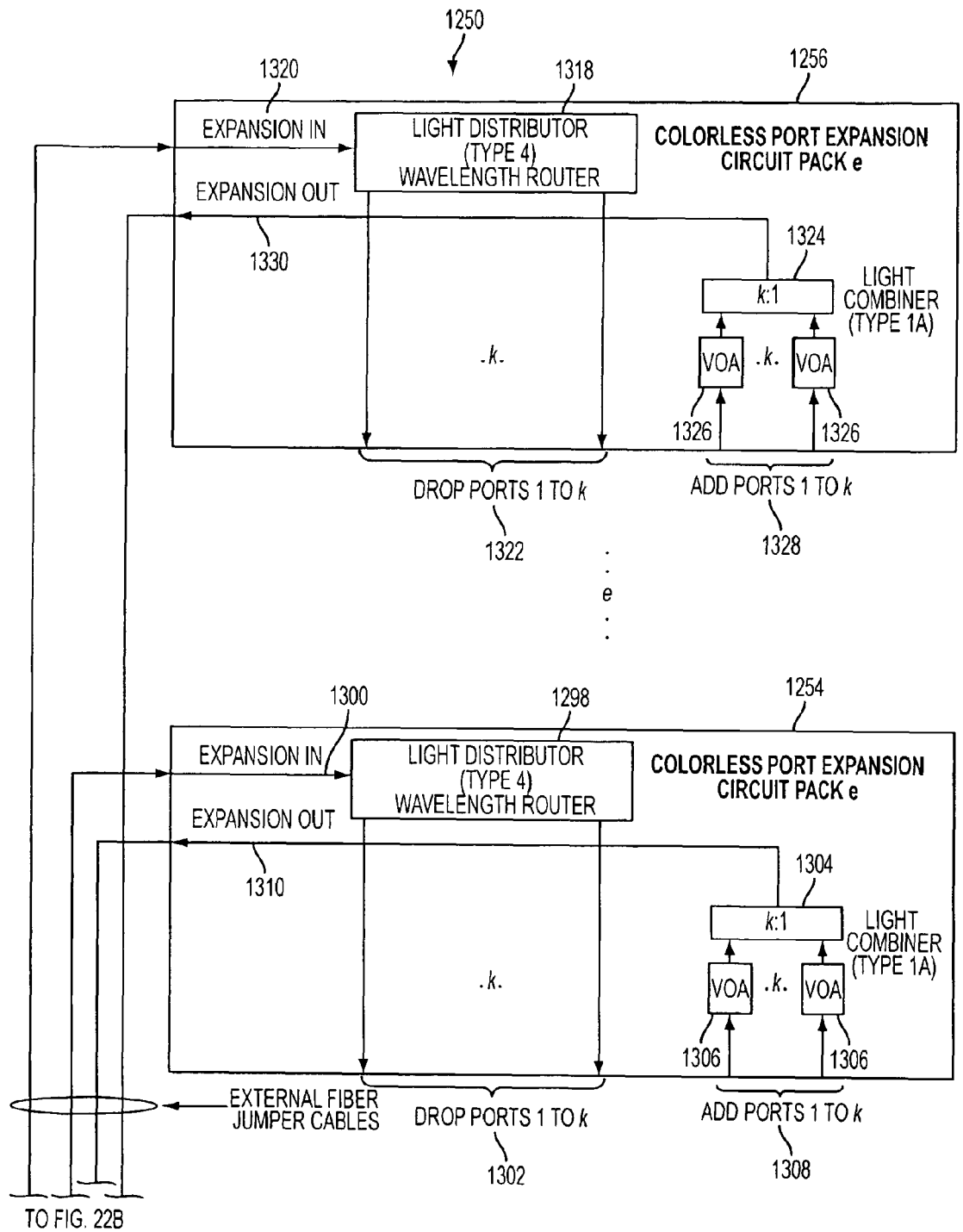
FIG. 22 is a block diagram of another example embodiment of ROADM example embodiment #3, which includes a ROADM circuit pack, comprising a type-1 ROADM having e expansion ports, attached to e colorless port expansion circuit packs, where e is a positive integer.
Figure 22B:
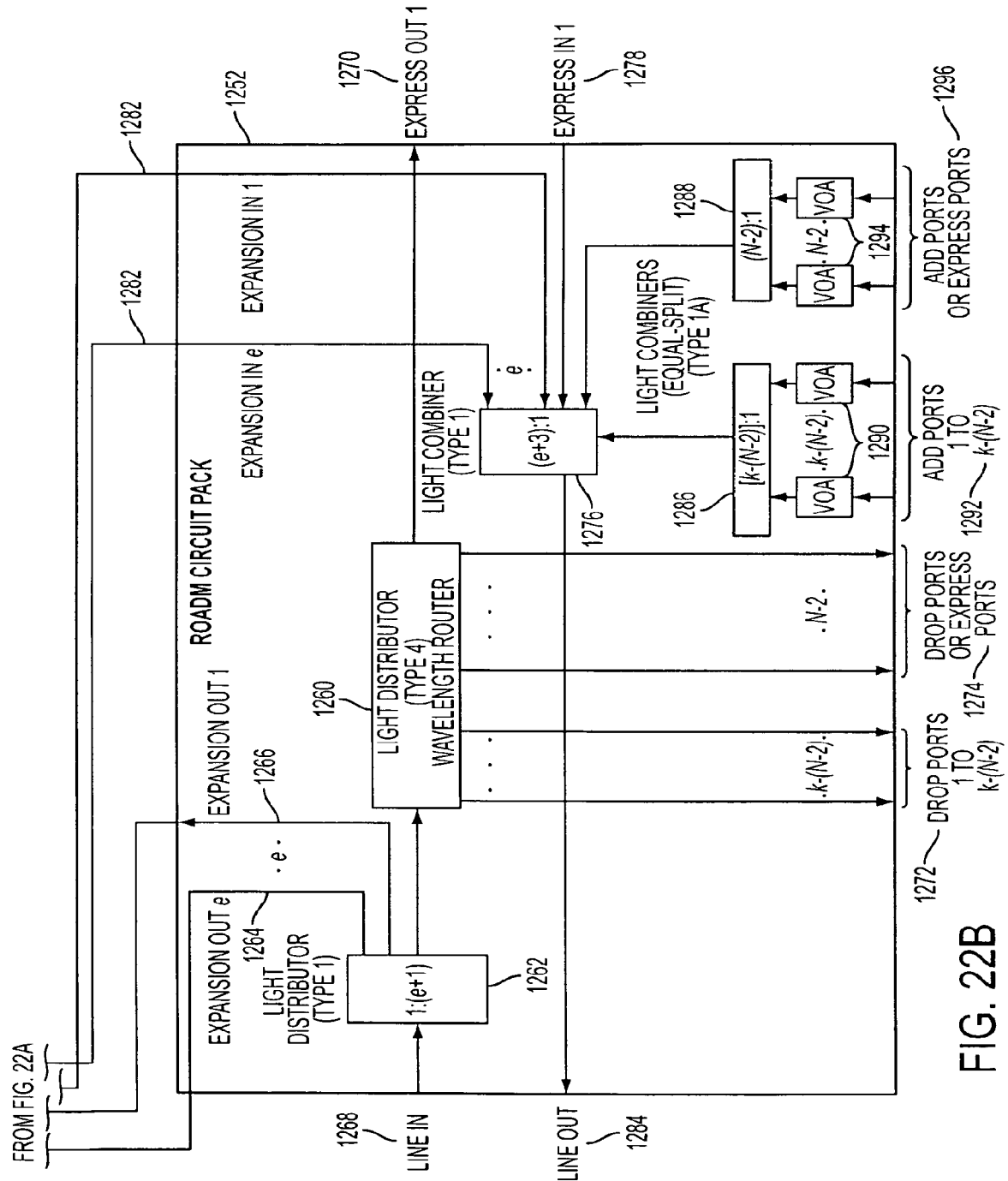

In a similar fashion, if there are e expansion ports on a ROADM, up to e colorless port expansion circuit packs can be added to the ROADM, although they need not be so added. An example embodiment of this configuration is illustrated in the example embodiment of FIG. 22. FIG. 22 shows an optical device 1250 comprising a ROADM circuit pack 1252 and e colorless port expansion circuit packs, two of which are shown, the 1st pack 1254 and the e th pack 1256, where e is an integer equal to at least 2.

In this example embodiment, the ROADM circuit pack 1252 can be the same, for example, to the ROADM circuit pack 1182 shown in FIG. 21, except that the FIG. 22 example embodiment is configured to add up to e expansion packs thereto, although it is not limited to this configuration. It is within the scope of the example embodiment for the ROADM circuit pack 1252 shown in FIG. 22 to be coupled to other kinds of devices besides e colorless port expansion circuit packs 1254 and 1256 shown in FIG. 22, and it is within the scope of the example embodiment for the e colorless port expansion circuit packs 1254 and 1256 shown in FIG. 22 to be used with devices other than the ROADM circuit pack 1252 shown in FIG. 22. It is further within the scope of the example embodiment 1) for the ROADM cores shown in the packs 1252, 1254, and 1256 in FIG. 22 to be replaced by any other ROADM core described herein, and 2) for the specific components of the ROADM cores and the circuit packs shown in FIG. 22 to be replaced by any other suitable component (or components) that performs (or perform) the same functions thereof.

The ROADM circuit pack 1252 can comprise a type-4 light distributor 1260 that can receive optical signals from a 1:(e+1), type-1 light distributor 1262. The light distributor 1262 can also output signals to e expansion out ports 1264 and 1266, the first expansion out port being denoted as 1266 and the e th expansion out port being denoted as 1264. The light distributor 1262 can receive optical signals from a line in port 1268. The light distributor 1260 can output signals to the express out 1 port 1270 and can drop optical signals to a first set of k−(N−2) drop ports 1272, and a second set of N−2 drop ports 1274, where N is the maximum number of optical degrees supported by the ROADM circuit pack 1252, and k is the maximum number of add ports and the maximum number of drop ports supported by the ROADM circuit pack. The first set of k−(N−2) drop ports 1272 can function exclusively as drop ports to locally drop optical signals from the distributor 1260. The second set of N−2 drop ports 1274 can function as both drop ports and express ports and are connectable to another ROADM or similar optical device in the node containing the ROADM circuit pack 1252.

The ROADM circuit pack 1252 can further comprise an (e+3):1, type-1 light combiner 1276 receiving optical signals from an express input port 1278 and from e expansion in ports 1282, and outputting optical signals from a line output port or interface 1284. The type-1 light combiner 1276 can also receive optical signals from a type-1A, k−(N−2):1 light combiner 1286 and a type-1A, (N−2):1 light combiner 1288. The light combiner 1286 can receive optical signals from k−(N−2) VOAs 1290, which each receives optical signals from one of k−(N−2) add ports 1292. Add ports 1292 constitute a first set of add ports that can function exclusively as add ports. The light combiner 1288 can receive optical signals from (N−2) VOAs 1294, which each can receive optical signals from one of (N−2) add ports 1296. Add ports 1296 constitute a second set of add ports that function as both add ports and as express ports that are connectable to another ROADM or similar optical device in the node containing the ROADM circuit pack 1252 to receive optical signals therefrom.

The type-1 light distributor 1262, the type-1 light combiner 1276, the type-1A light combiners 1286 and 1288, the type-4 light distributor 1260, and the VOAs 1290 and 1294 can be the same as, for example, the type-1 light distributor 24, the type-1 light combiner 30, the type-1A light combiner 44, the type-4 light distributor 76, and the VOAs 48, respectively, as shown in FIGS. 2A, 2B, 3B, 6, and 3B, although they are not limited thereto. In addition, the type-1 light combiner 1276, the type-1A light combiners 1286 and 1288, the type-4 light distributor 1260, and the VOAs 1290 and 1294 can be the same as, or different from, the type-1 light combiner 142, the type-1A light combiner 148, the type-4 light distributor 132, and VOAs 150 shown in FIG. 10A. Also, the type-1 ROADM circuit pack 1252 can include more than the number of components shown in FIG. 22, and it is within the scope of this example embodiment for any of the type-1 light distributor 1262, the type-1 light combiner 1276, the type-1A light combiners 1286 and 1288, the type-4 light distributor 1260, and the VOAs 1290 and 1294 to be replaced by any other suitable component (or components) that performs (or perform) the same or similar functions thereof, as discussed above.

The colorless port expansion circuit pack 1254 can comprise a type-4 light distributor 1298 that can receive optical signals from an expansion in port 1300, which can receive optical signals from the expansion out port 1266 of the ROADM circuit pack 1252. The light distributor 1298 can also drop optical signals from k drop ports 1302. The colorless port expansion circuit pack 1254 can also comprise a k:1, type-1A light combiner 1304 that can receive optical signals from k VOAs 1306, which each can receive optical signals from a different one of the k add ports 1308. The light combiner 1304 can output optical signals to an expansion out port 1310, which, in turn, can output optical signals to one of the expansion in ports 1282 of the ROADM circuit pack 1252.

The type-1A light combiner 1304, the type-4 light distributor 1298, and the VOAs 1306 can be the same as, for example, the type-1A light combiner 44, the type-4 light distributor 76, and the VOAs 48, respectively, as shown in FIGS. 3B, 6, and 3B, although they are not limited thereto. In addition, the type-1A light combiner 1304, the type-4 light distributor 1298, and the VOAs 1306 can be the same as, or different from, the type-1A light combiner 148, the type-4 light distributor 132, and VOAs 150 shown in FIG. 10A. Also, the circuit pack 1254 can include more than the number of components shown in FIG. 22, and it is within the scope of this example embodiment for any of the type-1A light combiner 1304, the type-4 light distributor 1298, and the VOAs 1306 to be replaced by any other suitable component (or components) that performs (or perform) the same or similar functions thereof, as discussed above.

The e th colorless port expansion circuit pack 1256 can comprise a type-4 light distributor 1318 that can receive optical signals from an expansion in port 1320, which can receive optical signals from the expansion out port 1264 of the ROADM circuit pack 1252. The light distributor 1318 can also drop optical signals from k drop ports 1322. The colorless port expansion circuit pack 1256 can also comprise a k:1, type-1A light combiner 1324 that can receive optical signals from k VOAs 1326, which each can receive optical signals from a different one of the k add ports 1328. The light combiner 1324 can output optical signals to an expansion out port 1330, which, in turn, can output optical signals to one of the expansion in ports 1282 of the ROADM circuit pack 1252.

In general, the coupling ratios of light distributor 1262 can normally be set such that the total insertion loss from Line In port 1268 to drop ports 1272 and 1274 is equal to the insertion loss from Line In port 1268 to drop ports 1322 and 1302, although they need not be so set. This insures the light power levels are equal to all transponders attached to all drop ports on 1252, 1254, and 1256.

The type-1A light combiner 1324, the type-4 light distributor 1318, and the VOAs 1326 can be the same as, for example, the type-1A light combiner 44, the type-4 light distributor 76, and the VOAs 48, respectively, as shown in FIGS. 3B, 6, and 3B, although they are not limited thereto. In addition, the type-1A light combiner 1324, the type-4 light distributor 1318, and the VOAs 1326 can be the same as, or different from, the type-1A light combiner 148, the type-4 light distributor 132, and VOAs 150 shown in FIG. 10A. Also, the circuit pack 1256 can include more than the number of components shown in FIG. 22, and it is within the scope of this example embodiment for any of the type-1A light combiner 1324, the type-4 light distributor 1318, and the VOAs 1326 to be replaced by any other suitable component (or components) that performs (or perform) the same or similar functions thereof, as discussed above.

Figure 23A:
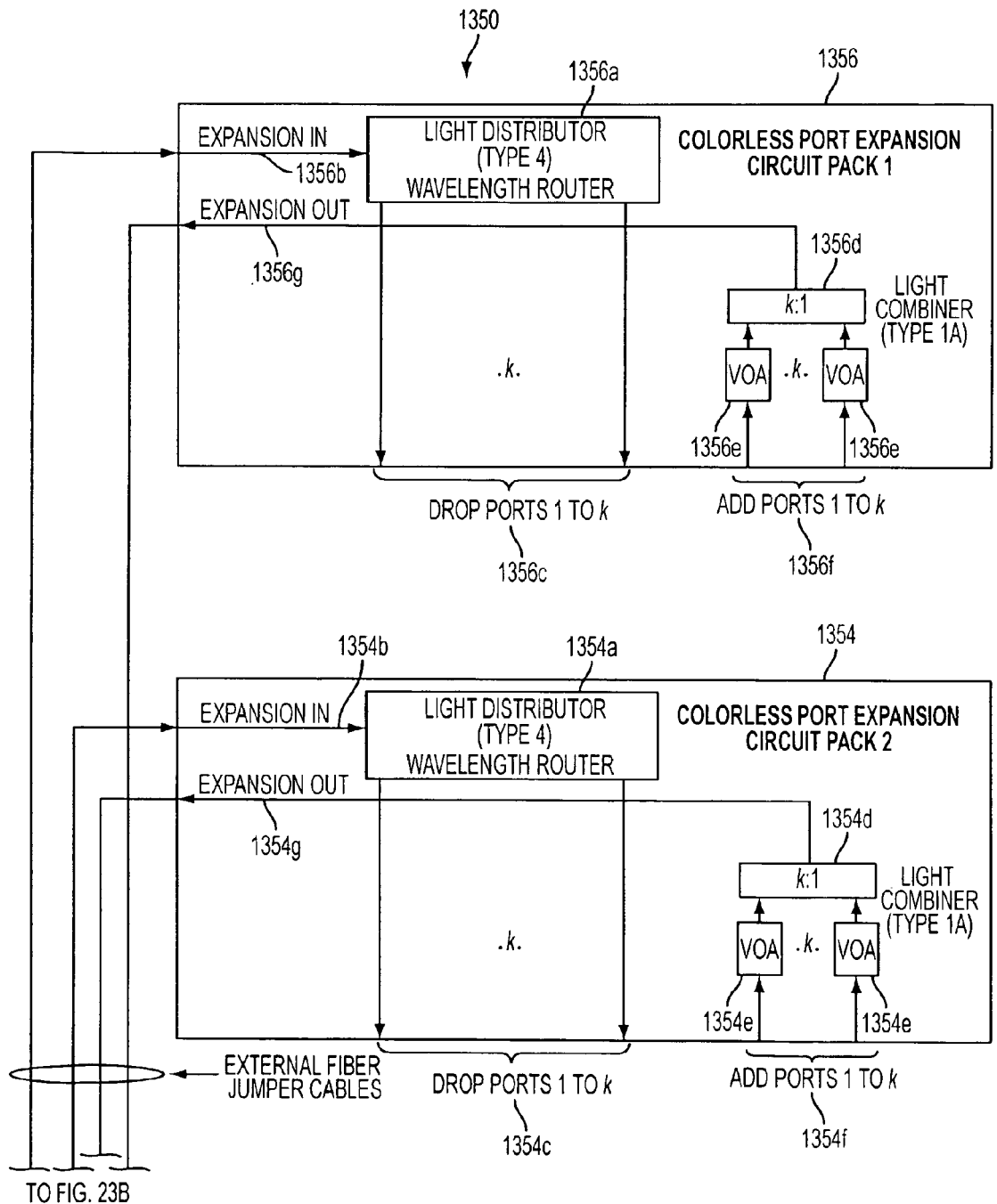
FIG. 23 is a block diagram of another example embodiment of ROADM example embodiment #3, which includes a ROADM circuit pack, comprising a type-1 ROADM having one expansion port attached to one colorless port expansion circuit pack and using one of its add ports and one of its drop ports as express ports to attach to a second colorless port expansion circuit pack.
Figure 23B:
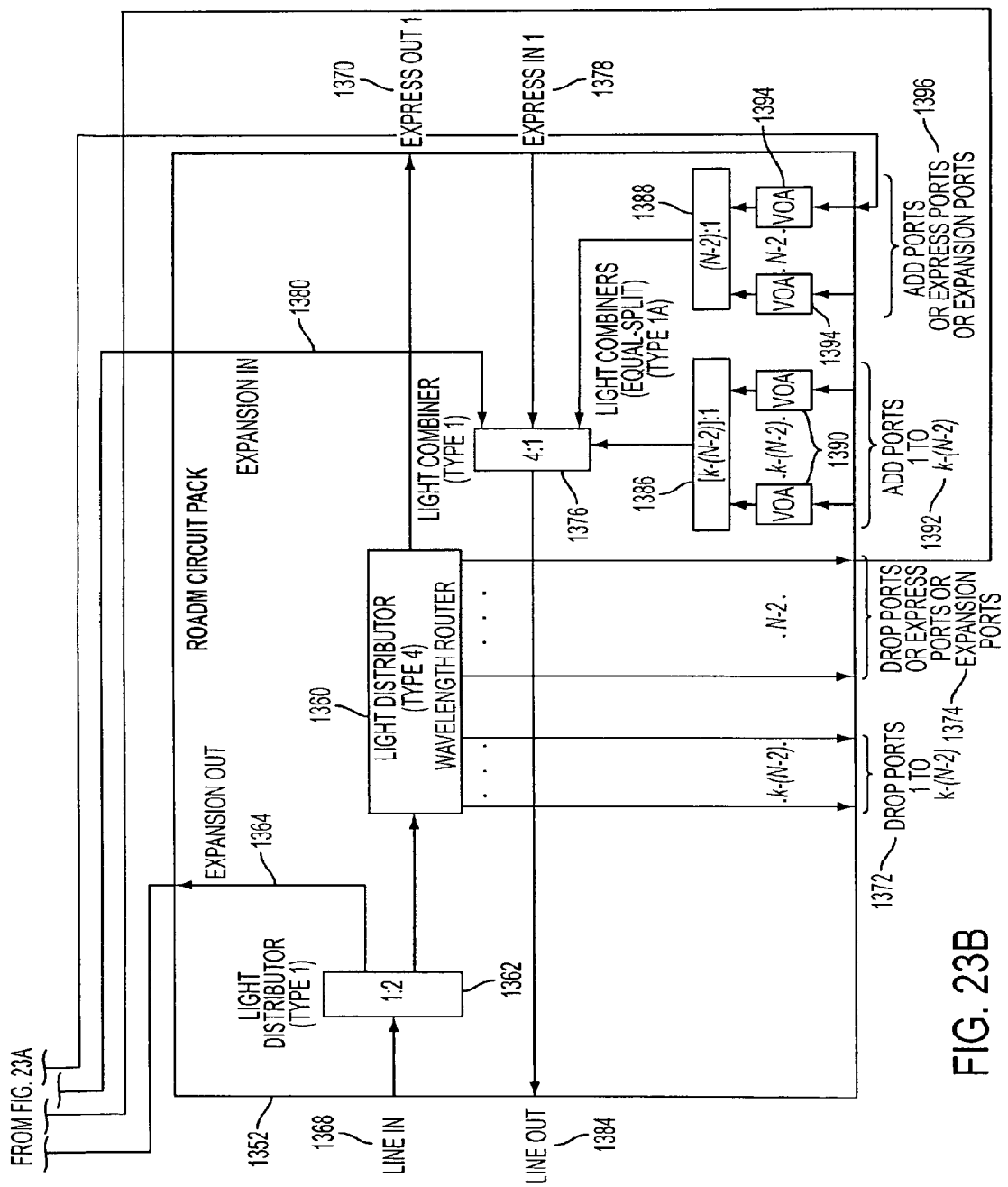
Figure 24A:
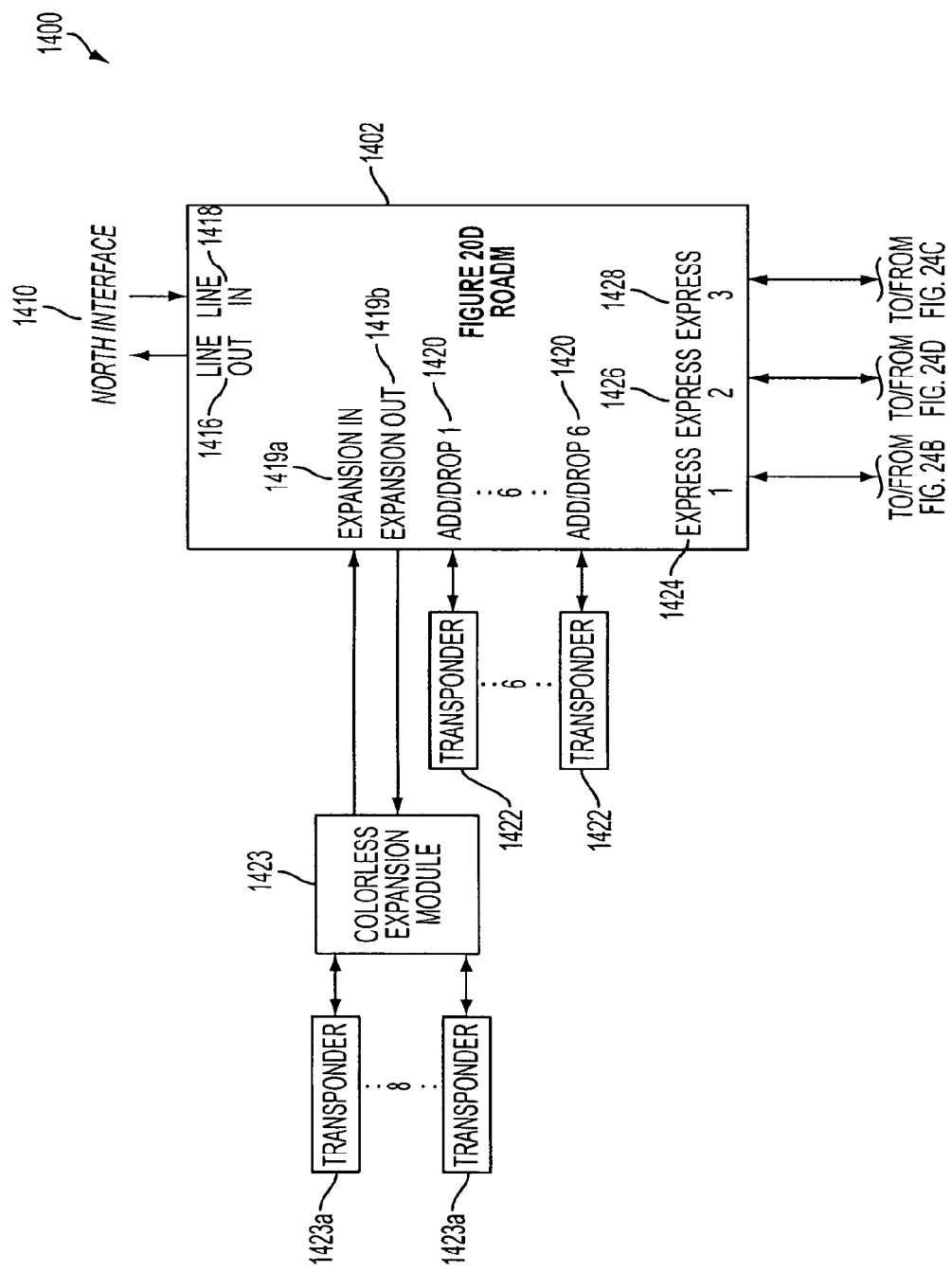
FIG. 24 is a block diagram of an optical node example embodiment #3, which can be a 4-degree optical node having four type-1 ROADM core devices, each having one expansion port connected to a colorless port expansion circuit pack, and first and second sets of add and drop ports, the second sets functioning as both add ports and drop ports, respectively, and as express ports. In this example embodiment, each ROADM has six colorless add ports in the first set of add ports and six colorless drop ports in the first set of drop ports and two add ports in the second set of add ports and two drop ports in the second set of drop ports, and each colorless port expansion circuit pack has eight colorless add ports and eight colorless drop ports to provide a total of 14 colorless add ports and 14 colorless drop ports per degree.
Figure 24B:
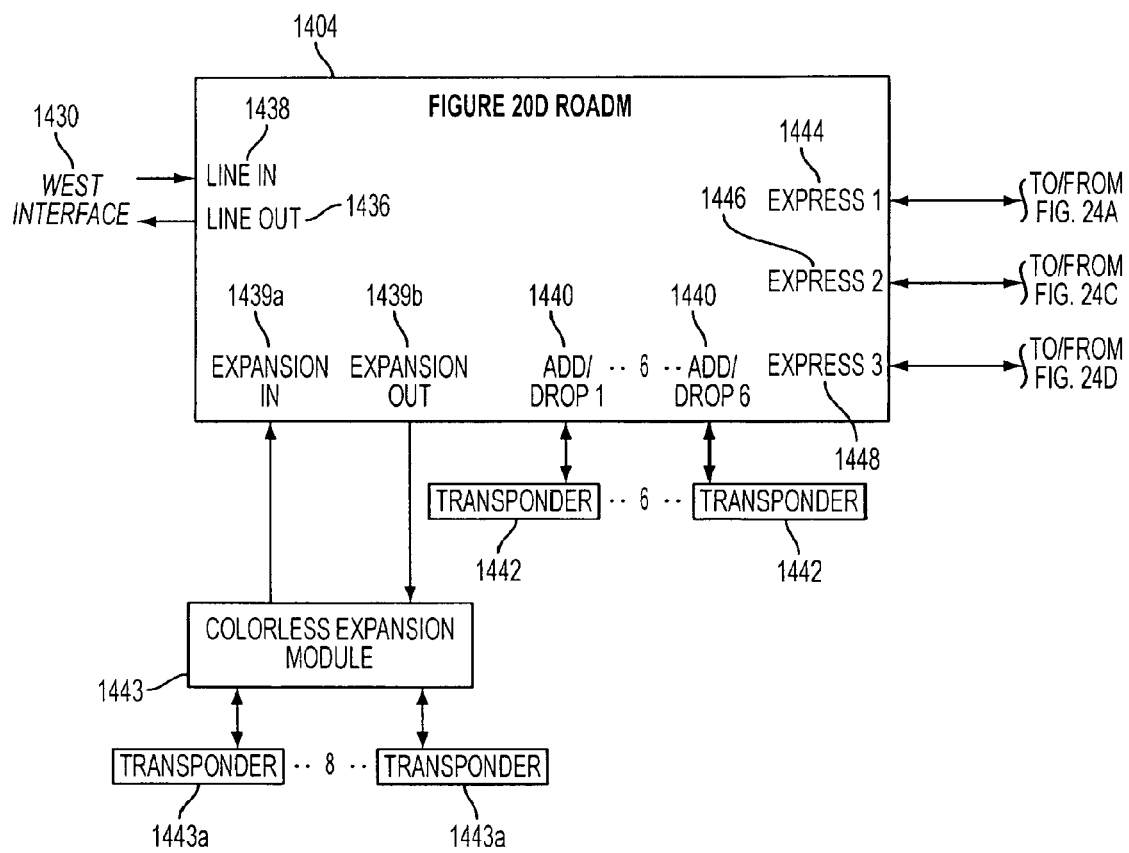
Figure 24C:
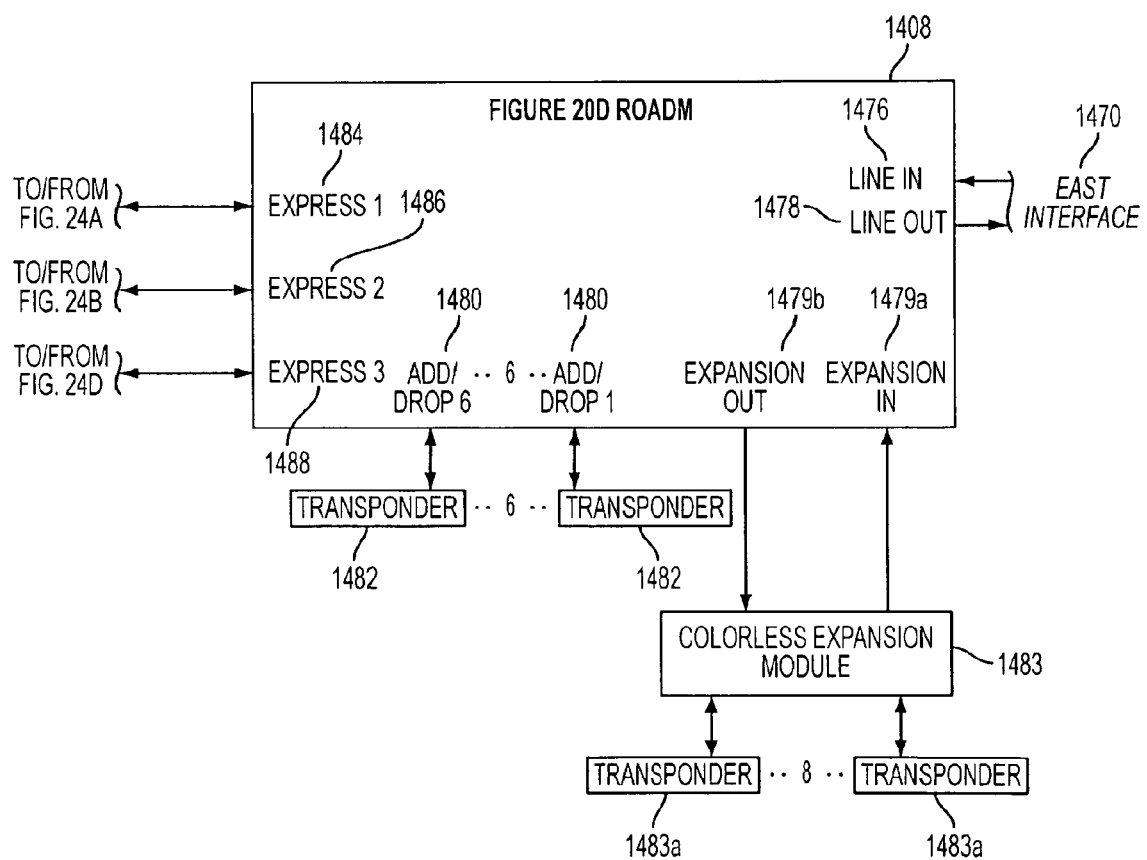
Figure 24D:
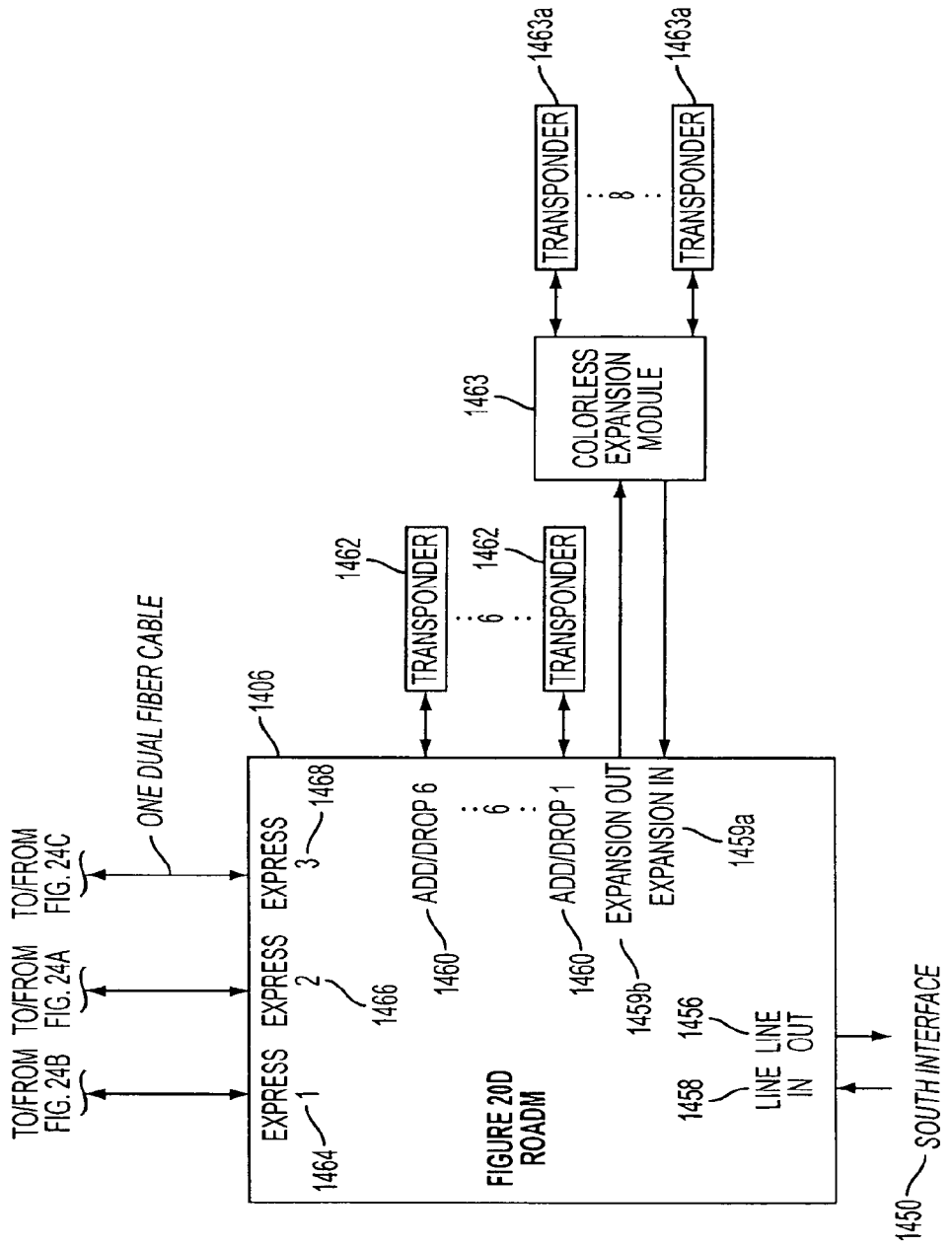

FIG. 23 shows an example embodiment of an optical device 1350 comprising a ROADM circuit pack 1352 and two colorless port expansion circuit packs 1354 and 1356 in which an express port can be used to support the colorless port expansion circuit packs 1354 and 1356. FIG. 23 shows only one dedicated expansion port (e=1), but an additional colorless port expansion circuit pack can be attached to the ROADM circuit pack 1352 by using one of the N−2 additional express ports, as will be discussed in more detail below. The colorless port expansion circuit packs 1354 and 1356 shown in FIG. 23 can be the same as, for example, the colorless port expansion packs shown in FIGS. 21 and 22, although they are not limited thereto. The ROADM circuit pack 1352 shown in FIG. 23 can be the same as, for example, the ROADM circuit packs shown in FIGS. 21 and 22, except that it includes only one dedicated expansion port (e=1), although it is not limited thereto. It is also within the scope of the example embodiment for the ROADM circuit pack 1352 shown in FIG. 23 to be used with other kinds of devices besides the colorless port expansion circuit packs 1354 and 1356 shown in FIG. 23 and to be connected to the colorless port expansion circuit packs 1354 and 1356 shown in FIG. 23 by means other than an express port or an expansion port. It is also within the scope of the example embodiment for the colorless port expansion circuit packs 1354 and 1356 shown in FIG. 23 to be used with devices other than the ROADM circuit pack shown 1352 in FIG. 23 and to be connected to a ROADM circuit pack through means other than an express port or an expansion port.

The ROADM circuit pack 1352 can comprise a type-4 light distributor 1360 that can receive optical signals from a 1:2, type-1 light distributor 1362. The light distributor 1362 can also output signals to an expansion out port 1364. The light distributor 1362 can receive optical signals from a line in port 1368. The light distributor 1360 can output signals to the express out 1 port 1370 and can drop optical signals to a first set of k−(N−2) drop ports 1372, and a second set of N−2 drop ports 1374, where N is the maximum number of optical degrees supported by the ROADM circuit pack 1352, and k is the maximum number of add ports and the maximum number of drop ports supported by the ROADM circuit pack 1352. The first set of k−(N−2) drop ports 1372 can function exclusively as drop ports to locally drop optical signals from the distributor 1360. The second set of N−2 drop ports 1374 can function as both drop ports and express ports and are connectable to a colorless port expansion circuit pack, such as pack 1354 (in which case this express port functions as an expansion port), another ROADM or similar optical device in the node containing the ROADM circuit pack 1352.

The ROADM circuit pack 1352 can further comprise a 4:1, type-1 light combiner 1376 receiving optical signals from an express input port 1378 and from an expansion in port 1380, and outputting optical signals from a line output port or interface 1384. The type-1 light combiner 1376 can also receive optical signals from a type-1A, k−(N−2):1 light combiner 1386 and a type-1A, (N−2):1 light combiner 1388. The light combiner 1386 can receive optical signals from k−(N−2) VOAs 1390, which each receives optical signals from one of k−(N−2) add ports 1392. Add ports 1392 constitute a first set of add ports that can function exclusively as add ports. The light combiner 1388 can receive optical signals from (N−2) VOAs 1394, which each can receive optical signals from one of (N−2) add ports 1396. Add ports 1396 constitute a second set of add ports that function as both add ports and as express ports that are connectable to a colorless port expansion circuit pack, such as, for example, the colorless port expansion circuit pack 1354, another ROADM or similar optical device in the node containing the ROADM circuit pack 1352 to receive optical signals therefrom.

The type-1 light distributor 1362, the type-1 light combiner 1376, the type-1A light combiners 1386 and 1388, the type-4 light distributor 1360, and the VOAs 1390 and 1394 can be the same as, for example, the type-1 light distributor 24, the type-1 light combiner 30, the type-1A light combiner 44, the type-4 light distributor 76, and the VOAs 48, respectively, as shown in FIGS. 2A, 2B, 3B, 6, and 3B, although they are not limited thereto. In addition, the type-1 light distributor 1362, the type-1 light combiner 1376, the type-1A light combiners 1386 and 1388, the type-4 light distributor 1360, and the VOAs 1390 and 1394 can be the same as, or different from, the type-1 light combiner 142, the type-1A light combiner 148, the type-4 light distributor 132, and VOAs 150 shown in FIG. 10A. Also, the type-1 ROADM circuit pack 1352 can include more than the number of components shown in FIG. 23, and it is within the scope of this example embodiment for any of the type-1 light distributor 1362, the type-1 light combiner 1376, the type-1A light combiners 1386 and 1388, the type-4 light distributor 1360, and the VOAs 1390 and 1394 to be replaced by any other suitable component (or components) that performs (or perform) the same or similar functions thereof, as discussed above.

The colorless port expansion circuit pack 1354 can comprise a type-4 light distributor 1354a that can receive optical signals from an expansion in port 1354b, which can receive optical signals from one of the drop ports 1374 of the ROADM circuit pack 1352 that functions as an express port (in this case this express port functions as an expansion port). The light distributor 1354a can also drop optical signals from k drop ports 1354c. The colorless port expansion circuit pack 1354 can also comprise a k:1, type-1A light combiner 1354d that can receive optical signals from k VOAs 1354e, which each can receive optical signals from a different one of the k add ports 1354f. The light combiner 1354d can output optical signals to an expansion out port 1354g, which, in turn, can output optical signals to one of the express ports 1396 of the ROADM circuit pack 1352 that functions as an expansion port.

The type-1A light combiner 1354d, the type-4 light distributor 1354a, and the VOAs 1354e can be the same as, for example, the type-1A light combiner 44, the type-4 light distributor 76, and the VOAs 48, respectively, as shown in FIGS. 3B, 6, and 3B, although they are not limited thereto. In addition, the type-1A light combiner 1354d, the type-4 light distributor 1354a, and the VOAs 1354e can be the same as, or different from, the type-1A light combiner 148, the type-4 light distributor 132, and VOAs 150 shown in FIG. 10A. Also, the circuit pack 1354 can include more than the number of components shown in FIG. 23, and it is within the scope of this example embodiment for any of the type-1A light combiner 1354d, the type-4 light distributor 1354a, and the VOAs 1354e to be replaced by any other suitable component (or components) that performs (or perform) the same or similar functions thereof, as discussed above.

The colorless port expansion circuit pack 1356 can comprise a type-4 light distributor 1356a that can receive optical signals from an expansion in port 1356b, which can receive optical signals from the expansion out port 1364 of the ROADM circuit pack 1352. The light distributor 1356a can also drop optical signals from k drop ports 1356c. The colorless port expansion circuit pack 1356 can also comprise a k:1, type-1A light combiner 1356d that can receive optical signals from k VOAs 1356e, which each can receive optical signals from a different one of the k add ports 1356f. The light combiner 1356d can output optical signals to an expansion out port 1356g, which, in turn, can output optical signals to the light combiner 1376 of the ROADM circuit pack 1252.

The type-1A light combiner 1356d, the type-4 light distributor 1356a, and the VOAs 1356e can be the same as, for example, the type-1A light combiner 44, the type-4 light distributor 76, and the VOAs 48, respectively, as shown in FIGS. 3B, 6, and 3B, although they are not limited thereto. In addition, the type-1A light combiner 1356d, the type-4 light distributor 1356a, and the VOAs 1356e can be the same as, or different from, the type-1A light combiner 148, the type-4 light distributor 132, and VOAs 150 shown in FIG. 10A. Also, the circuit pack 1356 can include more than the number of components shown in FIG. 23, and it is within the scope of this example embodiment for any of the type-1A light combiner 1356d, the type-4 light distributor 1356a, and the VOAs 1356e to be replaced by any other suitable component (or components) that performs (or perform) the same or similar functions thereof, as discussed above.

When the colorless port expansion circuit pack 1354 is attached to a ROADM circuit pack 1352 using one of the N–2 additional express ports 1374 and 1396, all the wavelengths available in the line in signal may not be available to the colorless port expansion circuit pack 1354. The wavelength router 1360 within the ROADM circuit pack 1352 can be configured to route the wavelengths destined for the colorless port expansion circuit pack 1354 to the drop port 1374 of the ROADM circuit pack 1352 that in turn connects to the expansion in port 1354b of the expansion circuit pack 1354, although it is not limited to this configuration. (Refer to FIG. 23.)

It is within the scope of the example embodiment for the gain of an output amplifier attached to the line out port 1384 to have a value that compensates for any additional optical insertion loss incurred by connecting a colorless port expansion circuit pack to the ROADM circuit pack 1352 via one of the N–2 additional express ports 1374 and 1396, although in other example embodiments, the gain of the output amplifier is chosen so as not to compensate from this additional insertion loss. In one example embodiment, a colorless port expansion circuit pack can be connected to one of the N–2 additional express ports 1396 without modification to the output amplifier gain because of the lower insertion loss associated with the N–2 add ports 1396 compared to the k–(N–2) add ports 1392 on the ROADM circuit pack 1352.

In an example embodiment in which one of the N–2 additional express ports 1396 can be used to add an additional colorless port expansion circuit pack to the ROADM circuit pack 1352 within a system, the largest system can contain N–1 degrees. In another example embodiment, in which two of the N–2 additional express ports 1396 can be used to add additional colorless port expansion circuit packs to the ROADM circuit packs within a system, the largest system can contain N–2 degrees.

Optical Node Example Embodiment #3

FIG. 24 shows optical node example embodiment #3 comprising node 1400. This example embodiment can be, but is not limited to being, a simplified view of an example embodiment of an optical node using ROADM example embodiment #3. (For simplicity, the input and output amplifiers are not shown.) More specifically, optical node 1400 can include four ROADM core devices 1402, 1404, 1406, and 1408 that can be the same as, for example, the ROADM core devices shown in FIG. 20d, although they are not limited thereto. It is within the scope of the example embodiment for the optical node 1400 to include additional elements not shown in FIG. 24 and for any of the FIG. 20d ROADM core devices in the node 1400 to be replaced by any other component (or components) that performs (or perform) the functions thereof. It is also within the scope of the example embodiment for any of the expansion ports shown in FIGS. 20a-20d, 21, 22, 23, and 24 to also be added to the example embodiment #1 ROADM of FIG. 10b.

In FIG. 24, k=8, but this example embodiment is not limited thereto. In the node 1400, on each ROADM 1402, 1404, 1406, and 1408 there can be three ports used as express ports, and each ROADM can have k–2 add/drop ports that function only as add and drop ports.

More specifically, the ROADM 1402 can comprise a north interface 1410, an output amplifier (not shown) and an input amplifier (not shown) attached to the interface 1410, a line out port 1416, a line in port 1418, an expansion in port 1419a, and expansion out port 1419b, six add/drop ports 1420, six transponders 1422 each attached to a different add/drop port 1420, a colorless port expansion circuit pack or module 1423 attached to the expansion in port 1419a and the expansion out port 1419b, eight transponders 1423a attached to the colorless port expansion circuit pack 1423, and express ports 1424, 1426, and 1428.

The ROADM 1404 can comprise a west interface 1430, an output amplifier (unshown) and an input amplifier (unshown) attached to the interface 1430, a line out port 1436, a line in port 1438, an expansion in port 1439a, and expansion out port 1439b, six add/drop ports 1440, six transponders 1442 each attached to a different add/drop port 1440, a colorless port expansion circuit pack or module 1443 attached to the expansion in port 1439a and the expansion out port 1439b, eight transponders 1443a attached to the colorless port expansion circuit pack 1423, and express ports 1444, 1446, and 1448.

The ROADM 1406 can comprise a south interface 1450, an output amplifier (not shown) and an input amplifier (not shown) attached to the interface 1450, a line out port 1456, a line in port 1458, an expansion in port 1459a, and expansion out port 1459b, six add/drop ports 1460, six transponders 1462 each attached to a different add/drop port 1460, a colorless port expansion circuit pack or module 1463 attached to the expansion in port 1459a and the expansion out port 1459b, eight transponders 1463a attached to the colorless port expansion circuit pack 1463, and express ports 1464, 1466, and 1468.

The ROADM 1408 can comprise an east interface 1470, output and input amplifiers (not shown) attached to the interface 1470, a line in port 1476, a line out port 1478, an expansion in port 1479a, and expansion out port 1479b, six add/drop ports 1480, six transponders 1482 each attached to a different add/drop port 1480, a colorless port expansion circuit pack or module 1483 attached to the expansion in port 1479a and the expansion out port 1479b, eight transponders 1483a attached to the colorless port expansion circuit pack 1483, and express ports 1484, 1486, and 1488.

Express ports 1424, 1426, and 1428 of ROADM 1402 can be connected, respectively, to express port 1444 of ROADM 1404, express port 1466 of ROADM 1406, and express port 1484 of ROADM 1408. In addition, express ports 1446 and 1448 of ROADM 1404 can be connected, respectively, to express port 1486 of ROADM 1408 and express port 1464 of ROADM 1406. Also, express port 1468 of ROADM 1406 can be connected to express port 1488 of ROADM 1408.

As noted above, FIG. 24 also shows transponders attached to the add/drop ports of the ROADM core devices, although it is within the scope of this example embodiment for transponders not to be attached to the add/drop ports of the ROADM cores and for a larger or smaller number of transponders than shown in FIG. 24 to be included. In the drop direction, each transponder can be used to convert a wavelength of a given DWDM frequency to an electrical signal. The electrical signal may then be converted by the transponder, for example, to a "white light" optical signal. (A white light optical signal is a non-colored optical signal of a non-precise wavelength such as 850 nm, 1310 nm, or 1550 nm.) In the add direction, each transponder can convert a "white light" optical signal to one of the m colored wavelengths supported by the ROADM (1402, 1404, 1406, and 1408), the node 1400, and the system of which the node 1400 is a part.

It is within the scope of this example embodiment for the ROADM core devices shown in FIG. 24 to include additional elements not shown therein and to replace each of the ROADM core devices, and to replace each component of the ROADM core devices shown in FIG. 24 with any other suitable component (or components) that performs (or perform) the functions thereof.

Figure 25:
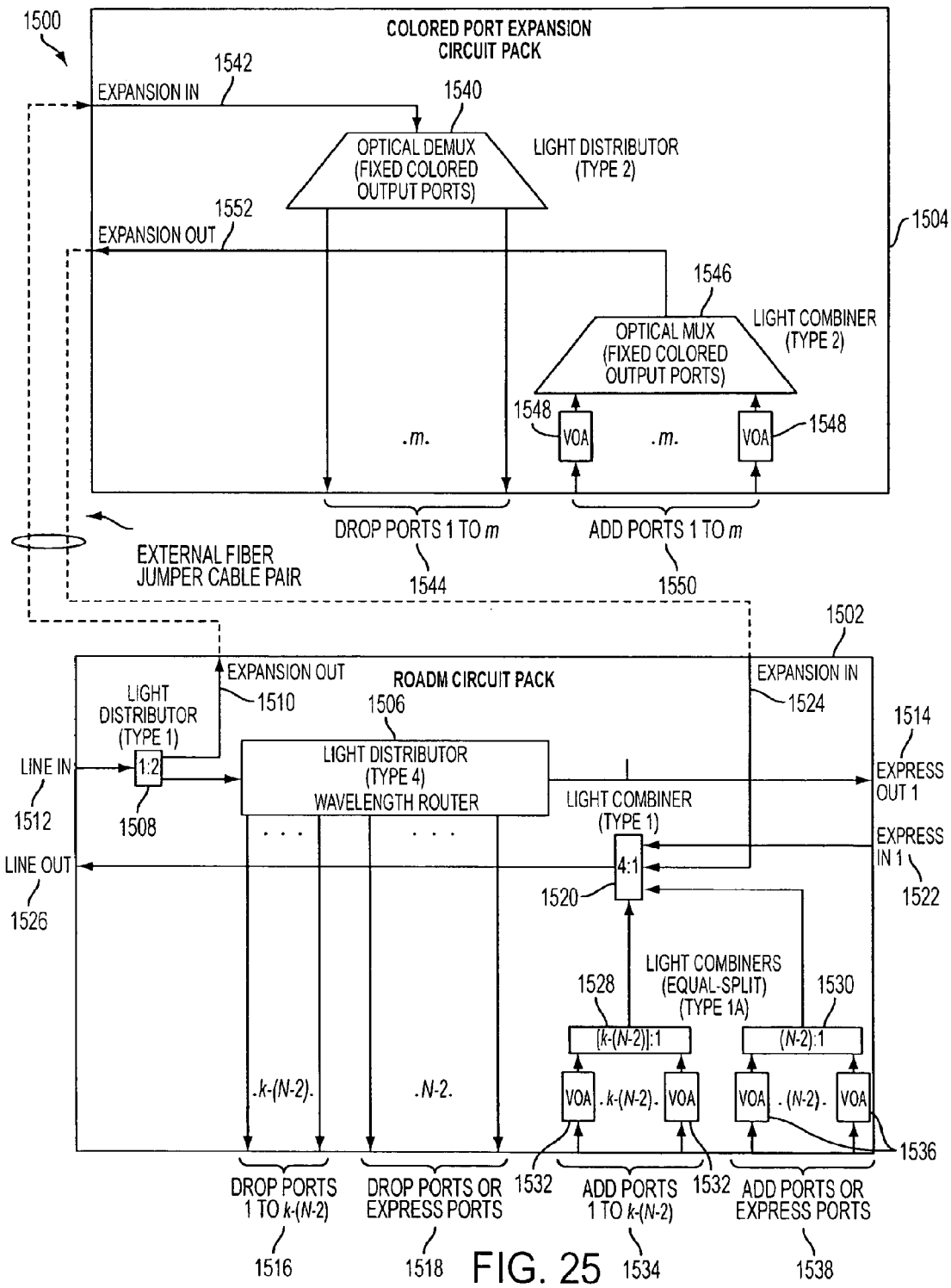
FIG. 25 is a block diagram of another example embodiment of optical node example embodiment #3, which includes a ROADM circuit pack, comprising a type-1 ROADM having an expansion port attached to a type-1 colored port expansion circuit pack (also called a colored add/drop expansion module).

FIG. 25 shows another example embodiment of the ROADM example embodiment #3 that attaches a colored port expansion circuit pack to a ROADM circuit pack.

More specifically, FIG. 25 shows an optical device 1500 that includes a ROADM circuit pack 1502 and a colored port expansion circuit pack 1504 attached thereto. In one example embodiment, the ROADM core device of the circuit pack 1502 can include the FIG. 20b ROADM in which an expansion port thereof can also be used to add colored add/drop ports to the FIG. 20b ROADM via the pack 1504.

The ROADM circuit pack 1502 can comprise a type-4 light distributor 1506 that can receive optical signals from a 1:2, type-1 light distributor 1508. The light distributor 1508 can also output signals to an expansion out port 1510 and can receive optical signals from a line in port 1512. The light distributor 1506 can output signals to the express out 1 port 1514 and can drop optical signals to a first set of k−(N−2) drop ports 1516, and a second set of N−2 drop ports 1518, where N is the maximum number of optical degrees supported by the ROADM 1502, and k is the maximum number of add ports and the maximum number of drop ports supported by the ROADM. The first set of k−(N−2) drop ports 1516 can function exclusively as drop ports to locally drop optical signals from the distributor 1506. The second set of N−2 drop ports 1518 can function as both drop ports and express ports and are connectable to another ROADM or similar optical device in the node containing the ROADM circuit pack 1502.

The ROADM circuit pack 1502 can further comprise a 4:1, type-1 light combiner 1520 receiving optical signals from an express input port 1522 and from an expansion in port 1524, and outputting optical signals from a line output port or interface 1526. The type-1 light combiner 1520 can also receive optical signals from two type-1A light combiners 1528 and 1530. The light combiner 1528 is a k−(N−2):1 light combiner that receives optical signals from k−(N−2) VOAs 1532, which each receives optical signals from one of k−(N−2) add ports 1534. Add ports 1534 constitute a first set of add ports that function only as add ports. The light combiner 1530 is a (N−2):1 light combiner that receives optical signals from (N−2) VOAs 1536, which each receives optical signals from one of (N−2) add ports 1538. Add ports 1538 constitute a second set of add ports that function as both add ports and as express ports that are connectable to another ROADM or similar optical device in the node containing the ROADM circuit pack 1502 to receive optical signals therefrom.

The type-1 light distributor 1508, the type-1 light combiner 1520, the type-1A light combiners 1528 and 1530, the type-4 light distributor 1506, and VOAs 1532 and 1536 can be the same as, for example, the type-1 light distributor 24, the type-1 light combiner 30, the type-1A light combiner 44, the type-4 light distributor 76, and the VOAs 48, respectively, as shown in FIGS. 2A, 2B, 3B, 6, and 3B, although they are not limited thereto. In addition, the type-1 light distributor 1508, the type-1 light combiner 1520, the type-1A light combiners 1528 and 1530, the type-4 light distributor 1506, and VOAs 1532 and 1536 can be the same as, or different from, the type-1 light combiner 142, the type-1A light combiner 148, and the type-4 light distributor 132, and VOAs 150 shown in FIG. 10A. Also, the type-1 ROADM circuit pack 1502 can include more than the number of components shown in FIG. 25, and it is within the scope of this example embodiment for any of the type-1 light distributor 1508, the type-1 light combiner 1520, the type-1A light combiners 1528 and 1530, the type-4 light distributor 1506, and VOAs 1532 and 1536 to be replaced by any other suitable component (or components) that performs (or perform) the same or similar functions thereof, as discussed above.

The colored port expansion circuit pack 1504 can comprise a type-2 light distributor 1540 that receives optical signals from an expansion in port 1542, which receives optical signals from the expansion out port 1510 of the ROADM circuit pack 1502. The light distributor 1540 can also drop optical signals from m drop ports 1544, where m can be the number of wavelengths supported by the device 1500 or the number of wavelengths entering the device 1500. The colored port expansion circuit pack 1504 can also comprise a type-2 light combiner 1546 that receives optical signals from m VOAs 1548, which each receives optical signals from a different one of the m add ports 1550. The light combiner 1546 outputs optical signals to an expansion out port 1552, which, in turn, outputs optical signals to the expansion in port 1524 of the ROADM circuit pack 1502.

The type-2 light combiner 1546, the type-2 light distributor 1540, and the VOAs 1548 can be the same as, for example, the type-2 light combiner 58, the type-2 light distributor 52, and the VOAs 48, respectively, as shown in FIGS. 3B, 4A, and 3B, although they are not limited thereto. Also, the circuit pack 1504 can include more than the number of components shown in FIG. 25, and it is within the scope of this example embodiment for any of the type-2 light combiner 1546, the type-2 light distributor 1540, and the VOAs 1548 to be replaced by any other suitable component (or components) that performs (or perform) the same or similar functions thereof, as discussed above.

It is within the scope of this example embodiment for a DWDM system of which the optical device 1500 is a part to support 32 or more wavelengths (m≥32), although it is not limited thereto. All of these wavelengths may be multiplexed into a single optical signal using the type-2 light combiner 1546 (for example, using an AWG) or other suitable component that performs the functions of a type-2 light combiner. Similarly, 32 or more wavelengths can be de-multiplexed using the type-2 light distributor 1540 (for example, using an AWG) or other suitable component that performs the functions of a type-2 light distributor.

The colored port expansion circuit pack 1504 can be called a type-1 colored port expansion circuit pack or a type-1 colored add/drop expansion module. It is within the scope of the example embodiment for the colored port expansion circuit pack 1504 and the ROADM circuit pack 1502 to be replaced by any other suitable component (or components) that performs (or perform) the functions thereof. It is also within the scope of the example embodiment for the number of wavelengths entering the optical device 1500, or entering any of the nodes, ROADM cores, network elements, or DWDM systems described herein, denoted by m, to be equal to the number of wavelengths supported by that node, ROADM core, network element, or DWDM system, respectively, although m can be unequal to the number of supported wavelengths. In one example embodiment, a node, a ROADM core, a network element, and a DWDM system, each having a colored port expansion module 1504, can support 44 wavelengths. In this case, m=44, and there can be provided 44 add/drop ports associated with the colored port expansion module. Each of the 44 add/drop ports can be provided with an individual connector (not shown) on the expansion circuit pack (not shown), or alternatively, the expansion module may contain a series of parallel optical connectors (not shown) which are then connected to an optical patch panel (not shown) that breaks out each individual add/drop port to individual optical connectors (not shown).

The colored port expansion circuit pack 1504 can provide a low cost means of accessing all wavelengths supported by a given system. In one example embodiment in which a colored port expansion circuit pack is used with the ROADM example embodiment #3, any unused colorless add/drop ports on the ROADM circuit pack can be used to support transponders (not shown) used for protection purposes, since a tunable transponder connected to a colorless add/drop port can transmit and receive any one of the m wavelengths supported by the system.

Figure 26:
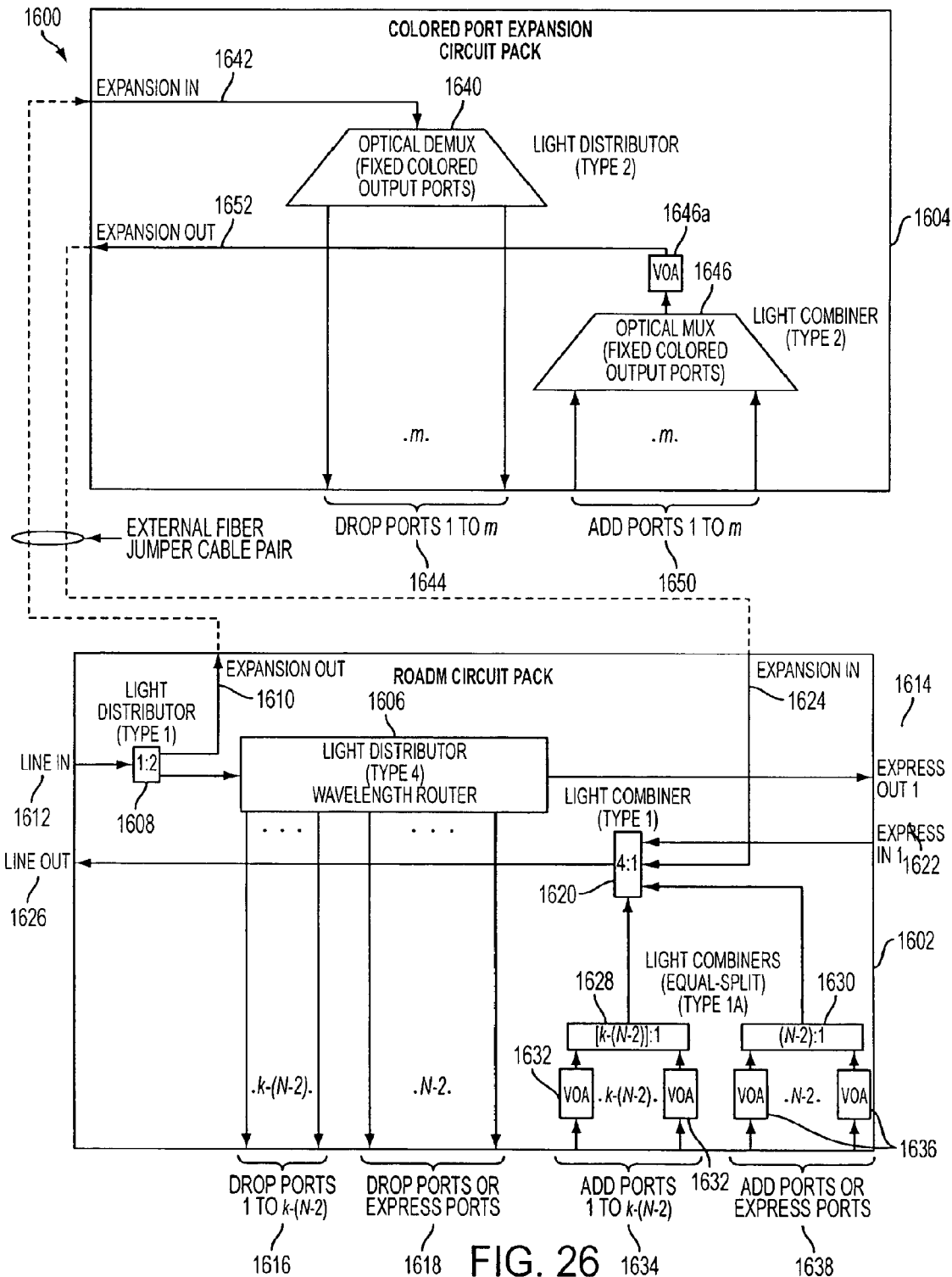
FIG. 26 is a block diagram of another example embodiment of optical node example embodiment #3, which includes a ROADM circuit pack, comprising a type-1 ROADM having an expansion port attached to a type-1 colored port expansion circuit pack (also called an add/drop expansion module) having a variable optical attenuator (VOA).

FIG. 26 shows an example embodiment of an optical device 1600 comprising a ROADM circuit pack 1602 and a type-2 colored port expansion circuit pack 1604 attached thereto. The ROADM circuit pack 1602 can be, but is not limited to being, an example embodiment of ROADM embodiment #3. It is within the scope of the example embodiment for the type-2 colored port expansion circuit pack 1604 and the ROADM circuit pack 1602 shown in FIG. 26 to be replaced by any other suitable component (or components) that performs (or perform) the functions thereof. It is also within the scope of this example embodiment for the components of the colored port expansion circuit pack 1604 and the ROADM circuit pack 1602 to be replaced by any other suitable component (or components) that performs (or perform) the functions thereof. It is further within the scope of this example embodiment for the components of the colored port expansion circuit pack 1604 and the ROADM circuit pack 1602 to be the same as or different from corresponding components in the other example embodiments disclosed herein.

The ROADM circuit pack 1602 can comprise a type-4 light distributor 1606 that can receive optical signals from a 1:2, type-1 light distributor 1608. The light distributor 1608 can also output signals to an expansion out port 1610 and can receive optical signals from a line in port 1612. The light distributor 1606 can output signals to the express out 1 port 1614 and can drop optical signals to a first set of k−(N−2) drop ports 1616, and a second set of N−2 drop ports 1618, where N is the maximum number of optical degrees supported by the ROADM 1602, and k is the maximum number of add ports and the maximum number of drop ports supported by the ROADM. The first set of k−(N−2) drop ports 1616 can function exclusively as drop ports to locally drop optical signals from the distributor 1606. The second set of N−2 drop ports 1618 can function as both drop ports and express ports and are connectable to another ROADM or similar optical device in the node containing the ROADM circuit pack 1602.

The ROADM circuit pack 1602 can further comprise a 4:1, type-1 light combiner 1620 receiving optical signals from an express input port 1622 and from an expansion in port 1624, and outputting optical signals from a line output port or interface 1626. The type-1 light combiner 1620 can also receive optical signals from two type-1A light combiners 1628 and 1630. The light combiner 1628 is a k−(N−2):1 light combiner that receives optical signals from k−(N−2) VOAs 1632, which each receives optical signals from one of k−(N−2) add ports 1634. Add ports 1634 constitute a first set of add ports that function only as add ports. The light combiner 1630 is a (N−2):1 light combiner that receives optical signals from (N−2) VOAs 1636, which each receives optical signals from one of (N−2) add ports 1638. Add ports 1638 constitute a second set of add ports that function as both add ports and as express ports that are connectable to another ROADM or similar optical device in the node containing the ROADM circuit pack 1602 to receive optical signals therefrom.

The type-1 light distributor 1608, the type-1 light combiner 1620, the type-1A light combiners 1628 and 1630, the type-4 light distributor 1606, and VOAs 1632 and 1636 can be the same as, for example, the type-1 light distributor 24, the type-1 light combiner 30, the type-1A light combiner 44, the type-4 light distributor 76, and the VOAs 48, respectively, as shown in FIGS. 2A, 2B, 3B, 6, and 3B, although they are not limited thereto. In addition, the type-1 light distributor 1608, the type-1 light combiner 1620, the type-1A light combiners 1628 and 1630, the type-4 light distributor 1606, and VOAs 1632 and 1636 can be the same as, or different from, the type-1 light combiner 142, the type-1A light combiner 148, and the type-4 light distributor 132, and VOAs 150 shown in FIG. 10A. Also, the type-1 ROADM circuit pack 1602 can include more than the number of components shown in FIG. 26, and it is within the scope of this example embodiment for any of the type-1 light distributor 1608, the type-1 light combiner 1620, the type-1A light combiners 1628 and 1630, the type-4 light distributor 1606, and VOAs 1632 and 1636 to be replaced by any other suitable component (or components) that performs (or perform) the same or similar functions thereof, as discussed above.

The colored port expansion circuit pack 1604 can comprise a type-2 light distributor 1640 that receives optical signals from an expansion in port 1642, which receives optical signals from the expansion out port 1610 of the ROADM circuit pack 1602. The light distributor 1640 can also drop optical signals from m drop ports 1644, where m can be the number of wavelengths supported by the device 1600 or the number of wavelengths entering the device 1600. The colored port expansion circuit pack 1604 can also comprise a type-2 light combiner 1646 that receives optical signals from m add ports 1650 and that outputs a multiplexed signal to a single wide-band VOA 1646a. The VOA 1646a outputs optical signals to an expansion out port 1652, which, in turn, outputs optical signals to the expansion in port 1624 of the ROADM circuit pack 1602.

The type-2 light combiner 1646, the type-2 light distributor 1640, and the VOA 1646a can be the same as, for example, the type-2 light combiner 58, the type-2 light distributor 52, and one of the VOAs 48, respectively, as shown in FIGS. 3B, 4A, and 3B, although they are not limited thereto. Also, the circuit pack 1604 can include more than the number of components shown in FIG. 26, and it is within the scope of this example embodiment for any of the type-2 light combiner 1646, the type-2 light distributor 1640, and the VOA 1646a to be replaced by any other suitable component (or components) that performs (or perform) the same or similar functions thereof, as discussed above.

FIG. 26 shows an example embodiment in which a type-2 colored port expansion circuit pack 1604 does not contain individual VOAs on each add port. Instead, there is a single wide-band VOA 1646a that can be used to simultaneously attenuate all wavelengths from all m add ports after they are multiplexed by the type-2 light combiner 1646. It is within the scope of example embodiment for a type-2 colored port expansion circuit pack to be used when the output power levels of the transponders (not shown) attached to the add ports are tightly matched to one another. For this case, the single VOA 1646a can be used to match the power levels associated with the transponders to the power levels of the wavelengths arriving on the express input ports 1638 of the ROADM circuit pack 1602. But other example embodiments can use a type-2 colored port expansion circuit when the output levels of the transponders attached to the add ports are not tightly matched to each other.

An example embodiment of another type of colored port expansion circuit pack, called a type-3 colored port expansion circuit pack, can be provided (not shown). The type-3 colored port expansion circuit pack can be configured not to include individual VOAs for each add port and not to include an aggregate VOA on the output of the type-2 light combiner. When a type-3 colored port expansion circuit pack is used, it is within the scope of the example embodiment for the transponders themselves to contain VOAs on their optical line output ports, although the example embodiment is not limited thereto. For this case, the power level of each added wavelength can be matched to the power levels of the wavelengths arriving on the express in ports by adjusting their power levels on the transponders themselves.

It is also within the example embodiment to attach the colored port expansion circuit pack 1604 to an example embodiment of an embodiment #1 ROADM having an expansion port. In addition, it is within the scope of the example embodiment for the colored port expansion circuit pack 1604 to be attached to one of the N−2 additional express ports of any ROADM example embodiment disclosed herein, and for the insertion losses incurred by the use of the colored port expansion circuit pack to be compensated for by the gain of the output amplifier used with the ROADM, although the example embodiment is not limited to this specific compensation scheme.

Figure 27:
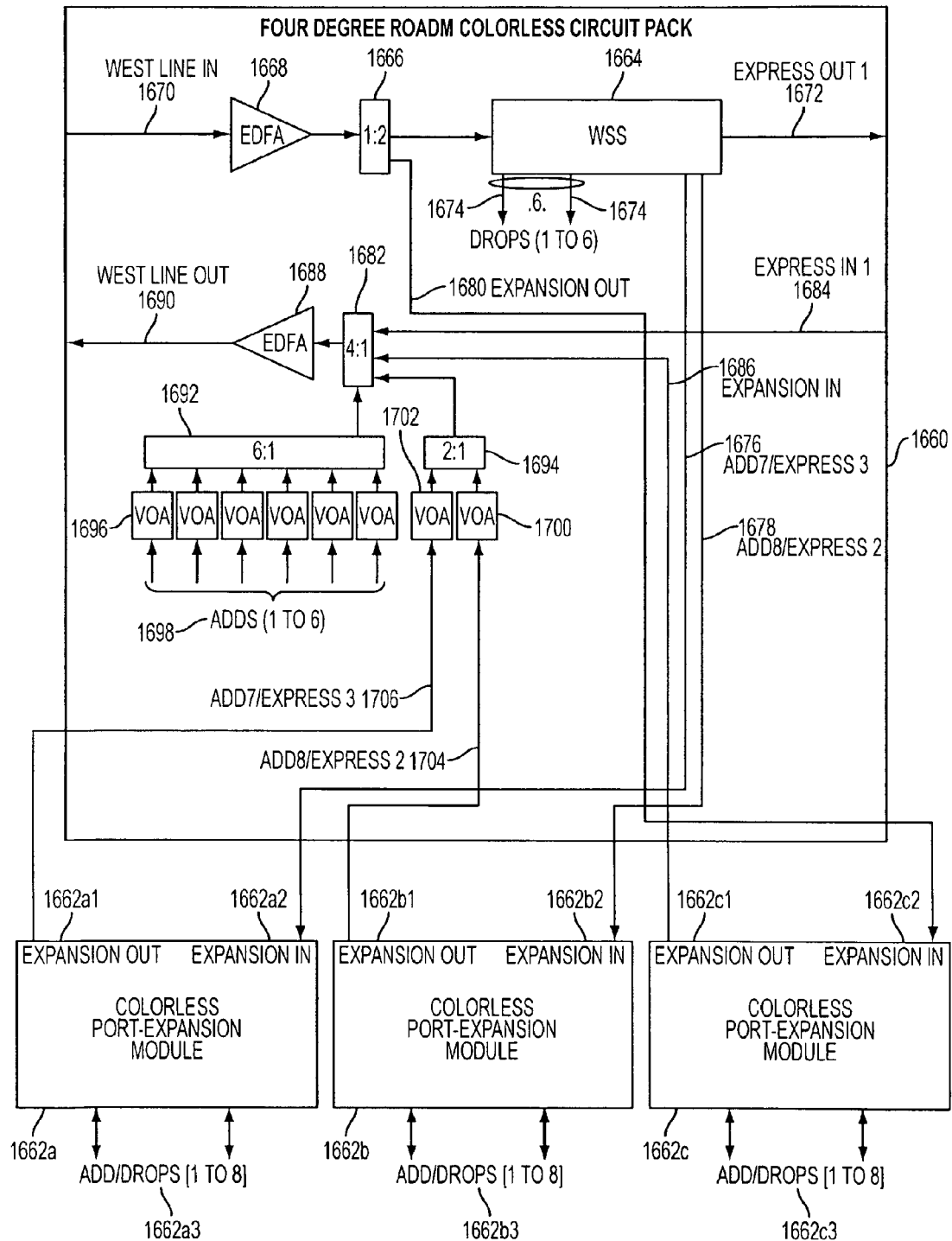
FIG. 27 is a block diagram of another example embodiment of optical node example embodiment #3, which includes a four-degree, type-1 ROADM circuit pack having two add ports and two drop ports that function as express ports attached to two colorless port expansion circuit packs, six add ports and six drop ports that function only as add and drop ports, respectively, and expansion add and drop ports attached to one colorless port expansion circuit pack having eight add ports and eight drop ports, to provide a total of 30 colorless add ports and 30 colorless drop ports.

FIG. 27 shows an example embodiment of ROADM example embodiment #3 with N=4 and k=8, and with three colorless port expansion modules. In FIG. 27, a four-degree ROADM colorless circuit pack 1660 is attached to three colorless port expansion modules 1662*a*, 1662*b*, and 1662*c*, although the circuit pack 1660 is not limited to being a four-degree device and can be a device of more or less than four degrees attachable to or attached to more or fewer than three expansion modules. The circuit pack 1660 includes a type-4 light distributor 1664, which is also called wavelength select switch (WSS). The WSS 1664 can be the same as the type-4 light distributor shown in FIG. 6, although it is not limited thereto. The colorless port expansion modules 1662*a*, 1662*b*, and 1662*c* can be the same as the colorless port expansion circuit packs shown in FIGS. 21-23 and the colorless expansion module shown in FIG. 24, although they are not limited thereto. It is within the scope of the example embodiment for any of the four degree ROADM colorless circuit pack 1660, the components thereof, the colorless expansion modules 1662*a*, 1662*b*, and 1662*c*, and the components thereof, to be replaced by any other suitable component (or components) that performs (or perform) the functions thereof.

More specifically, in FIG. 27, the circuit pack 1660 can comprise a type-4 light distributor 1664 receiving optical signals input from a type-1, 1:2 light distributor 1666, which also outputs optical signals along an optical cable 1680 to an expansion out port 1680, which outputs optical signals to an expansion in port 1662*c*2 of the module 1662*c*. The distributor 1666 can receive optical signals from an EDFA (erbium-doped fiber amplifier) 1668, which in turn can receive optical signals from a line interface or line in port 1670. The light distributor 1664 also outputs optical signals on an express output port 1672, and locally drops optical signals via a first set of six drop ports 1674 and drops optical signals from a second set of drop ports 1676 and 1678, which function as express/expansion ports. The express/expansion port 1676 outputs optical signals from the distributor 1664 to an expansion in port 1666*a*2 of the expansion module 1662*a*. The express/expansion port 1678 outputs optical signals from the distributor 1664 to the expansion in port 1662*b*2 of the expansion module 1662*b*.

The circuit pack 1660 can further comprise a 4:1, type-1 light combiner 1682 that can receive optical signals from an express input port 1684 and from an expansion in port 1686 that can receive optical signals from an expansion out port 1662*c*1 of the expansion module 1662*c*. The light combiner 1682 can also output optical signals to an EDFA 1688, which, in turn, can output optical signals to a line output interface 1690. The type-1 light combiner 1682 can also receive optical signals from two type-1A light combiners 1692 and 1694. The light combiner 1692 can be a 6:1 light combiner that can receive optical signals from six VOAs 1696, which each can receive optical signals from one of six add ports 1698. Add ports 1698 constitute a first set of add ports that function only as add ports. The light combiner 1694 is a 2:1 light combiner that receives optical signals from two VOAs 1700 and 1702, which each receive optical signals from one of two add ports 1704 and 1706. Add ports 1704 and 1706 constitute a second set of add ports that function as both add ports and as express ports that function here as expansion ports that are connectable, respectively, to the expansion out port 1662*b*1 of the expansion module 1662*b* and the expansion out port 1662*a*1 of the expansion module 1662*a*. The expansion modules 1662*a*, 1662*b*, and 1662*c* also include add/drop ports 1662*a*3, 1662*b*3, and 1662*c*3, respectively.

The configuration shown in FIG. 27 can provide 30 add/drop ports, while operating as a two degree ROADM configuration, although more or fewer add/drop ports can be provided. In order to construct a two degree optical node that supports 30 protected add/drop ports (60 ports total), the optical node can use two of the Four Degree ROADM Colorless Circuit packs 1660 and six of the Colorless Port-Expansion Modules. In this configuration (not shown), the Express Out 1 port of a given Four Degree ROADM Colorless Circuit pack can be connected to the Express In port of the other Four Degree ROADM Colorless Circuit pack.

The type-1 light distributor 1666, the type-1 light combiner 1682, the type-1A light combiners 1692 and 1694, the type-4 light distributor 1664, and VOAs 1696, 1700, and 1702 can be the same as, for example, the type-1 light distributor 24, the type-1 light combiner 30, the type-1A light combiner 44, the type-4 light distributor 76, and the VOAs 48, respectively, as shown in FIGS. 2A, 2B, 3B, 6, and 3B, although they are not limited thereto. In addition, the type-1 light distributor 1666, the type-1 light combiner 1682, the type-1A light combiners 1692 and 1694, the type-4 light distributor 1664, and VOAs 1696, 1700, and 1702 can be the same as, or different from, the type-1 light combiner 142, the type-1A light combiner 148, and the type-4 light distributor 132, and VOAs 150 shown in FIG. 10A. Also, the circuit pack 1660 and the expansion modules 1662*a*, 1662*b*, and 1662*c* can include more than the number of components shown in FIG. 27, and it is within the scope of this example embodiment for any of the type-1 light distributor 1666, the type-1 light combiner 1682, the type-1A light combiners 1692 and 1694, the type-4 light distributor 1664, and VOAs 1696, 1700, and 1702 to be replaced by any other suitable component (or components) that performs (or perform) the same or similar functions thereof, as discussed above.

Optical Spurs

Optical Node Example Embodiment #4

Figure 28:
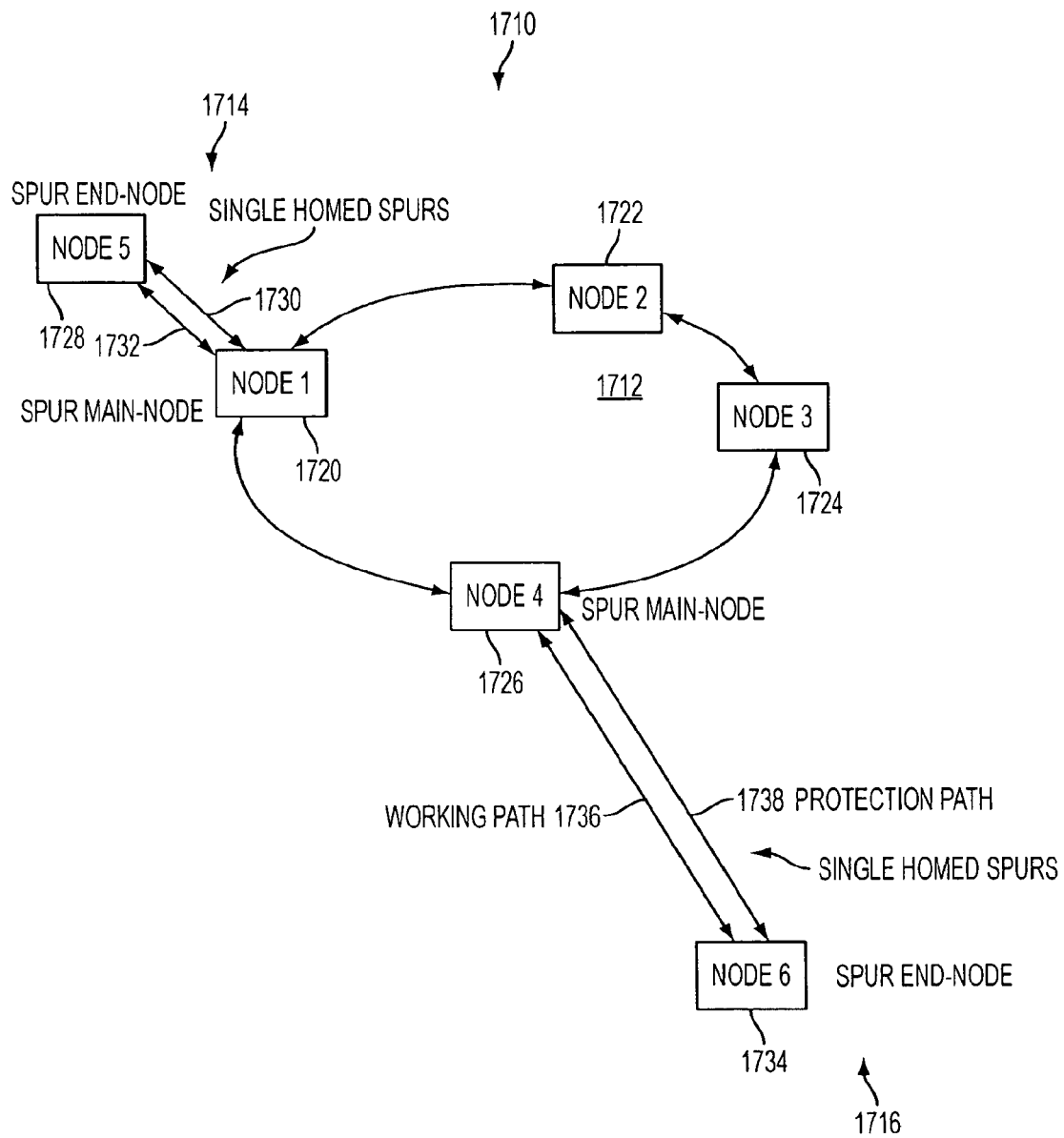
FIG. 28 is a block diagram of an example embodiment of an optical network having a single homed spur.

The N−2 additional express ports on any of the ROADM core devices discussed herein can also be used to support optical spurs, although they are not required to do so. Optical spurs can be configured to transport multiple wavelengths to a remote site off of, for example, an optical ring or optical mesh DWDM network. FIG. 28 illustrates an example embodiment of an optical network 1710 that can include a protected DWDM ring 1712 and two single, homed, protected spurs 1714 and 1716, though it is not limited to this number of spurs. Spur 1714 can include a spur end node, one of the nodes of the ring 1712, and two bi-directional optical fibers connecting the two, while the other protected spur 1716 can include a spur end node, a different node of the ring 1712, and two bi-directional optical fibers connecting the two, though these spurs are not limited to this number of nodes and optical fibers. (Each bi-directional fiber may be physically realized using two fiber strands: one fiber strand dedicated to each direction.) More specifically, the ring 1712 can include nodes 1-4, denoted as nodes 1720, 1722, 1724 and 1726, though it is not limited to this number of nodes. Protected spur 1714 can include a spur main node including node 1720, a spur end node having node 5, (denoted as node 1728), and bi-directional optical fibers 1730 and 1732 connecting node 1720 and node 1728. The other protected spur 1716 can include a spur main node having node 1726, a spur end node having node 6 (denoted as node 1734), and bi-directional optical fibers 1736 and 1738 connecting nodes 1726 and 1734.

It is within the scope of this example embodiment for the network 1710 to include additional elements not shown in FIG. 28 and for the nodes and bidirectional optical fiber to be replaced by other components that perform the same or similar function. It is also within the scope of the example embodiment to use more or fewer nodes in the ring 1712, the spur main node, and the spur end node than are shown in FIG. 28.

Figure 29:
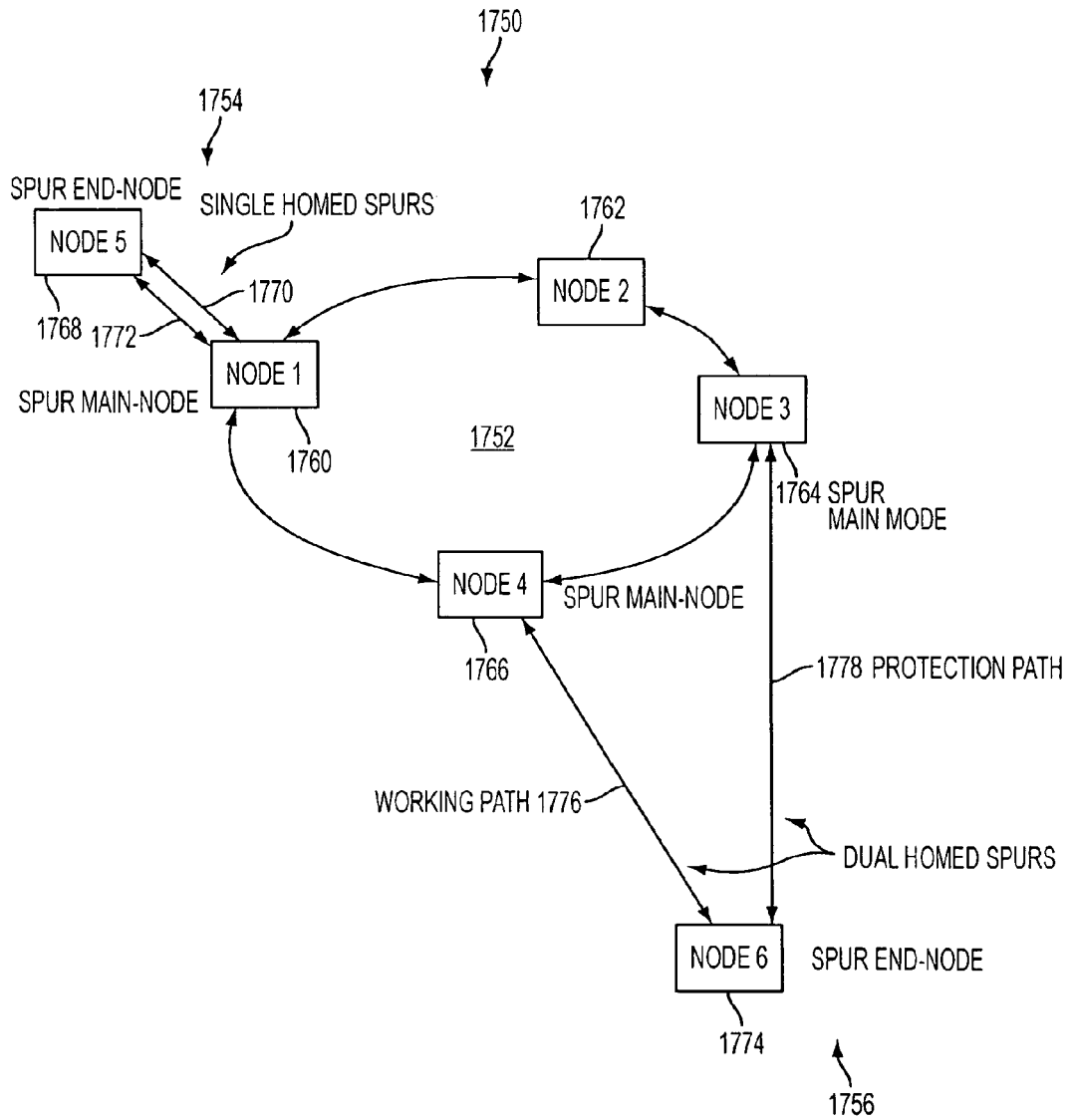
FIG. 29 is a block diagram of an example embodiment of an optical network having a dual homed spur.

FIG. 29 illustrates an example embodiment of an optical network 1750 that includes a protected DWDM ring 1752 (that can include nodes 1-4 denoted as nodes 1760, 1762, 1764, and 1766), a single, homed protected spur 1754, and a dual, homed, protected spur 1756, though the network is not limited to this number of spurs and nodes. The single, homed protected spur 1754 can include a spur end node having node 5 (denoted as node 1768), a spur main node having node 1760, and two bi-directional optical fibers 1770 and 1772 connecting the two, though it is not limited to this number of elements. The dual, homed protected spur 1756 can include a spur end node having node 6 (denoted as node 1774) a spur main node including two nodes of the ring 1752, nodes 1764 and 1766, a bi-directional optical fiber 1776 connecting the node 1774 to node 1766, and bi-directional optical fiber 1778 connecting node 1774 to node 1764.

It is within the scope of this example embodiment for the network 1750 to include additional elements not shown in FIG. 29 and for the nodes and bidirectional optical fiber to be replaced by other components that perform the same or similar function. It is also within the scope of the example embodiment to use more or fewer nodes in the ring 1752, the spur main node, and the spur end node than are shown in FIG. 29.

Figure 30A:
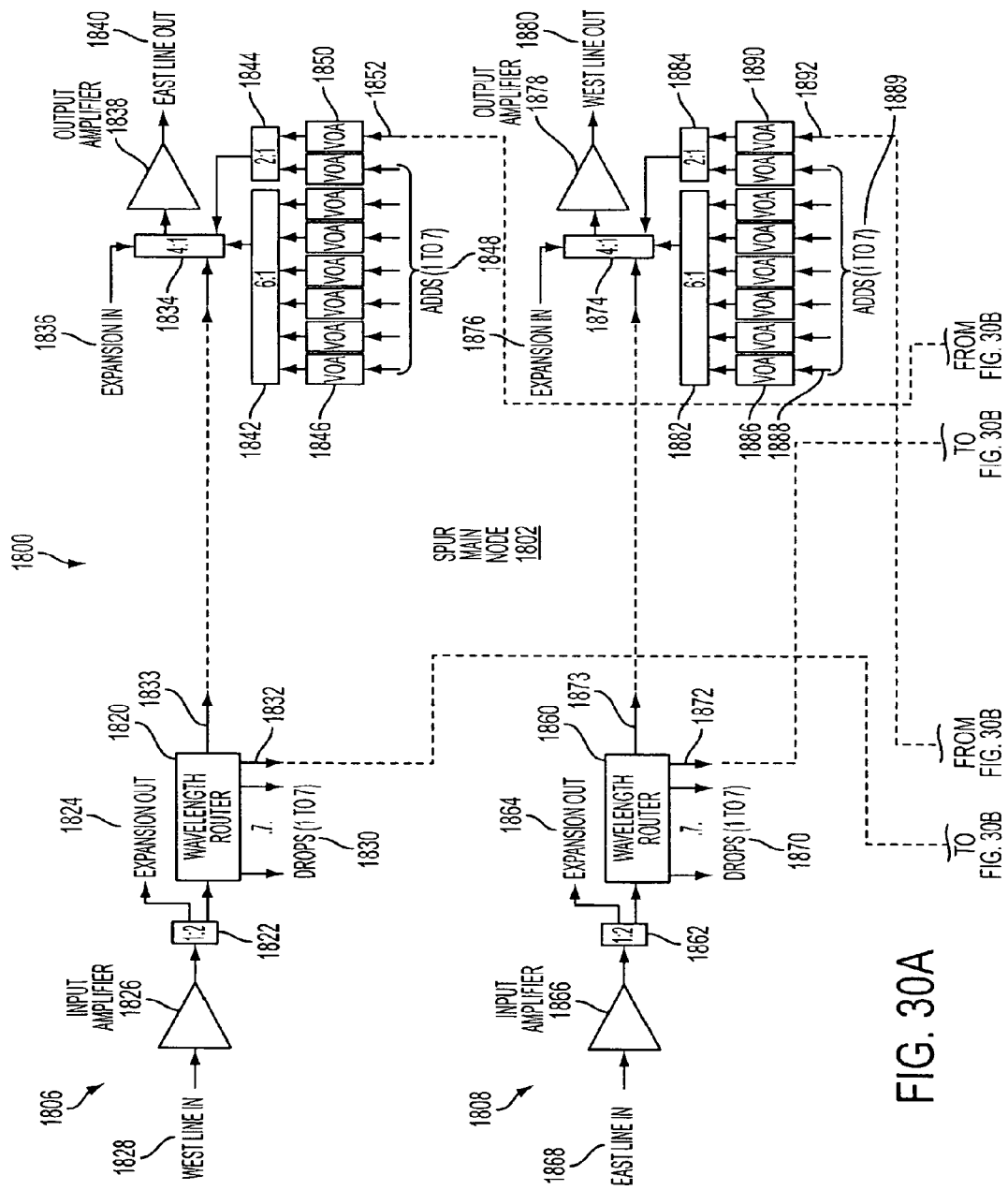
FIG. 30 is a block diagram of optical node example embodiment #4 having type-1 ROADMs and two optical spurs.
Figure 30B:
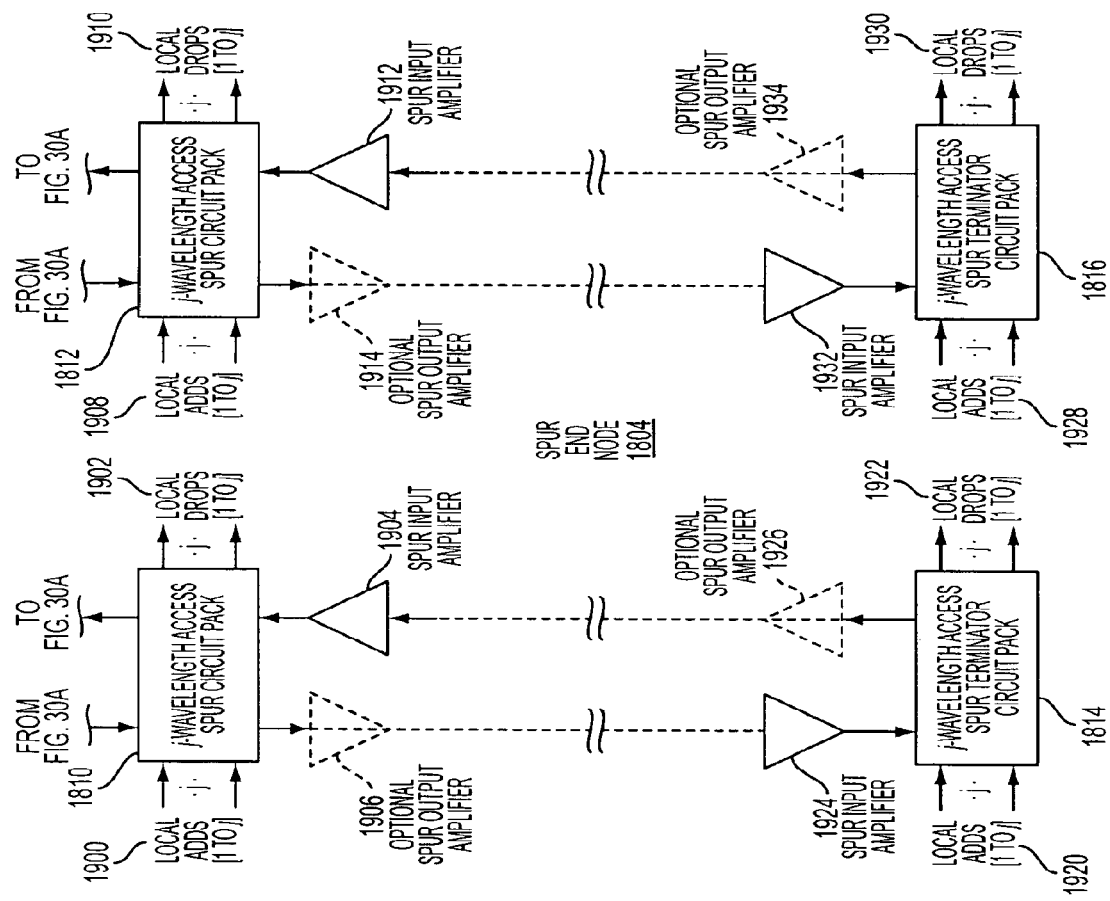

FIG. 30 illustrates an example embodiment of optical node example embodiment #4, including two optical spurs, and East and West ROADMs, which can be the same as, for example, the ROADM example embodiment #3, although they are not limited thereto. FIG. 30 illustrates in detail how the optical spurs can be connected to the East and West ROADMs. As can be seen in FIG. 30, the optical spurs can include two additional types of circuit packs: the j-wavelength access spur circuit pack and the j-wavelength access spur terminator circuit pack. The ROADM circuit packs and the j-wavelength access spur circuit packs can be located at the spur main-node (see FIG. 28), and the j-wavelength access spur terminator circuit packs can be located at the spur end-node (see FIG. 28), although they are not limited to being placed at these locations. It is within the scope of the example embodiment for the distance between the spur main-node and the spur end-node to determine the gain of the input amplifiers associated with the spur. It is also within the scope of the example embodiment for this distance also to determine whether or not output amplifiers are used on the spur (shown as optional in FIG. 30). But other examples can be provided in which the distance between the spur main-node and the spur end-node does not determine the gain of the input amplifiers associated with the spur or whether output amplifiers are used on the spur.

FIG. 30 shows an optical network 1800 that can include a spur main node 1802 and a spur end node 1804. The spur main node 1802 can include a west ROADM 1806, an east ROADM 1808, and j wavelength access spur circuit packs 1810 and 1812. The spur end node 1804 can include j wavelength access spur terminator circuit packs 1814 and 1816.

The west ROADM 1806 can include a type-4 wavelength router 1820 that can receive optical signals output from a type-1, 1:2 light combiner 1822, which also outputs optical signals to an expansion out port 1824. The light combiner 1822 can receive optical signals from an input amplifier 1826, which in turn can receive optical signals from the west line in port 1828. The type-4 wavelength router 1820 can also drop optical signals from seven drop ports 1830 and can output optical signals on an add port 1832 that can function as an express port to output optical signals from the light combiner 1820 to the express in port of the j wavelength access spur circuit pack 1810. The light combiner 1820 can also output an optical signal on express out port 1833 to a type-1, 4:1 light combiner 1834 of the east ROADM 1808.

The east ROADM 1808 also can include an expansion in port 1836 inputting optical signals into the light combiner 1834, an output amplifier 1838 that can receive the output of light combiner 1834, east line out port 1840 that can receive the output of the amplifier 1838, type-1A light combiners 1842 (a 6:1 light combiner) and 1844 (a 2:1 light combiner) that can output optical signals into the light combiner 1834, seven VOAs 1846 that can output optical signals into the light combiner 1842 and 1844 and that can each receive optical signals from one of seven add ports 1848 in a first set of add ports that function as add ports in this implementation, one VOA 1850 that can output an optical signal into the light combiner 1844, and an add port 1852 that can output optical signals to the VOA 1850 and that can function as an express port to receive optical signals from the express out port of the j wavelength access spur circuit pack 1812. The east ROADM 1808 can also include a type-4 wavelength router 1860 that can receive optical signals output from a type-1, 1:2 light combiner 1862, which can also output optical signals to an expansion out port 1864. The light combiner 1862 can receive optical signals from an input amplifier 1866, which in turn can receive optical signals from the west line in port 1868. The light distributor 1860 can also drop optical signals from seven drop ports 1870 and can output optical signals on an add port 1872 that can function as an express port to output optical signals from the light distributor 1860 to the express in port of the j wavelength access spur circuit pack 1812. The light distributor 1860 can also output an optical signal on express out port 1873 to a type-1, 4:1 light combiner 1874 of the west ROADM 1806.

The west ROADM 1806 can further include an expansion in port 1876 inputting optical signals into the light combiner 1874, an output amplifier 1878 that can receive the output of light combiner 1874, a west line out port 1880 that can receive the output of the amplifier 1878, type-1A light combiners 1882 (a 6:1 light combiner) and 1884 (a 2:1 light combiner) that can output optical signals into the light combiner 1874, seven VOAs 1886 that can output optical signals into the light combiner 1882 and 1884 and that can each receive optical signals from one of seven add ports 1889 in a first set of add ports that function as add ports in this implementation, one VOA 1890 that can output an optical signal into the light combiner 1884, and an add port 1892 that can output optical signals to the VOA 1890 and that can function as an express port to receive optical signals from the express out port of the j wavelength access spur circuit pack 1810.

The j wavelength access spur circuit pack 1810 can also include j add ports 1900, and j drop ports 1902. A spur input amplifier 1904 can receive optical signals from the j wavelength access spur terminator circuit pack 1814 and transmit amplified optical signals to the j wavelength access spur circuit pack 1810. An optional spur output amplifier 1906 can receive optical signals from the j wavelength access spur circuit pack 1810 and transmit amplified optical signals to the j wavelength access terminator spur circuit pack 1814.

The j wavelength access spur circuit pack 1812 can also include j add ports 1908, and j drop ports 1910. A spur input amplifier 1912 can receive optical signals from the j wavelength access spur terminator circuit pack 1816 and transmit amplified optical signals to the j wavelength access spur circuit pack 1812. An optional spur output amplifier 1914 can receive optical signals from the j wavelength access spur circuit pack 1812 and transmit amplified optical signals to the j wavelength access terminator spur circuit pack 1816.

The j wavelength access spur terminator circuit pack 1814 can also include j add ports 1920, and j drop ports 1922. A spur input amplifier 1924 can receive optical signals from the j wavelength access spur circuit pack 1810 and transmit amplified optical signals to the j wavelength access spur terminator circuit pack 1814. An optional spur output amplifier 1926 can receive optical signals from the j wavelength access spur terminator circuit pack 1814 and transmit amplified optical signals to the j wavelength access spur circuit pack 1810.

The j wavelength access spur circuit pack 1816 can also include j add ports 1928, and j drop ports 1930. A spur input amplifier 1932 can receive optical signals from the j wavelength access spur circuit pack 1812 and transmit amplified optical signals to the j wavelength access spur terminator circuit pack 1816. An optional spur output amplifier 1934 can receive optical signals from the j wavelength access spur terminator circuit pack 1816 and transmit amplified optical signals to the j wavelength access spur circuit pack 1812.

Each j wavelength access spur circuit pack 1810, 1812 can route a first set of wavelengths sent from its corresponding wavelength router 1820, 1860 to the corresponding j-wavelength access spur terminator circuit pack 1814, 1816 within the spur end node 1804 where the wavelengths can be dropped out of the corresponding local drop ports 1922 1930. At each j wavelength access spur circuit pack 1810 1812, a second set of wavelengths can be inputted into the local add inputs 1900, 1908, and then forwarded by the j wavelength access spur circuit pack 1810, 1812 to the corresponding j-wavelength access spur terminator circuit pack 1814, 1816 within the spur end node 1804 where the wavelengths can be dropped out of the corresponding local drop ports 1922, 1930.

At each j-wavelength access spur terminator circuit pack 1814, 1816 within the spur end node 1804, a third and fourth set of wavelengths can be inputted into the local add ports 1920 and 1928. Each j-wavelength access spur terminator circuit pack 1814, 1816 can then forward the third and fourth set of wavelengths to its corresponding j wavelength access spur circuit pack 1810, 1812. At each j wavelength access spur circuit pack 1810, 1812, the third set of wavelengths can be outputted from the corresponding local drop ports 1902, 1910, and the fourth set of wavelengths can be routed from each j wavelength access spur circuit pack 1810, 1812 to the corresponding ROADM 1808, 1806 where the fourth set of wavelengths can be outputted to the corresponding Line Out port 1880, 1840.

In summary, in the FIG. 30 example embodiment, a wavelength arriving at a given Line In port 1828, 1868 can be routed either to the spur end node 1804 or to the Line Out port 1840, 1880 of the opposite ROADM. A wavelength added at the spur end node may be routed to either the local drop port of a j wavelength access spur circuit pack 1810, 1812 or to a corresponding Line Out port 1840, 1880.

The type-1 light distributors, the type-1 light combiners, the type-1A light combiners, the type-4 light distributors, and the VOAs shown in FIG. 30 can be the same as, for example, the type-1 light distributor 24, the type-1 light combiner 30, the type-1A light combiner 44, the type-4 light distributor 76, and the VOAs 48, respectively, as shown in FIGS. 2A, 2B, 3B, 6, and 3B, although they are not limited thereto. In addition, the type-1 light distributors, the type-1 light combiners, the type-1A light combiners, the type-4 light distributors, and the VOAs shown in FIG. 30 can be the same as, or different from, the type-1 light combiner 142, the type-1A light combiner 148, the type-4 light distributor 132, and VOAs 150 shown in FIG. 10A. Also, the ROADMs 1806, and 1808, the spur circuit packs 1810-1816, and the node 1800 can include more than the number of components shown in FIG. 30, and it is within the scope of this example embodiment for any of the ROADMs, spur circuit packs, amplifiers, type-1 light distributors, the type-1 light combiners, the type-1A light combiners, the type-4 light distributors, and the VOAs shown in FIG. 30 to be replaced by any other suitable component (or components) that performs (or perform) the same or similar functions thereof, as discussed above.

Figure 31:
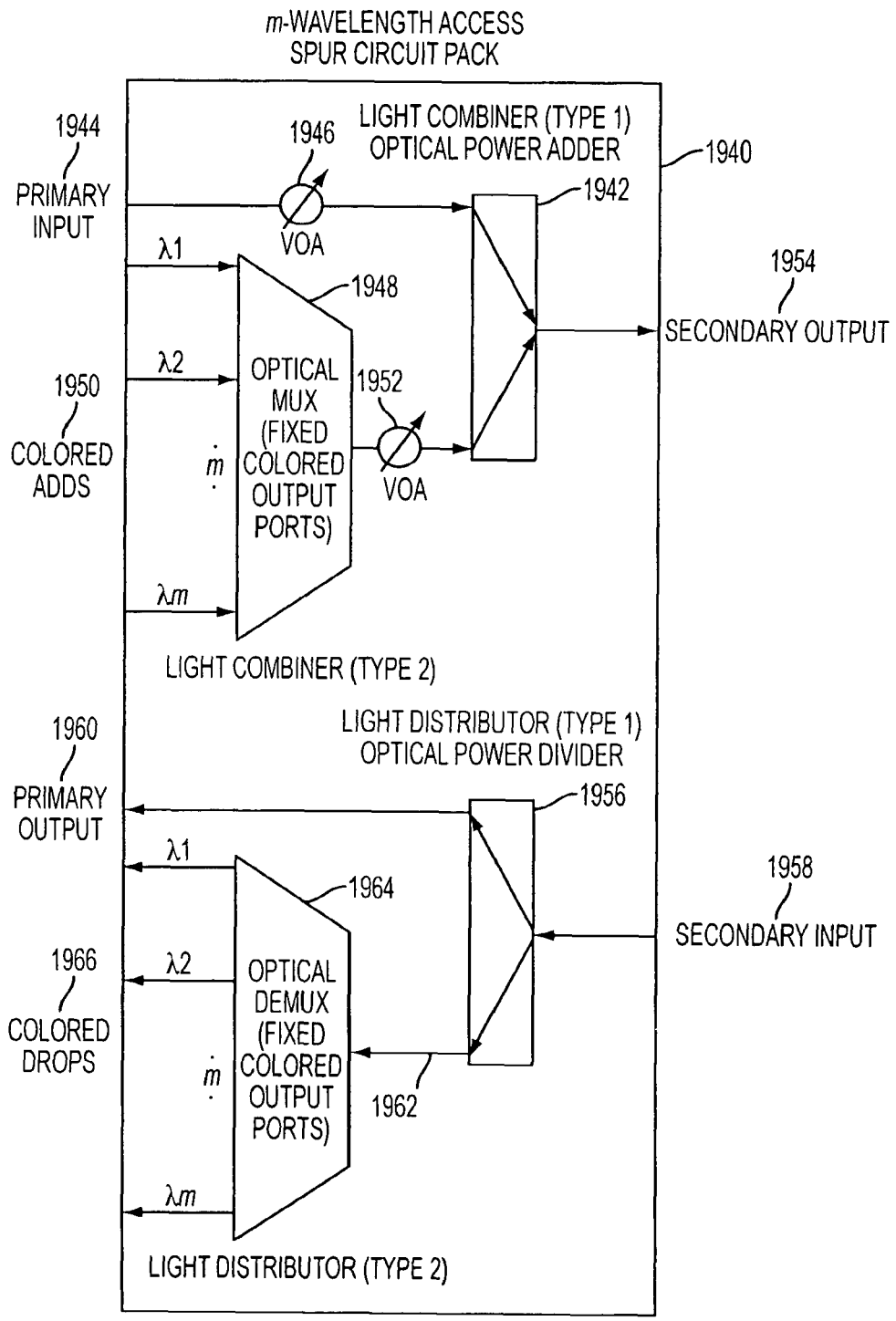
FIG. 31 is a block diagram of an example embodiment of one type of j-wavelength access spur circuit pack comprising type-1 and type-2 light combiners and type-1 and type-2 light distributors.

FIG. 31 shows an example embodiment of one type of j-wavelength access spur circuit pack 1940. The j-wavelength access spur circuit packs 1810 and 1812 shown in FIG. 30 can be the same as or different from this circuit pack 1940. For this example embodiment, j, which represents the number of add ports on the j-wavelength access spur circuit pack, can be equal to m, where m is the total number of wavelengths supported by the DWDM network to which the spur circuit pack 1940 is attached. But in other example embodiments of the j-wavelength access spur circuit pack, j is not equal to m. It is within the scope of the example embodiment for m to be equal to 32, 40, or 44 wavelengths, or some other number of wavelengths. Due to the relative simplicity of the FIG. 31 circuit pack 1940, it can designed to be a low cost apparatus for supporting optical spurs within the spur main-node. As can be seen in FIG. 31, the j-wavelength access spur circuit pack 1940 can include a type-1 light combiner 1942 that can receive optical signals from a primary input 1944 that passes through a VOA 1946, a type-2 light combiner 1948 that can receive optical signals from colored add ports 1950 and can output multiplexed signals into a VOA 1952, which outputs optical signals into the light combiner 1942, a secondary output 1954 to which the light combiner 1942 can output optical signals, a type-1 light distributor 1956 that can receive optical signals from a secondary input 1958 and that can output optical signals to a primary output 1960 and can output optical signals along a subtending output 1962 to a type-2 light distributor 1964 that can output single-wavelength optical signals to different colored drop ports 1966. The type-2 light combiner 1948 and the type-2 light distributor 1964 can be the same as, for example, the type-2 light combiner and the type-2 light distributor shown in FIG. 4, respectively, although they are not limited thereto. The type-1 light combiner 1942 and the type-1 light distributor 1956 can be the same as, for example, the type-1 light combiner and the type-1 light distributor shown in FIG. 2, respectively, although they are not limited thereto. The VOAs 1946 and 1952 can be the same as, for example, the VOAs shown in FIG. 3, although they are not limited thereto. It is within the scope of the example embodiment for the j-wavelength access spur circuit pack to include additional elements not shown in FIG. 31 and to replace each of these components thereof with any other suitable component (or components) that performs (or perform) the functions thereof.

Figure 32:
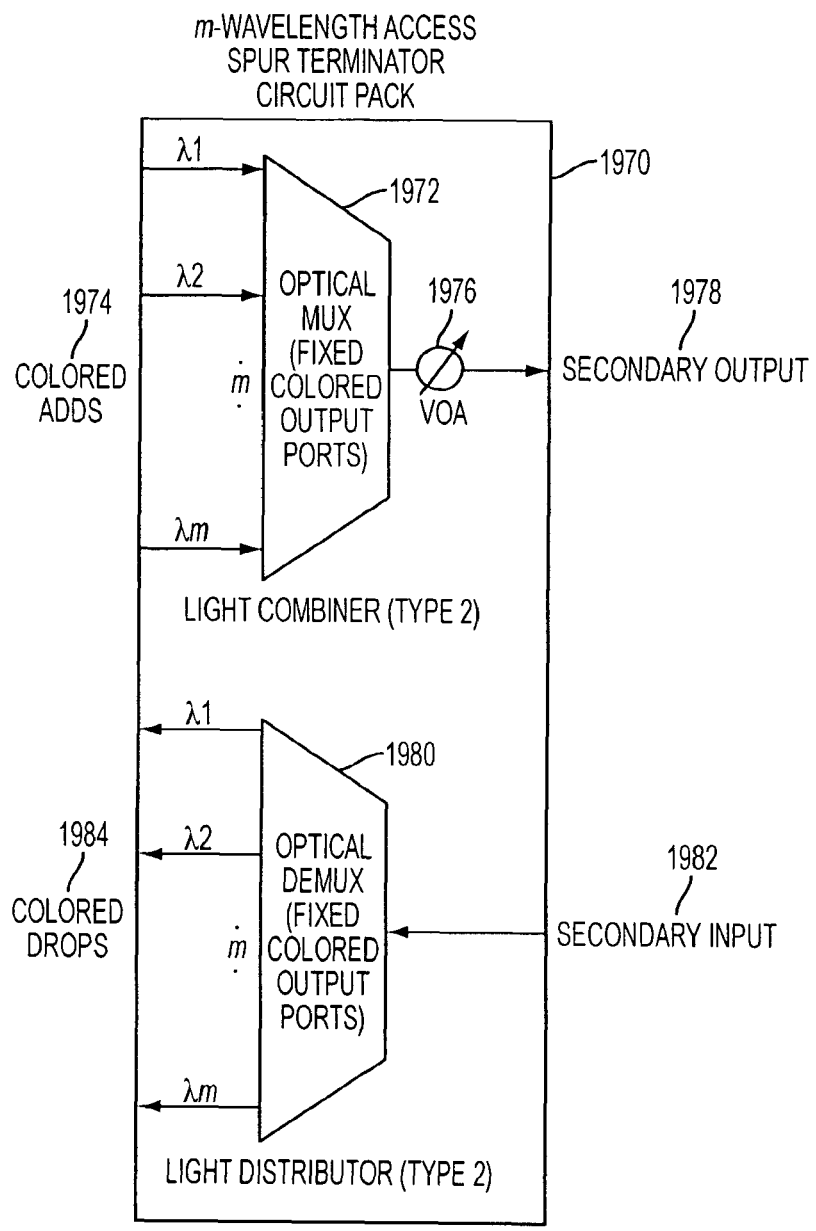
FIG. 32 is a block diagram of an example embodiment of one type of j-wavelength access spur terminator circuit pack comprising a type-2 light combiner, a type-2 light distributor, and a VOA.

FIG. 32 shows an example embodiment of one type of j-wavelength access spur terminator circuit pack 1970. The j-wavelength access spur terminator circuit packs 1814 and 1816 shown in FIG. 30 can be the same as or different from this circuit pack 1940. For this example of a circuit pack, j can be equal to m, where m is the total number of wavelengths supported by the DWDM network to which the spur terminator circuit pack is attached. But in other example embodiments of the j-wavelength access spur terminator circuit pack, j is not equal to m. In one example embodiment, a single circuit pack can be provided to accommodate the circuit packs shown in FIG. 31 and FIG. 32 and the colored port expansion circuit pack of FIG. 26, although separate circuit packs can also be provided for these three types of modules. In addition, a single circuit pack can be provided to accommodate two of the colored port expansion circuit pack of FIG. 26, the spur circuit pack shown in FIG. 31, and the spur terminator circuit pack shown in FIG. 32. As can be seen in FIG. 32, the j-wavelength access spur terminator circuit pack 1970 can include a type-2 light combiner 1972 that can receive optical signals from colored add ports 1974 and that can output multiplexed optical signals to a VOA 1976, which outputs optical signals to a secondary output 1978. The j-wavelength access spur terminator circuit pack 1970 can also include a type-2 light distributor 1980 that can receive an optical signals from a secondary input 1982 and that can output optical signals to colored drop ports 1984. The type-2 light combiner 1972 and the type-2 light distributor 1980 can be the same as, for example, the type-2 light combiner and the type-2 light distributor shown in FIG. 4, respectively, although they are not limited thereto. The VOA 1976 can be the same as, for example, the VOAs shown in FIG. 3, although it is not limited thereto. It is within the scope of the example embodiment for the j-wavelength access spur terminator circuit pack to include additional elements not shown in FIG. 32 and to replace each of these components thereof with any other suitable component (or components) that performs (or perform) the functions thereof.

Figure 33A:
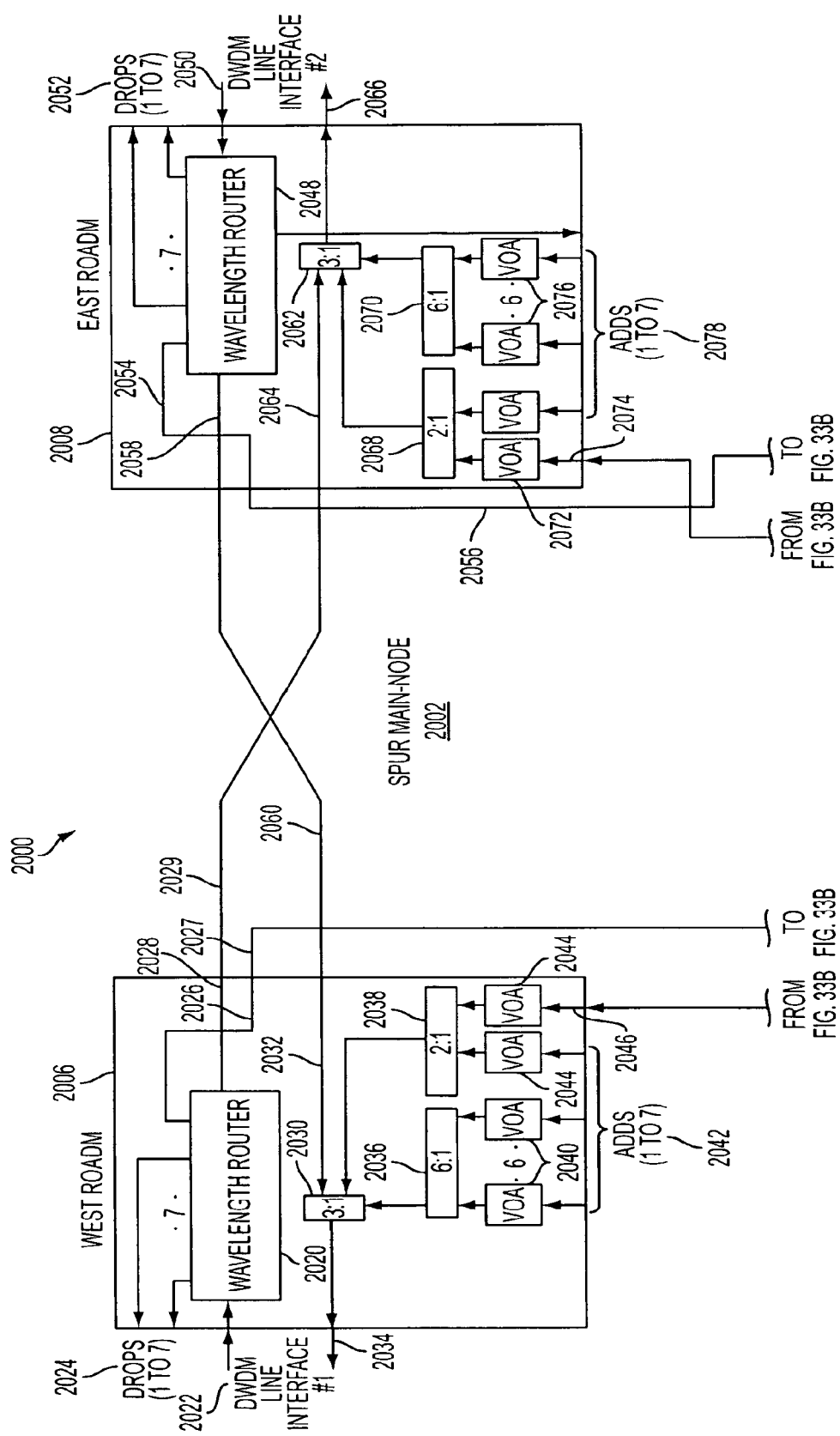
FIG. 33 is a block diagram of another example embodiment of optical node example embodiment #4 having two ROADMs and a single homed protected spur.
Figure 33B:
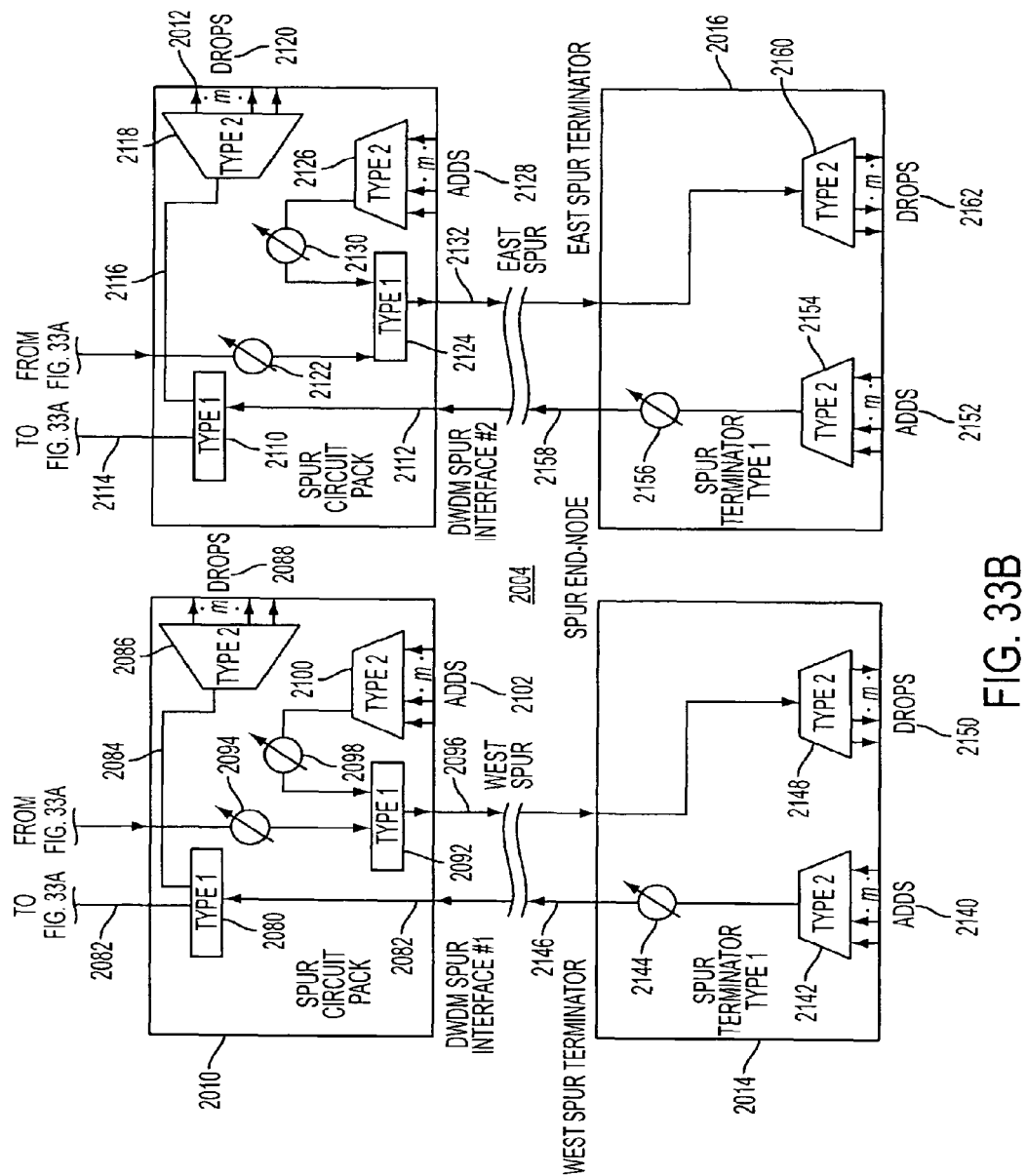

FIG. 33 illustrates a spur network 2000 including a spur main node 2002 and a spur end node 2004. The spur main node 2002 includes two ROADM core devices 2006 and 2008 that can be the same as, for example, the ROADM example embodiment #2, although they are not limited thereto. (It is within the scope of the example embodiment to use ROADM example embodiments #1 and #3, or any of the other ROADMs described herein, in the node shown in FIG. 33 without loss of functionality.) The spur main node 2002 can also include two spur circuit packs 2010 and 2012 that can be the same as, for example, the j-wavelength access spur circuit pack shown in FIG. 31, although they are not limited thereto. The spur end node 2004 can include two spur terminator circuit packs 2014 and 2016 that can be the same as, for example, the j-wavelength access spur terminator circuit pack shown in FIG. 32, although they are not limited thereto. The two spur terminator circuit packs 2014 and 2016 shown in FIG. 33 are also called type-1 spur terminators. The optical spur shown in FIG. 33 can include additional components not shown therein and each of the optical components shown therein can be replaced by another suitable component (or components) that performs (or perform) the same function thereof.

The ROADM core device 2006 can comprise a type-4 light distributor 2020 that can receive optical signals input from a DWDM line interface or line in port 2022. The light distributor 2020 can drop optical signals from a first set of seven drop ports 2024 and a second set of drop ports comprising an eighth drop port 2026, although the example embodiment is not limited to this number of drop ports in the two sets. In this implementation, the first set of drop ports 2024 function as drop ports to locally drop optical signals from the distributor 2020. The drop port 2026 in the second set can function in this instance as an express port to output optical signals along an optical fiber 2027 to the j-wavelength access spur circuit pack 2010 (specifically to a VOA 2094 which outputs signals to a type-1 light combiner 2092, which, in turn, outputs optical signals from the circuit pack to the west spur terminator 2014, as will be discussed below). The distributor 2020 can also output optical signals from an express out port 2028 along an optical fiber 2029 to the east ROADM 2008 (and specifically to a type-1, 3:1 light combiner 2062, which outputs received optical signals to a DWDM line out port 2066, as will be discussed below).

The ROADM core device 2006 can further comprise a 3:1, type-1 light combiner 2030 that can receive optical signals from an express input port 2032 (that can receive optical signals from an optical fiber 2060 that receives optical signals output from the type-4 light distributor 2048 of the east ROADM 2008), and can output optical signals to a DWDM line output interface 2034. The type-1 light combiner 2030 can also receive optical signals from two type-1A light combiners 2036 and 2038. The light combiner 1036 can be a 6:1 light combiner that receives optical signals from six VOAs 2040, which each can receive optical signals from one of six add ports 2042. Add ports 2042 constitute part of a first set of add ports that function only as add ports. The light combiner 2038 can be 2:1 light combiner that can receive optical signals from two VOAs 2044, which each can receive optical signals from one of two add ports. One of these add ports is part of the first set of add ports 2042 that functions only as an add port. The other add port, add port 2046, constitutes a second add port set that functions here as an express port to receive optical signals from an optical fiber 2082, which in turn receives optical signals from a type-1 light combiner 2080 in the spur circuit pack 2010, which, in turn, receives optical signals processed and output by the type-2 light combiner 2142 and VOA 2144 of the spur terminator 2014. As a result, the express port 2046 can receive optical signals from the spur terminator 2014.

The type-1 light combiner 2030, the type-1A light combiners 2036 and 2038, the type-4 light distributor 2020, and VOAs 2040 and 2044 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiner 2030, the type-1A light combiners 2036 and 2038, the type-4 light distributor 2020, and VOAs 2040 and 2044 can be the same as, or different from, the type-1 light combiner 142, the type-1A light combiner 148, and the type-4 light distributor 132, and VOAs 150 shown in FIG. 10A. Also, the type-1 ROADM core device 2006 can include more than the number of components shown in FIG. 33, and it is within the scope of this example embodiment for any of the type-1 light combiner 2030, the type-1A light combiners 2036 and 2038, the type-4 light distributor 2020, and VOAs 2040 and 2044 to be replaced by any other suitable component (or components) that performs (or perform) the same or similar functions thereof, as discussed above.

The ROADM core device 2008 can comprise a type-4 light distributor 2048 that can receive optical signals input from a DWDM line interface or line in port 2050. The light distributor 2048 can drop optical signals from a first set of seven drop ports 2052 and a second set of drop ports comprising an eighth drop port 2054, although the example embodiment is not limited to this number of drop ports in the two sets. In this implementation, the first set of drop ports 2052 function as drop ports to locally drop optical signals from the distributor 2048. The drop port 2054 in the second set can function in this instance as an express port to output optical signals along an optical fiber 2056 to the j-wavelength access spur circuit pack 2012 (specifically to a VOA 2122 which outputs signals to a type-1 light combiner 2124, which, in turn, outputs optical signals to the east spur terminator 2016, as will be discussed below). The distributor 2048 can also output optical signals from an express out port 2058 along an optical fiber 2060 to the west ROADM 2006 (and specifically to the type-1, 3:1 light combiner 2030, which outputs received optical signals to the DWDM line out port 2034).

The ROADM core device 2008 can further comprise a 3:1, type-1 light combiner 2062 that can receive optical signals from an express input port 2064 (that can receive optical signals from an optical fiber 2029 that, in turn, receives optical signals output from the type-4 light distributor 2020 of the west ROADM 2006), and can output optical signals to a DWDM line output interface 2066. The type-1 light combiner 2062 can also receive optical signals from two type-1A light combiners 2068 and 2070. The light combiner 2070 can be a 6:1 light combiner that can receive optical signals from six VOAs 2076, which each can receive optical signals from one of six add ports 2078. Add ports 2078 constitute part of a first set of add ports that function only as add ports. The light combiner 2068 can be 2:1 light combiner that can receive optical signals from two VOAs 2072, which each can receive optical signals from one of two add ports. One of these add ports is part of the first set of add ports 2078 that functions only as an add port. The other add port, add port 2074, constitutes a second add port set that functions here as an express port to receive optical signals from an optical fiber 2114, which in turn receives optical signals from a type-1 light combiner 2110 in the spur circuit pack 2012, which in turn, receives optical signals processed and output by the type-2 light combiner 2154 and VOA 2156 of the spur terminator 2016. As a result, the express port 2074 can receive optical signals from the spur terminator 2016.

The type-1 light combiner 2062, the type-1A light combiners 2068 and 2070, the type-4 light distributor 2048, and VOAs 2072 and 2076 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiner 2062, the type-1A light combiners 2068 and 2070, the type-4 light distributor 2048, and VOAs 2072 and 2076 can be the same as, or different from, the type-1 light combiner 142, the type-1A light combiner 148, and the type-4 light distributor 132, and VOAs 150 shown in FIG. 10A. Also, the type-1 ROADM core device 2008 can include more than the number of components shown in FIG. 33, and it is within the scope of this example embodiment for any of the type-1 light combiner 2062, the type-1A light combiners 2068 and 2070, the type-4 light distributor 2048, and VOAs 2072 and 2076 to be replaced by any other suitable component (or components) that performs (or perform) the same or similar functions thereof, as discussed above.

The spur circuit pack 2010 can include a type-1 light distributor 2080 that can receive optical signals from a DWDM line in port 2082, which in turn can receive optical signals from the line out port 2146 of the spur terminator 2014. The light distributor 2080 can output optical signals to an optical fiber 2082 attached to the express port 2046 of the ROADM 2006. The light distributor 2080 can also output optical signals to an optical fiber 2084 connected to a type-2 light distributor 2086, which outputs single-wavelength optical signals to colored drop ports 2088. The spur circuit pack 2010 also can include type-1 light combiner 2092 that can receive optical signals from a VOA 2094, which in turn can receive optical signals from an optical fiber 2027 attached to the drop port 2026 of the light distributor 2020 of the ROADM 2006. The light combiner 2092 can also output optical signals from a DWDM line out port 2096 to the type-2 light distributor 2148 of the spur terminator 2014. The light distributor 2092 can also receive optical signals from a VOA 2098 that can receive optical signals from a type-2 light combiner 2100, which in turn, can receive optical signals from colored add ports 2102. Therefore, signals added at colored add ports 2102 can the transmitted to spur terminator 2014.

The type-1 light distributors 2080 and 2092, the type-2 light distributor 2086, the type-2 light combiner 2100, and the VOAs 2094 and 2098 can be the same as, for example, the type-1 light distributor 24, the type-2 light distributor 52, the type-2 light combiner 58, and the VOAs 48, respectively, as shown in FIGS. 2A, 4A, 4B, and 3B, although they are not limited thereto. In addition, the type-1 light distributors 2080 and 2092, the type-2 light distributor 2086, the type-2 light combiner 2100, and the VOAs 2094 and 2098 can be the same as, or different from, the type-1 light distributor 1956, the type-2 light distributor 1964, the type-2 light combiner 1948, and the VOAs 1946 and 1952 shown in FIG. 31. Also, the spur circuit pack 2010 can include more than the number of components shown in FIG. 33, and it is within the scope of this example embodiment for any of the type-1 light distributors 2080 and 2092, the type-2 light distributor 2086, the type-2 light combiner 2100, and the VOAs 2094 and 2098 to be replaced by any other suitable component (or components) that performs (or perform) the same or similar functions thereof, as discussed above.

The spur circuit pack 2012 can include a type-1 light distributor 2110 that can receive optical signals from a DWDM line in port 2112, which in turn can receive optical signals from the line out port 2158 of the spur terminator 2016. The light distributor 2110 can output optical signals to an optical fiber 2114 attached to the express port 2074 of the ROADM 2008. The light distributor 2110 can also output optical signals to an optical fiber 2116 connected to a type-2 light distributor 2118, which outputs single-wavelength optical signals to colored drop ports 2120. The spur circuit pack 2012 also can include a VOA 2122 that can receive optical signals from an optical fiber 2056 connected to the express out port 2054 of the type-4 light distributor 2048 of the ROADM 2008. The spur circuit pack 2012 also can include type-1 light combiner 2124 that can receive optical signals from the VOA 2122. The spur circuit pack 2012 can also include a type-2 light combiner 2126 that can receive optical signals from colored add ports 2128 and that can output optical signals to a VOA 2130. The VOA 2130 can output optical signals to the light combiner 2124. The light combiner 2124 can also output optical signals from a DWDM line out port 2132 to the type-2 light distributor 2160 of the spur terminator 2016. Therefore, signals added at colored add ports 2128 can the transmitted to spur terminator 2016.

The type-1 light distributors 2110 and 2124, the type-2 light distributor 2118, the type-2 light combiner 2126, and the VOAs 2122 and 2130 can be the same as, for example, the type-1 light distributor 24, the type-2 light distributor 52, the type-2 light combiner 58, and the VOAs 48, respectively, as shown in FIGS. 2A, 4A, 4B, and 3B, although they are not limited thereto. In addition, the type-1 light distributors 2110 and 2124, the type-2 light distributor 2118, the type-2 light combiner 2126, and the VOAs 2122 and 2130 can be the same as, or different from, the type-1 light distributor 1956, the type-2 light distributor 1964, the type-2 light combiner 1948, and the VOAs 1946 and 1952 shown in FIG. 31. Also, the spur circuit pack 2012 can include more than the number of components shown in FIG. 33, and it is within the scope of this example embodiment for any of the type-1 light distributors 2110 and 2124, the type-2 light distributor 2118, the type-2 light combiner 2126, and the VOAs 2122 and 2130 to be replaced by any other suitable component (or components) that performs (or perform) the same or similar functions thereof, as discussed above.

The west spur terminator 2014 can include colored add ports 2140, a type-2 light combiner 2142 that can receive optical signals from the add ports 2140 and that can output multiplexed optical signals to a VOA 2144, which can output optical signals to the line out port 2146, which in turn, can output optical signals to the type-1 light combiner 2080 of the spur circuit pack 2010. The spur terminator 2014 can also include a type-2 light distributor 2148 that can receive optical signals from the light combiner 2092 of the spur circuit pack 2010 and that can output optical signals to colored drop ports 2150.

The east spur terminator 2016 can include colored add ports 2152, a type-2 light combiner 2154 that can receive optical signals from the add ports 2152 and that can output multiplexed optical signals to a VOA 2156, which can output optical signals to the line out port 2158, which in turn, can output optical signals to the type-1 light combiner 2110 of the spur circuit pack 2012. The spur terminator 2016 can also include a type-2 light distributor 2160 that can receive optical signals from the light combiner 2124 of the spur circuit pack 2012 and that can output optical signals to colored drop ports 2162.

The type-2 light distributors 2148 and 2160, the type-2 light combiners 2142 and 2154, and the VOAs 2144 and 2156 can be the same as, for example, the type-2 light distributor 52, the type-2 light combiner 58, and the VOAs 48, respectively, as shown in FIGS. 4A, 4B, and 3B, although they are not limited thereto. In addition, the type-2 light distributors 2148 and 2160, the type-2 light combiners 2142 and 2154, and the VOAs 2144 and 2156 can be the same as, or different from, the type-2 light distributor 1980, the type-2 light combiner 1972, and the VOA 1976 shown in FIG. 32. Also, the spur terminator packs 2014 and 2016 can include more than the number of components shown in FIG. 33, and it is within the scope of this example embodiment for any of the type-2 light distributors 2148 and 2160, the type-2 light combiners 2142 and 2154, and the VOAs 2144 and 2156 to be replaced by any other suitable component (or components) that performs (or perform) the same or similar functions thereof, as discussed above.

In FIG. 33, wavelengths arriving on the DWDM line interface 2022 of the west ROADM 2006 can be directed to the west spur circuit pack 2010 by routing the desired wavelengths to drop port 8/express port 2 (port 2026) of the wavelength router 2020 on the west ROADM 2006, although the example embodiment is not limited to this particular routing of wavelengths from the DWDM line interface 2022 to the west spur circuit pack 2010. Using VOA 2094, these wavelengths can then be power balanced (as an aggregate) with the wavelengths locally added (via transponder modules) to the spur via the add ports 2102 and the type-2 light combiner 2100 on the spur circuit pack 2010, although it is within the scope of the example embodiment to refrain from such power balancing. (Traffic that runs only between the spur circuit pack 2010 in the spur main-node 2002 and the spur terminator circuit pack 2014 in the spur end-node 2004 is referred to as "local traffic".) All wavelengths directed from the wavelength router 2020 of the west ROADM 2006 and all the wavelengths added locally at the add ports 2102 arrive at the remote spur end-node 2004, where they can be demultiplexed and routed to the individual drop ports 2150 on the spur terminator circuit pack 2014. Wavelengths arriving on the DWDM line interface 2050 of the east ROADM 2008 can be directed to the east spur circuit pack 2012 and the spur terminator 2016 in a similar manner, although it is within the scope of the example embodiment to route such wavelengths to the spur terminator circuit pack 2016 in a different way than wavelengths arriving at the west ROADM 2006 are directed to the spur terminator 2014. To keep the local traffic separate from optical traffic transmitted from the ROADM cores 2006 and 2008 to the spur end node 2004, wavelengths added locally at the spur circuit packs 2010 and 2012 can be of a different wavelength than optical signals being directed to the spur via the corresponding wavelength router 2020 and 2048. However, any wavelength that is not being directed from the wavelength router 2020, 2048 to the spur circuit pack 2010, 2012, can be added locally at the spur circuit pack 2010 and 2012.

In the opposite direction, wavelengths can be applied to the type-2 light combiner 2142 of the west spur terminator 2014 (via transponders) in order to be routed to the spur main-node 2002. At the spur main node 2002, all wavelengths from the spur end-node 2004 can be both dropped locally at the spur circuit pack 2010 at drop ports 2088 and forwarded to the DWDM line interface 2034 via the west ROADM 2006. To avoid wavelength contention, optical signals locally added to the add ports 2042 of the west ROADM 2006 can be of a different wavelength than optical signals from the spur end node 2004 and optical signals from the east ROADM express out port 2058. Wavelengths that are destined only for transponders connected to the drop ports 2088 of the spur circuit pack 2010 (i.e., local traffic) can be terminated at the next node attached to the West ROADM 2006, as will be discussed below. Wavelengths added at add ports 2152 to the east spur terminator 2016 can follow a similar path through the east spur circuit pack 2012 and the east ROADM 2008, although it is within the scope of the example embodiment for such added wavelengths to follow a different path.

Figure 34A:
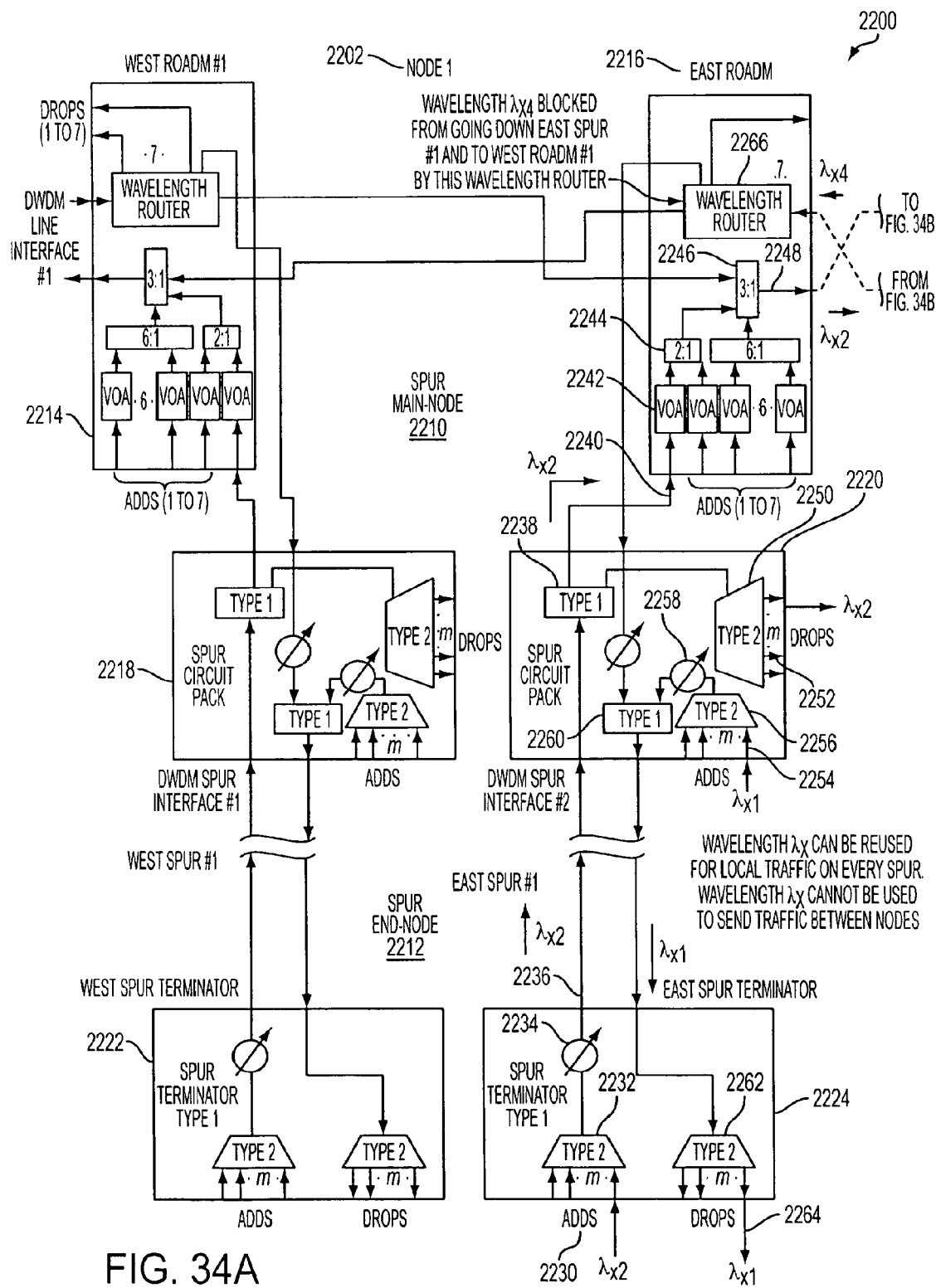
FIG. 34 is a block diagram of example embodiment of an optical network that includes two optical nodes, one or both of which can be optical node example embodiment #4 and in which local-traffic wavelengths in one node are terminated in the next node.
Figure 34B:
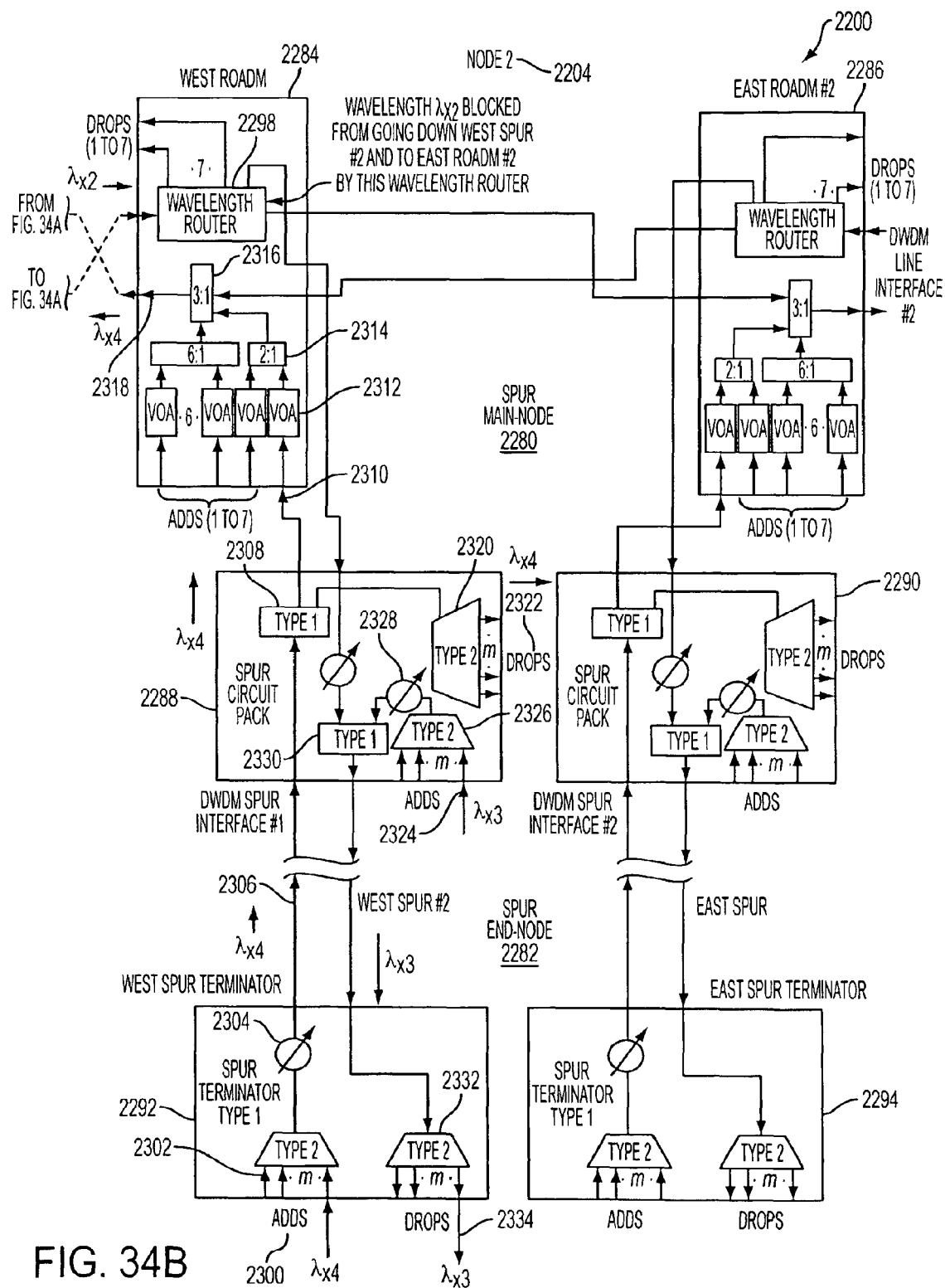

FIG. 34 illustrates how wavelengths that can be sent to the drop ports of a spur circuit pack can also be terminated at the next optical node. FIG. 34 shows an example embodiment of an optical network 2200 including an example embodiment of the optical node example embodiment #4, although it is not limited to node example embodiment #4. The two optical nodes 2202 and 2204 shown in FIG. 34 can be the same as, for example, the optical node shown in FIG. 30 or 33, although they are not limited thereto. The node 2202 can comprise a spur main node 2210 and a spur end node 2212, and the node 2204 can comprise a spur main node 2280 and a spur end node 2282. The spur main node 2210 of node 2202 and the spur main node 2280 of node 2204 can each include two m-wavelength access spur circuit packs 2218, 2220, and 2288, 2290, respectively, which can each be the same as, for example, the m-wavelength access spur circuit pack shown in FIG. 31, although they are not limited thereto. The spur end nodes 2212 and 2282 can each include two m-wavelength access spur terminator circuit packs 2222, 2224, and 2292, 2294, which can each be the same as, for example, the m-wavelength access spur terminator circuit pack shown in FIG. 32, although they are not limited thereto. In addition, the ROADMs 2214, 2216, 2284, and 2286 can be the same as or different from any of the ROADMs disclosed herein.

The network 2200 can contain more than the number of nodes shown in FIG. 34 and the nodes 2202 and 2204 can be replaced by any other component (or components) that performs (or perform) the same or a similar function. In addition, the elements within nodes 2202 and 2204 can be replaced by any other component (or components) that performs (or perform) the same or a similar function. Also, the components within the ROADMs and spur circuit packs in nodes 2202 and 2204 can be the same as or different from the ROADM and spur circuit pack components disclosed herein. Further, the nodes 2202 and 2204, the ROADMs 2214, 2216, 2284, and 2286, the spur terminator circuit packs 2222, 2224, and 2292, 2294, and the spur circuit packs 2218, 2220, and 2288, 2290 can contain additional components not shown in FIG. 34.

The node spur main node 2210 of the node 2202 can include a west ROADM 2214, an east ROADM 2216, and spur circuit packs 2218 and 2220. The spur end node 2212 can include west spur terminator 2222 and an east spur terminator 2224. The east spur of the node 2202, which includes the east ROADM 2216, the east spur circuit pack 2220, and the east spur terminator 2224 will be described below. The west spur of the node 2202, which includes the west ROADM 2214, the west spur circuit pack 2218, and the west spur terminator 2222 will not be further described, but the description of the east spur of node 2202 can apply to the west spur of node 2202.

A wavelength $\lambda_{x2}$ entering an add port 2230 of the east spur terminator 2224 can pass through a type-2 light combiner 2232, which can combine this wavelength with other wavelengths added at other add ports 2230 and output a multiplexed signal to a VOA 2234. The VOA 2234 can output the wavelength $\lambda_{x2}$ to a line out port, which can output the wavelength $\lambda_{x2}$ to an optical fiber 2236 connected to a type-1 light distributor 2238 of the spur circuit pack 2220. The light distributor 2238 can output the wavelength $\lambda_{x2}$ to an add/express port 2240 of the east ROADM 2216. The output of the add/express port 2240 can be transmitted to a VOA 2242, which can output the wavelength $\lambda_{x2}$ to a type-1, 2:1 light combiner 2244 (which also receives optical signals from another add port of the ROADM 2216 that functions only as an add port). The light combiner 2244 can output the wavelength $\lambda_{x2}$ to a type-1, 3:1 light combiner 2246 (which can also receive optical signals from the wavelength router of the ROADM 2214 and from a type-1, 6:1 light combiner that receives optical signals locally added to the ROADM 2216). The type-1, 3:1 light combiner 2246 can also output the wavelength $\lambda_{x2}$ to a line out port 2248 of the ROADM 2216, which can output the wavelength $\lambda_{x2}$ to the wavelength router 2298 of the ROADM 2284 of the node 2204. The wavelength router 2298 can then be used to block wavelength $\lambda_{x2}$ from propagating any further, so that the wavelength can be reused to support local traffic on the west spur of node 2. In addition, the light combiner 2238 can output the wavelength $\lambda_{x2}$ to a type-2 light distributor 2250, which can output the wavelength $\lambda_{x2}$ to a colored drop port 2252 of the spur circuit pack 2220.

A wavelength $\lambda_{x1}$ (which is of the same frequency as wavelength $\lambda_{x2}$) can be added at an add port 2254 of the spur circuit pack 2220, which can output wavelength $\lambda_{x1}$ to type-2 light combiner 2256, which also can receive optical signals from other add ports 2254. The light combiner 2256 can output the wavelength $\lambda_{x1}$ to a VOA 2258, which in turn, outputs the wavelength $\lambda_{x1}$ to a type-1 light combiner 2260 (which also can receive optical signals output from the wavelength router 2266 of the ROADM 2216). The light combiner 2260 can output the wavelength $\lambda_{x1}$ to a type-2 light distributor 2262 of the spur terminator 2224, which can output the wavelength $\lambda_{x1}$ to a drop port 2264 of the spur terminator 2224.

The wavelength $\lambda_{x1}$ can be reused for local traffic on every spur in the network 2200, but the network 2200 can be configured so that the wavelength $\lambda_{x1}$ is not used to send traffic between the nodes 2202 and 2204 to prevent wavelength contention. More specifically, the network can be configured (though it need not be) so that if a wavelength $\lambda_x$ (which is of the same frequency as wavelength $\lambda_{x1}$ and $\lambda_{x2}$) arrives on the line input of West ROADM 2214, that wavelength cannot be forwarded to East ROADM 2216 and then in turn forwarded to Node 2 if a wavelength of the same frequency is being used to support local traffic between spur circuit pack 2220 and spur terminator 2224 (other wise wavelength contention will occur). Also, the network can be configured (though it need not be) so that a wavelength $\lambda_x$ (which is of the same frequency as wavelength $\lambda_{x1}$ and $\lambda_{x2}$) cannot be added to the add ports of ROADM 2216 if a wavelength of the same frequency is being used to support local traffic between spur circuit pack 2220 and spur terminator 2224 (other wise wavelength contention will occur). More generally, wavelengths $\lambda_x$ added locally at any of the spur circuit packs of the network 2200 can be reused for local traffic on every spur in the network 2200, but the network 2200 can be configured so that the wavelengths $\lambda_x$ are not used to send traffic between the nodes 2202 and 2204 to prevent wavelength contention.

The wavelength router 2266 of the ROADM 2216 can receive a wavelength $\lambda_{x4}$ (which is of the same frequency as wavelength $\lambda_{x1}$ and $\lambda_{x2}$, and is used for local traffic on the west spur in node 2) from a light combiner 2316 of the ROADM 2284 of node 2204. The wavelength router 2266 can be configured to block wavelength $\lambda_{x4}$ from being transmitted out of ROADM 2216 to the east spur of the node 2202 and to the west ROADM 2214, (so as not to cause wavelength contention with $\lambda_{x1}$) although it can be configured not to do so.

The wavelength $\lambda_{x4}$ can originate at an add port 2300 of the west spur terminator 2292 of the node 2204. The add port 2300 can output the wavelength $\lambda_{x4}$ to a type-2 light combiner 2302, which can also receive other wavelengths added at other add ports 2300 and output the wavelength $\lambda_{x4}$ to a VOA 2304. The VOA 2304 can output the wavelength $\lambda_{x4}$ to a line out port of the spur terminator 2292 connected to an optical fiber 2306 that is, in turn, connected to a type-1 light distributor 2308 of the spur circuit pack 2288. The light distributor 2308 can output the wavelength $\lambda_{x4}$ to an add/express port 2310 of the west ROADM 2284. The output of the add/express port 2310 can be transmitted to a VOA 2312, which can output the wavelength $\lambda_{x4}$ to a type-1, 2:1 light combiner 2314 (which also can receive optical signals from another add port of the ROADM 2284 that functions only as an add port). The light combiner 2314 can output the wavelength $\lambda_{x4}$ to a type-1, 3:1 light combiner 2316 (which can also receive optical signals from the wavelength router of the ROADM 2286 and from a type-1, 6:1 light combiner that receives optical signals locally added to the ROADM 2284). The type-1, 3:1 light combiner 2316 can output the wavelength $\lambda_{x4}$ to a line out port 2318 (of the ROADM 2284), which can output the wavelength $\lambda_{x4}$ to the wavelength router 2266 of the ROADM 2216 of the node 2202, which can block the wavelength $\lambda_{x4}$ from exiting the router 2266 (in order to prevent contention, if a wavelength of the same frequency is being used to carry local traffic on the east spur of node 1), although it is not required to configure the router 2266 do so. In addition, the light combiner 2308 can output the wavelength $\lambda_{x4}$ to a type-2 light distributor 2320, which can output the wavelength $\lambda_{x4}$ to a colored drop port 2322 of the spur circuit pack 2288.

A wavelength $\lambda_{x3}$ (which is of the same frequency as wavelength $\lambda_{x1}$, $\lambda_{x2}$ and $\lambda_{x4}$) can be added at an add port 2324 of the spur circuit pack 2288, which can output wavelength $\lambda_{x3}$ to type-2 light combiner 2326, which also can receive optical signals from other add ports 2324. The light combiner 2326 can output the wavelength $\lambda_{x3}$ to a VOA 2328, which in turn, can output the wavelength $\lambda_{x3}$ to a type-1 light combiner 2330 (which also can receive optical signals output from the wavelength router 2298 of the ROADM 2284). The light combiner 2330 can output the wavelength $\lambda_{x3}$ to a type-2 light distributor 2332 of the spur terminator 2292, which can output the wavelength $\lambda_{x3}$ to a drop port 2334 of the spur terminator 2292.

The wavelength $\lambda_{x3}$ can be reused for local traffic on every spur in the network 2200, but the network 2200 can be configured so that the wavelength $\lambda_{x3}$ is not used to send traffic between the nodes 2202 and 2204 to prevent wavelength contention.

The wavelength router 2298 of the ROADM 2284 can receive a wavelength $\lambda_{x2}$ from a light combiner 2246 of the ROADM 2216. The wavelength router 2298 can be configured to block wavelength $\lambda_{x2}$ from being transmitted out of the ROADM 2284 to the west spur of the node 2204 and to the west ROADM 2286, although it is not required to configure the router 2298 to do so.

To summarize, at the east spur terminator 2224 of the spur of Node 1 (node 2202), a wavelength x ($\lambda_{x2}$) can be added to the spur for the purpose of dropping the wavelength at the east spur circuit pack 2220 of Node 1. However, as can be seen in FIG. 34, there is nothing in Node 1 to block this same wavelength from arriving at Node 2 (node 2204). However, at Node 2, the wavelength $\lambda_{x2}$ can be prevented from propagating down the west spur (comprising the spur circuit pack 2288 and spur terminator 2292) of node 2204 by the wavelength router 2298 of the west ROADM 2284 of Node 2, although the wavelength router 2298 can also be configured to enable such propagation down this west spur. Therefore, an optical signal of the same wavelength can be reused for local traffic on all spurs of a network constructed using optical node example embodiment #4. (In FIG. 34, the wavelength x ($\lambda_x$) can be generated by four different transponders (not shown), corresponding to $\lambda_{x1}$, $\lambda_{x2}$, $\lambda_{x3}$, and $\lambda_{x4}$, although it is within the scope of the example embodiment to generate this wavelength in a different manner.) It is also within the scope of the example embodiment for the optical network shown in FIG. 34 to contain additional elements not shown therein, to contain less elements than are shown therein, and to replace each optical component thereof with another suitable component (or components) that performs (or perform) the functions thereof.

FIG. 37 shows an example embodiment which can be configured so that optical signals of the same wavelength are not used for local traffic on spurs of adjacent nodes. This example embodiment can use a type-4 light combiner and a type-4 ROADM core (as shown in Node 2 of FIG. 37), which will be explained with reference to FIGS. 35 and 36.

FIG. 35 shows an example embodiment of a type-4 light combiner 2400. The type-4 light combiner behaves similarly to the type-4 light distributor 76 shown in FIG. 6, except that the flow of light is from the subtending inputs to the primary output.

As can be seen in FIG. 35, the type-4 light combiner 2400 can include type-2 light distributors 2414, a type-2 light combiner 2416, type-3 light combiners 2418, and VOAs 2420 positioned between the type-3 light combiners 2418 and the type-2 light combiner 2416. The type-2 light distributors 2414, the type-2 light combiner 2416, the type-3 light combiners 2418, and the VOAs 2420 can be the same as, for example, the type-2 light distributor 52, the type-2 light combiner 58, the type-3 light combiner 70, and the VOAs 42, respectively, as shown in FIGS. 4A, 4B, 5B, and 3A, although they are not limited thereto. In addition, a control signal associated with each VOA 2420 can be used to set the attenuation value of each VOA 2420. The subtending inputs 2410 are individually denoted by the phrase "subtending input 1", "subtending input 2", . . . "subtending input k", where k denotes the total number of subtending inputs. The type-4 light combiner 2400 can be configured and programmed to direct each wavelength arriving in the light stream entering the subtending inputs 1 through k through a particular path to the primary output 2412. This is accomplished by 1) receiving different multiple-wavelength signals, each composed of multiple wavelengths up to m wavelengths ($\lambda_1$, $\lambda_2$, . . . $\lambda_m$), with the type-2 light distributors 2414 on the subtending inputs 2410 (m representing the total number of wavelengths within the light stream entering the primary inputs 2410), 2) separating each multiple-wavelength signal into a plurality of single-wavelength optical signals with a different one of the type-2 light distributors 2414, 3) directing single-wavelength optical signals of the same wavelength from the type-2 light distributors 2414 to the same type-3 light combiner 2418, 4) using the type-3 light combiners 2418 to select only one of the received single-wavelength optical signals of the same wavelength for outputting towards the primary output 2412, 5) individually attenuating each selected single-wavelength optical signal output from the type-3 light combiners 2418 with a corresponding VOA 2420, and 6) combining the attenuated, selected single-wavelength optical signals with the type-2 light combiner 2416 into a combined multiple-wavelength optical signal and outputting the combined multiple-wavelength optical signal on the primary output 2412.

As illustrated in FIG. 35, up to m number of wavelengths can be included within the light stream entering each subtending input 2410, and up to m wavelengths can exit the primary output 2412. As noted above, the k-to-1 optical switches 2418 can be configured so that only one wavelength from each subtending input 2410 can be directed to the primary output 2412. Therefore, for example, if wavelength $\lambda_2$ from subtending input 1 is directed to the primary output 2412, then wavelength $\lambda_2$ from subtending input 2 (or any other input) cannot simultaneously be directed to the primary output 2412. The k-to-1 optical switches 2418 are programmable to select any of the single-wavelength optical signals of the same wavelength received by each type-3 light combiner 2418 for outputting towards the primary output 2412. It can also be noted that once a given wavelength is directed to the primary output 2412, the optical power of that wavelength can be attenuated by some programmable amount via the VOA 2420 associated with that output wavelength, although it is not required to do so. It can also be noted that the VOA 2420 associated with a given wavelength can be programmed such that the wavelength is blocked from exiting the primary output 2412 completely. Further, it is within the scope of the example embodiment for the type-4 light combiner 2418 to not include the VOAs 2420. It is also within the scope of the example embodiment for the light combiner 2400 to include more or fewer than the number of type-2 light distributors 2414, VOAs 2420, type-3 light combiners 2418, and type-2 light combiners 2416 shown in FIG. 35. It is also within the scope of the example embodiment for the type-4 light combiner 2400 to include additional elements not shown in FIG. 35 and to include fewer elements than shown in FIG. 35. It is further within the scope of the example embodiment for any of the type-2 light distributors 2414, VOAs 2420, type-3 light combiners 2418, and type-2 light combiner 2416 of the type-4 light combiner 2400 shown in FIG. 35 to be replaced by any other suitable component that performs the functions thereof discussed above. As an example, a single VOA function and a single k to 1 optical switch function may be implemented with a single mirror device (MEMs) which can both switch light and attenuate light simultaneously. Alternatively, both the VOA function and the k to 1 optical switch function may be implemented using liquid crystal technology, in another example embodiment.

In summary, the path through the type-4 light combiner 2400 is as follows. A WDM or DWDM light stream is applied to each of the subtending inputs 2410 of the combiner 2400. The light stream of each input can include up to m wavelengths simultaneously. The type-2 light distributor 2414 at each subtending input 2410 then demultiplexes the WDM/DWDM light streams into their individual wavelengths. The k-to-1 optical switch 2418 associated with each wavelength is then used to select a wavelength from one of the k subtending inputs thereof. Each of the selected individual wavelengths is attenuated by some programmable amount via its corresponding VOA 2420. The type-2 light combiner 2416 then multiplexes up to m wavelengths into a WDM/DWDM signal and outputs the result on the primary output 2412.

As can be seen from FIG. 35, a k-to-1 type-4 light combiner 2400 operating upon m wavelengths can use m VOA control signals, and m k-to-1 optical switch control signals, although it is within the scope of the example embodiment to provide other means of controlling the VOAs 2420 and the k-to-1 optical switches. The type-4 light combiner 2400 is also called as a wavelength router or a wavelength selective switch (WSS).

Figure 36:
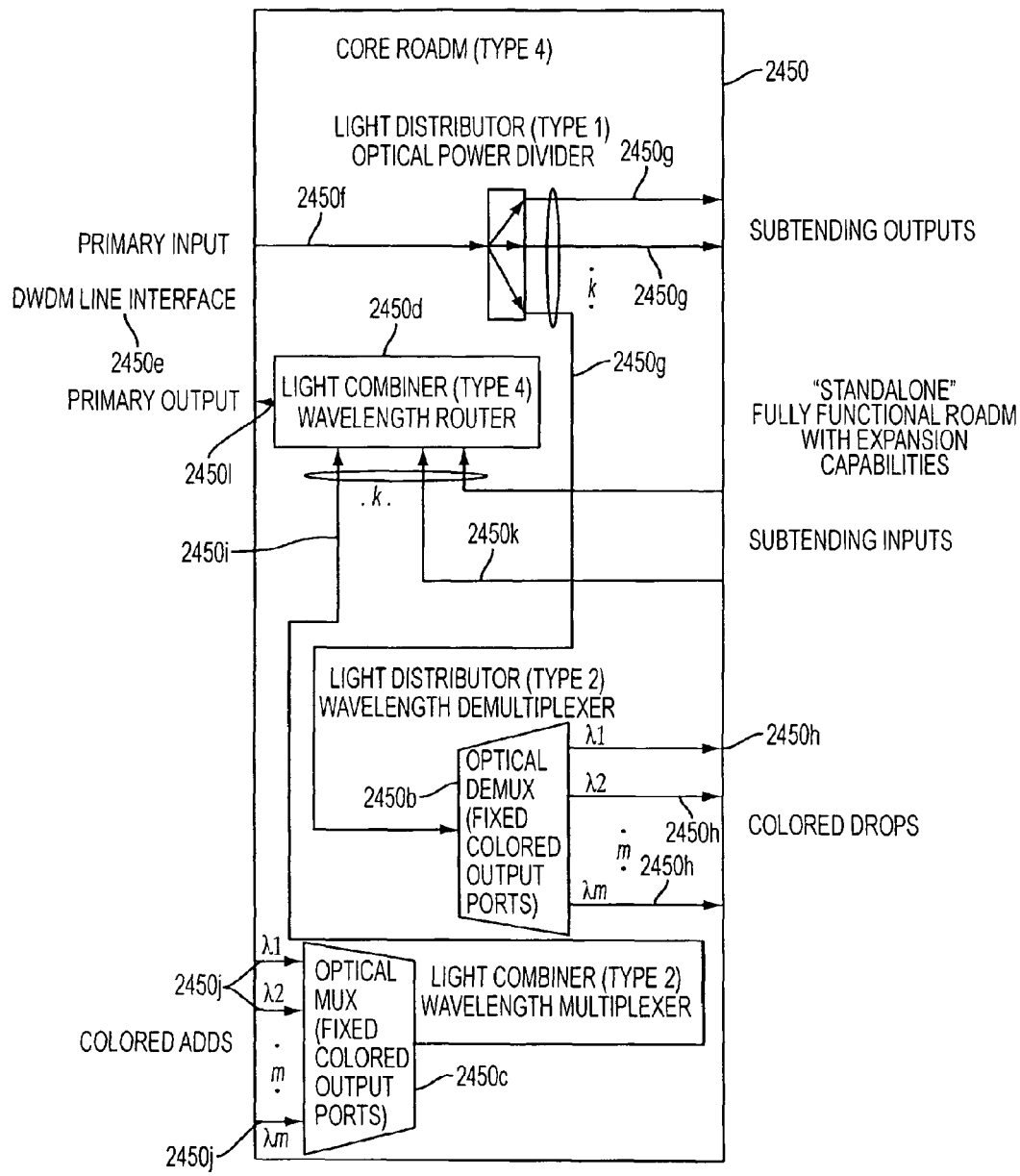
FIG. 36 is a block diagram of an example embodiment of a type-4 ROADM having integrated colored add and drop ports.
Figure 37A:
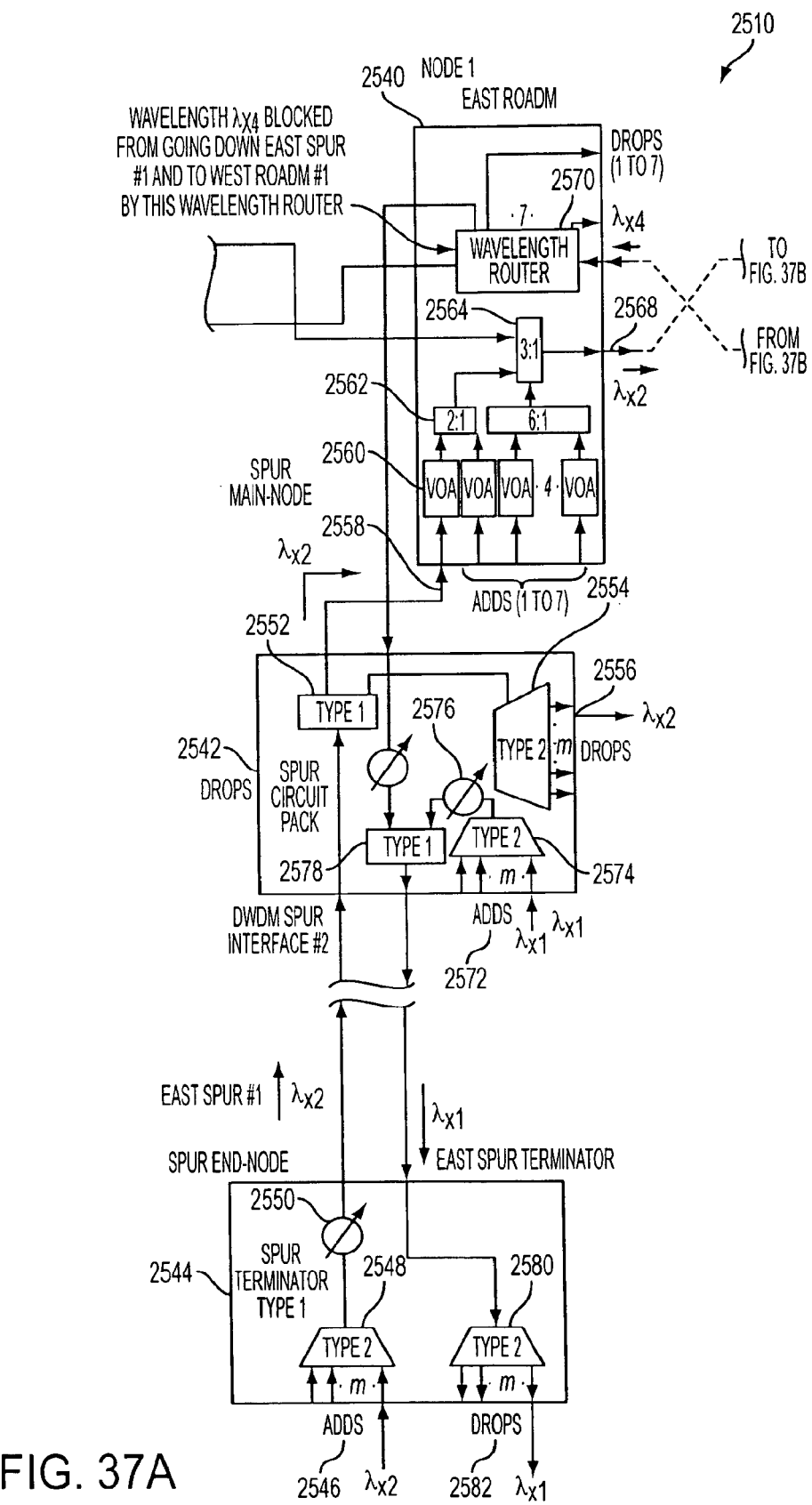
FIG. 37 is a block diagram of an example embodiment of an optical network that includes three optical nodes, at least one of which can be optical node example embodiment #4 and in which optical signals of the same wavelength are not used for local traffic on spurs of adjacent nodes.
Figure 37B:
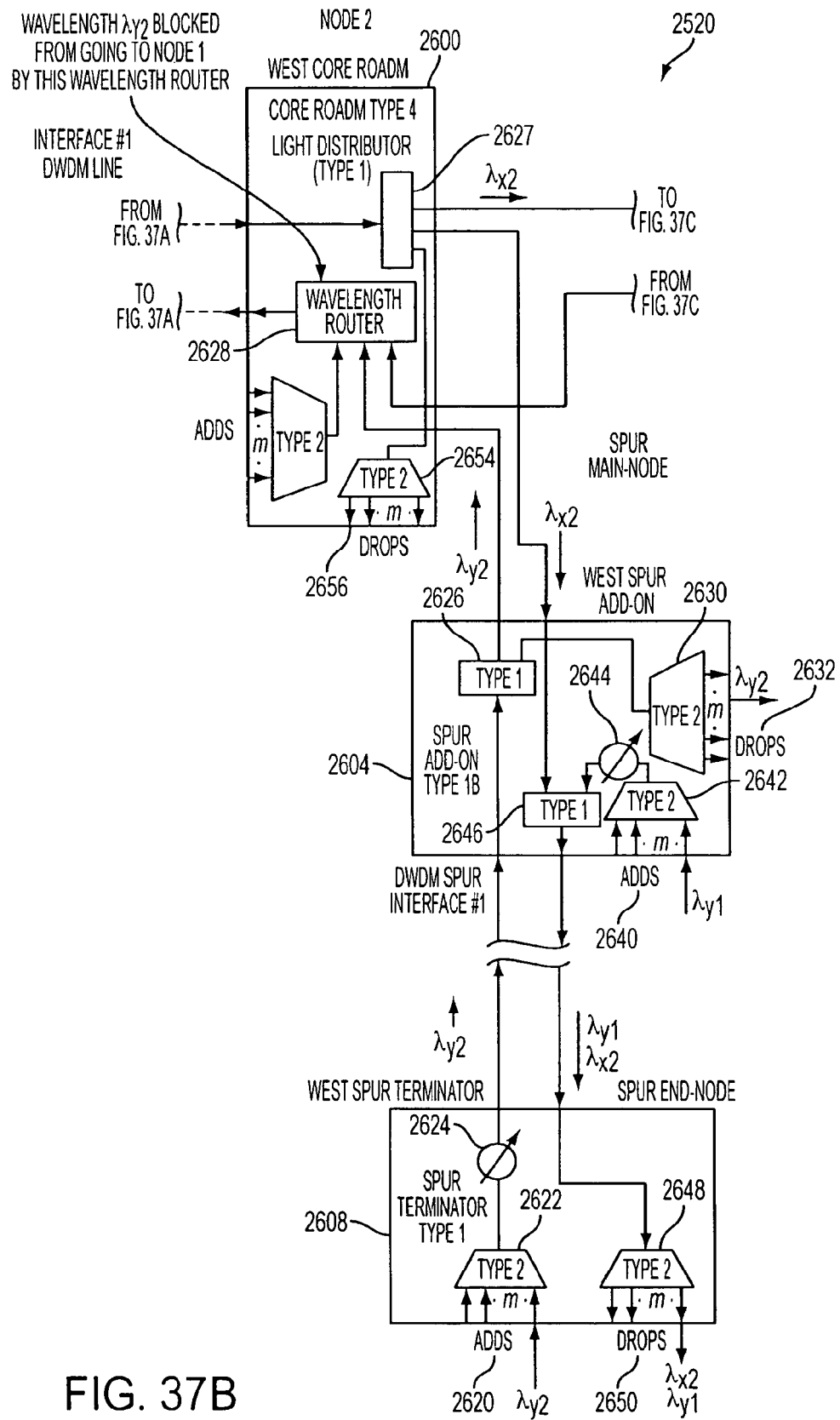
Figure 37C:
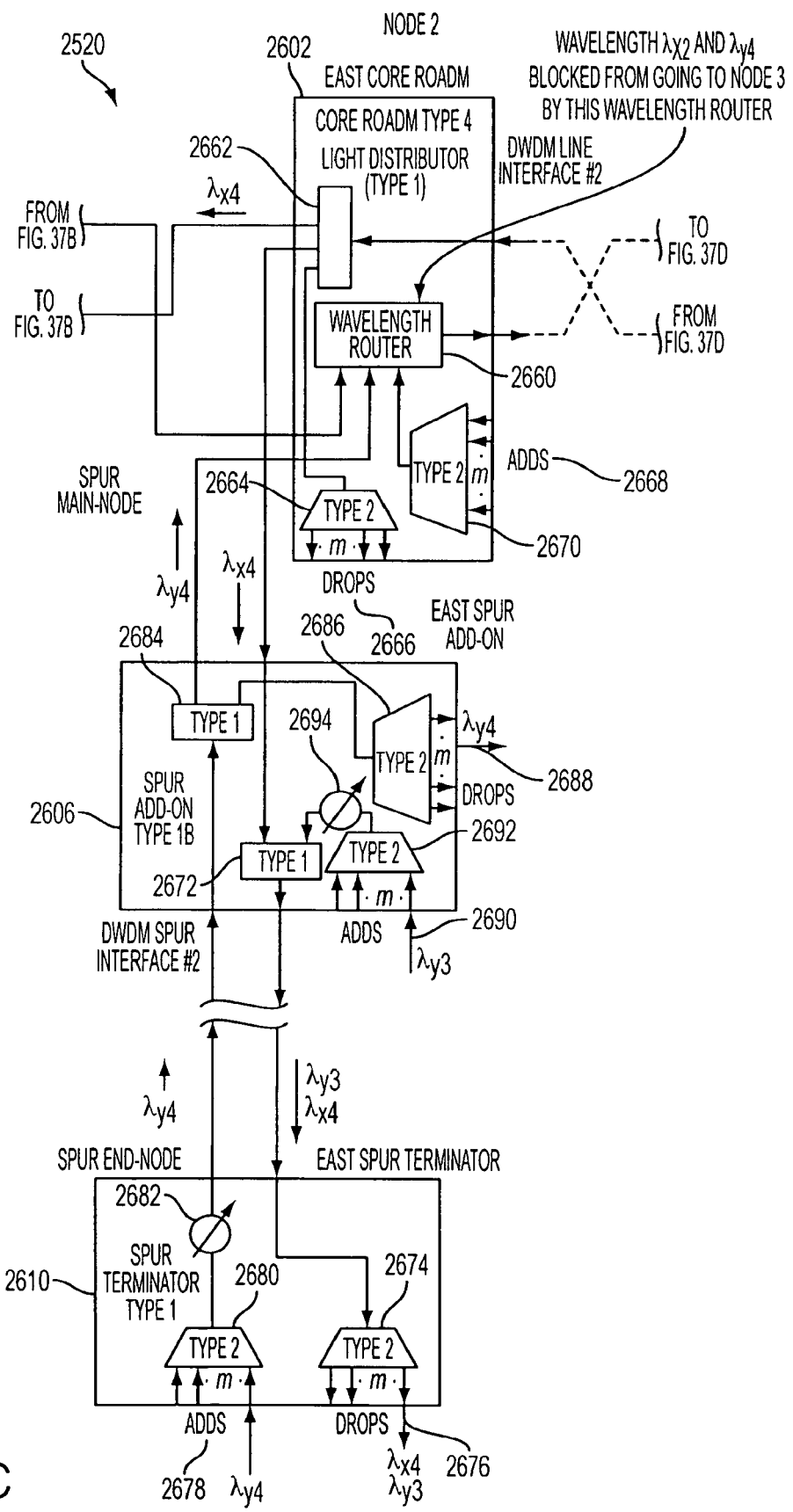
Figure 37D:
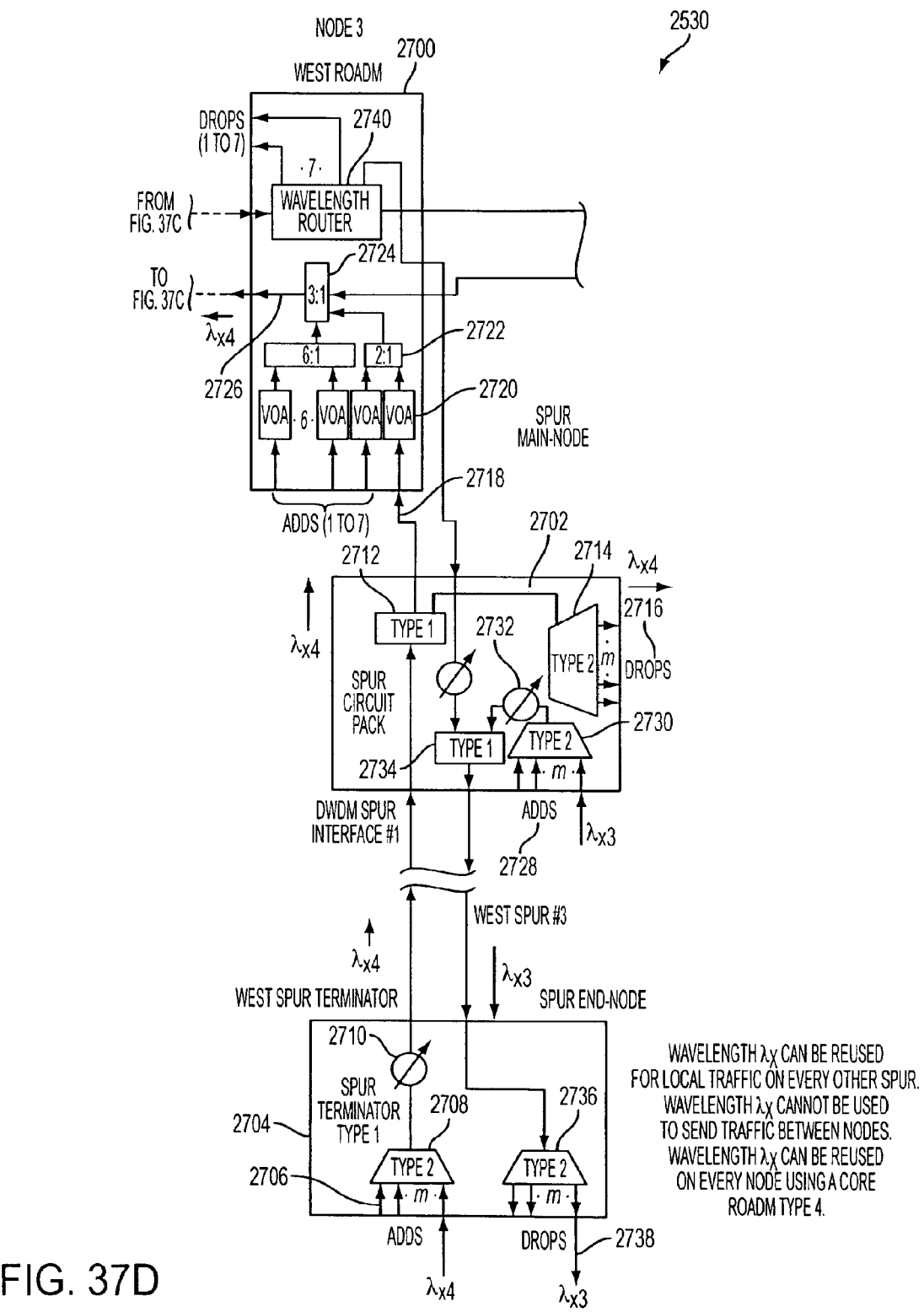

FIG. 36 shows an example embodiment of a type-4 ROADM core or core device 2450, also referred to as a universal ROADM core device. The type-4 ROADM core device 2450 can include a type-1 light distributor 2450a, a type-2 light distributor 2450b, a type-2 light combiner 2450c, and a type-4 light combiner 2450d. The type-1 light distributor 2450a, the type-2 light distributor 2450b, the type-2 light combiner 2450c, and the type-4 light combiner 2450d can be the same as, for example, the type-1 light distributor 24, the type-2 light distributor 52, the type-2 light combiner 58, and the type-4 light combiner 88, respectively, shown in FIGS. 2A, 3A, 3B, and 7, although they are not limited thereto. It is also within the scope of the example embodiment for the type-4 ROADM core device 2450 to include components in addition to the components shown in FIG. 36. It is further within the scope of the example embodiment for any of the type-1 light distributor 2450a, the type-2 light distributor 2450b, the type-2 light combiner 2450c, and the type-4 light combiner 2450d to be replaced by any other suitable component (or components) that performs (or perform) the functions thereof.

Because the type-4 ROADM core device 2450 can include type-1 and type-2 distributors 2450a, 2450b, respectively, and type-2 and type-4 light combiners 2450c, 2450d, respectively, the ROADM core device 2450 can be configured to: 1) divide the optical power of an another-node-originating optical signal received from another optical node via the network node interface 2450e on the primary input 2450f of the device 2450 between a plurality of optical-power-divided, output optical signals of multiple wavelengths, output from the ROADM core device on a plurality of subtending outputs 2450g with the type-1 light distributor 2450a; 2) separate one of the plurality of optical-power-divided output optical signals into a plurality of dropped optical signals each of a single-wavelength output from a plurality of colored drop ports 2450h thereof with the type-2 light distributor 2450b; 3) receive on a subtending input 2450i of the type-4 light combiner 2450d a first multiple-wavelength optical signal generated by the type-2 light combiner 2450c combining optical signals of different wavelengths added to the ROADM core device 2450 via colored add ports 2450j thereof, and receive with the type-4 light combiner 2450d a second multiple-wavelength optical signal from a subtending input 2450k of the ROADM core device 2450 (the first and second multiple-wavelength optical signals may contain one or more wavelengths in common); 4) separate the first and second multiple-wavelength optical signals into a first plurality of single-wavelength optical signals originating from the first multiple-wavelength signal and a second plurality of single-wavelength optical signals originating from the second multiple-wavelength optical signal with the type-4 light combiner 2450d; 5) for single-wavelength optical signals in the first and second plurality of single-wavelength optical signals having the same wavelength, select only one single-wavelength optical signal from one of the first and second plurality of single-wavelength optical signals for outputting with the type-4 light combiner 2450d; 6) attenuate each selected single-wavelength optical signal with the type-4 light combiner 2450d; and 7) combine the attenuated, selected single-wavelength optical signals into a single primary output optical signal to be output on a primary output 2450l of the ROADM core device 2450 via the network node interface 2450e to another node with the type-4 light combiner 2450d.

The type-4 ROADM core device 2450 shown in FIG. 36 can add/drop all m wavelengths of inputted and outputted optical signals, while simultaneously supporting additional ROADM add-on devices and functions, without limitation, as shown in the other figures.

FIG. 37 shows an example embodiment of an optical network 2500 having nodes 2510, 2520, and 2530 (denoted as Nodes 1, 2, and 3, respectively) employing optical spurs and type-4 ROADM core devices, which can be located in Node 2, although it is within the scope of the example embodiment to locate the type-4 ROADM cores in one or more of the other nodes, instead of or in addition to using type-4 ROADM cores in Node 2. It is also within the scope of this example embodiment for the network 2500 to include more than or fewer than the number of nodes shown in FIG. 37, and for the nodes 2510, 2520, and 2530 and the ROADMs contained therein, and the components within the nodes and ROADMs to be replaced by other nodes, ROADMs, and components, respectively, that perform the same or similar functions. The node with the type-4 ROADM core devices can be preceded and followed by nodes built using the ROADMs of ROADM example embodiment #2, although any other type of ROADM disclosed herein can be used in the nodes preceding and following the node or nodes containing the type-4 ROADM core devices. The spur main node in each of Nodes 1, 2, and 3 can include one or more m-wavelength access spur circuit packs, which can be the same as, for example, the m-wavelength access spur circuit pack shown in FIG. 31, although they are not limited thereto. The spur end node in each of Nodes 1, 2, and 3 can include one or more m-wavelength access spur terminator circuit packs, which can be the same as, for example, the m-wavelength access spur terminator circuit pack shown in FIG. 32, although they are not limited thereto. Due to the propagation of incoming wavelengths from the type-4 ROADM core devices to their corresponding spur, this network can be configured so that optical signals having the wavelength of signals used to support local traffic on the east spur of Node 1 are not used for local traffic on the west spur of Node 2, although the network can be configured in other ways, for example, so that the same wavelengths for local traffic in adjacent nodes are used. Similarly, the network can be configured so that optical signals having the wavelength of signals used to support local traffic on the west spur of Node 3 are not used for local traffic on the east spur of Node 2. However, the network can also be configured so that optical signals of the wavelength used to support local traffic on the east spur of Node 1 can be reused to support local traffic on the west spur of Node 3.

Nodes 1 and 3 can be the same as node 2000 shown in FIG. 33, except that only a portion of nodes 1 and 3 is shown in FIG. 37, although nodes 1 and 3 are not limited to such a configuration. Thus, it should be understood that the west portion of Node 1 and the east portion of Node 3 can be the same as, for example, the west portion (ROADM 2006, and spur circuit packs 2010 and 2014) of node 2000 shown in FIG. 33 and the east portion (ROADM 2008, and spur circuit packs 2012 and 2016) of the node 2000 shown in FIG. 33.

The east portion of the spur main node of Node 1 can include an east ROADM 2540, and a spur circuit pack 2542. The east portion of the spur end node of Node 1 can include an east spur terminator 2544.

A wavelength $\lambda_{x2}$ entering one of add ports 2546 of the east spur terminator 2544 in Node 1 can pass through a type-2 light combiner 2548, which can combine this wavelength with other wavelengths added at other add ports 2546 and output a multiplexed signal to a VOA 2550. The VOA 2550 can output the wavelength $\lambda_{x2}$ to a line out port, which can output the wavelength $\lambda_{x2}$ to a type-1 light distributor 2552 of the spur circuit pack 2542. The light distributor 2552 can output the wavelength $\lambda_{x2}$ to a type-2 light distributor 2254, which can drop the wavelength $\lambda_{x2}$ to a colored drop port 2556. In addition, the light distributor 2552 can output the wavelength $\lambda_{x2}$ to an add/express port 2558 of the east ROADM 2540. The output of the add/express port 2558 can be transmitted to a VOA 2560, which can output the wavelength $\lambda_{x2}$ to a type-1, 2:1 light combiner 2562 (which also can receive optical signals from another add port of the ROADM 2540 that functions only as an add port). The light combiner 2562 can output the wavelength $\lambda_{x2}$ to a type-1, 3:1 light combiner 2564 (which can also receive optical signals from the wavelength router of the unillustrated ROADM on the west side of the Node 1, and from a type-1, 6:1 light combiner that receives optical signals locally added to the ROADM 2540). The type-1, 3:1 light combiner 2564 can also output the wavelength $\lambda_{x2}$ to a line out port 2568 of the ROADM 2540, which can output the wavelength) to a type-1 light distributor 2627 of the ROADM 2600 of the Node 2 (node 2520). The light distributor 2627 can output the wavelength $\lambda_{x2}$ to a type-4 light combiner 2660 in east ROADM 2602, which can be configured to block the wavelength $\lambda_{x2}$ from being outputted to Node 3 (node 2530), although it can be configured not to do so. The type-1 light distributor 2627 can also output the wavelength $\lambda_{x2}$ to a type-1 light combiner 2646 in the spur circuit pack 2604. The type-1 light combiner 2646 can output the wavelength $\lambda_{x2}$ to a type-2 light distributor 2648 in the west spur terminator 2608, which in turn, can output the wavelength $\lambda_{x2}$ to a colored drop port 2650 of the west spur terminator 2608 in Node 2.

A wavelength $\lambda_{x1}$ (which is of the same frequency as wavelength $\lambda_{x2}$) can be added at one of the add ports 2572 of the spur circuit pack 2542, which can output wavelength $\lambda_{x1}$ to type-2 light combiner 2574, which also can receive optical signals from other add ports 2572. The light combiner 2574 can output the wavelength $\lambda_{x1}$ to a VOA 2576, which in turn, can output the wavelength $\lambda_{x1}$ to a type-1 light combiner 2578 (which also can receive optical signals output from the wavelength router 2570 of the ROADM 2540). The light combiner 2578 can output the wavelength $\lambda_{x1}$ to a type-2 light distributor 2580 of the spur terminator 2544, which can output the wavelength $\lambda_{x1}$ to a drop port 2582 of the spur terminator 2544.

In a network configuration like 2500 where every other node contains a type-4 ROADM core device such as that of 2450 in FIG. 36, and where every other node contains a ROADM such as that of ROADM 500 in FIG. 15A, a wavelength of a given frequency can, at most, be reused for local traffic on a spur in every other node. However, in order to reuse a wavelength of a given frequency on every other node in a configuration like that of 2500, the network 2500 can be configured so that the wavelength $\lambda_{x1}$ is not used to send traffic between the Nodes 1, 2, and 3 to prevent wavelength contention. More specifically, if a wavelength $\lambda_x$ (which is of the same frequency as wavelength $\lambda_{x1}$ and $\lambda_{x2}$) arrives on the line input of West ROADM in node 1 (not shown), that wavelength is not forwarded to East ROADM 2540 and then in turn is not forwarded to Node 2 if a wavelength of the same frequency is being used to support local traffic between spur circuit pack 2542 and spur terminator 2544 (otherwise wavelength contention will occur). Also, a wavelength $\lambda_x$ (which is of the same frequency as wavelength $\lambda_{x1}$ and $\lambda_{x2}$) is not added to the add ports of ROADM 2540 if a wavelength of the same frequency is being used to support local traffic between spur circuit pack 2542 and spur terminator 2544 (otherwise wavelength contention will occur). More generally, wavelengths $\lambda_x$ added locally at any of the spur circuit packs of the network 2500 can be reused for local traffic on the spurs in every other node in the network 2500, but the network 2500 can be configured so that the wavelengths $\lambda_x$ are not used to send traffic between the Nodes 1, 2, and 3 to prevent wavelength contention. However, it is within the scope of the example embodiment to configure the network to permit such forwarding and/or to provide any other suitable way to prevent such wavelength contention.

The wavelength router 2570 of the ROADM 2540 can receive a wavelength $\lambda_{x4}$ (which is of the same frequency as wavelength $\lambda_{x1}$ and $\lambda_{x2}$) from a type-4 light combiner 2628 of the ROADM 2600 of Node 2. The wavelength router 2570 can be configured to block wavelength $\lambda_{x4}$ from being transmitted out of ROADM 2540 to the east spur of the node 2510 and to the west ROADM of the node 2510, although it can be configured not to do so.

The wavelength $\lambda_{x4}$ can originate at one of the add ports 2706 of the west spur terminator 2704 of Node 3. The add port 2706 can output the wavelength $\lambda_{x4}$ to a type-2 light combiner 2708, which can also receive other wavelengths added at other add ports 2706 and output the wavelength $\lambda_{x4}$ to a VOA 2710. The VOA 2710 can output the wavelength $\lambda_{x4}$ to a type-1 light distributor 2712 of a spur circuit pack 2702 of Node 3. The light distributor 2712 can output the wavelength $\lambda_{x4}$ to a type-2 light distributor 2714, which can output the wavelength $\lambda_{x4}$ to a drop port 2716, and can also output the wavelength $\lambda_{x4}$ to an add/express port 2718 of the west ROADM 2700. The output of the add/express port 2718 can be transmitted to a VOA 2720, which can output the wavelength $\lambda_{x4}$ to a type-1A, 2:1 light combiner 2722 (which also can receive optical signals from another add port of the ROADM 2700 that functions only as an add port). The light combiner 2722 can output the wavelength $\lambda_{x4}$ to a type-1, 3:1 light combiner 2724 (which can also receive optical signals from the wavelength router of the east ROADM of the Node 3 (not shown) and from a type-1A, 6:1 light combiner that receives optical signals locally added to the ROADM 2700). The type-1, 3:1 light combiner 2724 can output the wavelength $\lambda_{x4}$ to a line out port 2726 (of the ROADM 2700), which can output the wavelength $\lambda_{x4}$ to a type-1 light distributor 2662 of the east ROADM 2602 of the Node 2, which can output the wavelength $\lambda_{x4}$ to the wavelength router 2628 of the west ROADM 2600. The wavelength router 2628 of the west ROADM 2600 can be used to block the wavelength $\lambda_{x4}$ from propagating any further than Node 2. Alternatively, as shown in FIG. 37, the wavelength router 2628 of the west ROADM 2600 can be configured to output the wavelength $\lambda_{x4}$ to the wavelength router 2570 of the east ROADM 2540 of Node 1, which can be configured to block the wavelength $\lambda_{x4}$ from exiting therefrom, as noted above, although it is not required to configure the router 2570 to do so. In addition, the light combiner 2662 can output the wavelength $\lambda_{x4}$ to a type-2 light distributor 2664, which can output the wavelength $\lambda_{x4}$ to a colored drop port 2666 of the ROADM 2602. Further, the light combiner 2662 can output the wavelength $\lambda_{x4}$ to a type-1 light combiner 2672 in the spur circuit pack 2606 in the Node 2, which in turn, outputs the wavelength $\lambda_{x4}$ to a type-2 light distributor 2674 in the east spur terminator 2610. The type-2 light distributor 2674 can output the wavelength $\lambda_{x4}$ to a drop port 2676 of the east spur terminator 2610. Since in this configuration, the wavelength $\lambda_{x4}$ can propagate down the east spur of node 2, a wavelength of the same frequency as wavelength $\lambda_{x4}$ is not reused to carry local traffic between the spur circuit pack 2606 and the spur terminator 2610, although it is within the scope of this embodiment to also reuse such a wavelength. However, since the wavelength $\lambda_{x4}$ can be blocked at either wavelength router 2628 or 2570, a wavelength of the same frequency as wavelength $\lambda_{x4}$ can be reused to carry local traffic between the spur circuit pack 2542 and the spur terminator 2544 of the east spur of node 1.

A wavelength $\lambda_{x3}$ (which is of the same frequency as wavelength $\lambda_{x1}$, $\lambda_{x2}$ and $\lambda_{x4}$) can be added at one of the add ports 2728 of the spur circuit pack 2702, which can output the wavelength $\lambda_{x3}$ to type-2 light combiner 2730, which also can receive optical signals from other add ports 2728. The light combiner 2730 can output the wavelength $\lambda_{x3}$ to a VOA 2732, which in turn, can output the wavelength $\lambda_{x3}$ to a type-1 light combiner 2734 (which also can receive optical signals output from the wavelength router 2740 of the ROADM 2700). The light combiner 2734 can output the wavelength $\lambda_{x3}$ to a type-2 light distributor 2736 of the spur terminator 2704, which can output the wavelength $\lambda_{x3}$ to a drop port 2738 of the spur terminator 2704.

The wavelength $\lambda_{x3}$ can be reused for local traffic on every other spur in the network 2500, but to avoid wavelength contention, the network 2500 can be configured so that the wavelength of the same frequency as $\lambda_{x3}$ is not used to send traffic between the Nodes 1, 2, and 3.

Turning to wavelengths originating in Node 2, a wavelength $\lambda_{y2}$ (which is of a different frequency as wavelength $\lambda_{x1}$, $\lambda_{x2}$, $\lambda_{x3}$, and $\lambda_{x4}$) can be input into one of the add ports 2620 in the west spur terminator 2608 of Node 2. The add port 2620 outputs the wavelength $\lambda_{y2}$ to a type-2 light combiner 2622, which outputs the wavelength $\lambda_{y2}$ to a VOA 2624. The VOA 2624 outputs the wavelength $\lambda_{y2}$ to a type-1 light distributor 2626 in the west spur circuit pack 2604, which outputs the wavelength $\lambda_{y2}$ to a type-4 light combiner 2628 in the west ROADM 2600. The light combiner 2628 can be configured to block the wavelength $\lambda_{y2}$ from being outputted to Node 1, although it need not be configured to do so. The light distributor 2626 can also output the wavelength $\lambda_{y2}$ to a type 2 light distributor 2630, which can output the wavelength $\lambda_{y2}$ to a drop port 2632.

A wavelength $\lambda_{y1}$ (which is of a different frequency as wavelength $\lambda_{x1}$, $\lambda_{x2}$, $\lambda_{x3}$ and $\lambda_{x4}$, but which is of the same frequency as $\lambda_{y2}$) can be input into one of the add ports 2640 of the west spur circuit pack 2604. The add port 2640 can output the wavelength $\lambda_{y1}$ to a type-2 light combiner 2642, which can output the wavelength $\lambda_{y1}$ to a VOA 2644, which, in turn, can output the wavelength $\lambda_{y1}$ to a type-1 light combiner 2646 (which can also receive optical signals, such as the wavelength $\lambda_{x2}$, from the type-1 light distributor 2627). The light combiner 2646 can output the wavelength $\lambda_{y1}$ to a type-2 light distributor 2648 in the west spur terminator 2608, which in turn, can output the wavelength $\lambda_{y1}$ to a drop port 2650 of the west spur terminator 2608. As can be seen, the wavelength used for local traffic on the west spur of node 2, $\lambda_{y1}$, can be of a different frequency than $\lambda_{x2}$ (and thus also wavelengths $\lambda_{x1}$, $\lambda_{x3}$ and $\lambda_{x4}$), so as to avoid wavelength contention. It can be noticed that if a wavelength of the same frequency as $\lambda_{y1}$ was to be used for local traffic on the east spur of node 1, wavelength contention would occur on the west spur of node 2. This occurs as a result of there being no method of blocking a wavelength originating at the input ports of spur end node 2544 from propagating to the west spur terminator of node 2 in this configuration, although it is within the scope of this example embodiment to provide a different configuration to prevent such propagation.

A wavelength $\lambda_{y4}$ (which is of the same frequency as wavelength $\lambda_{y2}$ and $\lambda_{y1}$) can be input into one of the add ports 2678 in the east spur terminator 2610 of Node 2. The add port 2678 outputs the wavelength $\lambda_{y4}$ to a type-2 light combiner 2680, which outputs the wavelength $\lambda_{y4}$ to a VOA 2682. The VOA 2682 outputs the wavelength $\lambda_{y4}$ to a type-1 light distributor 2684 in the east spur circuit pack 2606, which outputs the wavelength $\lambda_{y4}$ to a type-4 light combiner 2660 in the east ROADM 2602. The light combiner 2660 can be configured to block the wavelength $\lambda_{y4}$ from being outputted to Node 3, although it need not be configured to do so. The light distributor 2684 can also output the wavelength $\lambda_{y4}$ to a type-2 light distributor 2686, which can output the wavelength $\lambda_{y4}$ to a drop port 2688.

A wavelength $\lambda_{y3}$ (which is of the same frequency as wavelength $\lambda_{y1}$, $\lambda_{y2}$ and $\lambda_{y4}$) can be input into one of the add ports 2690 of the east spur circuit pack 2606.

The add port 2690 can output the wavelength $\lambda_{y3}$ to a type-2 light combiner 2692, which can output the wavelength $\lambda_{y3}$ to a VOA 2694, which, in turn, can output the wavelength $\lambda_{y3}$ to a type-1 light combiner 2672 (which can also receive optical signals, such as the wavelength $\lambda_{x4}$, from the type-1 light distributor 2662). The light combiner 2672 can output the wavelength $\lambda_{y3}$ to the type-2 light distributor 2674 in the east spur terminator 2610, which in turn, can output the wavelength $\lambda_{y3}$ to a drop port 2676 of the east spur terminator 2610.

As can be seen, the wavelength used for local traffic on the east spur of node 2, $\lambda_{y3}$ can be of a different frequency than $\lambda_{x4}$ (and thus also wavelengths $\lambda_{x1}$, $\lambda_{x2}$ and $\lambda_{x3}$), so as to avoid wavelength contention. It can be noticed that if a wavelength of the same frequency as $\lambda_{y3}$ was to be used for local traffic on the west spur of node 3, wavelength contention would occur on the East spur of node 2. This occurs as a result of there being no method of blocking a wavelength originating at the input ports of spur end node 2704 from propagating to the East spur terminator of node 2 in this configuration, although it is within the scope of the example embodiment to provide a configuration to block such propagation.

In summary, within the example embodiment network shown in FIG. 34 (where just the optical nodes of example embodiment #4 are used) wavelengths used for spur local traffic can to be reused on the spurs of every node. For the example embodiment network shown in FIG. 37 (where the optical nodes of example embodiment #4 are interleaved with nodes using type-4 ROADM core devices) wavelengths used for spur local traffic can be reused on the spurs of every second node.

Optical Spurs (Type-2)

Optical Node Example Embodiment #5

Figure 38A:
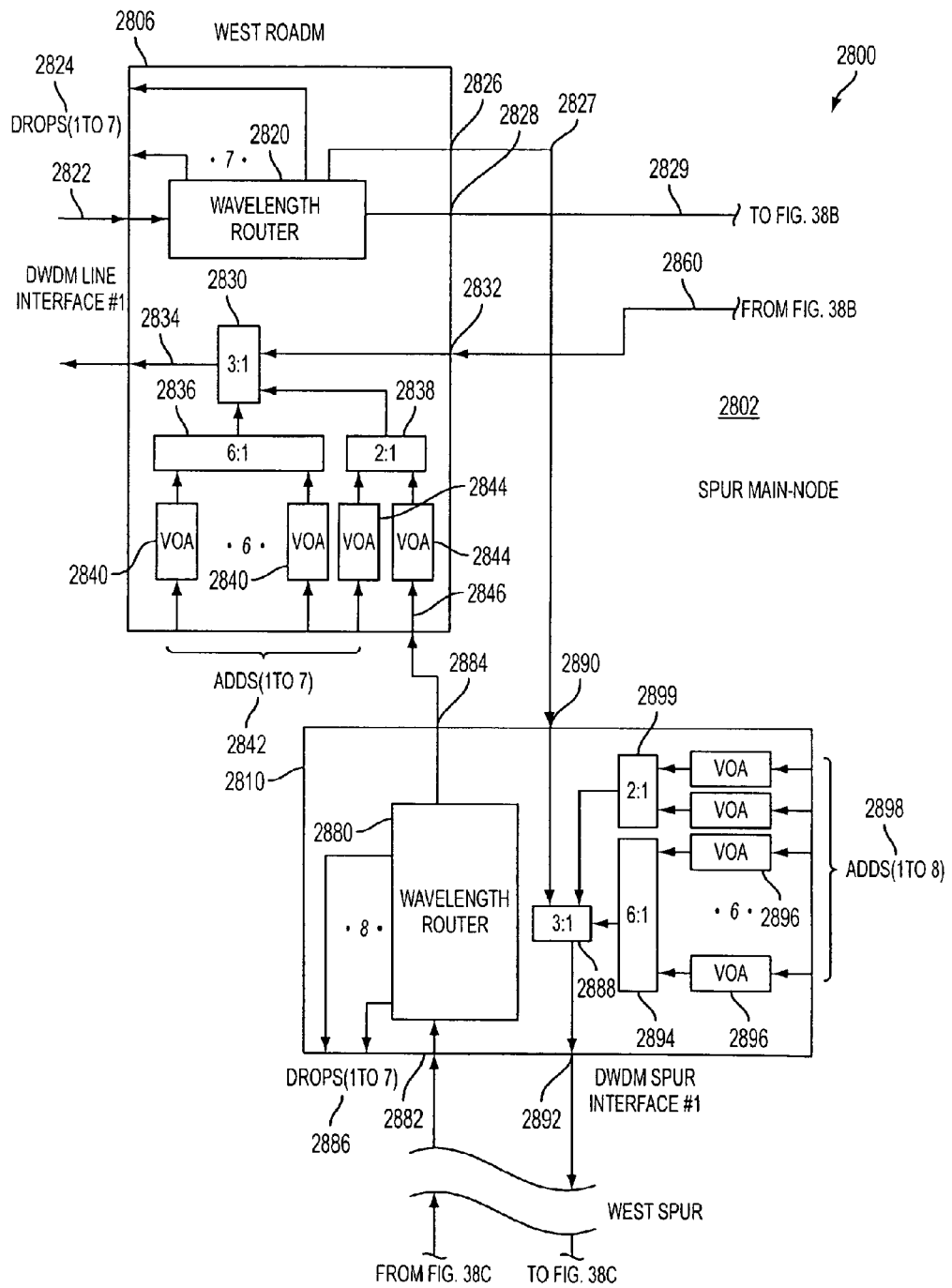
FIG. 38 is a block diagram of an example embodiment of optical node example embodiment #5, which is a two-degree node with a single homed protected spur, and where type-1 ROADM cores are used to add and drop local traffic in the spur main node.
Figure 38B:
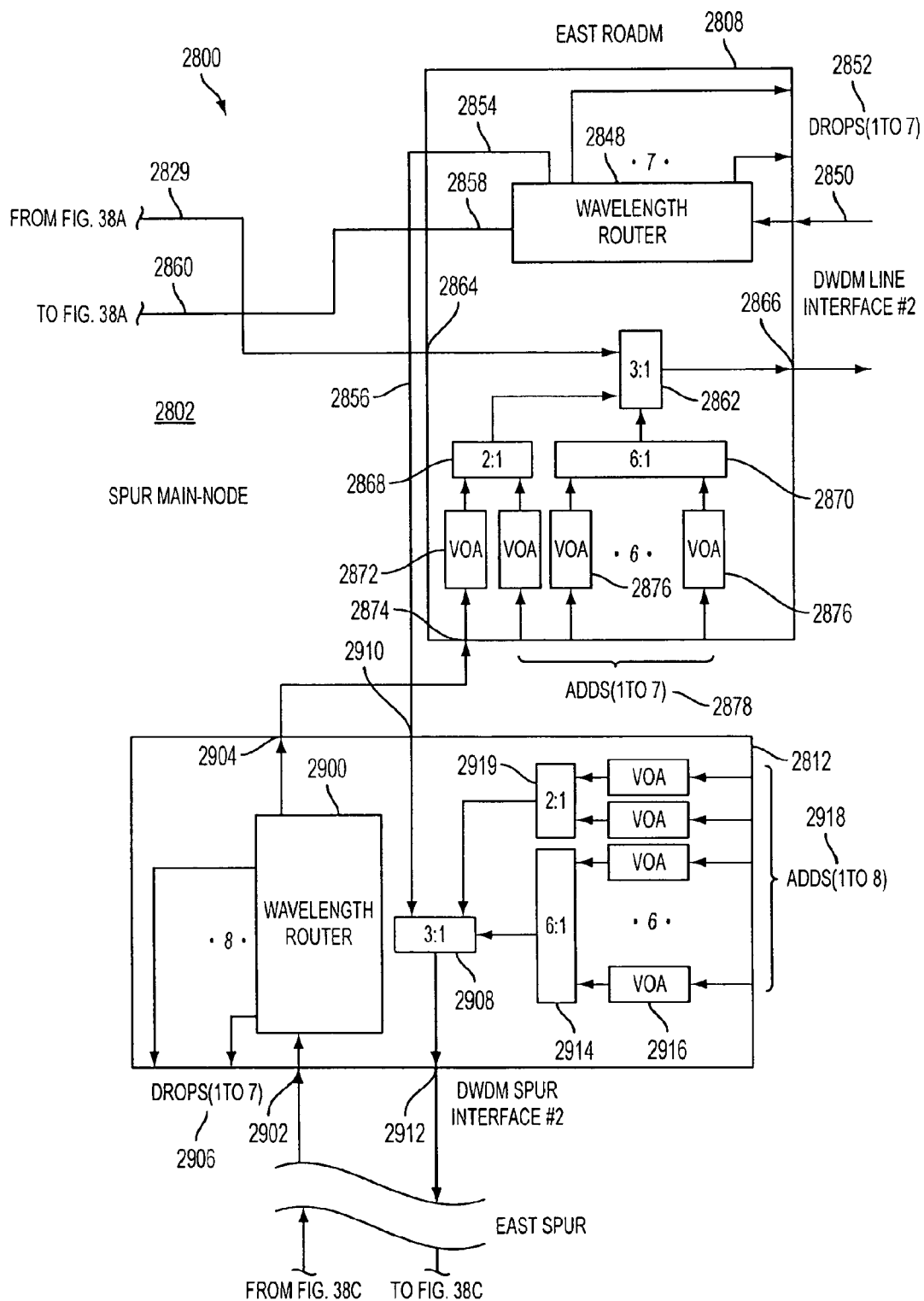
Figure 38C:
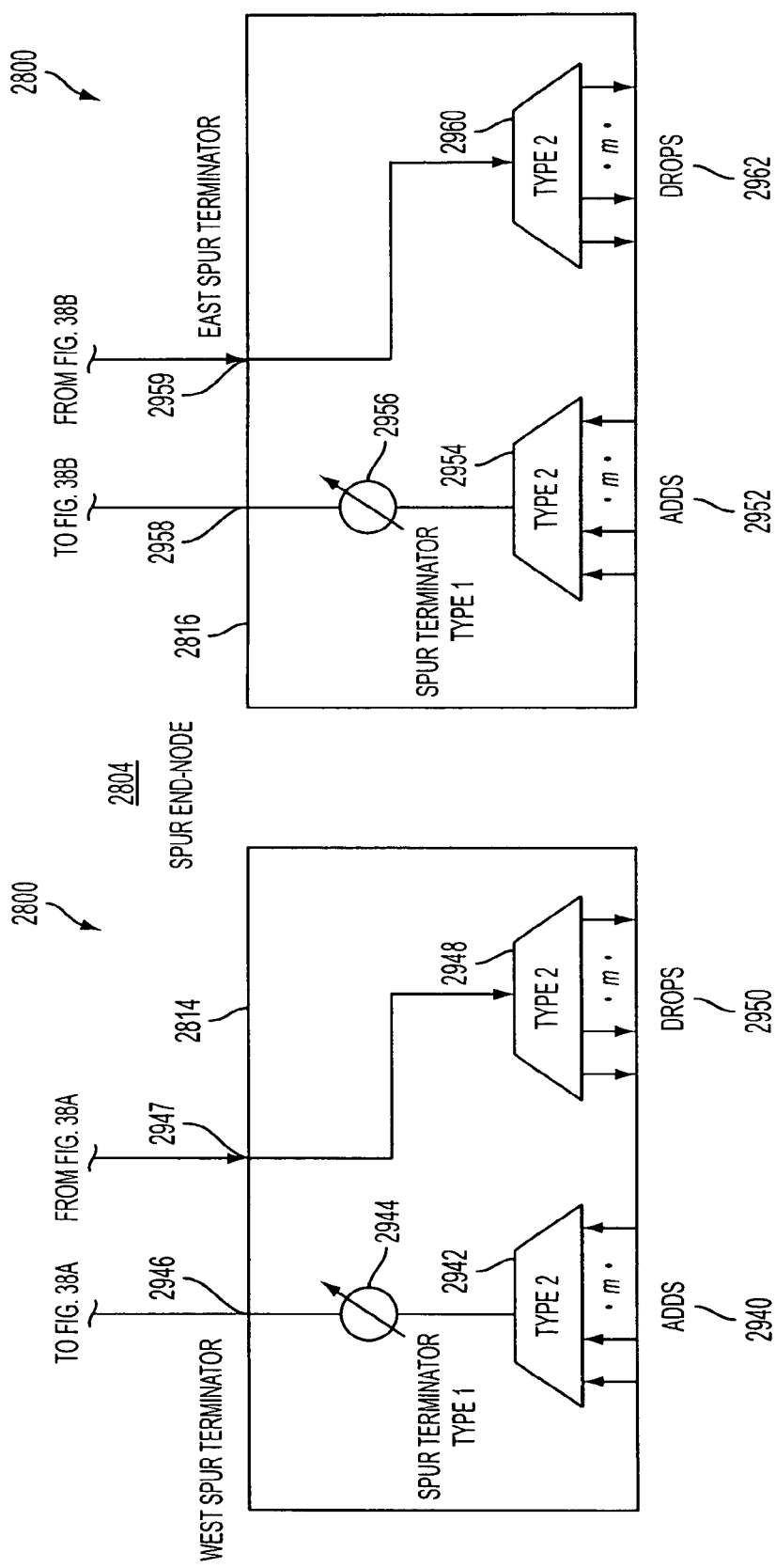
Figure 39A:
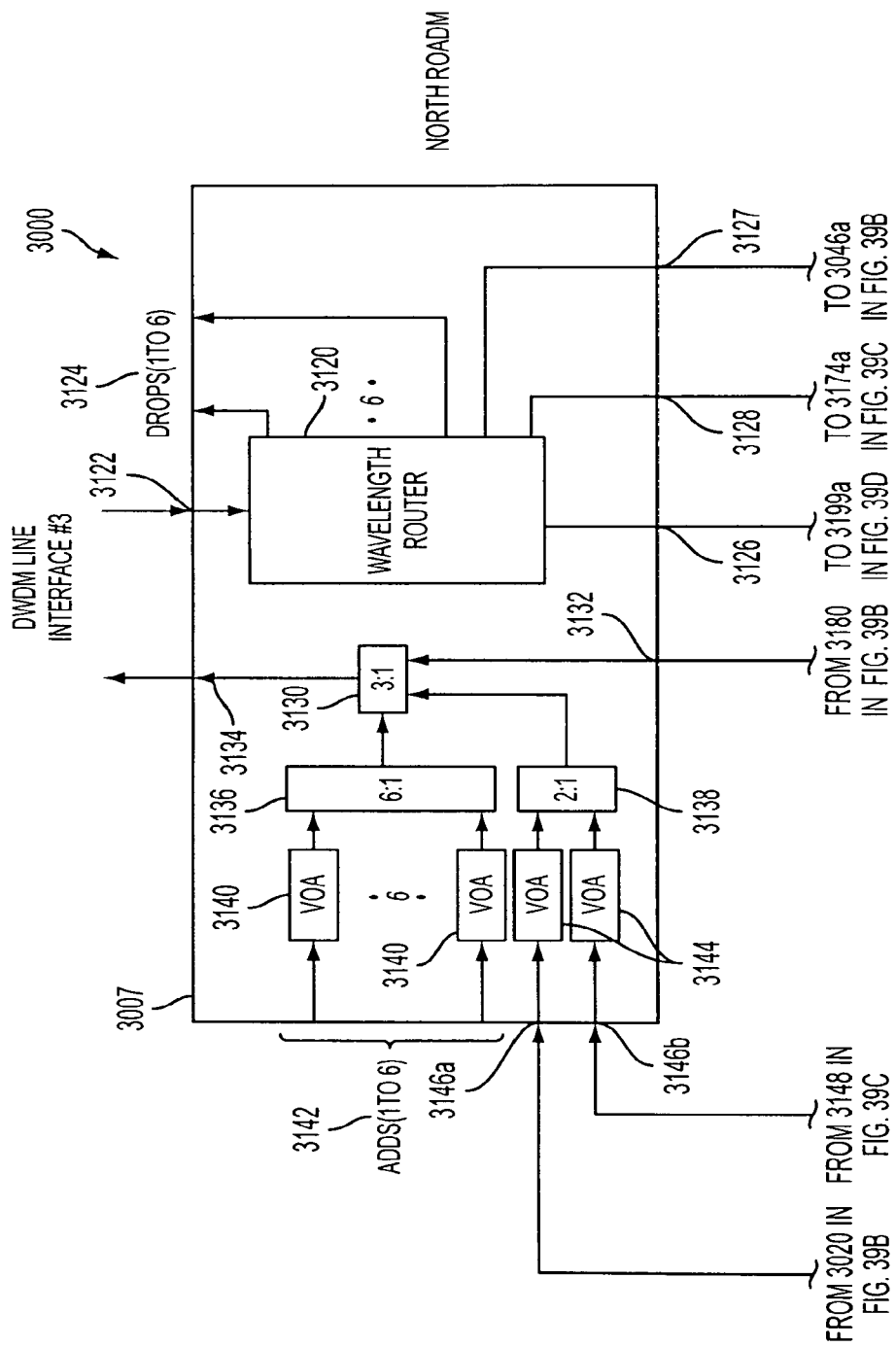
FIG. 39 is a block diagram of another example embodiment of optical node example embodiment #5, which is a three-degree node with a single homed protected spur.
Figure 39B:
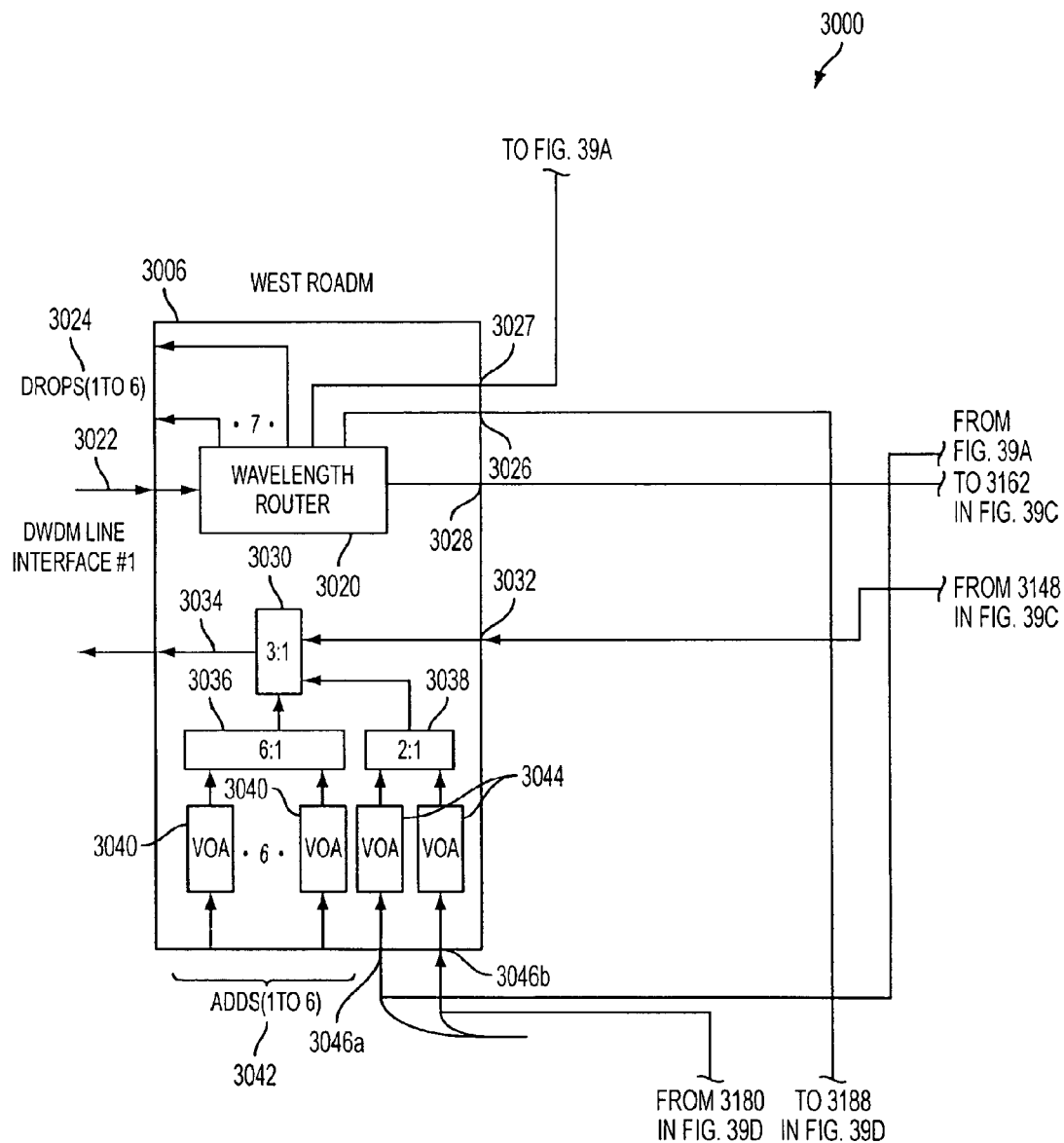
Figure 39C:
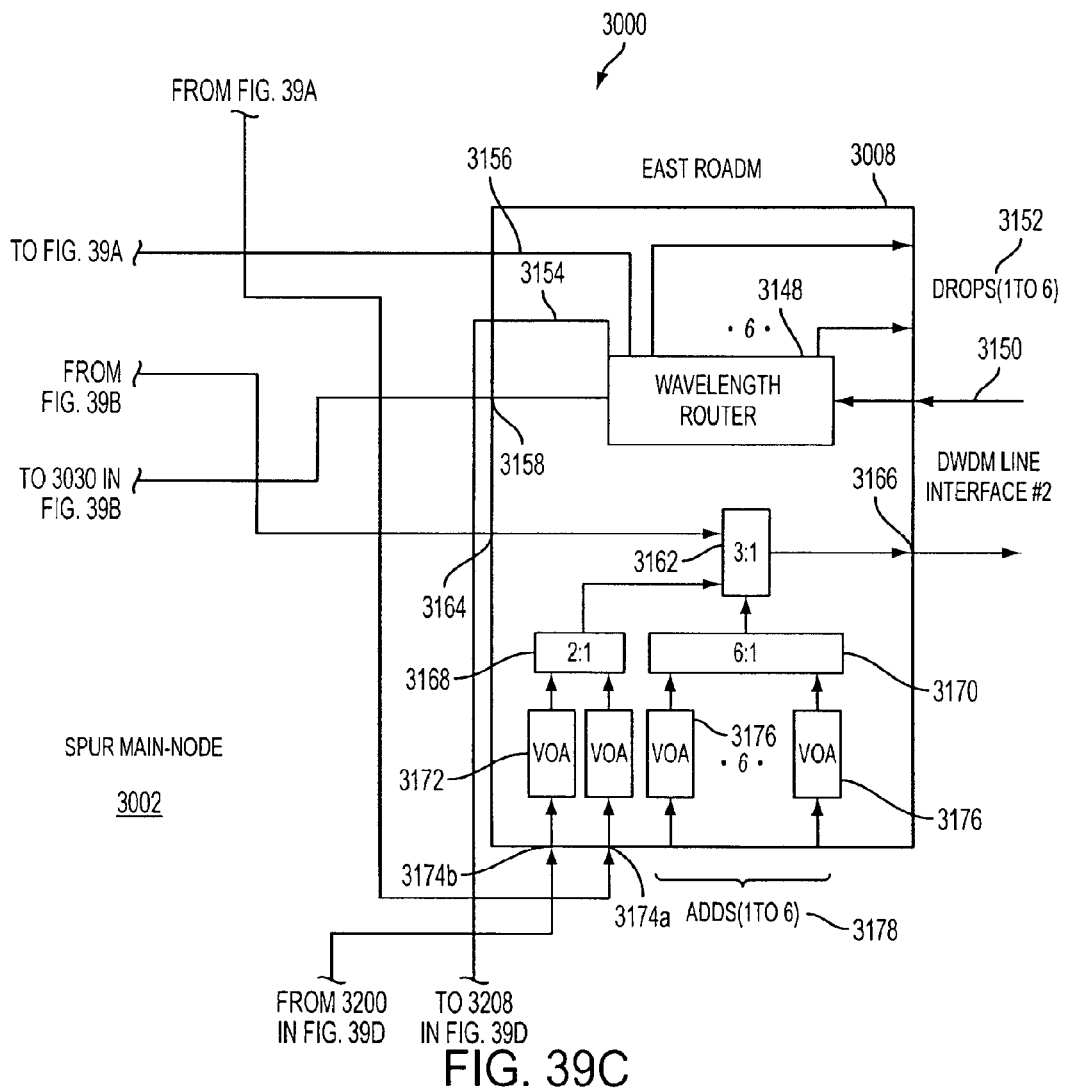
Figure 39D:
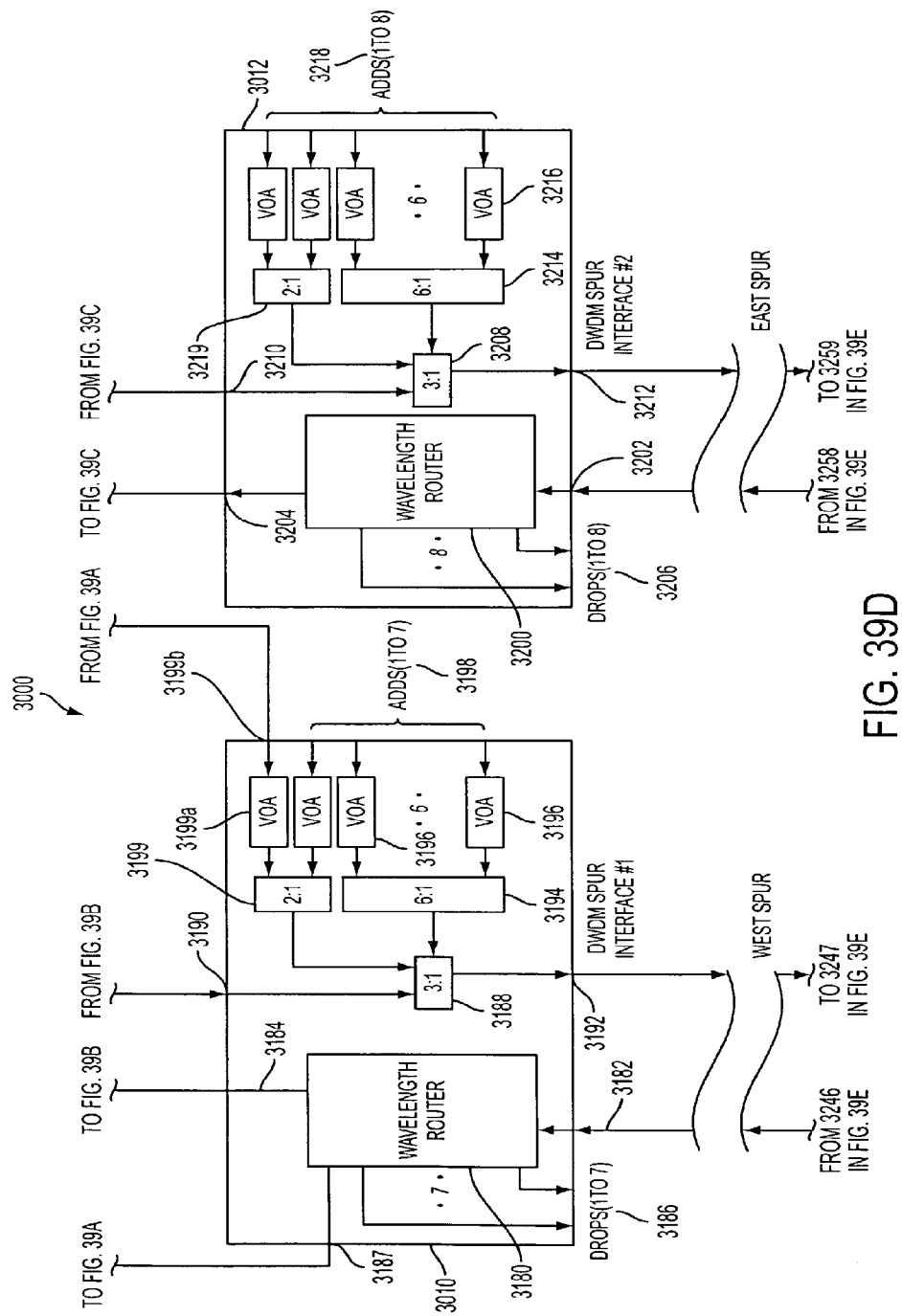
Figure 39E:
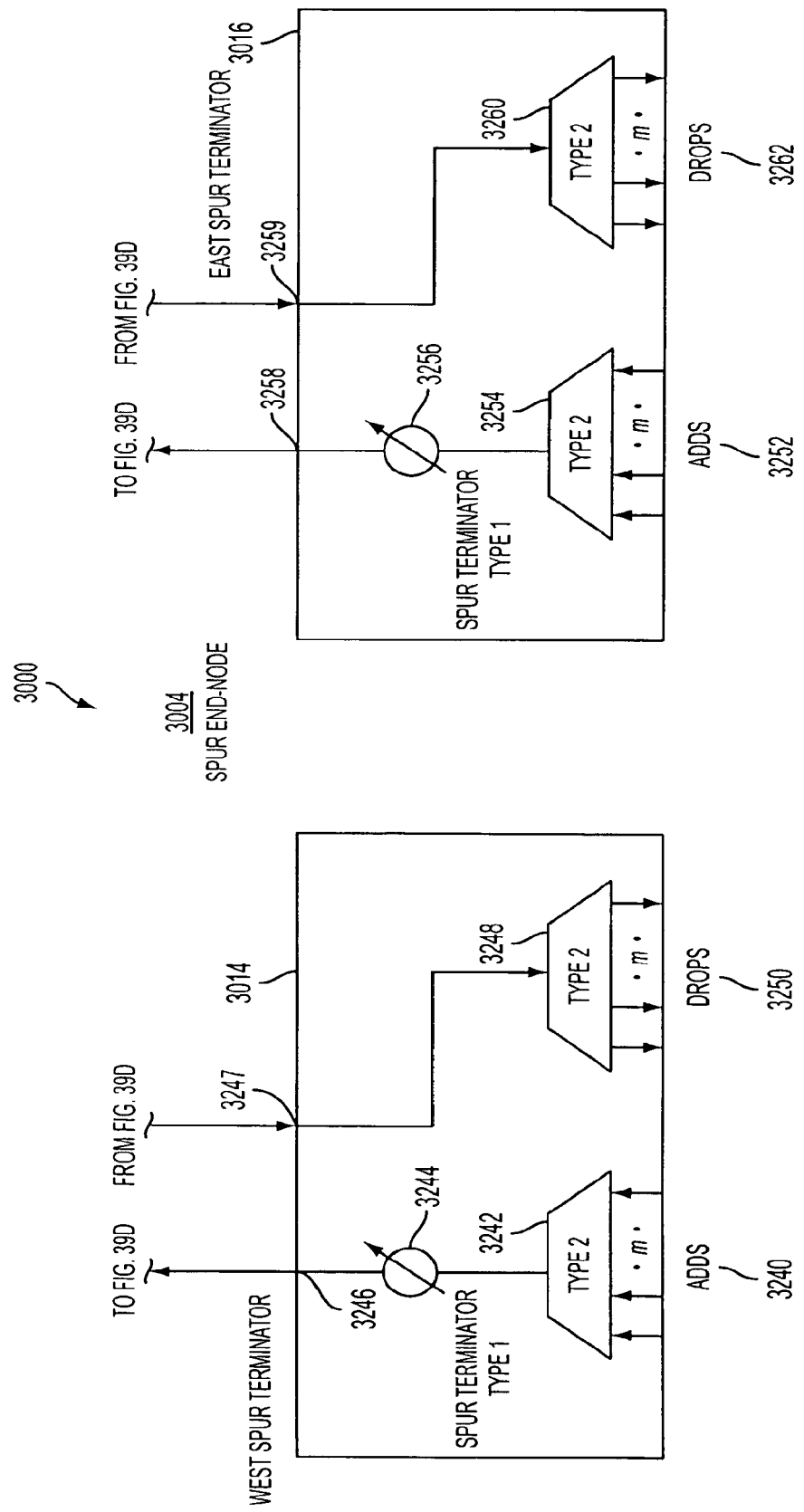

FIG. 38 illustrates an example embodiment of an optical node example embodiment #5. The optical node 2800 shown in FIG. 38 can include a spur main node 2802 and a spur end node 2804. The spur main node 2802 can include two different kinds of ROADMs: line-interface ROADMs (a west ROADM 2806 and an east ROADM 2808) and spur-interface ROADMs (west spur ROADM 2810 and east spur ROADM 2812). The line-interface ROADMs can be the same as, for example, the example embodiment #2 ROADM, although they are not limited thereto, and can be any other type of ROADM. These ROADMs can provide a DWDM line interface. The spur-interface ROADMs can be used to supply a spur interface, although the spur interface is not limited to using a ROADM. The spur-interface ROADM can be the same as, for example, the example embodiment #2 ROADM, but are not limited to being this type of ROADM, and can by any other type of ROADM. The spur end node 2804 that can include two type-1 spur terminators 2814 and 2816, which can be the same as, for example, the m-wavelength access spur terminator circuit pack shown in FIG. 32, although they are not limited thereto.

The spur-interface ROADMs in FIG. 38 are an example embodiment of another type of j-wavelength access spur circuit pack in the spur main node.

The node 2800, and the ROADMs and the spur terminators contained therein can include additional elements not shown in FIG. 38. It is also within the scope of the example embodiment for the ROADM core devices, the spur terminators, and the components thereof shown in FIG. 38 to be replaced by any other suitable component (or components) that performs (or perform) the same functions thereof.

The ROADM core device 2806 can comprise a type-4 light distributor 2820 that can receive optical signals input from a DWDM line interface or line in port 2822. The light distributor 2820 can drop optical signals from a first set of seven drop ports 2824 and a second set of drop ports comprising an eighth drop port 2826, although the example embodiment is not limited to this number of drop ports in the two sets. In this implementation, the first set of drop ports 2824 can function as drop ports to locally drop optical signals from the distributor 2820. The drop port 2826 in the second set can function in this instance as an express port to output optical signals along an optical fiber 2827 to the j-wavelength access spur circuit pack (in this case a type-4 ROADM) 2810 (specifically to a type-1, 3:1 light combiner 2888 that outputs optical signals to a DWDM spur interface 2892, which, in turn, outputs optical signals to a drop port 2950 through a type-2 light distributor 2948 in the west spur terminator 2814, as will be discussed below). The distributor 2820 can also output optical signals from an express out port 2828 along an optical fiber 2829 to the east ROADM 2808 (and specifically to a type-1, 3:1 light combiner 2862, which outputs received optical signals to a DWDM line out port 2866, as will be discussed below).

The ROADM core device 2806 can further comprise a 3:1, type-1 light combiner 2830 that can receive optical signals from an express input port 2832 (that can receive optical signals from an optical fiber 2860 that receives optical signals output from the type-4 light distributor 2848 of the east ROADM 2808), and can output optical signals to a DWDM line output interface 2834. The type-1 light combiner 2830 can also receive optical signals from two type-1A light combiners 2836 and 2838. The light combiner 2836 can be a 6:1 light combiner that receives optical signals from six VOAs 2840, which each can receive optical signals from one of six add ports 2842. Add ports 2842 constitute part of a first set of add ports that function only as add ports. The light combiner 2838 can be 2:1 light combiner that can receive optical signals from two VOAs 2844, which each can receive optical signals from one of two add ports. One of these add ports is part of the first set of add ports 2842 that functions as an add port in the FIG. 38 configuration. The other add port, add port 2846, constitutes a second add port set that functions here as an express port to receive optical signals from a type-4 light distributor 2880 in the spur circuit pack 2810, which in turn, receives optical signals processed and output by the type-2 light combiner 2942 and VOA 2944 of the spur terminator 2814. As a result, the express port 2846 can receive optical signals from the spur terminator 2814. In addition, the light distributor 2880 can also drop optical signals from drop ports 2886.

The type-1 light combiner 2830, the type-1A light combiners 2836 and 2838, the type-4 light distributor 2820, and VOAs 2840 and 2844 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiner 2830, the type-1A light combiners 2836 and 2838, the type-4 light distributor 2820, and VOAs 2840 and 2844 can be the same as, or different from, the type-1 light combiner 142, the type-1A light combiner 148, and the type-4 light distributor 132, and VOAs 150 shown in FIG. 10A. Also, the type-1 ROADM core device 2806 can include more than the number of components shown in FIG. 38, and it is within the scope of this example embodiment for any of the type-1 light combiner 2830, the type-1A light combiners 2836 and 2838, the type-4 light distributor 2820, and VOAs 2840 and 2844 to be replaced by any other suitable component (or components) that performs (or perform) the same or similar functions thereof, as discussed above.

The ROADM core device 2808 can comprise a type-4 light distributor 2848 that can receive optical signals input from a DWDM line interface or line in port 2850. The light distributor 2848 can drop optical signals from a first set of seven drop ports 2852 and a second set of drop ports comprising an eighth drop port 2854, although the example embodiment is not limited to this number of drop ports in the two sets. In this implementation, the first set of drop ports 2852 can function as drop ports to locally drop optical signals from the distributor 2848. The drop port 2854 in the second set can function in this instance as an express port to output optical signals along an optical fiber 2856 to the j-wavelength access spur circuit pack 2812 (specifically to a type-1, 3:1 light combiner 2908, which, in turn, outputs optical signals to the type-2 light distributor 2960 and one of the drop ports 2962 of the east spur terminator 2816, as will be discussed below). The distributor 2848 can also output optical signals from an express out port 2858 along an optical fiber 2860 to the west ROADM 2806 (and specifically to the type-1, 3:1 light combiner 2830, which outputs received optical signals to the DWDM line out port 2834).

The ROADM core device 2808 can further comprise a 3:1, type-1 light combiner 2862 that can receive optical signals from an express input port 2864 (that can receive optical signals from an optical fiber 2829 that, in turn, receives optical signals output from the type-4 light distributor 2820 of the west ROADM 2806), and can output optical signals to a DWDM line output interface 2866. The type-1 light combiner 2862 can also receive optical signals from two type-1A light combiners 2868 and 2870. The light combiner 2870 can be a 6:1 light combiner that can receive optical signals from six VOAs 2876, which each can receive optical signals from one of six add ports 2878. Add ports 2878 constitute part of a first set of add ports that function only as add ports. The light combiner 2868 can be 2:1 light combiner that can receive optical signals from two VOAs 2872, which each can receive optical signals from one of two add ports. One of these add ports is part of the first set of add ports 2878 that functions as an add port in the FIG. 38 configuration. The other add port, add port 2874, constitutes a second add port set that functions here as an express port to receive optical signals from an optical fiber 2904, which in turn receives optical signals from a type-4 light distributor 2900 in the spur circuit pack 2812, which in turn, receives optical signals processed and output by the type-2 light combiner 2954 and VOA 2956 of the spur terminator 2816. As a result, the express port 2874 can receive optical signals from the spur terminator 2816.

The type-1 light combiner 2862, the type-1A light combiners 2868 and 2870, the type-4 light distributor 2848, and VOAs 2872 and 2876 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiner 2862, the type-1A light combiners 2868 and 2870, the type-4 light distributor 2848, and VOAs 2872 and 2876 can be the same as, or different from, the type-1 light combiner 142, the type-1A light combiner 148, and the type-4 light distributor 132, and VOAs 150 shown in FIG. 10A. Also, the type-1 ROADM core device 2808 can include more than the number of components shown in FIG. 38, and it is within the scope of this example embodiment for any of the type-1 light combiner 2862, the type-1A light combiners 2868 and 2870, the type-4 light distributor 2848, and VOAs 2872 and 2876 to be replaced by any other suitable component (or components) that performs (or perform) the same or similar functions thereof, as discussed above.

As noted above, the spur circuit pack 2810 can include a type-4 light distributor 2880 that can receive optical signals from a DWDM line in port 2882 (from the west spur terminator 2814), and can output optical signals to a line out port 2884 and then to the add/express port 2846 of the west ROADM 2806. The light distributor 2880 can also output optical signals on drop ports 2886. The type-1, 3:1 light combiner 2888 of the spur circuit pack 2810 can receive optical signals from the light distributor 2820 of the west ROADM 2806 via the line in port 2890, and can output optical signals to the DWDM line out port 2892. The light combiner 2888 also can receive optical signals from both a type-1A, 6:1 light combiner 2894 (which receives optical signals from six VOA's 2896, which, in turn, receive optical signals from add ports 2898) and from a type-1A, 2:1 light combiner 2899 (which receives optical signals from two VOAs 2896, which, in turn, receive optical signals from add ports 2898).

Similarly, the spur circuit pack 2812 can include a type-4 light distributor 2900 that can receive optical signals from a DWDM line in port 2902 (from the west spur terminator 2816), and can output optical signals to a line out port 2904 and then to the add/express port 2874 of the west ROADM 2808. The light distributor 2900 can also output optical signals on drop ports 2906. The type-1, 3:1 light combiner 2908 of the spur circuit pack 2812 can receive optical signals from the light distributor 2848 of the west ROADM 2808 via the line in port 2910, and can output optical signals to the DWDM line out port 2912. The light combiner 2908 also can receive optical signals from both a type-1A, 6:1 light combiner 2914 (which receives optical signals from six VOA's 2916, which, in turn, receive optical signals from add ports 2918) and from a type-1A, 2:1 light combiner 2919 (which receives optical signals from two VOAs 2916, which, in turn, receive optical signals from add ports 2918).

The type-4 light distributors 2880 and 2900, the type-1 light combiners 2888 and 2908, the type-1A light combiners 2894, 2899, 2914, and 2919, and the VOAs 2896 and 2916 can be the same as, for example, the type-4 light distributor 76, the type-1 light combiner 30, the type-1A light combiner 58, and the VOAs 48, respectively, as shown in FIGS. 6, 2B, 3B, and 3B, although they are not limited thereto. In addition, the type-4 light distributors 2880 and 2900, the light combiners 2888, 2894, 2899, 2908, 2914, and 2919, and the VOAs 2896 and 2916 can be the same as, or different from, the type-4 light distributors, the light combiners, and the VOAs respectively, shown in any of the other figures. Also, the spur circuit packs 2810 and 2812 can include more than the number of components shown in FIG. 38, and it is within the scope of this example embodiment for any of the type-4 light distributors 2880 and 2900, the light combiners 2888, 2894, 2899, 2908, 2914, and 2919, and the VOAs 2896 and 2916 to be replaced by any other suitable component (or components) that performs (or perform) the same or similar functions thereof, as discussed above.

The west spur terminator 2814 can include colored add ports 2940, and a type-2 light combiner 2942 that can receive optical signals from the add ports 2940 and that can output multiplexed optical signals to a VOA 2944, which can output optical signals to the line out port 2946, which, in turn, can output optical signals to the type-4 light combiner 2880 of the spur circuit pack 2810. The spur terminator 2814 can also include a type-2 light distributor 2948 that can receive optical signals from the light combiner 2888 of the spur circuit pack 2810, which, in turn, receives optical signals from the type-4 light distributor 2820 of the ROADM 2806 and that can output optical signals to colored drop ports 2950.

The east spur terminator 2816 can include colored add ports 2952, and a type-2 light combiner 2954 that can receive optical signals from the add ports 2952 and that can output multiplexed optical signals to a VOA 2956, which can output optical signals to the line out port 2958, which, in turn, can output optical signals to the type-4 light combiner 2900 of the spur circuit pack 2812. The spur terminator 2816 can also include a type-2 light distributor 2960 that can receive optical signals from the light combiner 2908 of the spur circuit pack 2812, which, in turn, can receive optical signals from the light distributor 2848 of the east ROADM 2808 and that can output optical signals to colored drop ports 2962.

The type-2 light distributors 2948 and 2960, the type-2 light combiners 2942 and 2954, and the VOAs 2944 and 2956 can be the same as, for example, the type-2 light distributor 52, the type-2 light combiner 58, and the VOAs 48, respectively, as shown in FIGS. 4A, 4B, and 3B, although they are not limited thereto. In addition, the type-2 light distributors 2948 and 2960, the type-2 light combiners 2942 and 2954, and the VOAs 2944 and 2956 can be the same as, or different from, the type-2 light distributor, the type-2 light combiner, and the VOAs, respectively, shown in any of the other figures. Also, the spur terminator packs 2814 and 2816 can include more than the number of components shown in FIG. 38, and it is within the scope of this example embodiment for any of the type-2 light distributors 2948 and 2960, the type-2 light combiners 2942 and 2954, and the VOAs 2944 and 2956 to be replaced by any other suitable component (or components) that performs (or perform) the same or similar functions thereof, as discussed above.

In this example embodiment of a circuit pack (2810, 2812) shown in FIG. 38, j can be equal to k, where j represents the number of add ports on the j-wavelength access spur circuit pack, and k represents the number of subtending inputs and/or outputs, and k can be less than m (where m is the number of wavelengths of differing frequency supported by the DWDM system). But it is within the scope of the example embodiment for j not to be equal to k, and for k not to be less than m. Unlike the example embodiments provided earlier of the optical node example embodiment #4, the example embodiment of optical node example embodiment #5 shown in FIG. 38 can provide the ability to add and drop spur "local traffic" in the spur main node via colorless add/drop ports, although this example embodiment of optical node embodiment #5 is not limited thereto. In addition, in this example embodiment, the physical distance between the spur main node 2802 and the spur end node 2804 can be used to determine the input-amplifier gain of the amplifiers (not shown) associated with the spur and whether or not output amplifiers are used with the spurs, as discussed with reference to FIG. 30, although it is within the scope of the example embodiment to base such input-and-output-amplifier decisions on other considerations.

Wavelengths from the spur end node (2804) that are dropped locally at the j-wavelength access spur circuit pack (the spur-interface ROADMs 2810 and 2812) in the spur main node 2802 in FIG. 38 can be prevented from exiting the j-wavelength access spur circuit pack to its associated line-interface ROADM (2806, 2808) via the wavelength router (2880, 2900) on the j-wavelength access spur circuit pack (2810, 2812), although such wavelengths can also be passed to the associated line-interface ROADM (2806, 2808). Therefore in cases where optical nodes implemented with optical node example embodiment #5 are paired with optical nodes using type-4 ROADM cores in the same network, wavelengths used for spur local traffic can be reused on every spur in the network, although it is within the scope of the example embodiment to configure the network not to reuse the same wavelengths on every spur in the network.

FIG. 39 shows another example embodiment of optical node example embodiment #5. More specifically, FIG. 39 shows an example embodiment of a network 3000 in which an optical spur is added to a three degree node. The network 3000 can include a spur main node 3002 and a spur end node 3004, but the network 3000 is not limited to these two nodes and can include other nodes. The spur main node 3002 can include a west ROADM 3006, a north ROADM 3007, an east ROADM 3008, a west spur circuit pack 3010 in the form of a type-1 ROADM, and an east spur circuit pack 3012 in the form of a type-1 ROADM. It is within the scope of this example embodiment for the spur main node 3002 to include additional elements not shown in FIG. 39. The spur end node 3004 includes west spur terminator 3014 and east spur terminator 3016. It is within the scope of this example embodiment for the spur end node 3004 to include additional elements not shown in FIG. 39. It is also within the scope of the example embodiment for the ROADMs, the spur terminators, and the components thereof shown in FIG. 39 to be the same as or different from the ROADMs, spur terminators, and components thereof previously described. It is also within the scope of this example embodiment for the ROADMs, the spur terminators, and the components thereof shown in FIG. 39 replaced by any other suitable component (or components) that performs (or perform) the same functions thereof. It is further within the scope of this example embodiment for the spur circuit packs 3010 and 3012 to be replaced by any other type of spur circuit element that performs the same or similar functions including the spur circuit packs previously described.

In FIG. 39, either the west ROADM 3006 or the north ROADM 3007 can send/receive wavelengths to and from the west optical spur pack 3010. In other example embodiments, either the west ROADM or the north ROADM can send/receive wavelengths to and from the east optical spur pack 3012 or both optical spurs packs 3010 and 3012. In the example embodiment shown in FIG. 39, the ROADM core devices can be the same as, for example, the ROADM cores shown in FIG. 38, although they are not limited thereto. The j-wavelength access spur circuit packs 3010 and 3012 can be the same as, for example, the j-wavelength access spur circuit pack shown in FIG. 38, although they are not limited thereto. The spur end node 3004 in FIG. 39 can be the same as, for example, the spur end node shown in FIG. 38, although it is not limited thereto.

The west ROADM core device 3006 can comprise a type-4 light distributor 3020 that can receive optical signals input from a DWDM line interface or line in port 3022. The light distributor 3020 can drop optical signals from a first set of six drop ports 3024 and a second set of drop ports comprising two drop ports 3026 and 3027, although the example embodiment is not limited to this number of drop ports in the two sets. The first set of drop ports 3024 can function exclusively as drop ports to locally drop optical signals from the distributor 3020. The drop ports 3026 and 3027 in the second set can function in this instance as express ports to output optical signals respectively to: the j-wavelength access spur circuit pack (in this case a type-4 ROADM) 3010 (specifically to a type-1, 3:1 light combiner 3188 that outputs optical signals to a DWDM spur interface 3192, which, in turn, outputs optical signals to a drop port 3250 through a type-2 light distributor 3248 in the west spur terminator 3014, as will be discussed below); and the north ROADM 3007 (and specifically to add port 3146*a* thereof, which outputs optical signals to a VOA 3144, which in turn, outputs optical signals to a type-1A, 2:1 light combiner 3138, which in turn, outputs optical signals to a type-1, 3:1 light combiner 3130 that outputs optical signals to a DWDM line out port 3134). The distributor 3020 can also output optical signals from an express out port 3028 to the east ROADM 3008 (and specifically to a type-1, 3:1 light combiner 3162, which outputs received optical signals to a DWDM line out port 3166, as will be discussed below).

The ROADM core device 3006 can further comprise a 3:1, type-1 light combiner 3030 that can receive optical signals from an express input port 3032 (that can receive optical signals from a type-4 light distributor 3158 of the east ROADM 3008), and can output optical signals to a DWDM line output interface 3034. The type-1 light combiner 3030 can also receive optical signals from two type-1A light combiners 3036 and 3038. The light combiner 3036 can be a 6:1 light combiner that receives optical signals from six VOAs 3040, which each can receive optical signals from one of six add ports 3042. Add ports 3042 constitute a first set of add ports that function only as add ports. The light combiner 3038 can be 2:1 light combiner that can receive optical signals from two VOAs 3044, which each can receive optical signals from one of two add ports 3046a and 3046b constituting a second set of add ports that functions here as express ports. One add port 3046a can receive optical signals from a type-4 light distributor 3120 in the north ROADM 3007. The other add port 3046b can receive optical signals from a type-4 light distributor 3180 in the spur circuit pack 3010, which in turn, can receive optical signals processed and output by a type-2 light combiner 3242 (which receives signals from add ports 3240) and VOA 3244 of the spur terminator 3014. As a result, the express port 3046b can receive optical signals from the spur terminator 3014. In addition, the light distributor 3180 can also drop optical signals from seven drop ports 3186.

The type-1 light combiner 3030, the type-1A light combiners 3036 and 3038, the type-4 light distributor 3020, and VOAs 3040 and 3044 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiner 3030, the type-1A light combiners 3036 and 3038, the type-4 light distributor 3020, and VOAs 3040 and 3044 can be the same as, or different from, the type-1 light combiner 142, the type-1A light combiner 148, and the type-4 light distributor 132, and VOAs 150 shown in FIG. 10A. Also, the type-1 ROADM core device 3006 can include more than the number of components shown in FIG. 39, and it is within the scope of this example embodiment for any of the type-1 light combiner 3030, the type-1A light combiners 3036 and 3038, the type-4 light distributor 3020, and VOAs 3040 and 3044 to be replaced by any other suitable component (or components) that performs (or perform) the same or similar functions thereof, as discussed above.

The north ROADM core device 3007 can comprise a type-4 light distributor 3120 that can receive optical signals input from a DWDM line interface or line in port 3122. The light distributor 3120 can drop optical signals from a first set of six drop ports 3124. The first set of drop ports 3124 can function exclusively as drop ports to locally drop optical signals from the distributor 3120. The light distributor 3120 can also output optical signals from an express out port 3126, which is connected to add port 3199b of the spur circuit pack 3010. Add port 3199b outputs optical signals to VOA 3199a, which outputs optical signals to a type-1A, 2:1 light combiner 3199. Light combiner 3199 outputs optical signals to a type-1, 3:1 light combiner 3188, which outputs optical signals to DWDM line out port 3192, which, in turn, outputs optical signals to drop ports 3250 in the west spur terminator 3014 via a type-2 light distributor 3248. Therefore, the light distributor 3120 can drop optical signals to the west spur terminator 3014. The light distributor 3120 also can output optical signals to a second set of drop ports comprising two drop ports 3127 and 3128 (it is within the scope of this example embodiment for the two sets of drop ports to include different numbers of drop ports than those shown in FIG. 39). The drop ports 3127 and 3128 in the second set can function in this instance as express ports to output optical signals respectively to: the add/express port 3046a in the west ROADM 3006; and an add/express port 3174a in the east ROADM 3008.

The north ROADM core device 3007 can further comprise a 3:1, type-1 light combiner 3130 that can receive optical signals from an express input port 3132 (that can receive optical signals from a type-4 light distributor 3180 of the spur circuit pack 3010, which can receive optical signals from add ports 3240 of the west spur terminator 3014 via the type-2 light combiner 3242 and the VOA 3244), and can output optical signals to a DWDM line output interface 3134. The type-1 light combiner 3130 can also receive optical signals from two type-1A light combiners 3136 and 3138. The light combiner 3136 can be a 6:1 light combiner that receives optical signals from six VOAs 3140, which each can receive optical signals from one of six add ports 3142. Add ports 3142 constitute a first set of add ports that function only as add ports. The light combiner 3138 can be 2:1 light combiner that can receive optical signals from two VOAs 3144, which each can receive optical signals from one of two add ports 3146a and 3146b constituting a second set of add ports that functions here as express ports. One add port 3146a can receive optical signals from the type-4 light distributor 3020 in the west ROADM 3006. The other add port 3146b can receive optical signals from a type-4 light distributor 3148 in the east ROADM 3008.

The type-1 light combiner 3130, the type-1A light combiners 3136 and 3138, the type-4 light distributor 3120, and VOAs 3140 and 3144 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiner 3130, the type-1A light combiners 3136 and 3138, the type-4 light distributor 3120, and VOAs 3140 and 3144 can be the same as, or different from, the type-1 light combiner 142, the type-1A light combiner 148, and the type-4 light distributor 132, and VOAs 150 shown in FIG. 10A. Also, the type-1 ROADM core device 3007 can include more than the number of components shown in FIG. 39, and it is within the scope of this example embodiment for any of the type-1 light combiner 3130, the type-1A light combiners 3136 and 3138, the type-4 light distributor 3120, and VOAs 3140 and 3144 to be replaced by any other suitable component (or components) that performs (or perform) the same or similar functions thereof, as discussed above.

The east ROADM core device 3008 can comprise a type-4 light distributor 3148 that can receive optical signals input from a DWDM line interface or line in port 3150. The light distributor 3148 can drop optical signals from a first set of six drop ports 3152 and a second set of drop ports comprising two drop ports 3154 and 3156, although the example embodiment is not limited to this number of drop ports in the two sets. The first set of drop ports 3152 can function exclusively as drop ports to locally drop optical signals from the distributor 3148. The drop ports 3154 and 3156 in the second set can function in this instance as express ports to output optical signals respectively to: the j-wavelength access spur circuit pack (in this case a type-4 ROADM) 3012 (specifically to a type-1, 3:1 light combiner 3208 that outputs optical signals to a DWDM spur interface 3212, which, in turn, outputs optical signals to a drop port 3262 through a type-2 light distributor 3260 in the east spur terminator 3016, as will be discussed below); and the north ROADM 3006 (and specifically to one of the add ports 3146b thereof, which outputs optical signals to a VOA 3144, which in turn, outputs optical signals to a type-1A, 2:1 light combiner 3138, which in turn, outputs optical signals to a type-1, 3:1 light combiner 3130 that outputs optical signals to a DWDM line out port 3134). The distributor 3148 can also output optical signals from an express out port 3158 to the west ROADM 3006 (and specifically to a type-1, 3:1 light combiner 3030, which outputs received optical signals to a DWDM line out port 3034).

The east ROADM core device 3008 can further comprise a 3:1, type-1 light combiner 3162 that can receive optical signals from an express input port 3164 (that can receive optical signals from a type-4 light distributor 3020 of the west ROADM 3006), and can output optical signals to a DWDM line output interface 3166. The type-1 light combiner 3162 can also receive optical signals from two type-1A light combiners 3168 and 3170. The light combiner 3170 can be a 6:1 light combiner that receives optical signals from six VOAs 3176, which each can receive optical signals from one of six add ports 3178. Add ports 3178 constitute a first set of add ports that function only as add ports. The light combiner 3168 can be 2:1 light combiner that can receive optical signals from two VOAs 3172, which each can receive optical signals from one of two add ports 3174a and 3174b constituting a second set of add ports that functions here as express ports. One add port 3176a can receive optical signals from a type-4 light distributor 3120 in the north ROADM 3007. The other add port 3174b can receive optical signals from a type-4 light distributor 3200 in the spur circuit pack 3012, which in turn, can receive optical signals processed and output by a type-2 light combiner 3254 (which receives signals from add ports 3252) and VOA 3256 of the spur terminator 3016. As a result, the express port 3174b can receive optical signals from the spur terminator 3016. In addition, the light distributor 3200 can also drop optical signals from eight drop ports 3206.

The type-1 light combiner 3162, the type-1A light combiners 3168 and 3170, the type-4 light distributor 3148, and VOAs 3172 and 3176 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiner 3162, the type-1A light combiners 3168 and 3170, the type-4 light distributor 3148, and VOAs 3172 and 3176 can be the same as, or different from, the type-1 light combiner 142, the type-1A light combiner 148, and the type-4 light distributor 132, and VOAs 150 shown in FIG. 10A. Also, the type-1 ROADM core device 3008 can include more than the number of components shown in FIG. 39, and it is within the scope of this example embodiment for any of the type-1 light combiner 3162, the type-1A light combiners 3168 and 3170, the type-4 light distributor 3148, and VOAs 3172 and 3176 to be replaced by any other suitable component (or components) that performs (or perform) the same or similar functions thereof, as discussed above.

As noted above, the spur circuit pack 3010 can include a type-4 light distributor 3180 that can receive optical signals from a DWDM line in port 3182 (that receives optical signals from the west spur terminator 3014), and can output optical signals to an express out port 3184 and then to the add/express port 3046b of the west ROADM 3006. The light distributor 3180 can also output optical signals on seven drop ports 3186. The type-1, 3:1 light combiner 3188 of the spur circuit pack 3010 can receive optical signals from the light distributor 3020 of the west ROADM 3006 via the line in port 3190, and can output optical signals to the DWDM line out port 3192. The light combiner 3188 also can receive optical signals from both a type-1A, 6:1 light combiner 3194 (which receives optical signals from six VOA's 3196, which, in turn, receive optical signals from add ports 3198) and from a type-1A, 2:1 light combiner 3199 (which receives optical signals from two VOAs 3199a, which, in turn, receive optical signals from add ports 3199b).

Similarly, the spur circuit pack 3012 can include a type-4 light distributor 3200 that can receive optical signals from a DWDM line in port 3202 (that receives optical signals from the east spur terminator 3016), and can output optical signals to an express out port 3204 and then to the add/express port 3174b of the east ROADM 3008. The light distributor 3200 can also output optical signals on eight drop ports 3206. The type-1, 3:1 light combiner 3208 of the spur circuit pack 3012 can receive optical signals from the light distributor 3148 of the east ROADM 3008 via the express in port 3210, and can output optical signals to the DWDM line out port 3212. The light combiner 3208 also can receive optical signals from both a type-1A, 6:1 light combiner 3214 (which receives optical signals from six VOA's 3216, which, in turn, receive optical signals from add ports 3218) and from a type-1A, 2:1 light combiner 3219 (which receives optical signals from two VOAs 3216, which, in turn, receive optical signals from add ports 3218).

The type-4 light distributors 3180 and 3200, the type-1 light combiners 3188 and 3208, the type-1A light combiners 3194, 3199, 3214, and 3219, and the VOAs 3196 and 3216 can be the same as, for example, the type-4 light distributor 76, the type-1 light combiner 30, the type-1A light combiner 58, and the VOAs 48, respectively, as shown in FIGS. 6, 2B, 3B, and 3B, although they are not limited thereto. In addition, the type-4 light distributors 3180 and 3200, the type-1 light combiners 3188 and 3208, the type-1A light combiners 3194, 3199, 3214, and 3219, and the VOAs 3196 and 3216 can be the same as, or different from, the type-4 light distributors, the light combiners, and the VOAs respectively, shown in any of the other figures. Also, the spur circuit packs 3010 and 3012 can include more than the number of components shown in FIG. 39, and it is within the scope of this example embodiment for any of the type-4 light distributors 3180 and 3200, the type-1 light combiners 3188 and 3208, the type-1A light combiners 3194, 3199, 3214, and 3219, and the VOAs 3196 and 3216 to be replaced by any other suitable component (or components) that performs (or perform) the same or similar functions thereof, as discussed above.

The west spur terminator 3014 can include colored add ports 3240, and a type-2 light combiner 3242 that can receive optical signals from the add ports 3240 and that can output multiplexed optical signals to a VOA 3244, which can output optical signals to the line out port 3246, which in turn, can output optical signals to the type-4 light combiner 3180 of the spur circuit pack 3010. The spur terminator 3014 can also include a type-2 light distributor 3248, that can receive optical signals from the light combiner 3188 of the spur circuit pack 3010, which, in turn, receives optical signals from the type-4 light distributor 3020 of the west ROADM 3006, and that can output optical signals to colored drop ports 3250.

The east spur terminator 3016 can include colored add ports 3252, and a type-2 light combiner 3254 that can receive optical signals from the add ports 3252 and that can output multiplexed optical signals to a VOA 3256, which can output optical signals to the line out port 3258, which in turn, can output optical signals to the type-4 light distributor 3200 of the spur circuit pack 3012. The spur terminator 3016 can also include a type-2 light distributor 3260, that can receive optical signals from the light combiner 3208 of the spur circuit pack 3012, which, in turn, can receive optical signals from the light distributor 3148 of the east ROADM 3008, and that can output optical signals to colored drop ports 3262.

The type-2 light distributors 3248 and 3260, the type-2 light combiners 3242 and 3254, and the VOAs 3244 and 3256 can be the same as, for example, the type-2 light distributor 52, the type-2 light combiner 58, and the VOAs 48, respectively, as shown in FIGS. 4A, 4B, and 3B, although they are not limited thereto. In addition, the type-2 light distributors 3248 and 3260, the type-2 light combiners 3242 and 3254, and the VOAs 3244 and 3256 can be the same as, or different from, the type-2 light distributor, the type-2 light combiner, and the VOAs, respectively, shown in any of the other figures. Also, the spur terminator packs 3014 and 3016 can include more than the number of components shown in FIG. 39, and it is within the scope of this example embodiment for any of the type-2 light distributors 3248 and 3260, the type-2 light combiners 3242 and 3254, and the VOAs 3244 and 3256 to be replaced by any other suitable component (or components) that performs (or perform) the same or similar functions thereof, as discussed above.

Figure 40A:
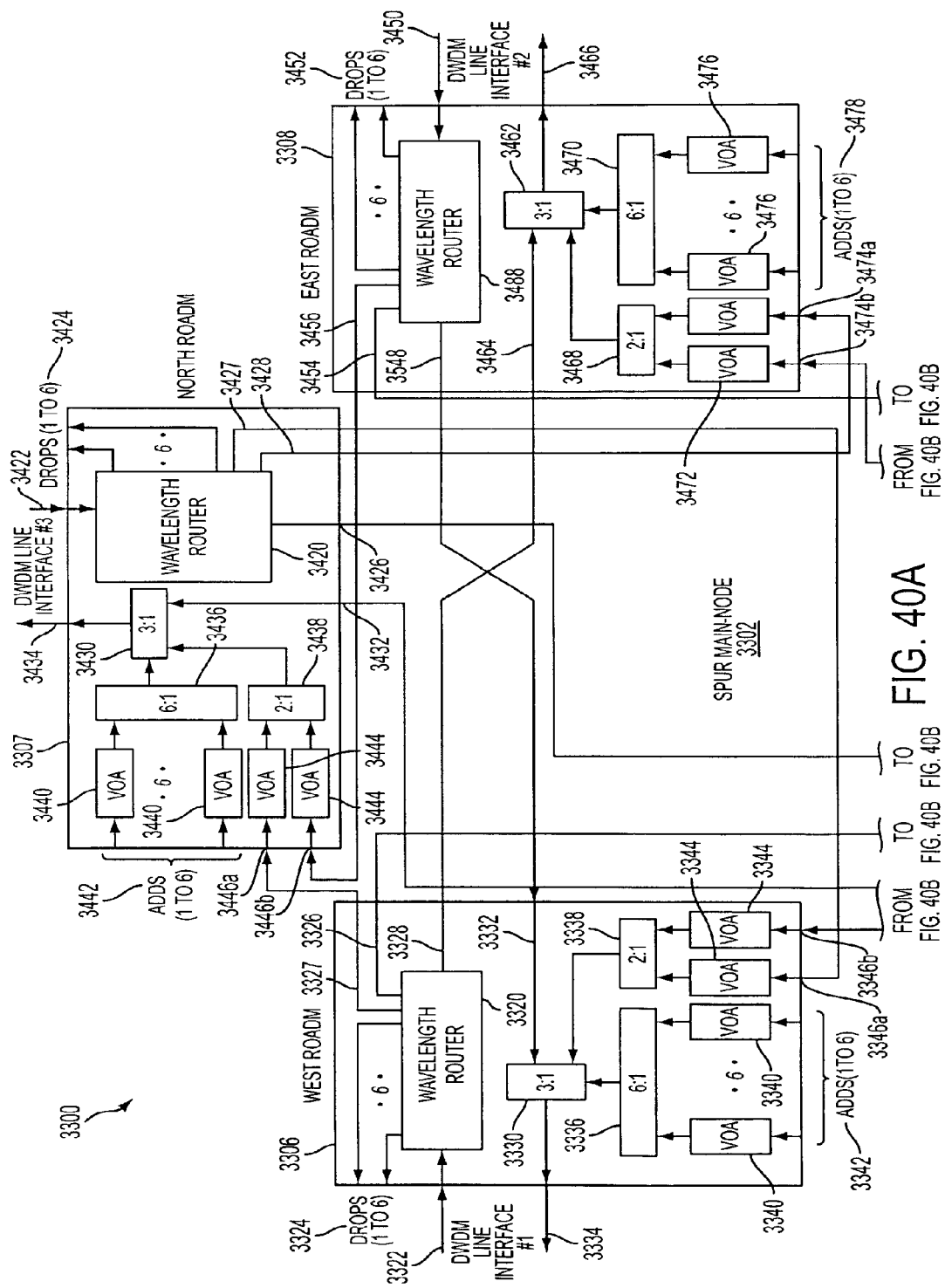
FIG. 40 is a block diagram of another example embodiment of optical node example embodiment #5, which is a three-degree node with a single homed protected spur, and the use of a type-1 ROADM as the colorless spur terminator.
Figure 40B:
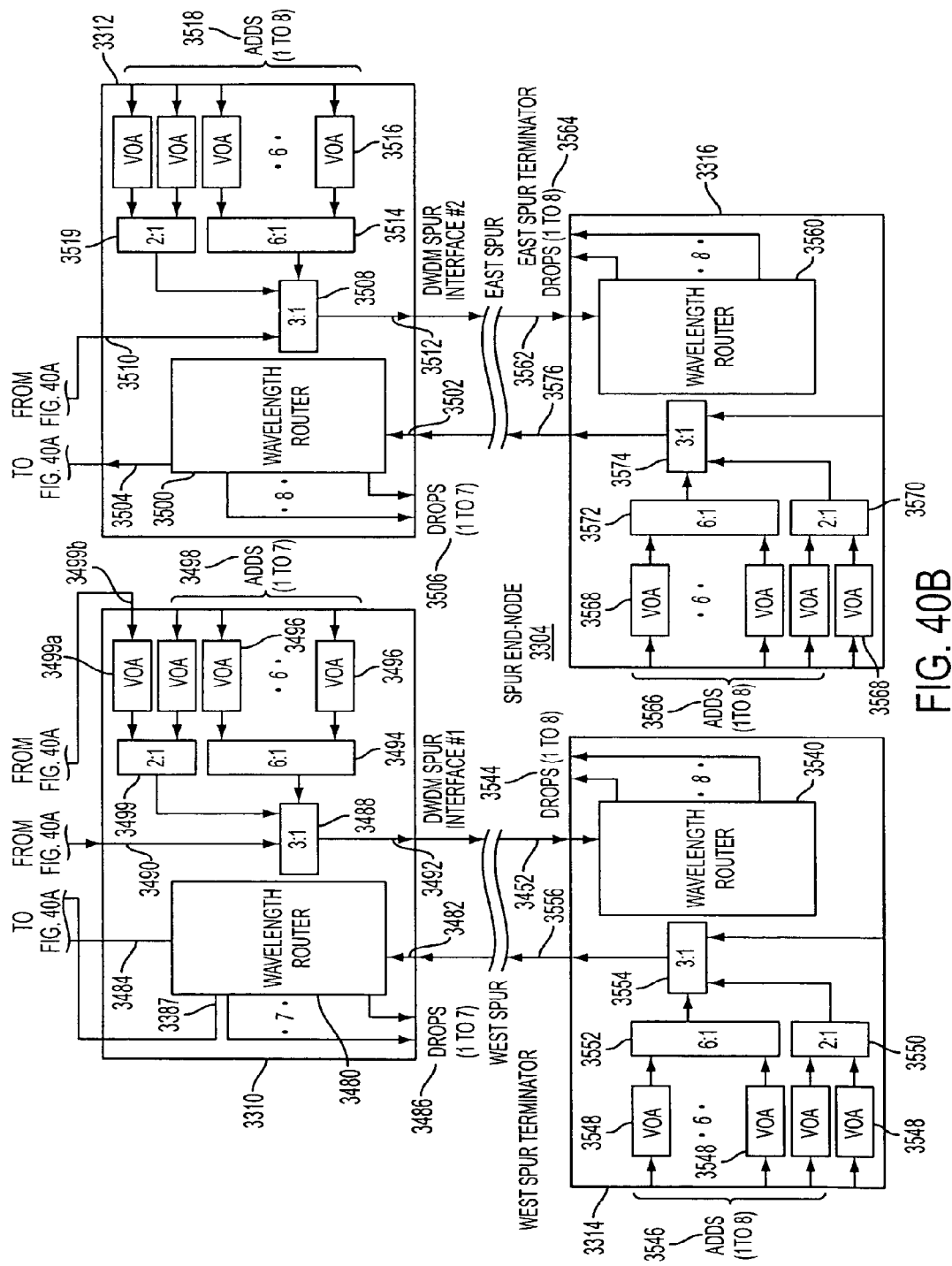

FIG. 40 shows another example embodiment of optical node example embodiment #5. More specifically, FIG. 40 shows a network 3300 in which an optical spur is added to a three degree node. The network 3300 can include a spur main node 3302 and a spur end node 3304, but the network 3300 is not limited to these two nodes and can include other nodes. The spur main node 3302 can include a west ROADM 3306, a north ROADM 3307, an east ROADM 3308, a west spur circuit pack 3310 in the form of a type-1 ROADM, and an east spur circuit pack 3312 in the form of a type-1 ROADM. It is within the scope of this example embodiment for the spur main node 3302 to include additional elements not shown in FIG. 40. The spur end node 3304 includes west spur terminator 3314 and east spur terminator 3316. It is within the scope of this example embodiment for the spur end node 3304 to include additional elements not shown in FIG. 40. It is also within the scope of the example embodiment for the ROADMs, the spur terminators, and the components thereof shown in FIG. 40 to be the same as or different from the ROADMs, spur terminators, and components thereof previously described. It is also within the scope of this example embodiment for the ROADMs, the spur terminators, and the components thereof shown in FIG. 40 replaced by any other suitable component (or components) that performs (or perform) the same functions thereof. It is further within the scope of this example embodiment for the spur circuit packs 3310 and 3312 to be replaced by any other type of spur circuit element that performs the same or similar functions including the spur circuit packs previously described.

The ROADMs in the spur main node 3302 can be the same as, for example, the ROADM example embodiment #2, although they are not limited thereto. The spur circuit packs 3310 and 3312 can be m-wavelength access spur circuit packs that can be the same as, for example, the m-wavelength access spur circuit pack shown in FIG. 38, although they are not limited thereto. The spur terminator circuit packs 3314 and 3316 in the spur end node 3304 can include, for example, two m-wavelength access spur terminator circuit packs. But, in this example embodiment, the two m-wavelength access spur terminator circuit packs 3314 and 3316 in the spur end node can be of a type that is different from the m-wavelength access spur terminator circuit pack that shown in FIG. 32. The two m-wavelength access spur terminator circuit packs 3314 and 3316 shown in FIG. 40 can have the same configuration as the two m-wavelength access spur circuit packs 3310 and 3312 in the spur main node, although they are not limited thereto. For this type of m-wavelength access spur terminator circuit pack, j can be equal to k, where j is the number of drop ports, and k is the number of subtending inputs/outputs, where k is less than m, although in other example embodiments of the j-wavelength access spur terminator circuit pack, j is not equal to k and k is not less than m. In the FIG. 40 example embodiment, the add/drop ports on the j-wavelength access spur terminator circuit packs 3314 and 3316 can be colorless add drop ports, although they are not limited thereto.

The west ROADM core device 3306 can comprise a type-4 light distributor 3320 that can receive optical signals input from a DWDM line interface or line in port 3322. The light distributor 3320 can drop optical signals from a first set of six drop ports 3324 and a second set of drop ports comprising two drop ports 3326 and 3327, although the example embodiment is not limited to this number of drop ports in the two sets. The first set of drop ports 3324 can function exclusively as drop ports to locally drop optical signals from the distributor 3320. The drop ports 3326 and 3327 in the second set can function in this instance as express ports to output optical signals respectively to: the j-wavelength access spur circuit pack 3310 (in this case a type-4 ROADM) (specifically to a type-1, 3:1 light combiner 3488 that outputs optical signals to a DWDM spur interface 3492, which, in turn, outputs optical signals to drop ports 3544 through a type-4 light distributor 3540 in the west spur terminator 3314, as will be discussed below); and the north ROADM 3307 (and specifically to an add port 3446a, which outputs optical signals to a VOA 3444, which in turn, outputs optical signals to a type-1A, 2:1 light combiner 3438, which in turn, outputs optical signals to a type-1, 3:1 light combiner 3430 that outputs optical signals to a DWDM line out port 3434). The distributor 3320 can also output optical signals from an express out port 3328 to the east ROADM 3308 (and specifically to a type-1, 3:1 light combiner 3462, which outputs received optical signals to a DWDM line out port 3466, as will be discussed below).

The ROADM core device 3306 can further comprise a 3:1, type-1 light combiner 3330 that can receive optical signals from an express input port 3332 (that can receive optical signals from a type-4 light distributor 3448 of the east ROADM 3308), and can output optical signals to a DWDM line output interface 3334. The type-1 light combiner 3330 can also receive optical signals from two type-1A light combiners 3336 and 3338. The light combiner 3336 can be a 6:1 light combiner that receives optical signals from six VOAs 3340, which each can receive optical signals from one of six add ports 3342. Add ports 3342 constitute a first set of add ports that function only as add ports. The light combiner 3338 can be 2:1 light combiner that can receive optical signals from two VOAs 3344, which each can receive optical signals from one of two add ports 3346a and 3346b constituting a second set of add ports that functions here as express ports. One add port 3346a can receive optical signals from a type-4 light distributor 3420 in the north ROADM 3307. The other add port 3046b can receive optical signals from a type-4 light distributor 3480 in the spur circuit pack 3310, which in turn, can receive optical signals processed and output by the west spur terminator 3314 (more specifically, by a type-1, 3:1 light combiner 3554 which receives optical signals from add ports 3546, a type-1A, 2:1 light combiner 3550 (which receives optical signals from add ports 3546 via VOAs 3548), and a type-1A, 6:1 light combiner 3552 (which receives optical signals from add ports 3546 via VOAs 3548)). In addition, the light distributor 3480 can also drop optical signals from seven drop ports 3486.

The type-1 light combiner 3330, the type-1A light combiners 3336 and 3338, the type-4 light distributor 3320, and VOAs 3340 and 3344 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiner 3330, the type-1A light combiners 3336 and 3338, the type-4 light distributor 3320, and VOAs 3340 and 3344 can be the same as, or different from, the type-1 light combiner 142, the type-1A light combiner 148, and the type-4 light distributor 132, and VOAs 150 shown in FIG. 10A. Also, the type-1 ROADM core device 3306 can include more than the number of components shown in FIG. 40, and it is within the scope of this example embodiment for any of the type-1 light combiner 3330, the type-1A light combiners 3336 and 3338, the type-4 light distributor 3320, and VOAs 3340 and 3344 to be replaced by any other suitable component (or components) that performs (or perform) the same or similar functions thereof, as discussed above.

The north ROADM core device 3307 can comprise a type-4 light distributor 3420 that can receive optical signals input from a DWDM line interface or line in port 3422. The light distributor 3420 can drop optical signals from a first set of six drop ports 3424. The first set of drop ports 3424 can function exclusively as drop ports to locally drop optical signals from the distributor 3420. The light distributor 3420 can also output optical signals from a line out port 3426, which is connected to add port 3499*b* of the spur circuit pack 3310. Add port 3499*b* outputs optical signals to VOA 3499*a*, which outputs optical signals to a type-1A, 2:1 light combiner 3499. Light combiner 3499 outputs optical signals to a type-1, 3:1 light combiner 3488, which outputs optical signals to DWDM line out port 3492, which, in turn, outputs optical signals to drop ports 3544 in the west spur terminator 3314 via a type-4 light distributor 3540. Therefore, the light distributor 3420 can drop optical signals to the west spur terminator 3314. The light distributor 3420 also can output optical signals to a second set of drop ports comprising two drop ports 3427 and 3428 (it is within the scope of this example embodiment for the two sets of drop ports to include different numbers of drop ports than those shown in FIG. 40). The drop ports 3427 and 3428 in the second set can function in this instance as express ports to output optical signals respectively to: the add/express port 3346*a* in the west ROADM 3306; and an add/express port 3474*a* in the east ROADM 3308.

The north ROADM core device 3307 can further comprise a 3:1, type-1 light combiner 3430 that can receive optical signals from an express input port 3432 (that can receive optical signals from a type-4 light distributor 3480 of the spur circuit pack 3310, which can receive optical signals from add ports 3546 of the west spur terminator 3314 via the type-1 light combiner 3554, the type-1A light combiners 3552 and 3550, and the VOAs 3548), and can output optical signals to a DWDM line output interface 3434. The type-1 light combiner 3430 can also receive optical signals from two type-1A light combiners 3436 and 3438. The light combiner 3436 can be a 6:1 light combiner that receives optical signals from six VOAs 3440, which each can receive optical signals from one of six add ports 3442. Add ports 3442 constitute a first set of add ports that function only as add ports. The light combiner 3438 can be 2:1 light combiner that can receive optical signals from two VOAs 3444, which each can receive optical signals from one of two add ports 3446*a* and 3446*b* constituting a second set of add ports that functions here as express ports. One add port 3146*a* can receive optical signals from the type-4 light distributor 3320 in the west ROADM 3306. The other add port 3146*b* can receive optical signals from a type-4 light distributor 3448 in the east ROADM 3308.

The type-1 light combiner 3430, the type-1A light combiners 3436 and 3438, the type-4 light distributor 3420, and VOAs 3440 and 3444 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiner 3430, the type-1A light combiners 3436 and 3438, the type-4 light distributor 3420, and VOAs 3440 and 3444 can be the same as, or different from, the type-1 light combiner 142, the type-1A light combiner 148, and the type-4 light distributor 132, and VOAs 150 shown in FIG. 10A. Also, the type-1 ROADM core device 3307 can include more than the number of components shown in FIG. 40, and it is within the scope of this example embodiment for any of the type-1 light combiner 3430, the type-1A light combiners 3436 and 3438, the type-4 light distributor 3420, and VOAs 3440 and 3444 to be replaced by any other suitable component (or components) that performs (or perform) the same or similar functions thereof, as discussed above.

The east ROADM core device 3308 can comprise a type-4 light distributor 3448 that can receive optical signals input from a DWDM line interface or line in port 3450. The light distributor 3448 can drop optical signals from a first set of six drop ports 3452 and a second set of drop ports comprising two drop ports 3454 and 3456, although the example embodiment is not limited to this number of drop ports in the two sets. The first set of drop ports 3452 can function exclusively as drop ports to locally drop optical signals from the distributor 3448. The drop ports 3454 and 3456 in the second set can function in this instance as express ports to output optical signals respectively to: the j-wavelength access spur circuit pack 3312 (in this case a type-4 ROADM) (specifically to a type-1, 3:1 light combiner 3508 that outputs optical signals to a DWDM spur interface 3512, which, in turn, outputs optical signals to a drop port 3564 through a type-4 light distributor 3560 in the east spur terminator 3316, as will be discussed below); and the north ROADM 3307 (and specifically to one of the add ports 3446*b* thereof, which outputs optical signals to the VOA 3444, which in turn, outputs optical signals to the type-1A, 2:1 light combiner 3438, which in turn, outputs optical signals to the type-1, 3:1 light combiner 3430 that outputs optical signals to the DWDM line out port 3434). The light distributor 3448 can also output optical signals from an express out port 3458 to the west ROADM 3306 (and specifically to a type-1, 3:1 light combiner 3330, which outputs received optical signals to a DWDM line out port 3334).

The east ROADM core device 3008 can further comprise a 3:1, type-1 light combiner 3462 that can receive optical signals from an express input port 3464 (that can receive optical signals from a type-4 light distributor 3320 of the west ROADM 3306), and can output optical signals to a DWDM line output interface 3466. The type-1 light combiner 3462 can also receive optical signals from two type-1A light combiners 3468 and 3470. The light combiner 3470 can be a 6:1 light combiner that receives optical signals from six VOAs 3476, which each can receive optical signals from one of six add ports 3478. Add ports 3478 constitute a first set of add ports that function only as add ports. The light combiner 3468 can be 2:1 light combiner that can receive optical signals from two VOAs 3472, which each can receive optical signals from one of two add ports 3474*a* and 3474*b* constituting a second set of add ports that functions here as express ports. One add port 3476*a* can receive optical signals from a type-4 light distributor 3420 in the north ROADM 3307. The other add port 3174*b* can receive optical signals from a type-4 light distributor 3500 in the spur circuit pack 3312, which in turn, can receive optical signals processed and output by a type-1 light combiner 3574 (which receives signals from add ports 3566 via VOAs 3568 and type-1A light combiners 3570 and 3572) of the east spur terminator 3316. As a result, the express port 3474*b* can receive optical signals from the spur terminator 3316. In addition, the light distributor 3500 can also drop optical signals from eight drop ports 3506.

The type-1 light combiner 3462, the type-1A light combiners 3468 and 3470, the type-4 light distributor 3448, and VOAs 3472 and 3476 can be the same as, for example, the type-1 light combiner 30, the type-1A light combiner 44, the type-4 light distributor 76, and the VOAs 48, respectively, as shown in FIGS. 2B, 3B, 6, and 3B, although they are not limited thereto. In addition, the type-1 light combiner 3462, the type-1A light combiners 3468 and 3470, the type-4 light distributor 3448, and VOAs 3472 and 3476 can be the same as, or different from, the type-1 light combiner 142, the type-1A light combiner 148, and the type-4 light distributor 132, and VOAs 150 shown in FIG. 10A. Also, the type-1 ROADM core device 3308 can include more than the number of components shown in FIG. 40, and it is within the scope of this example embodiment for any of the type-1 light combiner 3462, the type-1A light combiners 3468 and 3470, the type-4 light distributor 3448, and VOAs 3472 and 3476 to be replaced by any other suitable component (or components) that performs (or perform) the same or similar functions thereof, as discussed above.

As noted above, the spur circuit pack 3310 can include a type-4 light distributor 3480 that can receive optical signals from a DWDM line in port 3482 (that receives optical signals from the west spur terminator 3314), and can output optical signals to an express out port 3484, connected to the add/express port 3346b of the west ROADM 3306. The light distributor 3480 can also output optical signals on seven drop ports 3486. The type-1, 3:1 light combiner 3488 of the spur circuit pack 3310 can receive optical signals from the light distributor 3320 of the west ROADM 3306 via the line in port 3490, and can output optical signals to the DWDM line out port 3492. The light combiner 3488 also can receive optical signals from both a type-1A, 6:1 light combiner 3494 (which receives optical signals from six VOA's 3496, which, in turn, receive optical signals from add ports 3498) and from a type-1A, 2:1 light combiner 3499 (which receives optical signals from two VOAs 3499a, which, in turn, receive optical signals from add ports 3499b).

Similarly, the spur circuit pack 3312 can include a type-4 light distributor 3500 that can receive optical signals from a DWDM line in port 3502 (that receives optical signals from the east spur terminator 3316), and can output optical signals to an express out port 3504 connected to the add/express port 3474b of the east ROADM 3308. The light distributor 3500 can also output optical signals on eight drop ports 3506. The type-1, 3:1 light combiner 3508 of the spur circuit pack 3312 can receive optical signals from the light distributor 3448 of the east ROADM 3308 via the line in port 3510, and can output optical signals to the DWDM line out port 3512. The light combiner 3508 also can receive optical signals from both a type-1A, 6:1 light combiner 3514 (which receives optical signals from six VOA's 3516, which, in turn, receive optical signals from add ports 3518) and from a type-1A, 2:1 light combiner 3519 (which receives optical signals from two VOAs 3516, which, in turn, receive optical signals from add ports 3518).

The type-4 light distributors 3480 and 3500, the type-1 light combiners 3488 and 3508, the type-1A light combiners 3494, 3499, 3514, and 3519, and the VOAs 3496, 3499a, and 3516 can be the same as, for example, the type-4 light distributor 76, the type-1 light combiner 30, the type-1A light combiner 58, and the VOAs 48, respectively, as shown in FIGS. 6, 2B, 3B, and 3B, although they are not limited thereto. In addition, the type-4 light distributors 3480 and 3500, the type-1 light combiners 3488 and 3508, the type-1A light combiners 3494, 3499, 3514, and 3519, and the VOAs 3496, 3499a, and 3516 can be the same as, or different from, the type-4 light distributors, the light combiners, and the VOAs respectively, shown in any of the other figures. Also, the spur circuit packs 3310 and 3312 can include more than the number of components shown in FIG. 40, and it is within the scope of this example embodiment for any of the type-4 light distributors 3480 and 3500, the type-1 light combiners 3488 and 3508, the type-1A light combiners 3494, 3499, 3514, and 3519, and the VOAs 3496, 3499a, and 3516 to be replaced by any other suitable component (or components) that performs (or perform) the same or similar functions thereof, as discussed above.

The west spur terminator 3314 can include colorless add ports 3546 that can output optical signals to VOAs 3548, two of which can output optical signals to a type-1A, 2:1 light combiner 3550 and six of which can output optical signals to type-1A, 6:1 light combiner 3552. The light combiners 3550 and 3552 can output optical signals to a type-1, 3:1 light combiner 3554, which can output optical signals to a line out port 3556, which can output optical signals to the light combiner 3480 in the spur circuit pack 3310. The spur terminator 3314 can also include a type-4 light distributor 3540 that can receive optical signals from a line in port 3542, which in turn can receive optical signals from the light combiner 3488 of the spur circuit pack 3310. The light distributor 3540 can output optical signals to colorless drop ports 3544.

The east spur terminator 3316 can include colorless add ports 3566 that can output optical signals to VOAs 3568, two of which can output optical signals to a type-1A, 2:1 light combiner 3570 and six of which can output optical signals to type-1A, 6:1 light combiner 3572. The light combiners 3570 and 3572 can output optical signals to a type-1, 3:1 light combiner 3574, which can output optical signals to a line out port 3576, which can output optical signals to the light combiner 3500 in the spur circuit pack 3312. The spur terminator 3316 can also include a type-4 light distributor 3560 that can receive optical signals from a line in port 3562, which in turn can receive optical signals from the light combiner 3508 of the spur circuit pack 3312. The light distributor 3560 can output optical signals to colorless drop ports 3564.

The type-4 light distributors 3540 and 3560, the type-1 light combiners 3554 and 3574, the type-1A light combiners 3550, 3552, 3570, and 3572, and the VOAs 3548 and 3568 can be the same as, for example, the type-4 light distributor 76, the type-1 light combiner 30, the type-1A light combiner 58, and the VOAs 48, respectively, as shown in FIGS. 6, 2B, 3B, and 3B, although they are not limited thereto. In addition, the type-4 light distributors 3540 and 3560, the type-1 light combiners 3554 and 3574, the type-1A light combiners 3550, 3552, 3570, and 3572, and the VOAs 3548 and 3568 can be the same as, or different from, the type-4 light distributors, the light combiners, and the VOAs respectively, shown in any of the other figures. Also, the spur terminator circuit packs 3314 and 3316 can include more than the number of components shown in FIG. 40, and it is within the scope of this example embodiment for any of the type-4 light distributors 3540 and 3560, the type-1 light combiners 3554 and 3574, the type-1A light combiners 3550, 3552, 3570, and 3572, and the VOAs 3548 and 3568 to be replaced by any other suitable component (or components) that performs (or perform) the same or similar functions thereof, as discussed above.

Figure 41A:
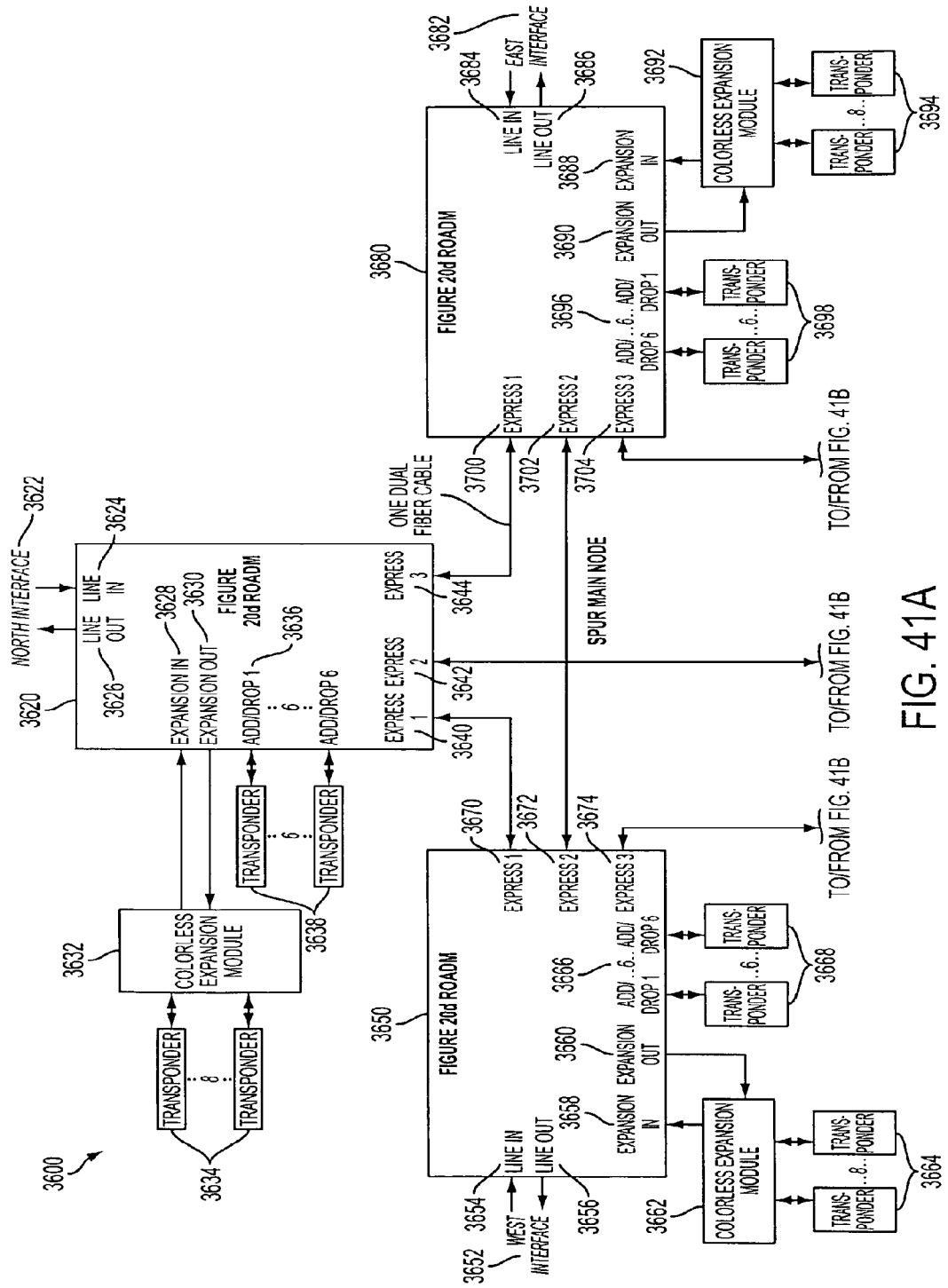
FIG. 41 is a block diagram of another example embodiment of optical node example embodiment #5, which is a three-degree node having a spur main node and a spur end node, each comprising type-1 ROADMs having expansion ports attached to colorless port expansion modules, and where input and output amplifiers are used on the spur.
Figure 41B:
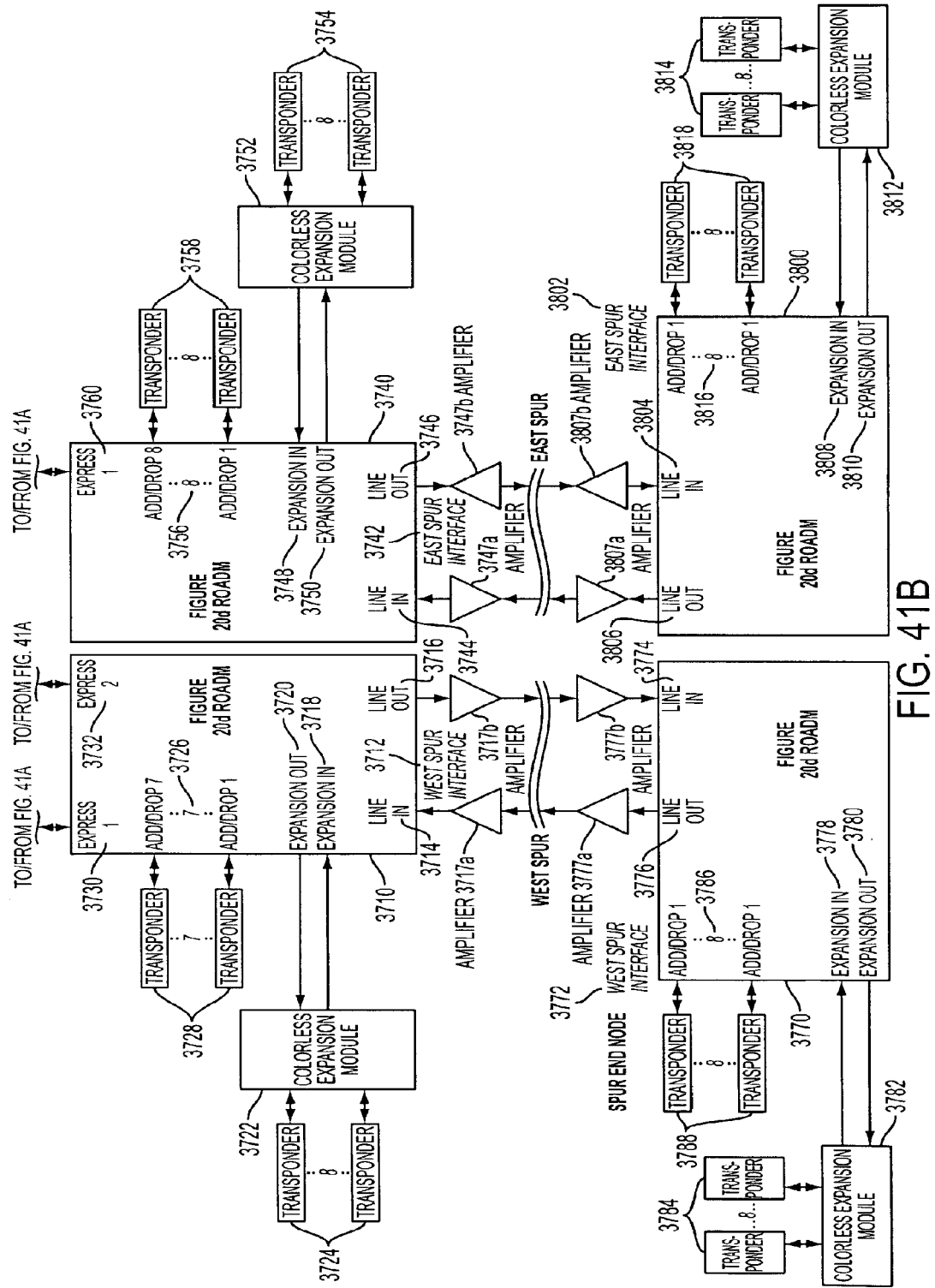

FIG. 41 shows an example embodiment of a network 3600 with two spurs (an east spur comprising the east network-interface ROADM 3680, the east spur-interface ROADM 3740, and the east end-node ROADM 3800, and a west spur comprising the north network-interface ROADM 3620, the west network-interface ROADM 3650, the west spur-interface ROADM 3710 and the west end-node ROADM 3770)

and colorless expansion modules at both ends of the spur (at the spur main node and the spur end node). However, it is within the scope of this example embodiment for the network 3600 to include other nodes and other spurs. Network 3600 can include a three-degree, spur main node having network-interface ROADMs 3620, 3650, and 3680, spur-interface ROADMs 3710 and 3740, and colorless port expansion modules 3632, 3662, 3692, 3722, and 3752 having colorless add/drop ports. The five ROADM core devices, can be the same as, for example, the ROADM cores shown in FIG. 20D, although they are not limited thereto and can be any other ROADMs. The spur end node can include two ROADM core devices 3770 and 3800, which can be the same as, for example, the ROADM core devices shown in FIG. 20D, although they are not limited thereto and can be any other ROADMs. Each ROADM in the spur end node can also include one of the colorless expansion modules 3782 and 3812. It is within the scope of the example embodiment for the ROADM core devices, the amplifiers, and the components of these elements shown in FIG. 41 to be replaced by any other suitable component (or components) that performs (or perform) the same functions thereof. It is also within the scope of the example embodiment to replace the colorless add/drop ports and the colorless expansion modules with other types of ports and modules, such as colored add/drop ports and colored expansion modules, respectively. It is also within the scope of this example embodiment to include a different number of ROADMs and expansion modules in the network 3600 than shown in FIG. 41 and for the ROADMs and expansion modules to have a different number of ports and transponders than are shown in FIG. 41.

The ROADM 3620 can comprise a north interface 3622, an output amplifier (not shown) and an input amplifier (not shown) attached to the interface 3622, a line in port 3624, a line out port 3626, an expansion in port 3628, an expansion out port 3630, a colorless expansion module 3632 (connected to the expansion in and out ports 3628, 3630) with eight add/drop ports, eight transponders 3634 connected to the module 3632, six add/drop ports 3636, six transponders 3638 connected to the six add/drop ports, and express ports 3640, 3642, and 3644 (denoted, respectively, as express ports 1, 2, and 3).

The west ROADM 3650 can comprise a west interface 3652, an output amplifier (not shown) and an input amplifier (not shown) attached to the interface 3652, a line in port 3654, a line out port 3656, an expansion in port 3658, an expansion out port 3660, a colorless expansion module 3662 (connected to the expansion in and out ports 3658, 3660) with eight add/drop ports, eight transponders 3664 connected to the module 3662, six add/drop ports 3666, six transponders 3668 connected to the six add/drop ports, and express ports 3670, 3672, and 3674 (denoted, respectively, as express ports 1, 2, and 3).

The east ROADM 3680 can comprise a west interface 3682, an output amplifier (not shown) and an input amplifier (not shown) attached to the interface 3682, a line in port 3684, a line out port 3686, an expansion in port 3688, an expansion out port 3690, a colorless expansion module 3692 (connected to the expansion in and out ports 3688, 3690) with eight add/drop ports, eight transponders 3694 connected to the module 3692, six add/drop ports 3696, six transponders 3698 connected to the six add/drop ports, and express ports 3700, 3702, and 3704 (denoted, respectively, as express ports 1, 2, and 3).

The west spur-interface ROADM 3710 can comprise a west spur interface 3712, an output amplifier (not shown) and an input amplifier (not shown) attached to the interface 3712, a line in port 3714, a line out port 3716, an expansion in port 3718, an expansion out port 3720, a colorless expansion module 3722 (connected to the expansion in and out ports 3718, 3720) with eight add/drop ports, eight transponders 3724 connected to the module 3722, seven add/drop ports 3726, seven transponders 3728 connected to the seven add/drop ports, and express ports 3730 and 3732 (denoted, respectively, as express ports 1 and 2).

The east spur-interface ROADM 3740 can comprise an east spur interface 3742, a line in port 3744, a line out port 3746, an expansion in port 3748, an expansion out port 3750, a colorless expansion module 3752 (connected to the expansion in and out ports 3748, 3750) with eight add/drop ports, eight transponders 3754 connected to the module 3752, eight add/drop ports 3756, eight transponders 3758 connected to the eight add/drop ports, and express port 3760 (denoted as express port 1).

Amplifiers 3717a and 3717b can be respectively connected to the line in port 3714 and the line out port 3716 of the west spur-interface ROADM 3710, while amplifiers 3747a and 3747b are respectively connected to the line in port 3744 and the line out port 3746 of the east spur-interface ROADM 3740.

The west spur end node ROADM 3770 can comprise a west spur interface 3772, a line in port 3774, a line out port 3776, an expansion in port 3778, an expansion out port 3780, a colorless expansion module 3782 (connected to the expansion in and out ports 3778, 3780) with eight add/drop ports, eight transponders 3784 connected to the module 3782, eight add/drop ports 3786, and eight transponders 3788 connected to the eight add/drop ports.

The east spur end node ROADM 3800 can comprise an east spur interface 3802, a line in port 3804, a line out port 3806, an expansion in port 3808, an expansion out port 3810, a colorless expansion module 3812 (connected to the expansion in and out ports 3808, 3810) with eight add/drop ports, eight transponders 3814 connected to the module 3812, eight add/drop ports 3816, and eight transponders 3818 connected to the eight add/drop ports.

Amplifiers 3777a and 3777b can be respectively connected to the line out port 3776 and the line in port 3774 of the west end node ROADM 3770, while amplifiers 3807a and 3807b are respectively connected to the line out port 3806 and the line in port 3804 of the east end node ROADM 3800.

Express ports 3640, 3642, and 3644 of ROADM 3620 can be connected, respectively, to express port 3670 of ROADM 3650, express port 3732 of ROADM 3710, and express port 3700 of ROADM 3680. In addition, express ports 3672 and 3674 of ROADM 3650 can be connected, respectively, to express port 3702 of ROADM 3680 and express port 3730 of ROADM 3710. Also, express port 3760 of ROADM 3740 can be connected to express port 3704 of ROADM 3680.

As noted above, FIG. 41 also shows transponders attached to the add/drop ports of the various ROADM core devices, although it is within the scope of this example embodiment for transponders not to be attached to the add/drop ports of the ROADM core devices and for a larger or smaller number of transponders than shown in FIG. 41 to be included. In the drop direction, each transponder can be used to convert a wavelength of a given DWDM frequency to an electrical signal. The electrical signal may then be converted by the transponder, for example, to a "white light" optical signal. (A white light optical signal is a non-colored optical signal of a non-precise wavelength such as 850 nm, 1310 nm, or 1550 nm.) In the add direction, each transponder can convert a "white light" optical signal to one of the m colored wavelengths supported by the ROADMs (3620, 3650, 3680, 3710, 3740, 3770, and 3800), colorless expansion modules (3632, 3662, 3692, 3722, 3752, 3782, and 3812) and the network of which 3600 is a part.

Type-5 Light Distributor

FIG. 42 illustrates one example embodiment of a type-5 light distributor 3900 containing a primary input 3904, k subtending outputs, the first of which is denoted as 3940 and the k th of which is denoted as 3944, and one express output 3936. The type-5 light distributor 3900 is also referred to as a type-2 wavelength router (or simply wavelength router 2). This example embodiment of a type-5 light distributor 3900 can support m wavelengths of differing frequencies. The optical signals associated with each of the m wavelengths may be routed using one of the following three example embodiments of different routing procedures.

1. The entire optical power of a wavelength arriving on the primary input 3904 can be directed to the express output 3936.
2. The entire optical power of a wavelength arriving on the primary input 3904 can be directed to one (and only one) of the k subtending outputs 3940, 3944.
3. A portion of the optical power of a wavelength arriving on the primary input 3904 can be directed to one (and only one) of the k subtending outputs 3940, 3944 and a portion of its optical power can be directed to the express output 3936.

In each of these three examples of different routing procedures, multiple wavelengths (up to a maximum of m) can be sent to each subtending output 3940 and to the express output 3936 on the type-2 wavelength router, although in other example embodiments multiple wavelengths are not sent to each subtending output 3940, 3944 and to the express output 3936, or only a single wavelength is sent. In addition, the optical power associated with each wavelength exiting an output port can be further attenuated by a configurable (programmable) amount, although in other example embodiments no further attenuation is performed. Furthermore, the optical power of each exiting wavelength at each output port can be independently attenuated, although in other example embodiments the optical power of each exiting wavelength at each output port can be collectively attenuated or attenuated in subgroups.

In addition to the primary input 3904, the express output 3936, and the subtending outputs 3940, 3942, this example embodiment of the type-5 light distributor shown in FIG. 42 can include seven different kinds of elements (although it is within the scope of this example embodiment for the distributor 3900 to include more or fewer than the types and number of elements shown in FIG. 42).

First, the distributor 3900 can include a type-2 light distributor 3902 that receives multiplexed optical signals of up to m wavelengths from the primary input 3904. Second, the distributor 3900 can include m 1-to-3, type-3 light distributors (the first of which is denoted by 3906 and the mth of which is denoted as 3908) (also called 1-to-3 optical switches). These light distributors 3906, 3908 each can receive a different wavelength output from type-2 light distributor 3902. Third, the distributor 3900 can include m 1-to-2, type-1 light distributors (also called optical couplers), the first of which is denoted by 3910 and the mth of which is denoted as 3922. Each coupler 3910, 3922 can be coupled to one subtending output of a different one of the 1-to-3, type-3 light distributors 3906, 3908. Fourth, the distributor 3900 can include m pairs of 2-to-1, type-3 light combiners (also called 2-to-1 optical switches, the first pair being denoted by 3912, 3914 and the mth pair being denoted by 3924, 3926. Each pair of 2-to-1, type-3 light combiners is associated with (i.e., receives an input from) a different 1-to-2 optical coupler 3910, 3922 and a different 1-to-3 optical switch 3906, 3908 from which it receives outputs signals. More specifically, each light combiner of a given pair of light combiners (3912, 3914), (3924, 3926) can be coupled to a) a different subtending output the 1-to-2, type-1 optical coupler 3910, 3922 associated with that given pair, and b) a subtending output of the 1-to-3, type-3 light distributor 3906, 3908 also associated with that given pair and that outputs optical signals to its associated 1-to-2 optical coupler. As a result, for the pair (3912, 3914), switch 3912 can receive optical signals from coupler 3910 and from switch 3906, and switch 3914 can receive optical signals from coupler 3910 and from switch 3906. Similarly, for the pair (3924, 3926), switch 3924 can receive optical signals from coupler 3922 and from switch 3908, and switch 3926 can receive optical signals from coupler 3922 and from switch 3908. Fifth, the distributor 3900 can include m pairs of VOAs. The first pair is denoted by (3916, 3918) and the mth pair is denoted by (3928, 3930). Each pair of VOAs is associated with a different pair of the 2-1, type-3 optical switches (3912, 3914), (3924, 3926). And each VOA in each pair can be coupled to the subtending output of a different 2-to-1, type-3 light combiner. Thus, VOA 3916 can be coupled to the output of switch 3912, VOA 3918 can be coupled to the output of switch 3914, VOA 3928 can be coupled to the output of switch 3924, and VOA 3930 can be coupled to the output of switch 3926. Sixth, the distributor 3000 can include m 1-to-k, type-3 light distributors (also called 1-to-k switches), the first of which is denoted by 3920 and the mth of which is denoted by 3932. One VOA in each pair of VOAs is associated with one of the 1-to-k, type-3 light distributors 3920, 3932 so that each 1-to-k, type-3 light distributor is connected to the output of one of the two VOAs in a different pair of VOAs. Thus, 1-to-k, type-3 light distributor 3920 is connected to the output of VOA 3918 and 1-to-k, type-3 light distributor 3932 is connected to the output of VOA 3930. Seventh, the distributor 3900 can include k type-2 light combiners, the first of which is denoted by 3938 and the kth of which is denoted by 3942. Each type-2 light combiner can be connected to one subtending output of each 1-to-k type-3 light distributor 3920, 3932. Thus, light distributor 3938 is connected to the subtending outputs of switches 3920 and 3932, and light distributor 3942 is also connected to the subtending outputs of switches 3920 and 3932. In addition, the distributor 3900 can include an additional type-2 light combiner 3934 that can receive the outputs of each VOA whose output is not inputted into a 1-to-k optical switch 3920, 3932, i.e., VOAs 3916 and 3928.

The type-2 light distributor 3902 and the type-2 light combiners 3934, 3938, and 3942 can be the same as, for example, the type-2 light distributor 52 and the type-2 light combiner 58, respectively, shown in FIGS. 4A and 4B, although they are not limited thereto. The 1-to-3, type-3 light distributors 3906, 3908 and the 1-to-k, type-3 light distributors 3920, 3932, and the 2-to-1, type-3 light combiners 3912, 3914, 3924, 3926 can be the same as, for example, the type-3 light distributor 64 and the type-3 light combiner 70, respectively, shown in FIGS. 5A and 5B, although they are not limited thereto. The 1-to-2 optical couplers 3910, 3922 can be the same as, for example, the type-1 light distributor 26 shown in FIG. 2A, although they are not limited thereto. It is within the scope of the example embodiment of the distributor 3900 shown in FIG. 42 to replace each of the above-noted components shown in FIG. 42 with any other suitable component (or components) that performs (or perform) the functions thereof.

In the example embodiment of the type-2 wavelength router 3900 shown in FIG. 42, when a portion of the optical power of light of a given wavelength input into the router 3900 is divided between the express output 3936 and a selected subtending output 3940, 3944, the division of the optical power of the light may be an equal division of the light optical power or an unequal division of the light optical power. In one example embodiment, the division of light may be a fixed division of optical power. In another example embodiment, the division of light optical power may be a configurable division or a variable division.

In the FIG. 42 example embodiment of the type-2 wavelength router 3900, three paths of a wavelength can be provided by following the possible paths of a selected wavelength from input 3904 to output (3936, 3940, 3944). For example, from FIG. 42 it can be seen that the WDM (or DWDM) stream of wavelengths arriving on the primary input 3904 can be first de-multiplexed into its individual wavelengths by the type-2 light distributor 3902. Once this occurs, the entire optical power associated with each of the m wavelengths can be directed to the corresponding 1-to-3 optical switch 3906, 3908. Each 1-to-3 optical switch 3906, 3908 can be configured (programmed), by methods known to those skilled in the art, to forward its input optical power to only one of three outputs: output 1, output 2, or output 3. If the optical power is directed to output 1 of one of the 1-to-3 optical switches 3906, 3908, then the optical power can be forwarded to a first input of a first switch in one of the pairs of the 2-to-1 optical switches (3912, 3914), (3924, 3926). If the optical power is directed to output 2 of one of the 1-to-3 optical switches 3906, 3908, then the optical power can be forwarded to the input of a one of the 1-to-2 optical couplers 3910, 3922. If the optical power is directed to output 3 of one of the 1-to-3 optical switches 3906, 3908, then the optical power can be forwarded to a first input of the second switch in the pair of the 2-to-1 optical switches (3912, 3914), (3924, 3926) whose first switch received the optical power when the optical power was output on output 1. Thus, if the entire optical power of a wavelength is directed to output 1 of switch 3906, then the entire optical power is forwarded to switch 3912. If the entire optical power is directed to output 2 of switch 3906, then the entire optical power is forwarded to coupler 3910. If the entire optical power is directed to output 3 of switch 3906, then the entire optical power is forwarded to switch 3914. Similarly, if the entire optical power is directed to output 1 of switch 3908, then the entire optical power is forwarded to switch 3924. If the entire optical power is directed to output 2 of switch 3908, then the entire optical power is forwarded to coupler 3922. If the entire optical power is directed to output 3 of switch 3908, then the entire optical power is forwarded to switch 3926. If the entire optical power is directed to the input of the 1-to-2 optical coupler 3910, 3922, then the optical coupler 3910, 3922 can divide the entire optical power into two equal or two unequal portions, and can forward the first portion of the optical power of the wavelength to the second input of the first 2-to-1 optical switch 3912, 3924 and can forward the second portion of the optical power of the wavelength to the second input of the second 2-to-1 optical switch 3914, 3926. The first 2-to-1 optical switch 3912, 3924 can be configured (programmed), by means known to those skilled in the art, to forward the light presented on only one of its two inputs to its output. The second 2-to-1 optical switch 3914, 3926 can also be configured (programmed), by means known to those skilled in the art, to forward the light presented on only one of its two inputs to its output. The light exiting the first 2-to-1 optical switch 3912, 3924 can be forwarded to a first VOA 3916, 3928. The light exiting the second 2-to-1 optical switch 3914, 3926 can be forwarded to a second VOA 3918, 3930. Both the first and second VOAs 3916, 3918, 3928, and 3930 can be configured (programmed), by means known to those skilled in the art, to attenuate the light entering the VOA such that the light exiting each VOA is of some value less in optical power than the light entering the VOA. The optical power of the wavelength exiting the first VOA 3916, 3928 can be forwarded to the type-2 light combiner 3934 associated with the express output 3936, where the optical power of up to m wavelengths can be combined into one WDM (DWDM) optical stream. The optical power of the wavelength exiting the second VOA 3918, 3930 can be forwarded to a 1-to-k optical switch 3920, 3932. The 1-to-k optical switch 3920, 3932 can be configured (programmed), by means known to those skilled in the art, to direct the optical power entering the switch to only one of the k subtending outputs of the switch. Each of the k outputs of the switch 3920, 3932 can be directed to one of the k type-2 light combiners 3938, 3942 associated with each of the k subtending outputs of the switch 3920, 3932. Each of the type-2 light combiners 3938, 3942 associated with each of the k subtending outputs can multiplex the optical power associated with up to m wavelengths into a WDM (or DWDM) optical stream, and can forward the optical stream to its corresponding output.

Thus, if for example, a wavelength is directed from distributor 3902 to switch 3906, which is configured to route all the optical power thereof to switch 3912, and if the switch 3912 is configured to direct the entire optical power of that wavelength to the VOA 3916, and if the VOA 3916 is configured not to attenuate the power thereof, then the entire optical power of that wavelength arriving on the primary input 3904 (minus the optical power that is inherently loss by traversing through the optical components within 3900) can be directed to the express output 3936. Moreover, if for example, a wavelength is directed from distributor 3904 to switch 3906, which is configured to route all the optical power thereof to switch 3914, and if the switch 3914 is configured to route the entire optical power thereof to VOA 3918, and if VOA 3918 is configured to direct the entire power thereof to switch 3920, and if the switch 3920 is configured to direct the entire power of this wavelength received from the VOA 3918 light combiner 3938, then the entire optical power of a wavelength arriving on the primary input 3904 (minus the optical power that is inherently loss by traversing through the optical components within 3900) can be directed to one (and only one) of the k subtending outputs 3940. And if for example, a wavelength is directed from distributor 3904 to switch 3906, which is configured to route all the optical power thereof to coupler 3910, and if coupler 3910 is configured to direct a portion of the optical power of the received wavelength to the two switches 3912 and 3914, since the switches 3912 and 3914 can be programmed to send this wavelength to the distributors 3934 and 3938, respectively (the switch 3912 sending a portion of the wavelength's power to the distributor 3934 through the VOA 3916 and the switch 3914 sending the other portion of the wavelength's power to the distributor 3938 via the VOA 3918 and switch 3920, which is configured to select distributor 3938 as the distributor to receive this portion of the wavelength's power), then a portion of the optical power of a wavelength arriving on the primary input 3904 can be directed to one of the k subtending outputs 3940 (since this output is connected to the distributor 3938) and a portion of its optical power can be directed to the express output 3936 (since this output is connected to the distributor 3934).

Thus, associated with each of the m wavelengths exiting the type-2 light distributor 3902 is one set of configurable (programmable) optical functions performed by the 1-to-3 optical switches 3906, 3908, the first and second 2-to-1 optical switches (3912, 3914)(3924, 3926), the 1-to-2 optical coupler 3910, 3922, the first and second VOAs (3916, 3918) (3928, 3930), and the 1-to-k optical switch (3920, 3932), as shown in FIG. 42.

It should be noted that each VOA can be configured to substantially extinguish the optical power entering that VOA, such that there is substantially zero optical light exiting the VOA. In addition, it is within the scope of the example embodiment for each VOA not to substantially extinguish the optical power entering that VOA.

Although the type-1 light distributors 3910, 3922 are shown as being implemented with optical couplers, any other form of a type-1 light distributor can be used without loss of functionality. Although the type-3 light distributors 3906, 3908 are shown as being implemented with 1-to-3 optical switches, any other form of a type-3 light distributor can be used without loss of functionality. Although the type-3 light combiners 3912, 3914, 3924, 3926 are shown as being implemented with 2-to-1 optical switches, any other form of a type-3 light combiner can be used without loss of functionality. Although the type-3 light distributors 3920, 3932 are shown as being implemented with 1 to k optical switches, any other form of a type-3 light distributor can be used without loss of functionality. Also, the various light combiners, light distributors and VOAs in distributor 3900 can be combined in various combinations without loss of functionality. For instance, a combination VOA switch could replace 3918 and 3920 without loss of functionality, or the set of functionality performed by the components 3906, 3910, 3012, 3914, 3916, 3918, and 3020 could be accomplished by a single integrated component without loss of functionality. Therefore, the components shown in 3900 are meant to only show the logical functionality of the device 3900. As a result, it is within the scope of this example embodiment to replace the components of distributor 3900 shown in FIG. 42 with one or more other components to perform the functions thereof.

The type-2 wavelength router 3900 (or a wavelength router with a subset of the type-2 wavelength router's functionality) can be utilized within all the previously defined ROADM and node example embodiments. Each ROADM so created can then be utilized to construct corresponding optical node example embodiments.

Figure 43:
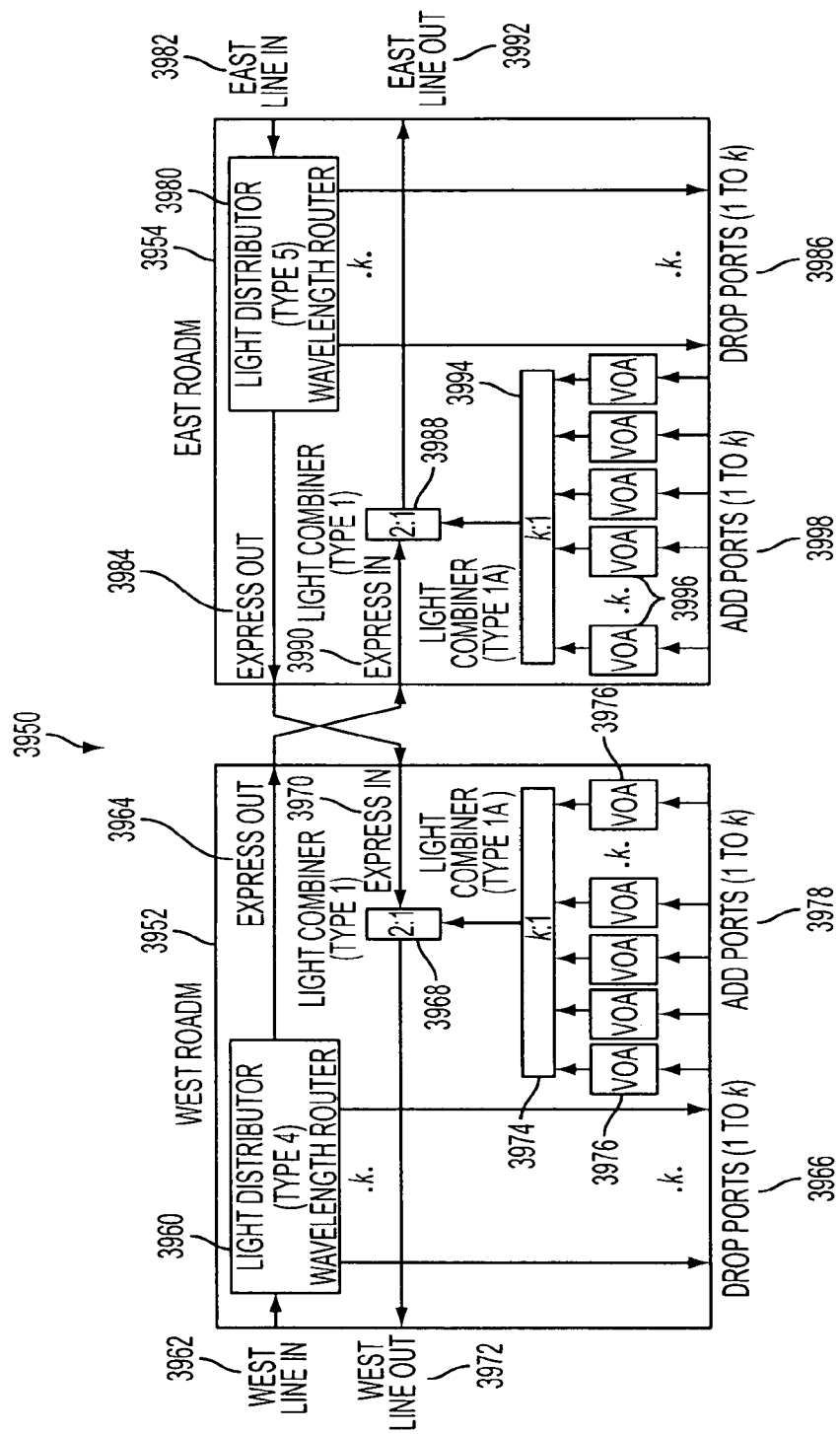
FIG. 43 is a block diagram of an example embodiment of optical node embodiment #1, which is a two-degree node with protected colorless add and drop ports, in which each type-1 ROADM contains a type-5 light distributor instead of a type-4 light distributor.

A ROADM constructed with a type-5 light distributor can perform an optical drop-and-continue function for each wavelength entering the ROADM at its line input. For instance, FIG. 43 shows an example embodiment of a ROADM that can be the same as, for example, the ROADM core devices shown in FIG. 11, but in which the type-4 light distributors are replaced with the type-5 light distributors (although it is not limited to being a modified version of the FIG. 11 ROADM, and can encompass any ROADM described herein that uses a type-4 light distributor or that can be modified to add a type-5 light distributor thereto). It is within the scope of this example embodiment for the ROADMs shown in FIG. 43 to be replaced by any other ROADM discussed herein.

FIG. 43 shows a network 3950 (which can also be a node) including two ROADM core devices 3952 and 3954 interconnected in order to form a two-degree optical node in which each ROADM core device 3952, 3954 has k colorless add/drop ports. Each ROADM core shown in FIG. 43 can also be the same as, for example, one of the ROADM cores shown in FIG. 10(*a*) with the type-4 light distributor replaced by a type-5 light distributor, although it is not limited thereto. It is within the scope of the example embodiment for the optical node and the ROADMs 3952 and 3954 shown in FIG. 43 to include additional elements. It is also within the scope of this example embodiment to replace each of the ROADM core devices shown in FIG. 43 and each of the components of each ROADM core with any other suitable component (or components) that performs (or perform) the functions thereof. In the two-degree configuration shown in FIG. 43, since all of the k add ports are considered equal, the type-1A light combiner used on each ROADM can be designed such that an equal amount of light from each add port appears at the output of the light combiner, although it is not required to do so. Such a light combiner is referred to as an "equal-split" optical coupler.

The ROADM 3952 can comprise a type-5 light distributor 3960 (which can be the same as or different from the type-5 light distributor shown in FIG. 42) that can receive optical signals input from west line interface 3962, output optical signals on express output port 3964 (which is connected to the express input port 3990 of the ROADM 3954), and locally drop optical signals via k drop ports 3966, where k is a positive integer representing the total number of add ports and the total number of drop ports, which are the same (although the example embodiment may have an unequal number of add and drop ports). The ROADM core device 3952 can further comprise a 2:1, type-1 light combiner 3968 that can receive optical signals from an express input port 3970 (which, in turn, can receive optical signals from an express output port 3984 of the ROADM 3954) and output optical signals from a line output interface 3972. The type-1 light combiner 3968 can also receive optical signals from a k:1, type-1A light combiner 3974. The light combiner 3974 can receive optical signals from k VOAs 3976, each of which is connected to one of the k add ports 3978. The type-1 light combiner 3968, the type-1A light combiner 3974, the type-5 light distributor 3960, and the VOAs 3976 can be the same as, for example, the type-1 light combiner 30, the type-1A light combiner 44, the type-5 light distributor 3900, and VOAs 48, respectively, as shown in FIGS. 2B, 3B, 42, and 3B, although they are not limited thereto. The type-1 ROADM core device 3952 can include more than the number of components shown in FIG. 43, and it is within the scope of this example embodiment for any of the type-1 light combiner 3968, the type-1A light combiner 3974, the type-5 light distributor 3960, and the VOAs 3976 shown in FIG. 43 to be replaced by any other suitable component (or components) that performs (or performs) the functions thereof, as discussed above.

The ROADM 3954 can comprise a type-5 light distributor 3980 that can receive optical signals input from line interface 3982, output optical signals to the express output port 3984 (which is connected to the express input port 3970 of the ROADM 3952), and locally drop optical signals via k drop ports 3986, where k is a positive integer representing the total number of add ports and the total number of drop ports, which are the same (although the example embodiment may have an unequal number of add and drop ports). The ROADM core device 3954 can further comprise a 2:1, type-1 light combiner 3988 that can receive optical signals from the express input port 3990 (which, in turn, receives optical signals from an express output port 3964 of the ROADM 3952) and output optical signals from a line output interface 3992. The type-1 light combiner 3988 can also receive optical signals from a k:1, type-1A light combiner 3994. The light combiner 3994 can receive optical signals from k VOAs 3996, each of which is connected to one of the k add ports 3998. The type-1 light combiner 3988, the type-1A light combiner 3994, the type-5 light distributor 3980, and VOAs 3996 can be the same as, for example, the type-1 light combiner 30, the type-1A light combiner 44, the type-5 light distributor 3900, and VOAs 48, respectively, as shown in FIGS. 2B, 3B, 42, and 3B, although they are not limited thereto. The type-1 ROADM core device 3954 can include more than the number of components shown in FIG. 43, and it is within the scope of this example embodiment for any of the type-1 light combiner 3988, the type-1A light combiner 3994, the type-5 light distributor 3980, and VOAs 3996 shown in FIG. 43 to be replaced by any other suitable component (or components) that performs (or perform) the functions thereof, as discussed above.

In the FIG. 43 ROADMs 3952 and 3954, a given wavelength entering the West line in port 3962 can be forwarded (dropped) to a selected drop port 3966 of the West ROADM 3952 and also be forwarded (continued) to the East line out port 3992. This can be accomplished by configuring the type-5 light distributor 3960 in the West ROADM 3954 such that the optical power of the selected wavelength is directed to the corresponding 1-to-2 optical coupler internal to the type-5 light distributor 3960, and by configuring the associated first 2-to-1 optical switch to forward the light from the first output of the optical coupler to the express output, and by configuring the associated second 2-to-1 optical switch to forward the light from the second output of the optical coupler to the selected secondary output associated with the desired drop port. The optical drop and continue function is useful for the distribution of optical broadcast video signals. It is also within the scope of the example embodiment for the ROADMs shown in FIG. 43 to be configured differently to route a given wavelength entering the west line in port 3962 differently than described above.

The coupling ratios of the 1-to-2 optical couplers within the type-5 light distributors 3960, 3980 can be chosen such that a given ROADM example embodiment is optimized for several configurations simultaneously, although it is within the scope of the example embodiment select the coupling ratios so that a given ROADM example embodiment is optimized for one configuration or is not optimized for any particular configuration.

Figure 44A:
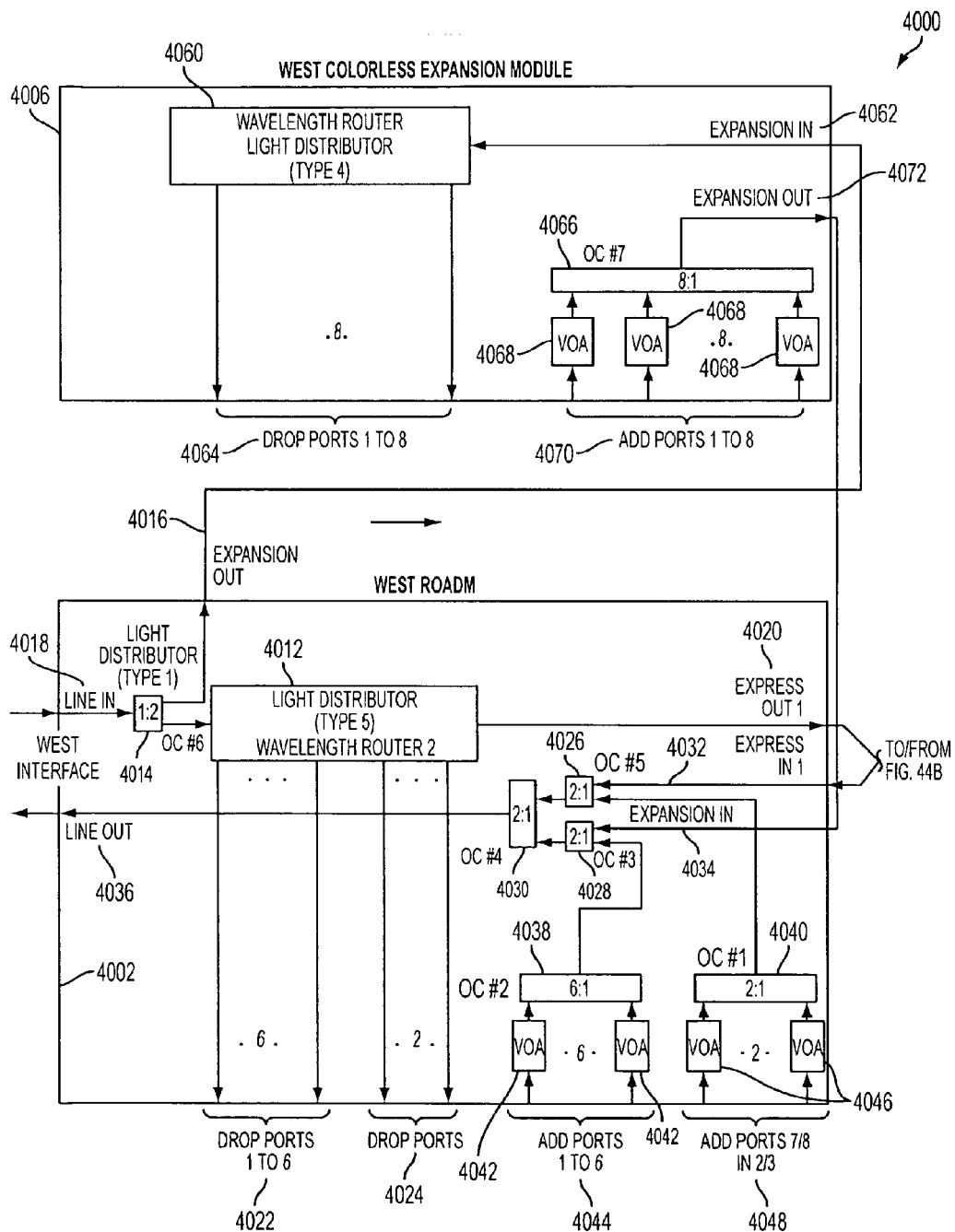
FIG. 44 is a block diagram of an example embodiment of an optical node comprising two type-1 ROADMs each having an expansion port connected to a colorless expansion module, in which the type-4 light distributor is replaced with a type-5 light distributor.
Figure 44B:
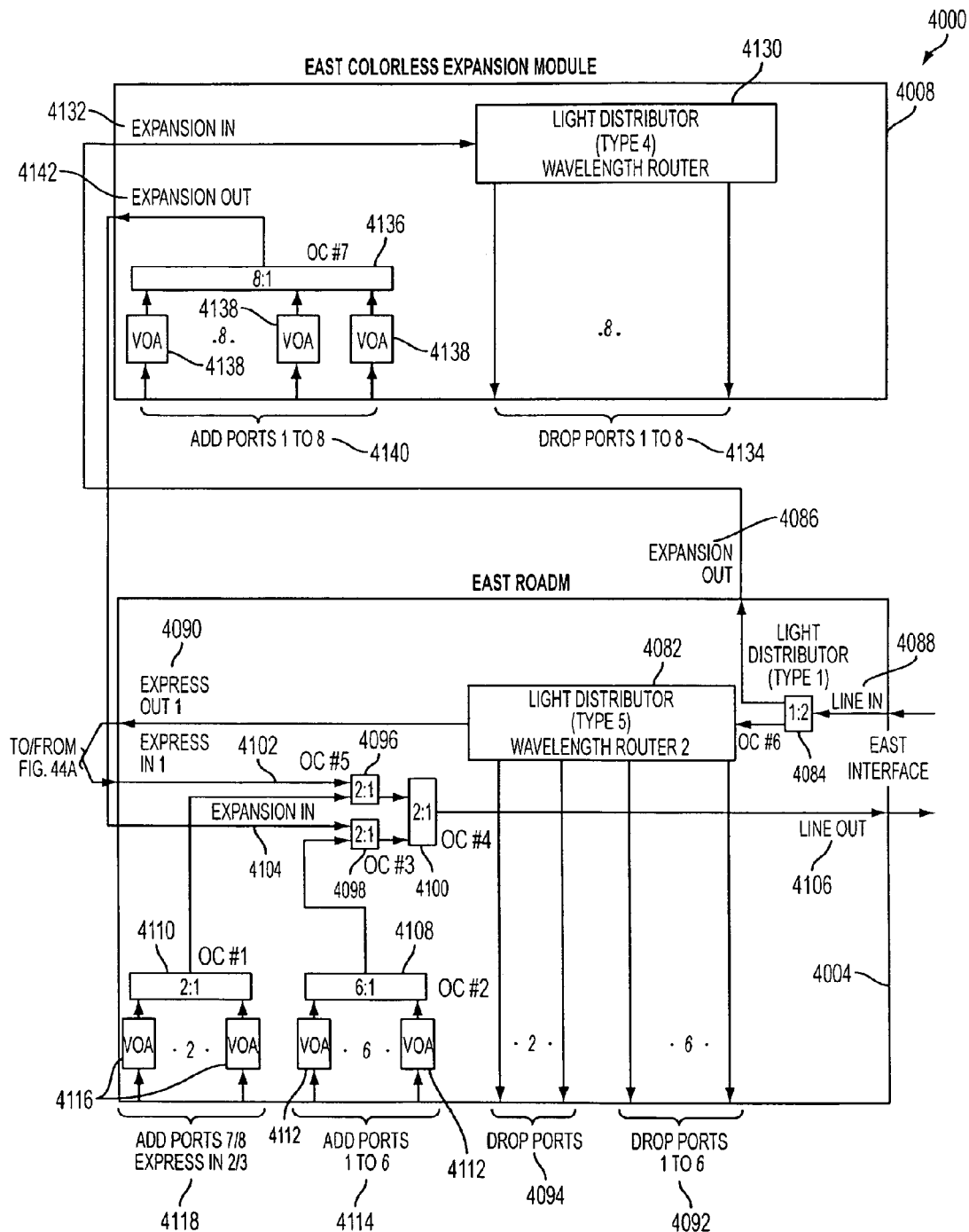

FIG. 44 shows an example embodiment of a node or network that is constructed using two ROADMs that can be the same as, for example, the FIG. 20d ROADMs, except that the type-4 light distributors are replaced with the type-5 light distributors, although the example embodiment is not limited to using a FIG. 20d ROADM that is modified to replace its type-4 light distributors with type-5 light distributors. It is also within the scope of the example embodiment to employ any of the other ROADMs disclosed therein in the node shown in FIG. 44, as long as they are modified if needed to employ a type-5 light distributor or as along as they perform the functions of a type-5 light distributor. In the FIG. 44 node, the two ports feeding optical coupler #1 (OC #1 denoted by reference numeral 4040) can be used to attach transponders thereto, or they can be used to support optical spurs, to support additional degrees, or to couple with other optical components.

More specifically, FIG. 44 shows a network 4000 (which can also be an optical node) that can include west and east ROADM core devices 4002 and 4004, respectively, a west expansion module 4006 connected to the west ROADM 4002 and an east expansion module 4008 connected to the east ROADM 4004. It is within the scope of this example embodiment for the network 4000 to include additional ROADMs, expansion modules, and other elements, and for the ROADMs and expansion modules to include additional components not shown in FIG. 44. It is also within the scope of this example embodiment for the ROADM, expansion modules, and the components thereof to be replaced by other components that perform the same or similar functions.

The ROADM core device 4002 can include a type-5 light distributor 4012 receiving optical signals input from a type-1, 1:2 light distributor 4014. Distributor 4014 can also can output optical signals to an expansion out port 4016 (which can output optical signals to an expansion in port 4062 of the expansion module 4006, which can input optical signals to a type-4 light distributor 4060, which can output optical signals to drop ports 4064) and can receive optical signals from a line interface or line in port 4018. The light distributor 4012 can output optical signals to an express output port 4020, and drop optical signals via two sets of drop ports 4022 and 4024. The first set of six drop ports 4022 can function only as drop ports to locally drop optical signals from the distributor 4012. The second set of two drop ports 4024 can function as both drop ports and express ports and are connectable to another ROADM or similar optical device in the network 4000.

The ROADM core device 4002 can further comprise three 2:1, type-1 light combiners 4026, 4028, and 4030. The light combiner 4026 can receive optical signals from an express input port 4032 (which can receive optical signals from ROADM 4004, and more specifically from an express out port 4090, which can receive optical signals from type-5 light distributor 4082, which, in turn can receive optical signals from type-1, 2:1 light combiner 4084 that receives optical signals from east line in port 4088) and from a type-1A, 2:1 light combiner 4040. The light combiner 4028 can receive optical signals from an expansion in port 4034 (which can receive optical signals from an expansion out port 4072 of expansion module 4006, which can receive optical signals from add ports 4070 via VOAs 4068 and light combiner 4066) and from a type-1A, 6:1 light combiner 4038. The light combiners 4026 and 4028 output optical signals to the 2:1 light combiner 4030, which outputs optical signals to a line output port or interface 4036. The light combiner 4038 can receive optical signals from six VOAs 4042, which each can receive optical signals from one of six add ports 4044. Add ports 4044 constitute a first set of add ports that function only as add ports. The light combiner 4040 can receive optical signals from two VOAs 4046, which each can receive optical signals from one of two add ports 4048. Add ports 4048 constitute a second set of add ports that function as both add ports and as express ports that are connectable to another ROADM or similar optical device in the node containing the ROADM 4002 to receive optical signals therefrom.

The type-1 light distributor 4014, the type-1 light combiners 4026, 4028, and 4030, the type-1A light combiners 4038 and 4040, the type-5 light distributor 4012, and VOAs 4042 and 4046 can be the same as, for example, the type-1 light distributor 24, the type-1 light combiner 30, the type-1A light combiner 44, the type-5 light distributor 3900, and the VOAs 48, respectively, as shown in FIGS. 2A, 2B, 3B, 42, and 3B, although they are not limited thereto. In addition, the type-1 light distributor 4014, the type-1 light combiners 4026, 4028, and 4030, the type-1A light combiners 4038 and 4040, and VOAs 4042 and 4046 can be the same as, or different from, the type-1 light combiner 142, the type-1A light combiner 148, and VOAs 150 shown in FIG. 10A. Also, the type-1 ROADM core device 4002 can include more than the number of components shown in FIG. 44, and it is within the scope of this example embodiment for any of the type-1 light distributor 4014, the type-1 light combiners 4026, 4028, and 4030, the type-1A light combiners 4038 and 4040, the type-5 light distributor 4012, and VOAs 4042 and 4046 to be replaced by any other suitable component (or components) that performs (or perform) the same or similar functions thereof, as discussed above.

The ROADM core device 4004 can include a type-5 light distributor 4082 receiving optical signals input from a type-1, 1:2 light distributor 4084. Distributor 4084 can also output optical signals to an expansion out port 4086 (which can output optical signals to an expansion in port 4132 of the expansion module 4008, which can input optical signals to a type-4 light distributor 4130, which can output optical signals to drop ports 4134) and can receive optical signals from a line interface or line in port 4088. The light distributor 4082 can output optical signals to an express output port 4090, and drops optical signals via two sets of drop ports 4092 and 4094. The first set of six drop ports 4092 can function only as drop ports to locally drop optical signals from the distributor 4082. The second set of two drop ports 4094 can function as both drop ports and express ports and are connectable to another ROADM or similar optical device in the network 4000.

The ROADM core device 4004 can further comprise three 2:1, type-1 light combiners 4096, 4098, and 4100. The light combiner 4096 can receive optical signals from an express input port 4102 (which can receive optical signals from ROADM 4002, and more specifically from an express out port 4020, which can receive optical signals from type-5 light distributor 4012, which, in turn can receive optical signals from type-1, 2:1 light combiner 4014 that receives optical signals from west line in port 4018) and from a type-1A, 2:1 light combiner 4110. The light combiner 4098 can receive optical signals from an expansion in port 4104 (which can receive optical signals from an expansion out port 4142 of expansion module 4008, which can receive optical signals from add ports 4140 via VOAs 4138 and light combiner 4136) and from a type-1A, 6:1 light combiner 4108. The light combiners 4096 and 4098 output optical signals to the 2:1 light combiner 4100, which outputs an optical signals to a line output port or interface 4106. The light combiner 4108 can receive optical signals from six VOAs 4112, which each can receive optical signals from one of six add ports 4114. Add ports 4114 constitute a first set of add ports that function only as add ports. The light combiner 4110 can receive optical signals from two VOAs 4116, which each can receive optical signals from one of two add ports 4118. Add ports 4118 constitute a second set of add ports that function as both add ports and as express ports that are connectable to another ROADM or similar optical device in the node containing the ROADM 4004 to receive optical signals therefrom.

The type-1 light distributor 4084, the type-1 light combiners 4096, 4098, and 4100, the type-1A light combiners 4108 and 4100, the type-5 light distributor 4082, and VOAs 4112 and 4116 can be the same as, for example, the type-1 light distributor 24, the type-1 light combiner 30, the type-1A light combiner 44, the type-5 light distributor 3900, and the VOAs 48, respectively, as shown in FIGS. 2A, 2B, 3B, 42, and 3B, although they are not limited thereto. In addition, the type-1 light distributor 4084, the type-1 light combiners 4096, 4098, and 4100, the type-1A light combiners 4108 and 4100, and VOAs 4112 and 4116 can be the same as, or different from, the type-1 light combiner 142, the type-1A light combiner 148, and VOAs 150 shown in FIG. 10A. Also, the type-1 ROADM core device 4002 can include more than the number of components shown in FIG. 44, and it is within the scope of this example embodiment for any of the type-1 light distributor 4084, the type-1 light combiners 4096, 4098, and 4100, the type-1A light combiners 4108 and 4100, the type-5 light distributor 4082, and VOAs 4112 and 4116 to be replaced by any other suitable component (or components) that performs (or perform) the same or similar functions thereof, as discussed above.

The west colorless expansion module 4006 can comprise a type-4 light combiner 4060 that receives optical signals from expansion in port 4062 (which receives optical signals from the expansion out port 4016 of the west ROADM 4002) and drops optical signals to eight colorless drop ports 4064. The module 4006 also can include a type-1A, 8:1 light combiner 4066 that can receive optical signals from eight VOAs 4068, which in turn, can each receive optical signals from a different one of eight colorless add ports 4070, and that can output optical signals to an expansion out port 4072 that can output optical signals to the expansion in port 4034 of the ROADM 4002.

The east colorless expansion module 4008 can comprise a type-4 light combiner 4130 that receives optical signals from expansion in port 4132 (which receives optical signals from the expansion out port 4086 of the east ROADM 4004) and drops optical signals to eight colorless drop ports 4134. The module 4008 also can include a type-1A, 8:1 light combiner 4136 that can receive optical signals from eight VOAs 4138, which in turn, can each receive optical signals from a different one of eight colorless add ports 4140, and that can output optical signals to an expansion out port 4142 that can output optical signals to the expansion in port 4104 of the ROADM 4004.

The type 1-A light combiners 4066 and 4136, the type-4 light distributors 4060 and 4130, and the VOAs 4068 and 4138 can be the same as or different from the type-1A light combiner 44, the type-4 light distributor 76, and the VOAs 48, respectively, as shown in FIGS. 3B, 6, and 3B. Also, the modules 4006 and 4008 can include more than the number of components shown in FIG. 44, and it is within the scope of this example embodiment for any of the type 1-A light combiners 4066 and 4136, the type-4 light distributors 4060 and 4130, and the VOAs 4068 and 4138 to be replaced by any other suitable component (or components) that performs (or perform) the same or similar functions thereof, as discussed above.

Determining Coupling Ratios

It is within the scope of the example embodiment to determine the coupling ratios of all the couplers on the ROADM modules, the expansion modules, and within the type-5 light distributor shown in FIG. 44, such that all desired future configurations are supported.

For example, it is within the scope of the example embodiment to determine a set of coupler ratio values such that all modes of operation are supported while using a lowest possible output amplifier gain on input and/or output amplifiers (not shown) attached the to line in and out ports of the ROADM 4002 and the ROADM 4004, although the example embodiment is not limited thereto. It is also within the scope of the example embodiment to configure the example embodiment of the optical node shown in FIG. 44 so that the optical drop and continue functionality of the type-5 light distributor is used only when operating as a two degree node (and not when operating as a three and/or four degree node), although the example embodiment is not limited thereto. When using such an example embodiment configuration, it is useful to determine eight coupling ratios: OC #1 through OC #6 on the ROADM circuit pack (in the ROADM 4002, these optical couplers are denoted, respectively by reference numerals 4040, 4038 4028, 4030, 4026, and 4014) OC #7 on the expansion circuit pack (denoted by reference numeral 4066 in module 4006) and the coupling ratio for a drop and continue coupler within the type-5 light distributor (4012 in ROADM 4002), although the example embodiment is not limited to determining these coupling ratios.

These coupling ratios can be determined by the following five procedures, although in other example embodiments, a different set of procedures can be used.

In an example embodiment of the first procedure, any equal-split optical couplers among OC #1 through OC #7 can be identified. Equal-split optical couplers are couplers whose input signals are considered of equal importance. In one example embodiment, the signals entering OC #7 can be considered of equal importance when they are all supplied by transponders whose output signals are designed to experience the same insertion loss, so that no one transponder-originating signal uses a lower insertion loss path than the other transponders-originating signals. In other example embodiments, the signals entering OC#7 are not of equal important and these signals are associated with different insertion losses so that at least one signal will be routed to a lower insertion loss path than the others. Returning to this example embodiment, OC #7 is an equal-split optical coupler. For similar reasons, OC #1 and OC#2 can also be equal-split optical couplers, although in other example embodiments they are not. Therefore, the coupling ratio for OC#7 can be equal to 100/k percent, where k is the number of add ports coupled to OC#7. (For node 4000, k is equal to 8 and N is equal to 2.) This procedure is shown as block 4200 in FIG. 46. The coupling ratio for OC#2 can be equal to 100/(k−(N−2)) percent, where N is the maximum number of optical degrees that can be supported by the ROADM. This procedure is shown as block 4202 in FIG. 46. The coupling ratio for OC#1 is equal to 100/(N−2) percent. This procedure is shown as block 4204 in FIG. 46. Based upon these coupling ratios, Table 1 can be used to assign the insertion loss values to the paths of the OC#7, OC#2, and OC#1. (A table with additional coupling ratios may be used, if for example the number of add ports associated with OC#7 is greater than 10 but less than 16, or if the number of add ports associated with OC#7 is greater than 16. For the example discussed in reference to the FIG. 44 node 4000, there is no need for a table with additional coupling ratios.)

In an example embodiment of the second procedure, a minimum optical power level at which the receivers of the transponders (not shown, but attached to each of the add and drop ports in the ROADMs and expansion modules in FIG. 44) can operate while still meeting all transmission requirements can be determined. In the example embodiment configuration noted above for FIG. 44, a minimum optical power level can be no less than −14 dBm, although in other example embodiments, the minimum optical power level is different than this value. Once this minimum power level is determined, the coupling ratio for OC#6 can be determined. This can be done by first determining a maximum possible insertion loss of the upper output of OC#6 (the output feeding the expansion out port 4016), using the following expression:

$$IL_{oc} \leq P_{in} - P_{min} - IL_{wr},$$

where $P_{in}$ equals the input power of an individual wavelength at the line in port, $IL_{wr}$ equals the insertion loss of the wavelength router on the expansion circuit pack, $IL_{oc}$ equals the insertion loss of the OC#6 output feeding the wavelength router on the expansion circuit pack, and $P_{min}$ equals the minimum allowable power level to the receivers of the transponders attached to the expansion circuit pack. Since in this example embodiment, an input amplifier (not shown) attached to the line in port of the ROADM 4002 can drive the line in port such that the optical power level of each incoming wavelength is set to 0.0 dBm, $P_{in}$ can be equal to 0 (although in other example embodiments, the input amplifier (not shown) attached to the line in port of the ROADM 4002 can drive the line in port so that the optical power level of each incoming wavelength is set to a different value), so the above expression becomes:

$$IL_{oc} \leq -P_{min} - IL_{wr}.$$

In this example embodiment, the acceptable minimum transponder optical power can be set to −14 dBm and the wavelength router insertion loss (type-2) can be 6 dB (although it is within the scope of the example embodiment to set these parameter to different suitable values) so that the above expression reduces to:

$$IL_{oc} \leq 8 \text{ dB}$$

Therefore, the insertion loss through OC#6 for the path to the expansion module can be no more than 8 dB. Using Table 4, a standard coupling ratio for OC#6 can be selected such that the insertion loss on the path 1 of the coupler is as large as possible, but is less than 8 dB ($IL_{oc}$), so that a maximum amount of optical power can be passed to the other output of the optical coupler. From Table 4 it can be determined that a 20/80% 1-to-2 coupler can be used for OC#6, since its insertion loss can be 7.6 dB. Therefore, a 20/80% coupler can be chosen for OC#6. For this case, the insertion loss of the lower output on OC#6 (path 2) can be 1.1 dB (according to Table 4). As an alternative, a custom optical coupler could be created where the insertion loss of one output is exactly 8 dB, and where the insertion loss of the second output is less than 1.1 dB. In other example embodiments, the coupling ratio for OC#6 can be selected without regard to whether the insertion loss on the path 1 of the coupler is as large as possible, but less than 8 dB and without regard to passing a maximum amount of optical power to the other output of the optical coupler. Therefore, in other example embodiments, other couplers besides a 20/80% 1-to-2 coupler can be used for OC#6, and other insertion losses besides 7.6 dB and 1.1 dB for the two outputs of the coupler can be used. This procedure is shown as block 4206 in FIG. 46.

Figure 46:
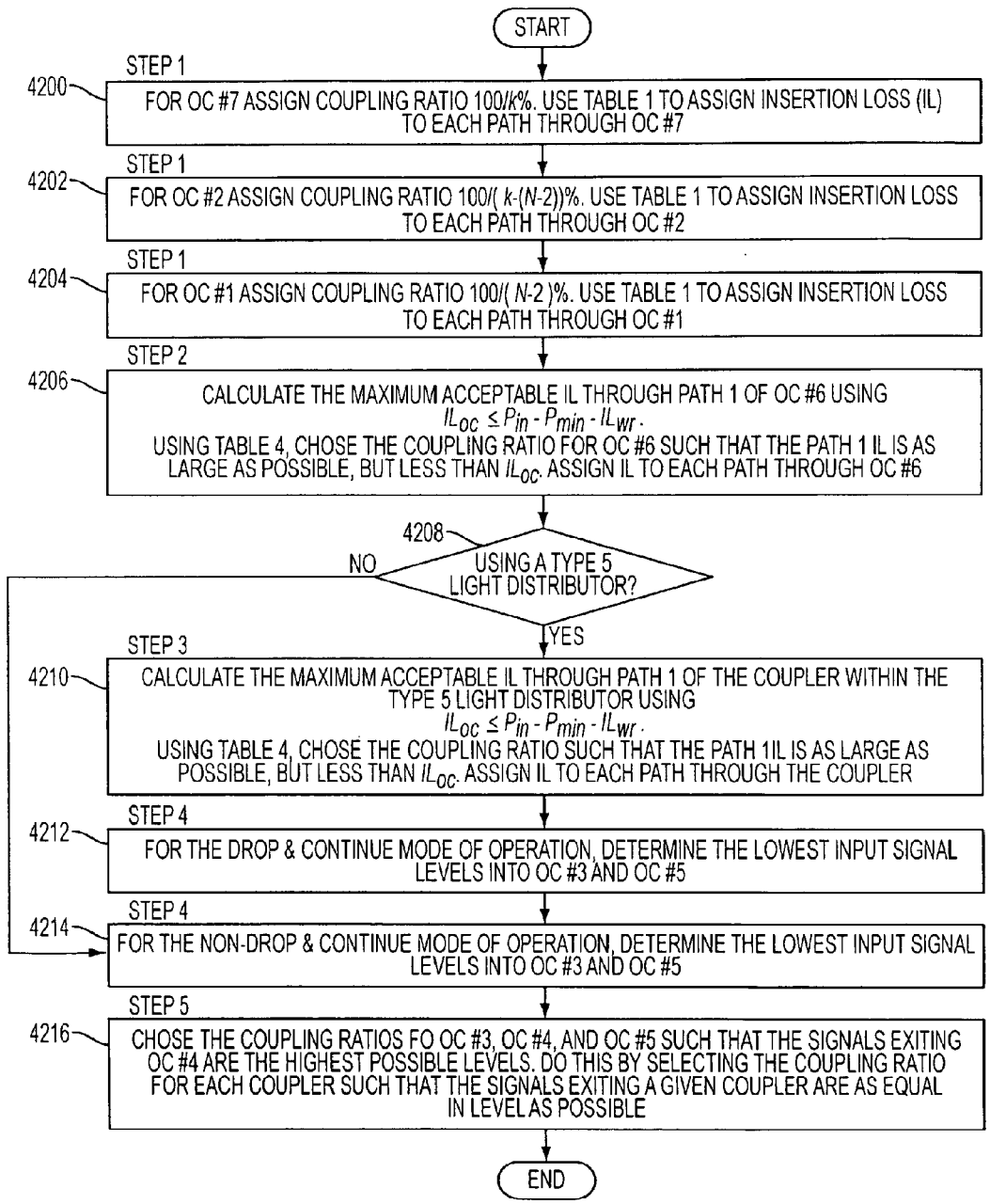
FIG. 46 is a flow chart of an example embodiment of a procedure for selecting coupling ratios for optical couplers of an optical node.

Next, it is determined whether a type 5 light distributor is being used in the ROADM, as shown in block 4208 in FIG. 46. Since this coupling-ratio-determining procedure accommodates ROADMs that include either a type-5 light distributor or a type-4 light distributor, this coupling-ratio-determining procedure can be applicable to ROADMs different from that shown in FIG. 44 that use a type-5 light distributor. For example, the procedure can be used to determine the coupling ratios associated with a node containing the ROADM 1130 depicted in FIG. 20D.

If a type-5 light distributor is being used in the ROADM, as shown in FIG. 44, in an example embodiment of a $3^{rd}$ procedure, the coupling ratio for the coupling function within the type-5 light distributor (also referred to as the type-2 wavelength router) on the ROADM circuit pack 4002 can be chosen, as shown in blocks 4210, 4212, and 4214 of FIG. 46. This selection can be performed by first determining the insertion losses through the type-5 light distributor. Example insertion loss values for the various functions performed by the type-5 light distributor shown in FIG. 42 are shown in Table 9.

TABLE 9

| Type-5 Light Distributor function | Insertion Loss |
|---|---|
| Type-2 light distributor function | 2 dB |
| Type-2 Light Combiner function | 2 dB |
| 1-to-2 optical switch function | 0.5 dB |
| 1-to-3 optical switch function | 0.5 dB |
| 1-to-k optical switch function(k = 8) | 1.5 dB |
| VOA (set to 0 attenuation)function | 1.0 dB |
| 1-to-2 Optical coupler function | Depends on coupling ratio |

Based upon Table 9, the insertion losses of four paths through the type-5 light distributor are shown in Table 10. (Where WR-OC-1 and WR-OC-2 correspond to outputs 1 and 2 respectively of the internal optical coupler function within the type-5 light distributor.)

TABLE 10

| Light Distributor 5 Path | Insertion Loss[1] |
|---|---|
| Express Only | 6 dB |
| Drop Only | 7.5 dB |
| Express (Drop and Continue mode) | 6 + WR-OC-1 |
| Drop (Drop and Continue mode) | 7.5 + WR-OC-2 |

[1]The insertion loss assumes that all VOAs are configured to their minimum attenuation value of 1 dB.

In one example embodiment, the coupling ratio of the internal coupling function when operating in the drop and continue mode can be determined so as to send as little light as possible to the drop ports, and so as to send as much light as possible to the express port. The following expression can be used to determine the insertion loss of the coupler function in the drop path in response to these considerations:

$$IL_{oc} \leq P_{in} - P_{min} - IL_{wr}.$$

For this case, $P_{in}$ can be equal to the input power at the line in port minus the insertion loss through OC#6, or −1.1 dBm. The value of $P_{min}$ can again be −14 dBm. $IL_{wr}$ is the insertion loss of the drop path within the type-5 light distributor, not including the insertion loss of the optical coupler within the type-5 light distributor. Therefore, from Table 10, $IL_{wr}$ can be equal to 7.5 dB. (It is also within the scope of the example embodiment to set these parameter to different suitable values) Substituting these values into the above equation provides the following expression:

$$IL_{oc} \leq 5.4 \text{ dB}.$$

Based upon the insertion losses of the standard couplers shown in Table 4, a 35/65% coupler can be selected (with insertion losses of 5.1 dB and 2.2 dB), although in other example embodiments, a different coupler can be selected. For example, a custom optical coupler could be created where the insertion loss of one output is exactly 5.4 dB, and where the insertion loss of the second output is less than 2.2 dB. Based upon this selection, the values of Table 10 are updated, and shown in Table 11. This procedure is shown in block 4210 in FIG. 46.

TABLE 11

| Light Distributor 5 Path | Insertion Loss |
|---|---|
| Express Only | 6 dB |
| Drop Only | 7.5 dB |
| Express (Drop and Continue mode) | 8.2 dB |
| Drop (Drop and Continue mode) | 12.6 dB |

Figure 45A:
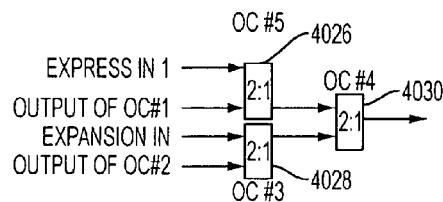
FIG. 45A-FIG. 45C are block diagrams of an example embodiment of optical couplers OC#3-OC#5, with FIG. 45A illustrating the inputs into each coupler, FIG. 45B showing the input signal levels of the last column of Table 17 applied to the inputs of OC#3 and OC#5, and FIG. 45C illustrating the four resulting levels output from OC#4 corresponding to the four input signal levels.

Table 12 shows the values of the various couplers within the FIG. 44 system. From Table 12 the coupling ratios of only three 2-to-1 couplers (OC#3, OC#4, OC#5) have yet to be determined. FIG. 45A shows examples of these three couplers and the signals at their corresponding inputs. It is within the scope of the example embodiment to rearrange the input signals to couplers OC#3 and OC#5, for a variety of reasons, such as, for example, to lower the output amplifier gain of the amplifier (not shown) attached to the line out port of the ROADM 4002. In this table TBD means "to be determined".

TABLE 12

| Type | Configuration | Coupling Ratio | Insertion Loss (path 1) | Insertion Loss (other path(s)) |
|---|---|---|---|---|
| OC #1 | 2x1 (equal) | 50/50% | 3.4 dB | 3.4 dB |
| OC #2 | 6x1 (equal) | 16.67% | 9.0 dB | 9.0 dB |
| OC #3 | 2x1 | TBD | TBD | TBD |
| OC #4 | 2x1 | TBD | TBD | TBD |
| OC #5 | 2x1 | TBD | TBD | TBD |
| OC #6 | 1x2 | 20/80% | 7.6 dB | 1.1 dB |
| OC #7 | 8x1 (equal) | 12.5% | 10.6 dB | 10.6 dB |
| OC #8[2] | 1x2 | 35/65% | 5.1 dB | 2.2 dB |

[2]This coupler can correspond to the coupler function within the type-5 light distributor. Note, there can be m such coupler functions within the type-5 light distributor as indicated in FIG. 42. In one embodiment, all m couplers have the same coupling ratio, while in other embodiments, they do not.

In an example embodiment of a 4th procedure, the lowest signal levels that can be applied to the inputs of the coupling network shown in FIG. 45a can be determined. This can be accomplished, for example, by first determining the lowest signal levels that can be applied to the ROADM ports that are sourcing power to the inputs of the FIG. 45a coupling network: express in 1, expansion in, add ports 1 to 6, add ports 7/8, and express ports 2/3.

Table 13 shows the values of output signals from other devices that can feed into the add ports 7/8 and the express ports 2/3 of the ROADM, and their corresponding lowest signal levels. But the example embodiment is not limited to these values. Other example embodiments can provide other values of output signal from other devices that can feed into the ROADM.

Table 14 shows the values of output signals from another ROADM circuit pack that can feed into the ROADM Express In 1 port. But the example embodiment is not limited to these values. Other example embodiments can provide other values of output signals from another ROADM circuit pack that can feed into the ROADM express in 1 port.

Although the expansion in signal can be driven by both colored and colorless port expansion modules, below, only the example embodiment of a colorless port expansion pack will be considered below. Table 15 contains the values of the output signal from a colorless port expansion pack that can feed into the ROADM port expansion in. But it should be understood that the example embodiment is not limited to these values. Other example embodiments can provide other values for these parameters.

Table 16 shows the values of output signals from transponders that can feed into the add ports 1 to 6 of the ROADM. But it should be understood that the example embodiment is not limited to these values, and that other example embodiments can provide other values for these parameters.

TABLE 13

| | Minimum Signal Level | |
|---|---|---|
| Signal Feeding ROADM Ports "Add Ports 7/8, Express In 2/3" | Drop & Continue mode | Non-Drop & Continue mode |
| Transponder output signal (=TX) | 0.0 dBm | 0.0 dBm |
| Expansion Out signal of a colorless port expansion module (=TX − $IL_{VOA}$ − $IL_{8x1}$ = 0 − 1 − 10.6 ) | −11.6 dBm | −11.6 dBm |
| Expansion Out signal of a colored port expansion module | Not Considered | Not Considered |
| Express Out 1 signal from another ROADM circuit pack (=−IL of 4014 − IL of 4012) | −9.3 dBm | −7.1 dBm |

TABLE 13-continued

|  | Minimum Signal Level | |
|---|---|---|
| Signal Feeding ROADM Ports "Add Ports 7/8, Express In 2/3" | Drop & Continue mode | Non-Drop & Continue mode |
| Express Out 2/3 signal from another ROADM circuit pack | NA[3] | −8.6 dBm |
| Output signal from a spur circuit pack such as the one shown in FIG. 33 | −3.4 dBm | −3.4 dBm |

[3] Assumes that drop and continue mode is not supported when operating as a node with more than two degrees.
[4] This level assumes that there is an input amp on the spur. This level assumes that the spur input amp sets the optical output level of each wavelength to 0 dBm. This level assumes an insertion loss of 3.4 dB through both paths of the Type-1 light distributor on the spur circuit pack.

TABLE 14

|  | Minimum Signal Level | |
|---|---|---|
| Signal Feeding ROADM Port "Express In 1" | Drop & Continue mode | Non-Drop & Continue mode |
| Express Out 1 signal from another ROADM circuit pack | −9.3 dBm | −7.1 dBm |
| Express Out 2/3 signal from another ROADM circuit pack | NA[5] | −8.6 dBm |

[5] Assumes that drop and continue mode is not supported when operating as a node with more than two degrees.

TABLE 15

|  | Minimum Signal Level | |
|---|---|---|
| Signal Feeding ROADM Port "Expansion In" | Drop & Continue mode | Non-Drop & Continue mode |
| Expansion Out signal of the colorless port expansion Module | −11.6 dBm | −11.6 dBm |

TABLE 16

|  | Minimum Signal Level | |
|---|---|---|
| Signal Feeding ROADM Ports "Add Ports 1 to 6" | Drop & Continue mode | Non-Drop & Continue mode |
| Transponder output signal | 0.0 dBm | 0.0 dBm |

Table 17 shows the values of the lowest optical levels that can be applied to the inputs of OC#3 and OC#5 in one example embodiment. These values are calculated based upon the information in Tables 13 through 16, for the drop and continue mode of operation (where only two degrees are supported), since the drop and continue mode of operation results in the lowest optical power levels. It should be understood though, that since the example embodiment is not limited to the specific values shown in Tables 13 through 16, the example embodiment is also not limited to the specific values shown in Table 17. Other example embodiments can use other values for the lowest optical levels that can be applied to the inputs of OC#3 and OC#5 and other node degrees. This procedure is shown in FIG. 46 in block 4212.

TABLE 17

Lowest Optical Power Levels at the inputs of OC#3 and OC#5 (Drop & Continue Mode)

| Input ROADM Port | Minimum Signal Level | Insertion Loss prior to OC#3/5 | Lowest Level applied to OC#3/5 |
|---|---|---|---|
| Express In 1 (From Table 14) | −9.3 dBm | 0 dB | −9.3 dBm |
| Add Port 7/8, Express In 2/3 (From Table 13) | −11.6 dBm | 4.4 dB | −16.0 dBm |
| Expansion In (From Table 15) | −11.6 dBm | 0 dB | −11.6 dBm |
| Add Ports 1 to 6 (From Table 16) | 0.0 dBm | 10.0 dB | −10.0 dBm |

Table 18 shows values of the lowest optical levels that can be applied to the inputs of OC#3 and OC#5 for an example embodiment configuration that is the same as that used to calculate the values shown in Table 17, except that a non-drop and continue mode of operation is employed and up to four node degrees are supported. It should be understood though, that since the example embodiment is not limited to the specific values shown in Table 18, other example embodiments can use other values for these parameters. This procedure is shown in FIG. 46 as block 4214 and it occurs after block 4208 if a type-5 light distributor is not being used in the ROADM. If a type-5 light distributor is used in the ROADM, block 4214 occurs after block 4212.

TABLE 18

Lowest Optical Power Levels at the inputs of OC#3 and OC#5 (Non-Drop & Continue Mode)

| ROADM Port | Minimum Power Level | Insertion Loss prior to OC#3/5 | Lowest Level applied to OC#3/5 |
|---|---|---|---|
| Express In 1 | −8.6 dBm | 0 dB | −8.6 dBm |
| Express In 2, Express In 3 | −11.6 dBm | 4.4 dB | −16.0 dBm |
| Expansion In | −11.6 dBm | 0 dB | −11.6 dBm |
| Add Ports 1 to 6 | 0.0 dBm | 10.0 dB | −10.0 dBm |

A comparison of Tables 17 and 18 reveals that the lowest signal levels applied to OC#3 and OC#5 occur for the example embodiment configuration using the drop and continue mode of operation. Therefore, the signals levels shown in the last column of Table 17 are the lowest signal levels that that will be applied to the four inputs of OC#3 and OC#5 in this example embodiment.

Figure 45B:
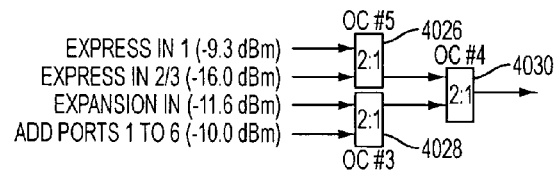

FIG. 45B shows an example embodiment configuration in which the signal levels of the last column of Table 17 are applied to the inputs of optical couplers OC#3 and OC#5. It should be understood that since other signal levels can be used, other example embodiments can employ other values for the signal levels entering OC#3 and OC#5

Figure 45C:
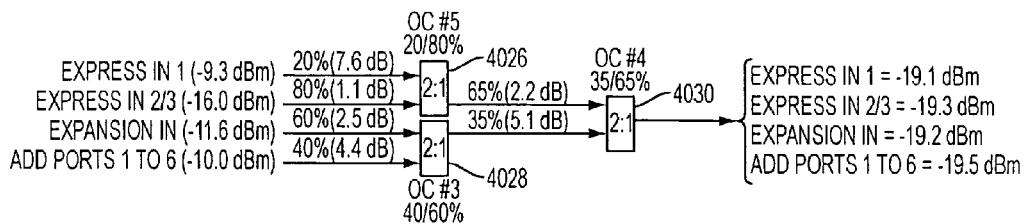

In an example embodiment of a 5$^{th}$ procedure shown in block 4216 in FIG. 46, the coupling ratios for OC#3, OC#4, and OC#5 can be chosen such that the signals exiting coupler OC#4 are at the highest possible levels (although in other example embodiments, the coupling ratios for OC#3, OC#4, and OC#5 can be selected such that the signals exiting coupler OC#4 are not at the highest possible levels). This can be accomplished, for example, by selecting the coupling ratio for each coupler such that the signals exiting the given coupler are as equal in level as possible, although the example embodiment is not limited to such equal-level outputs. For instance, for optical coupler OC#5, the difference between the levels of the two input signals can be 6.7 dB (16.0-9.3), although in other example embodiments, this difference can assume a different value. By examining the coupling ratios in Table 4A, it can be seen that the difference in insertion losses for the two paths through the 20/80% coupler is 6.5 dB (7.6-1.1). Therefore, the 20/80% coupler can be chosen for OC#5, since the 20/80% coupler provides the closest difference in insertion loss to the value 6.7 dB, although in other example embodiments, a different coupler can be selected. For the optical coupler OC#3, the difference between the levels of the two input signals can be 1.6 dB (11.6-10.0), although in other embodiments, this difference can assume a different value. By examining the coupling ratios in Table 4A, it can be seen that the difference in insertion losses for the two paths through the 40/60% coupler can be 1.9 dB (4.4-2.5). Therefore, the 40/60% coupler can be chosen for OC#3, since the 40/60% coupler provides the closest difference in insertion loss to the value 1.6 dB, although in other embodiments, a different coupler can be selected. In a similar manner, based upon the resulting input levels to OC#4, a 35/65% coupler is chosen for OC#4, although in other example embodiments, a different coupler can be selected. FIG. 45C shows the four resulting levels out of OC#4 corresponding to the four input signals levels to couplers OC#3 and OC#5. The lowest signal level can correspond to the input signals of add ports 1 to 6 (−19.5 dBm). Therefore, assuming that the desired output power for each wavelength exiting the output amplifiers associated with the node 4000 is 0 dBm, if output amplifiers (not shown) at the line out port of the ROADM 4002 and the ROADM 4004 with gains of 19.5 dB are chosen for the FIG. 44 system, all configurations can be supported (for example, a 2 degree node with a drop and continue function and with up to three colorless port expansion modules per degree, a 2 degree node with a drop and continue function and an optical spur with up to two colorless port expansion modules per degree, a 3 degree node with an optical spur and one colorless port expansion module per degree, a 3 degree node with two colorless port expansion modules per degree, and a 4 degree node with one colorless port expansion module per degree). It is assumed that the per wavelength VOAs within the type 5 light distributors 4012, 4082 and the per wavelength VOAs associated with any transponders attached to the system 4068, 4138, 4042, 4046, 4116, 4112 are used to attenuate any wavelengths which may have a higher power greater than 0 dBm at the output of the output amplifiers. Table 19 shows all coupling ratios.

TABLE 19

| Type | Configuration | Coupling Ratio | Insertion Loss (path 1) | Insertion Loss (other path(s)) |
|---|---|---|---|---|
| OC #1 | 2x1 (equal) | 50/50% | 3.4 dB | 3.4 dB |
| OC #2 | 6x1 (equal) | 16.67% | 9.0 dB | 9.0 dB |
| OC #3 | 2x1 | 40/60% | 2.5 dB | 4.4 dB |
| OC #4 | 2x1 | 35/65% | 2.2 dB | 5.1 dB |
| OC #5 | 2x1 | 20/80% | 7.6 dB | 1.1 dB |
| OC #6 | 1x2 | 20/80% | 7.6 dB | 1.1 dB |
| OC #7 | 8x1 (equal) | 12.5% | 10.6 dB | 10.6 dB |
| OC #8[6] | 1x2 | 35/65% | 5.1 dB | 2.2 dB |

[6]Corresponds to the coupler function within the type-5 light distributor.

Other Coupling-Ratio Determining Example Embodiments

It is within the scope of the example embodiment to select an output amplifier (not shown) for the line out port of the ROADM 4002 or expansion port with a gain higher than a minimum gain to provide for some amount of system margin. Therefore in the above example embodiment, an output amplifier (not shown) at the line out port of the ROADM 4002 with a gain of greater than 19.5 dB can be used.

Since a VOA can have an insertion loss of 1.0 dB, it can be noticed from FIG. 44 and Table 19 that the total insertion loss from add ports 1-6 to the line out port can be 19.5 dB, while the total insertion loss from add ports 7/8 to the line out port can be 7.7 dB (although in other example embodiments, these values can be different). Therefore the insertion loss through add ports 7/8 can be substantially less than the insertion loss through add ports 1 to 6 (by 11.8 dB) (although in other example embodiments, these values can be different). In a different example embodiment using a single 8-to-1 equal-split coupler on the ROADM circuit pack (instead of a 6-to-1 equal-split coupler and a 2-to-1 equal-split coupler), when a colorless expansion module is added through one of the add ports of the ROADM circuit pack, the insertion loss from the input of the add port of the expansion card to the output of the 8-to-1 coupler on the ROADM circuit pack can be 23.2 dB alone (although in other example embodiments, this value can be different). When the output of the 8-to-1 coupler on the ROADM circuit pack is coupled with the express in 1 signal and the expansion in signal such that there is about another 1 dB of insertion loss for the 8-to-1 coupler path, the total insertion loss for the signal added to the colorless port expansion add port can be 24.2 dB, resulting in an output signal to the output amplifier (not shown) at the line out port of ROAM 4002 of −24.2 dBm (although in other example embodiments, this value can be different). Therefore creating two add ports with substantially lower insertion loss than the other add ports enables an output amplifier (not shown) at the line out port of ROAM 4002 to be used that has 4.7 dB less gain (24.2-19.5) (although in other example embodiments, this value can be different).

In another example embodiment in which a type-4 light distributor is used in FIG. 44 (instead of a type-5 light distributor), in order to determine the optical coupling ratios for couplers OC#3, OC#4, and OC#5, the fourth column of Table 18 can be used (instead of the fourth column of Table 17), since the type-4 light distributor does not support the wavelength level optical drop and continue function, and no internal coupling ratio value for the wavelength router is determined.

The FIG. 46 example embodiment is not limited to a procedure used to select the coupling ratios for components of ROADM example embodiment #3, and can be used to select the coupling ratio of any other ROADM example embodiment described herein. In addition, although ROADM 4002 was discussed in regard to FIG. 45, the coupling-ratio-determining procedure of FIG. 46 applies equally to the optical couplers in ROADM 4004 in FIG. 44, which also shows OC#1 through OC#7 in the ROADM 4004 and expansion module 4008 combination.

In this FIG. 46 example embodiment relating to FIG. 44, the signal levels of the wavelengths entering the line in port of the ROADM circuit pack can all be at 0 dBm, although in other example embodiments, these signal levels can assume different values from each other or they can assume the same value that is different from 0 dBm, either higher or lower. In addition, it is within the scope of the example embodiment for the optical power levels of each wavelength entering the line in port of the ROADM circuit pack to be different from each other. In this case, an output amplifier (not shown) on the line out port or other port of the ROADM 4002 can be selected that has a greater amount of gain than for the case where all arriving wavelengths have identical optical power level. Similarly, it is within the scope of the example embodiment for the input levels applied by transponders (not shown) at the add ports of the ROADM circuit pack and the expansion modules to not be exactly at 0 dBm, and for all the input optical power levels to not be equal. For the case where all the optical power levels of the wavelengths being applied to the add ports are not equal, all calculations can be performed using the optical power level of the wavelength with the lowest optical power level.

Also, throughout the description of this document, miscellaneous insertion losses such as those of optical connectors, optical taps, and optical splices have been ignored for simplicity purposes. It is within the scope of the example embodiment to take into account these additional insertion losses.

Although the "Express In 1" signal was coupled with the "Express In 2/3" signal using OC#5, and although the "Expansion In" signal was coupled to the "Add Ports 1 to 6" signal using OC#3, it may be advantageous to rearrange the coupling pairs in order to be able to specify a line-out output amplifier (not shown) with the lowest possible gain. For instance, if the "Express In 1" signal is coupled with the "Add Ports 1 to 6" signal, and if the "Expansion In" signal is coupled to the "Express In 2/3" signal, it can be shown that an output amplifier (not shown) with a gain of only 19.4 dB can be used.

Based upon the coupler values shown in Table 19, and based upon a per wavelength optical power level of 0.0 dBm out of the line-in input amplifier (not shown), when operating in drop and continue mode of operation, a given transponder will receive a wavelength with an optical power level of −13.7 dBm. In order to present similar optical power levels to all transponders, regardless of the mode of operation, it may be highly desirable to attenuate the drop signals to a value of approximately −13.7 dBm even when a given wavelength is being only dropped to a drop port (and not continued out to the express port). However, when drop ports 7 and 8 are used as express ports, it is advantageous for the optical power levels exiting these drop ports (ports 7 and 8) to be as low as possible in order to be able to use a line-out output amplifier (not shown) with as low of a gain as possible. Therefore, when drop ports 7 and 8 are used as express ports, the insertion loss from the line in signal 4018 to the drop out signal 4024 may be set to 8.6 dB (the non-drop-and-continue path through the type 5 light distributor 4012), while the insertion loss from the line in signal 4018 to the drop out signal 4022 (corresponding to drop ports 1 to 6) may be set to 13.7 dB. Therefore, the drop ports 6 and 7 will have a lower insertion loss than drop ports 1 to 6 when the drop ports 6 and 7 function as express ports.

Other ROADM Example Embodiments

Figure 47A:
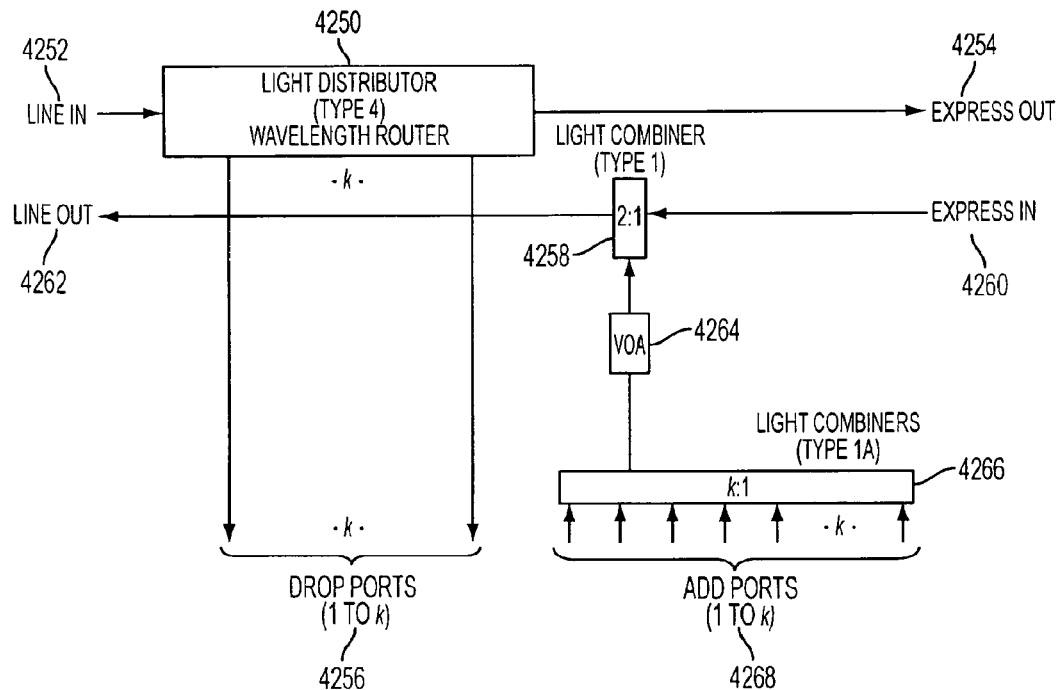
Figure 47B:
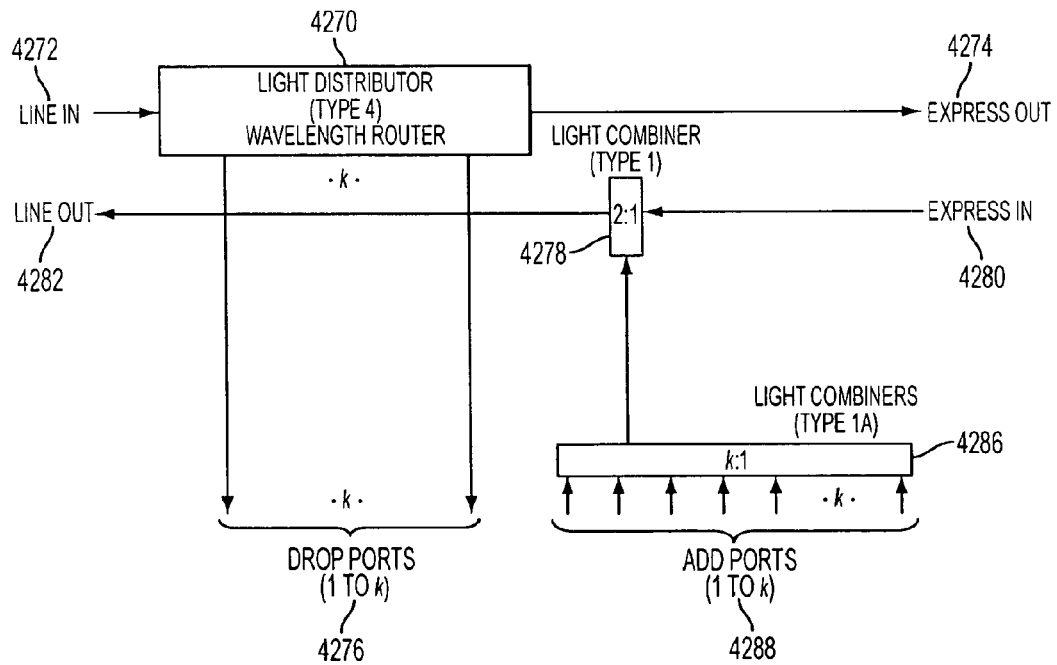

FIGS. 47A and 47B show two additional ROADM example embodiments that are variations on the FIG. 10A ROADM. They differ from the FIG. 10A ROADM in that they have a different number of (or no) VOAs, although they are not limited to being variations on this ROADM. Thus, it is within the scope of this example embodiment to encompass any type of ROADM, with the difference being the use of fewer or no VOAs.

FIG. 47A shows an example embodiment of a ROADM that can be the same as, for example, the FIG. 10A ROADM with the individual VOAs removed from the add ports and a single VOA placed at the output of the k-to-1 equal-split coupler, although it is not limited to being a variation on the FIG. 10A ROADM and is not limited to using a single VOA placed at the output of the k-to-1 equal-split coupler. Since the individual VOAs in FIG. 10A are used to power balance the individual wavelengths entering the add ports 152, replacing the individual VOAs by a single VOA may be done for those cases where there is very little variance in the output power of the individual transponders attached to the add ports.

More specifically, FIG. 47A discloses a ROADM core device that can include a type-4 light distributor 4250 that can receive optical signals input from a line interface 4252 (also called a line in or line input port), output optical signals on an express output port 4254, and locally drop optical signals via k drop ports 4256, where k is a positive integer representing the total number of add ports and the total number of drop ports, which are the same (although the example embodiment may have an unequal number of add and drop ports). The ROADM core device shown in FIG. 47A can further include a 2:1, type-1 light combiner 4258 that can receive optical signals from an express input port 4260 and can output optical signals from a line output interface 4262 (also called a line out or line output port). The type-1 light combiner 4258 can also receive optical signals from a VOA 4264, which, in turn, can receive optical signals from a type-1, k:1 light combiner 4266. The light combiner 4266 can receive optical signals from k add ports 4268.

The type-1 light combiners 4258 and 4266, the type-4 light distributor 4250, and the VOA 4264 can be the same as, for example, the type-1 light combiner 30, the type-4 light distributor 76, and the VOAs 48, respectively, as shown in FIGS. 2B, 6, and 3B, although they are not limited thereto. The type-1 ROADM core device shown in FIG. 47A can include more than the number of components shown in FIG. 47A, and it is within the scope of this example embodiment for any of the type-1 light combiners 4258 and 4266, the type-4 light distributor 4250, and the VOA 4264 shown in FIG. 47A to be replaced by any other suitable component (or components) that performs (or perform) the functions thereof, as discussed above.

FIG. 47B shows an example embodiment of a ROADM that can be the same as, for example, the FIG. 10A ROADM with the individual VOAs removed from the add ports and no single VOA placed at the output of the k-to-1 equal-split coupler, although it is not limited to being a variation on the FIG. 10A ROADM. Since the individual VOAs in FIG. 10A are used to power balance the individual wavelengths entering the add ports 152, removing the individual VOAs may be done for those cases where VOAs are embedded into the outputs of the individual transponders attached to the add ports.

More specifically, FIG. 47B discloses a ROADM core device that can include a type-4 light distributor 4270 that can receive optical signals input from a line interface 4272 (also called a line in or line input port), output optical signals on an express output port 4274, and locally drop optical signals via k drop ports 4276, where k is a positive integer representing the total number of add ports and the total number of drop ports, which are the same (although the example embodiment may have an unequal number of add and drop ports). The ROADM core device shown in FIG. 47B can further include a 2:1, type-1 light combiner 4278 that can receive optical signals from an express input port 4280 and can output optical signals from a line output interface 4282 (also called a line out or line output port). The type-1 light combiner 4278 can also receive optical signals from a type-1, k:1 light combiner 4286. The light combiner 4286 can receive optical signals from k add ports 4288.

The type-1 light combiners 4278 and 4286, and the type-4 light distributor 4270 can be the same as, for example, the type-1 light combiner 30, and the type-4 light distributor 76, respectively, as shown in FIGS. 2B and 6, although they are not limited thereto. The type-1 ROADM core device shown in FIG. 47B can include more than the number of components shown in FIG. 47B, and it is within the scope of this example embodiment for any of the type-1 light combiners 4278 and 4286, and the type-4 light distributor 4270 shown in FIG. 47B to be replaced by any other suitable component (or components) that performs (or perform) the functions thereof, as discussed above.

The ROADM example embodiments #1, #2, #3, Optical Node Example Embodiments #1, #2, #3, #4, and #5, the type-5 light distributor example embodiments, and the coupling-ratio-selecting procedure example embodiments, or any part(s) or function(s) thereof may be implemented using hardware, software or a combination thereof and may be implemented in one or more computer systems or other processing systems. However, manipulations performed by these example embodiments were often referred to in terms, such as choosing or selecting, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a central processing unit (CPU) (not shown) can be used to instruct the configuring of the ROADMs and optical nodes, and typically include one or more components, such as one or more microprocessors, for performing the arithmetic and/or logical operations required for program execution for configuring the ROADMs, and storage media, such as one or more disk drives or memory cards (e.g., flash memory) for program and data storage, and a random access memory, for temporary data and program instruction storage. From a software standpoint, a CPU typically includes software resident on a storage media (e.g., a disk drive or memory card), which, when executed, directs the CPU in performing transmission and reception functions. The CPU software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

In addition, the CPU may include plural separate CPUs, wherein each is dedicated to a separate application, such as, for example, a data application, a voice application, and a video application.

Software embodiments of the example embodiments presented herein may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments have been described above, it should be understood that they have been presented by way of example, and not limitation. It will be apparent to persons skilled in the relevant art(s) that various changes in form and detail can be made therein. Thus, the scope of the various example embodiments should not be limited by any of the details thereof described herein, but should be defined only in accordance with the following claims and their equivalents.

In addition, it should be understood that the FIGS. 1-47 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A dense wavelength division multiplexing optical add/drop optical node comprising:
    a first set of optical couplers;
    a second set of optical couplers; and
    a third set of optical couplers, an output of the first set of optical couplers and at least part of an output of the second set of optical couplers being input into the third set of optical couplers, coupling ratios for the first set of optical couplers being substantially equal, coupling ratios for the second set of optical couplers being such that a power level of an optical wavelength output therefrom is a minimum required power for optical wavelengths dropped from a first reconfigurable optical add drop multiplexer core device, and coupling ratios for the third set of optical couplers maximizing a power level of an optical wavelength exiting the third set of optical couplers.

2. The node set forth in claim 1, the second set of optical couplers including a set of 1-to-2, optical-power-divider-type light distributors within a light distributor device configured to select any of the following operations: directing an entire optical power of the wavelength only to an express output thereof; directing the entire optical power of the wavelength only to one of subtending outputs thereof; and directing a portion of the optical power of the wavelength to only one of the subtending outputs and a portion of the optical power of the wavelength to the express output.

3. The node set forth in claim 1, the first set of optical couplers including an optical coupler that combines signals from add ports contained on a port expansion module.

4. The node set forth in claim 1, the first set of optical couplers including a first coupler that combines all signals of add ports operable as express ports, and a second coupler which combines all signals of add ports that do not operate as express ports.

5. The node set forth in claim 1, the third set of optical couplers residing on the first reconfigurable optical add drop multiplexer core device and processing (a) signals from add ports of the first reconfigurable optical add drop multiplexer core device, (b) a signal from an express output port of a second reconfigurable optical add drop multiplexer core device, and (c) a signal from an expansion output port of an expansion module attached to the first reconfigurable optical add drop multiplexer core device.

6. A procedure for assigning coupling ratios for first, second, and third sets of optical couplers within a dense wavelength division multiplexing optical add/drop node, an output of the first set of optical couplers and at least part of an output of the second set of optical couplers being input into the third set of optical couplers, the procedure comprising:
    selecting coupling ratios for the first set of optical couplers to be equal among all inputs of each optical coupler in the first set;
    selecting coupling ratios for the second set of optical couplers such that a power level of an optical wavelength output therefrom is a minimum required power for optical wavelengths dropped from a first reconfigurable optical add drop multiplexer core device;
    selecting coupling ratios for the third set of optical couplers to maximize a power level of an optical wavelength exiting the third set of optical couplers;
    wherein at least one of the selecting steps are computer implemented.

7. The procedure set forth in claim 6 wherein the second set of optical couplers includes a set of 1-to-2, optical-power-divider-type light distributors within a light distributor device, and the procedure further comprises the light distributor device performing at least one of:
    directing an entire optical power of the wavelength only to an express output thereof;
    directing the entire optical power of the wavelength only to one of subtending outputs thereof; and
    directing a portion of the optical power of the wavelength to only one of the subtending outputs and a portion of the optical power of the wavelength to the express output.

8. The procedure set forth in claim 6, further comprising combining signals from add ports contained on a port expansion module.

9. The procedure set forth in claim 6, further comprising combining all signals of add ports operable as express ports, and combining all signals of add ports that do not operate as express ports.

10. The procedure set forth in claim 6, further comprising processing (a) signals from add ports of the first reconfigurable optical add drop multiplexer core device, (b) a signal from an express output port of a second reconfigurable optical add drop multiplexer core device, and (c) a signal from an expansion output port of an expansion module attached to the first reconfigurable optical add drop multiplexer core device, wherein the third set of optical couplers resides on the first reconfigurable optical add drop multiplexer core device.

11. The procedure set forth in claim 6, wherein the selecting of the coupling ratios for the third set of optical couplers is performed such that a difference between levels of input signals to at least a first one of the optical couplers of the third set of optical couplers is about 6.7 dB.

12. The procedure set forth in claim 6, wherein at least one of the optical couplers of the third set of optical couplers is a 20/80% coupler.

13. The procedure set forth in claim 11, wherein the selecting of the coupling ratios for the third set of optical couplers is performed such that a difference between levels of input signals to at least a second one of the optical couplers of the third set of optical couplers is about 1.6 dB.

14. The procedure set forth in claim 13, wherein the second one of the optical couplers is a 40/60% coupler.

15. The procedure set forth in claim 14, wherein the first one of the optical couplers of the third set of optical couplers is a 20/80% coupler.

16. The procedure set forth in claim 15, wherein a third one of the optical couplers of the third set of optical couplers is a 35/65% coupler.

17. The procedure set forth in claim 16, wherein each optical coupler of the third set of optical couplers is a 2×1 optical coupler.

18. The node set forth in claim 1, wherein a first one of the optical couplers of the third set of optical couplers is a 20/80% coupler, a second one of the optical couplers of the third set of optical couplers is a 40/60% coupler, and a third one of the optical couplers of the third set of optical couplers is a 35/65% coupler.

19. The node set forth in claim 1, wherein each optical coupler of the third set of optical couplers is a 2×1 optical coupler.

20. The node set forth in claim 1, wherein a difference between levels of input signals to at least one of the optical couplers of the third set of optical couplers is about 6.7 dB.

\* \* \* \* \*